(12) United States Patent
Fang et al.

(10) Patent No.: US 12,003,374 B2
(45) Date of Patent: *Jun. 4, 2024

(54) SYSTEM, METHOD, AND APPARATUS FOR EXTRA VEHICLE COMMUNICATIONS CONTROL

(71) Applicant: Sonatus, Inc., Sunnyvale, CA (US)

(72) Inventors: Yu Fang, Palo Alto, CA (US); Xuanran Zong, Sunnyvale, CA (US); Jan Cardenas, Cupertino, CA (US)

(73) Assignee: Sonatus, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/674,309

(22) Filed: Feb. 17, 2022

(65) Prior Publication Data

US 2022/0173971 A1 Jun. 2, 2022

Related U.S. Application Data

(63) Continuation of application No. 17/570,738, filed on Jan. 7, 2022, which is a continuation of application
(Continued)

(51) Int. Cl.
*G06F 15/16* (2006.01)
*G06F 9/54* (2006.01)
(Continued)

(52) U.S. Cl.
CPC .......... *H04L 41/0893* (2013.01); *G07C 5/008* (2013.01); *H04L 41/28* (2013.01);
(Continued)

(58) Field of Classification Search
CPC ....... H04L 41/0893; H04L 2012/40215; H04L 29/12849; H04L 45/72; H04W 4/40
(Continued)

(56) References Cited

U.S. PATENT DOCUMENTS

| 6,292,731 B1 | 9/2001 | Kirchhoffer et al. |
| 8,705,527 B1 | 4/2014 | Addepalli et al. |

(Continued)

FOREIGN PATENT DOCUMENTS

| KR | 20010027471 A | * | 4/2001 |
| KR | 20010027471 A | | 4/2001 |

(Continued)

OTHER PUBLICATIONS

Wai Chen and Shengwei Cai, "Ad hoc peer-to-peer network architecture for vehicle safety communications," in IEEE Communications Magazine, vol. 43, No. 4, pp. 100-107, Apr. 2005, doi: 10.1109/MCOM.2005.1421912. (Year: 2005).*

(Continued)

*Primary Examiner* — Hamza N Algibhah
(74) *Attorney, Agent, or Firm* — GTC Law Group PC & Affiliates

(57) ABSTRACT

An example system includes a mobile system having a first network zone and a second network zone of a different type than the first network zone; a policy manager circuit structured to interpret a policy comprising an external data routing description, wherein the external data routing description comprises a local domain name server (DNS) comprising a plurality of local address values for end points of the second network zone; a gatekeeper interface circuit interposed between the first network zone and a transceiver selectively couplable to an external device; and a configuration circuit structured to configure the gatekeeper interface circuit in response to the external data routing description; wherein the gatekeeper interface circuit is structured to regulate communications between end points of the first network zone and the transceiver, and to regulate communications between end points of the second network zone and the transceiver.

25 Claims, 63 Drawing Sheets

Related U.S. Application Data

No. 17/027,187, filed on Sep. 21, 2020, now Pat. No. 11,228,496.

(60) Provisional application No. 63/024,383, filed on May 13, 2020, provisional application No. 62/986,444, filed on Mar. 6, 2020, provisional application No. 62/911,249, filed on Oct. 5, 2019, provisional application No. 62/911,248, filed on Oct. 5, 2019, provisional application No. 62/903,462, filed on Sep. 20, 2019.

(51) Int. Cl.
| | |
|---|---|
| *G07C 5/00* | (2006.01) |
| *H04L 9/40* | (2022.01) |
| *H04L 29/06* | (2006.01) |
| *H04L 41/0893* | (2022.01) |
| *H04L 41/28* | (2022.01) |
| *H04L 43/0876* | (2022.01) |
| *H04L 47/20* | (2022.01) |
| *H04L 61/3015* | (2022.01) |
| *H04L 61/4511* | (2022.01) |
| *H04W 4/40* | (2018.01) |

(52) U.S. Cl.
CPC .......... *H04L 43/0876* (2013.01); *H04L 47/20* (2013.01); *H04L 61/3025* (2013.01); *H04L 61/4511* (2022.05); *H04L 63/0236* (2013.01); *H04W 4/40* (2018.02)

(58) Field of Classification Search
USPC ........................................................ 709/223
See application file for complete search history.

(56) References Cited

U.S. PATENT DOCUMENTS

| | | | |
|---|---|---|---|
| 9,355,507 B1 | 5/2016 | Lee et al. | |
| 9,634,892 B2* | 4/2017 | Das .................. | H04W 4/029 |
| 9,852,636 B2 | 12/2017 | Chow et al. | |
| 9,871,819 B2* | 1/2018 | Liyanage ............... | H04L 67/12 |
| 10,573,168 B1 | 2/2020 | Razak et al. | |
| 10,616,176 B2* | 4/2020 | Lei ......................... | H04L 67/12 |
| 10,650,621 B1 | 5/2020 | King et al. | |
| 10,759,424 B2 | 9/2020 | Misu et al. | |
| 10,945,199 B2* | 3/2021 | Omiya ................... | H04W 24/08 |
| 10,951,728 B2* | 3/2021 | Lepp ..................... | H04W 4/48 |
| 11,072,356 B2 | 7/2021 | Mong et al. | |
| 11,165,651 B2 | 11/2021 | Fang et al. | |
| 11,228,496 B2 | 1/2022 | Fang et al. | |
| 11,252,039 B2 | 2/2022 | Fang et al. | |
| 11,287,150 B2 | 3/2022 | Guan et al. | |
| 11,349,717 B2 | 5/2022 | Fang et al. | |
| 11,362,899 B2 | 6/2022 | Fang et al. | |
| 11,386,229 B2 | 7/2022 | Adams et al. | |
| 11,411,823 B2 | 8/2022 | Fang et al. | |
| 11,538,287 B2 | 12/2022 | Fang et al. | |
| 11,805,018 B2 | 10/2023 | Fang et al. | |
| 11,824,722 B2 | 11/2023 | Fang et al. | |
| 2001/0033225 A1* | 10/2001 | Razavi .................... | H04L 67/34 |
| | | | 340/425.5 |
| 2006/0155438 A1 | 7/2006 | Tsunoda et al. | |
| 2007/0229350 A1* | 10/2007 | Scalisi .............. | G08B 21/0247 |
| | | | 342/350 |
| 2008/0119983 A1 | 5/2008 | Inbarajan et al. | |
| 2008/0147250 A1 | 6/2008 | Oesterling et al. | |
| 2008/0195257 A1 | 8/2008 | Rauch | |
| 2008/0258939 A1 | 10/2008 | Smith et al. | |
| 2009/0125153 A1 | 5/2009 | Yang et al. | |
| 2009/0187968 A1 | 7/2009 | Roese et al. | |
| 2009/0207818 A1 | 8/2009 | Tsai et al. | |
| 2010/0169353 A1 | 7/2010 | Soetarman | |
| 2010/0269155 A1 | 10/2010 | Droms et al. | |
| 2011/0078299 A1 | 3/2011 | Nagapudi et al. | |
| 2011/0153149 A1* | 6/2011 | Jeon .................. | H04L 29/12849 |
| | | | 701/29.6 |
| 2011/0260884 A1 | 10/2011 | Yi et al. | |
| 2013/0159489 A1* | 6/2013 | Cha ....................... | H04L 65/1069 |
| | | | 709/223 |
| 2013/0303192 A1 | 11/2013 | Louboutin et al. | |
| 2013/0311774 A1 | 11/2013 | Larson et al. | |
| 2014/0173076 A1 | 6/2014 | Ravindran et al. | |
| 2014/0215491 A1 | 7/2014 | Addepalli et al. | |
| 2014/0277935 A1 | 9/2014 | Daman et al. | |
| 2014/0325602 A1* | 10/2014 | Kwon ..................... | H04L 63/08 |
| | | | 726/4 |
| 2014/0350768 A1* | 11/2014 | Filippov ................ | B62D 1/286 |
| | | | 701/23 |
| 2014/0359185 A1 | 12/2014 | Sawal et al. | |
| 2015/0071115 A1 | 3/2015 | Neff et al. | |
| 2015/0210287 A1 | 7/2015 | Penilla et al. | |
| 2015/0244806 A1 | 8/2015 | Renac et al. | |
| 2015/0276415 A1 | 10/2015 | Shrinath et al. | |
| 2016/0133063 A1 | 5/2016 | Lim et al. | |
| 2016/0163136 A1 | 6/2016 | Lee et al. | |
| 2016/0197776 A1* | 7/2016 | Das ....................... | H04W 8/265 |
| | | | 455/419 |
| 2016/0255154 A1* | 9/2016 | Kim ..................... | H04L 63/1433 |
| | | | 726/25 |
| 2016/0275158 A1* | 9/2016 | Baset ..................... | G06F 16/367 |
| 2016/0294605 A1 | 10/2016 | Searle et al. | |
| 2016/0328197 A1 | 11/2016 | Bai et al. | |
| 2017/0054574 A1 | 2/2017 | Wu et al. | |
| 2017/0147989 A1 | 5/2017 | Onimaru | |
| 2017/0161973 A1 | 6/2017 | Katta et al. | |
| 2017/0210228 A1 | 7/2017 | Katayama et al. | |
| 2017/0248965 A1 | 8/2017 | Wellman et al. | |
| 2017/0339095 A1* | 11/2017 | Lei .......................... | H04L 41/12 |
| 2017/0359128 A1 | 12/2017 | Xi et al. | |
| 2018/0007161 A1 | 1/2018 | Hwang et al. | |
| 2018/0017404 A1 | 1/2018 | Mendels et al. | |
| 2018/0072250 A1 | 3/2018 | Kim et al. | |
| 2018/0131524 A1* | 5/2018 | Shin ....................... | H04L 9/0643 |
| 2018/0189323 A1 | 7/2018 | Wheeler | |
| 2018/0191636 A1* | 7/2018 | Wang ..................... | H04L 47/32 |
| 2018/0232235 A1 | 8/2018 | Gaur et al. | |
| 2018/0237039 A1 | 8/2018 | Mong et al. | |
| 2018/0261020 A1 | 9/2018 | Petousis et al. | |
| 2018/0267530 A1 | 9/2018 | Sugaiwa et al. | |
| 2018/0270230 A1 | 9/2018 | Schmidt et al. | |
| 2018/0286152 A1 | 10/2018 | Iwaasa | |
| 2018/0287815 A1 | 10/2018 | Yamamoto et al. | |
| 2018/0293809 A1 | 10/2018 | James et al. | |
| 2018/0357561 A1 | 12/2018 | Selvarajan et al. | |
| 2018/0367525 A1 | 12/2018 | Kassimis et al. | |
| 2019/0020985 A1 | 1/2019 | Dai et al. | |
| 2019/0097932 A1* | 3/2019 | Buczek .................. | H04L 69/14 |
| 2019/0108049 A1 | 4/2019 | Singh et al. | |
| 2019/0141142 A1 | 5/2019 | Filippou et al. | |
| 2019/0215185 A1 | 7/2019 | Hellenthal | |
| 2019/0260800 A1 | 8/2019 | Shalev et al. | |
| 2019/0334763 A1* | 10/2019 | Cawse ................ | H04L 41/0677 |
| 2019/0349071 A1* | 11/2019 | Saxena ................... | H04W 4/44 |
| 2019/0356574 A1 | 11/2019 | Schoch | |
| 2019/0379683 A1 | 12/2019 | Overby et al. | |
| 2019/0394089 A1* | 12/2019 | Barrett ................ | H04L 63/1416 |
| 2019/0394305 A1 | 12/2019 | Kim et al. | |
| 2020/0036717 A1 | 1/2020 | Akella et al. | |
| 2020/0057630 A1 | 2/2020 | Cho et al. | |
| 2020/0145252 A1 | 5/2020 | Torisaki et al. | |
| 2020/0160633 A1* | 5/2020 | Zhang .................. | G07C 9/00309 |
| 2020/0208998 A1 | 7/2020 | Xiang et al. | |
| 2020/0209002 A1 | 7/2020 | Hou et al. | |
| 2020/0210336 A1 | 7/2020 | Bräutigam et al. | |
| 2020/0218531 A1 | 7/2020 | Kushwaha et al. | |
| 2020/0252339 A1 | 8/2020 | Mckeefery et al. | |
| 2020/0257317 A1 | 8/2020 | Musk et al. | |
| 2020/0259919 A1* | 8/2020 | Lepp .................... | H04L 67/2833 |
| 2020/0264632 A1* | 8/2020 | Sugimoto ............ | G05D 1/0297 |
| 2020/0267080 A1 | 8/2020 | Joshi et al. | |
| 2020/0342691 A1 | 10/2020 | Saers et al. | |
| 2020/0361487 A1* | 11/2020 | Sakamoto .............. | B60R 16/02 |

(56) References Cited

U.S. PATENT DOCUMENTS

| | | | |
|---|---|---|---|
| 2020/0406910 A1 | 12/2020 | Ruan et al. | |
| 2021/0026617 A1 | 1/2021 | Maru et al. | |
| 2021/0070321 A1* | 3/2021 | Serizawa | B60W 50/0098 |
| 2021/0075800 A1* | 3/2021 | Paraskevas | H04W 4/48 |
| 2021/0092018 A1 | 3/2021 | Fang et al. | |
| 2021/0092019 A1 | 3/2021 | Fang et al. | |
| 2021/0155267 A1* | 5/2021 | Goto | B60W 40/105 |
| 2021/0155269 A1* | 5/2021 | Oba | G08G 1/16 |
| 2021/0171042 A1* | 6/2021 | Hayakawa | B60W 30/146 |
| 2021/0173911 A1* | 6/2021 | Ohashi | B60R 25/25 |
| 2021/0192867 A1 | 6/2021 | Fang et al. | |
| 2021/0197831 A1 | 7/2021 | Choi et al. | |
| 2021/0234760 A1 | 7/2021 | Fang et al. | |
| 2021/0234761 A1 | 7/2021 | Fang et al. | |
| 2021/0234762 A1 | 7/2021 | Fang et al. | |
| 2021/0234763 A1 | 7/2021 | Fang et al. | |
| 2021/0258189 A1 | 8/2021 | Toyoda et al. | |
| 2021/0264693 A1 | 8/2021 | Rueck et al. | |
| 2021/0310217 A1 | 10/2021 | Akiyama et al. | |
| 2021/0407220 A1 | 12/2021 | Fang et al. | |
| 2022/0070063 A1 | 3/2022 | Fang et al. | |
| 2022/0078084 A1 | 3/2022 | Fang et al. | |
| 2022/0131751 A1 | 4/2022 | Fang et al. | |
| 2022/0131753 A1 | 4/2022 | Fang et al. | |
| 2022/0131755 A1 | 4/2022 | Fang et al. | |
| 2022/0173969 A1 | 6/2022 | Fang et al. | |
| 2022/0173970 A1 | 6/2022 | Fang et al. | |
| 2022/0173972 A1 | 6/2022 | Fang et al. | |
| 2022/0231917 A1 | 7/2022 | Fang et al. | |
| 2022/0271971 A1 | 8/2022 | Newald et al. | |
| 2022/0297635 A1 | 9/2022 | Fang et al. | |
| 2023/0150523 A1 | 5/2023 | Fang et al. | |
| 2023/0154244 A1 | 5/2023 | Fang et al. | |
| 2023/0154245 A1 | 5/2023 | Fang et al. | |
| 2023/0154246 A1 | 5/2023 | Fang et al. | |
| 2023/0158974 A1 | 5/2023 | Fang et al. | |
| 2023/0158975 A1 | 5/2023 | Fang et al. | |
| 2023/0161583 A1 | 5/2023 | Fang et al. | |
| 2023/0360448 A1 | 11/2023 | Fang et al. | |
| 2023/0396634 A1 | 12/2023 | Fang et al. | |

FOREIGN PATENT DOCUMENTS

| | | |
|---|---|---|
| KR | 100310412 B1 * | 9/2001 |
| KR | 100310412 B1 | 9/2001 |
| WO | 2001026332 | 4/2001 |
| WO | 2007050406 A1 | 5/2007 |
| WO | 2020150872 A1 | 7/2020 |
| WO | 2021055952 A1 | 3/2021 |
| WO | 2021055955 A1 | 3/2021 |
| WO | 2021178979 A1 | 9/2021 |
| WO | 2021178979 A8 | 10/2021 |
| WO | 2022218554 A1 | 10/2022 |
| WO | 2022256742 A1 | 12/2022 |
| WO | 2023059938 A1 | 4/2023 |

OTHER PUBLICATIONS

Chapin, Peter C., et al., "Authorization in Trust Management: Features and Foundations", Retrieved on Dec. 2, 2020 (Dec. 2, 2020) from <http://lemuria.cis.vtc.edu/-pchapin/papers/chapin-skalka-wang-ACMCS2008.pdf> entire document, 48 pages.

Chen, Wai , et al., "Ad hoc peer-to-peer network architecture for vehicle safety communications", IEEE Communications Magazine, vol. 43, No. 4, 2005, pp. 100-107.

Nguyen-Duy, Jonathan , "Smart Cars: A Peek Into the Future of Converged Networks", Jan. 9, 2018, 4 pages.

PCT/US2020/051817 , "International Application Serial No. PCT/US2020/051817, International Search Report and Written Opinion dated Feb. 24, 2021", Sonatus, Inc., 23 pages.

PCT/US2020/051817 , "International Application Serial No. PCT/US2020/051817, Invitation to Pay Additional Fees and, Where Applicable, Protest Fee dated Dec. 1, 2020", Sonatus, Inc., 2 pages.

PCT/US2020/051825 , "International Application Serial No. PCT/US2020/051825, International Search Report and Written Opinion dated Jan. 13, 2021", Sonatus, Inc., 15 pages.

PCT/US2021/021421 , "International Application Serial No. PCT/US2021/021421, International Search Report and Written Opinion dated Jul. 21, 2021", Sonatus, Inc., 19 pages.

PCT/US2021/021421 , "International Application Serial No. PCT/US2021/021421, Invitation to Pay Additional Fees and, Where Applicable, Protest Fee dated May 10, 2021", Sonatus, Inc., 2 pages.

Wakikawa, Ryuji , et al., "Design of Vehicle Network: Mobile Gateway for MANET and NEMO Converged Communication", Sep. 2, 2005, 2 pages.

Wang, Yujing , et al., "Adapting a Container Infrastructure for Autonomous Vehicle Development", Cornell University Library/Computer Science/Software Engineering, Nov. 19, 2019, [online] [retrieved on Jun. 22, 2021 (Jun. 22, 2021)] Retrieved from the Internet < URL: https://arxiv.org/abs/1911.01075>, entire document,, 6 pages.

U.S. Appl. No. 17/570,018, filed Jan. 6, 2022, Pending.
U.S. Appl. No. 17/570,060, filed Jan. 6, 2022, Pending.
U.S. Appl. No. 17/570,125, filed Jan. 6, 2022, Pending.
U.S. Appl. No. 17/525,290, filed Nov. 12, 2021, Pending.
U.S. Appl. No. 17/570,738, filed Jan. 7, 2022, Pending.
U.S. Appl. No. 17/570,822, filed Jan. 7, 2022, Pending.
U.S. Appl. No. 17/570,853, filed Jan. 7, 2022, Pending.
U.S. Appl. No. 17/525,427, filed Nov. 12, 2021, Pending.
U.S. Appl. No. 18/123,151, filed Mar. 17, 2023, Pending, Yu Fang.
U.S. Appl. No. 18/123,159, filed Mar. 17, 2023, Pending, Yu Fang.
U.S. Appl. No. 18/123,172, filed Mar. 17, 2023, Pending, Yu Fang.
U.S. Appl. No. 18/123,183, filed Mar. 17, 2023, Pending, Yu Fang.
U.S. Appl. No. 18/123,186, filed Mar. 17, 2023, Pending, Yu Fang.
U.S. Appl. No. 18/123,188, filed Mar. 17, 2023, Pending, Yu Fang.
U.S. Appl. No. 18/123,193, filed Mar. 17, 2023, Pending, Yu Fang.
U.S. Appl. No. 18/123,195, filed Mar. 17, 2023, Pending, Yu Fang.
U.S. Appl. No. 18/123,198, filed Mar. 17, 2023, Pending, Yu Fang.
U.S. Appl. No. 18/123,203, filed Mar. 17, 2023, Pending, Yu Fang.
U.S. Appl. No. 18/123,208, filed Mar. 17, 2023, Pending, Yu Fang.

"Automotive testing and Engineering services", 2022, 20 pages.

Ishak, Mohamad Khairi, et al., "Vehicle Sensors Programming BAsed on Controller Area Network (CAN) Bus Using Canoe", 2019, 4 pages.

PCT/US2020/051817 , "International Application Serial No. PCT/US2020/051817, International Preliminary Report on Patentability dated Mar. 31, 2022", Sonatus, Inc., 22 pages.

PCT/US2021/021421 , "International Application Serial No. PCT/US2021/021421, International Preliminary Report on Patentability dated Sep. 15, 2022", Sonatus, Inc., 17 pages.

PCT/US2022/032380 , "International Application Serial No. PCT/US2022/032380, International Search Report and Written Opinion dated Sep. 8, 2022", Sonatus, Inc., 12 pages.

PCT/US2022/046292 , "International Application Serial No. PCT/US2022/046292, International Search Report and Written Opinion dated Mar. 7, 2023", Sonatus, Inc., 18 pages.

PCT/US2022/046292 , "International Application Serial No. PCT/US2022/046292, Invitation to Pay Additional Fees and, Where Applicable, Protest Fee dated Jan. 11, 2023", Sonatus, Inc., 2 pages.

PCTUS2020051825 , "International Application Serial No., International Preliminary Report on Patentability dated Mar. 31, 2022", Sonatus, Inc., 16 pages.

PCT/US2022/032380, "International Application Serial No. PCT/US2022/032380, International Preliminary Report on Patentability mailed Nov. 21, 2023", Sonatus, Inc., 13 pages.

PCT/US2023/032346, "International Application Serial No. PCT/US2023/032346, International Search Report and Written Opinion mailed Nov. 27, 2023", Sonatus, Inc., 3 pages.

* cited by examiner

2100

| | 2102 | 2104 | 2106 | 2108 |
|---|---|---|---|---|
| | END POINT | NETWORK ZONE | LOCAL ADDRESS | EXTERNAL ADDRESS |
| | CONTROLLER1 | ZONE1 | ID161 | IPv6_X1 |
| | SENSOR1 | ZONE2 | IPv4/IPv6_1 | IPv6_X2 |
| | SENSOR2 | ZONE1 | ID84 | IPv6_X3 |
| | CONTROLLER2 | ZONE2 | IPv4/IPv6_2 | IPv6_X4 |
| | INTERFACE CIRCUIT1 | ZONE2 | IPv4/IPv6_3 | IPv6_X5 |
| | CONTROLLER3 | ZONE2 | IPv4/IPv6_4 | IPv6_X6 |

PORT MIRRORING  TRAFFIC MONITORING   COUNTERS

| SAVE CONFIGURATION | START PORT MIRRORING | READ STATE |

SWITCH 0
FROM  TO
  ☐   ☐  ICU (PORT 0)
  ☐   ☐  RR_CAMERA (PORT 1)
  ☐   ☐  ADAS_PRK (PORT 2)
  ☐   ☐  CLUSTER (PORT 3)
  ☐   ☐  HUD (PORT 4)
  ☐   ☐  ISL (PORT 6)
  ☐   ☐  INTERNAL (PORT 7)
  ☐   ☐  HOST CPU (PORT 8)

FILTERS
INGRESS FILTER MODE
[ALL ⇅]
INGRESS FILTER
*A MAC ADDRESS*
EGRESS FILTER MODE
[ALL ⇅]
EGRESS FILTER
*A MAC ADDRESS*

SWITCH 0
FROM  TO
  ☐   ☐  O/S MIRR_DRIV (PORT 0)
  ☐   ☐  O/S MIRR_PASS (PORT 2)
  ☐   ☐  FRT_CAMERA (PORT 4)
  ☐   ☐  HU (PORT 6)
  ☐   ☐  INTERNAL (PORT 7)

FILTERS
INGRESS FILTER MODE
[ALL ⇅]
INGRESS FILTER
*A MAC ADDRESS*
EGRESS FILTER MODE
[ALL ⇅]
EGRESS FILTER
*A MAC ADDRESS*

DOWNSAMPLE INGRESS TO EVERY $N^{TH}$ PACKET
[ALL ⇅]
DOWNSAMPLE INGRESS TO EVERY $N^{TH}$ PACKET
[ALL ⇅]
MIRRORING TIMEOUT
[N MILLISECONDS ⇅]

*FIG. 22*

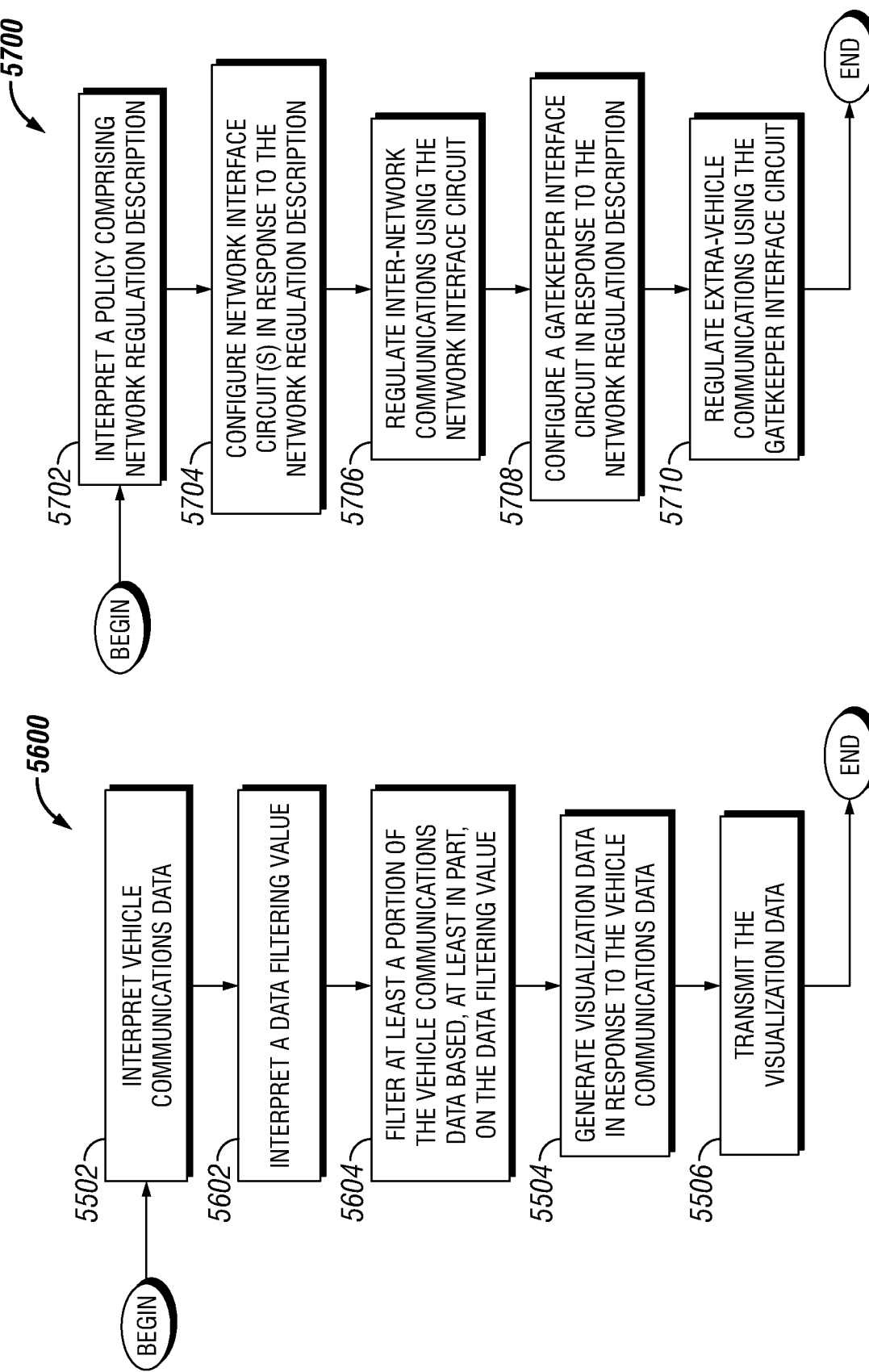

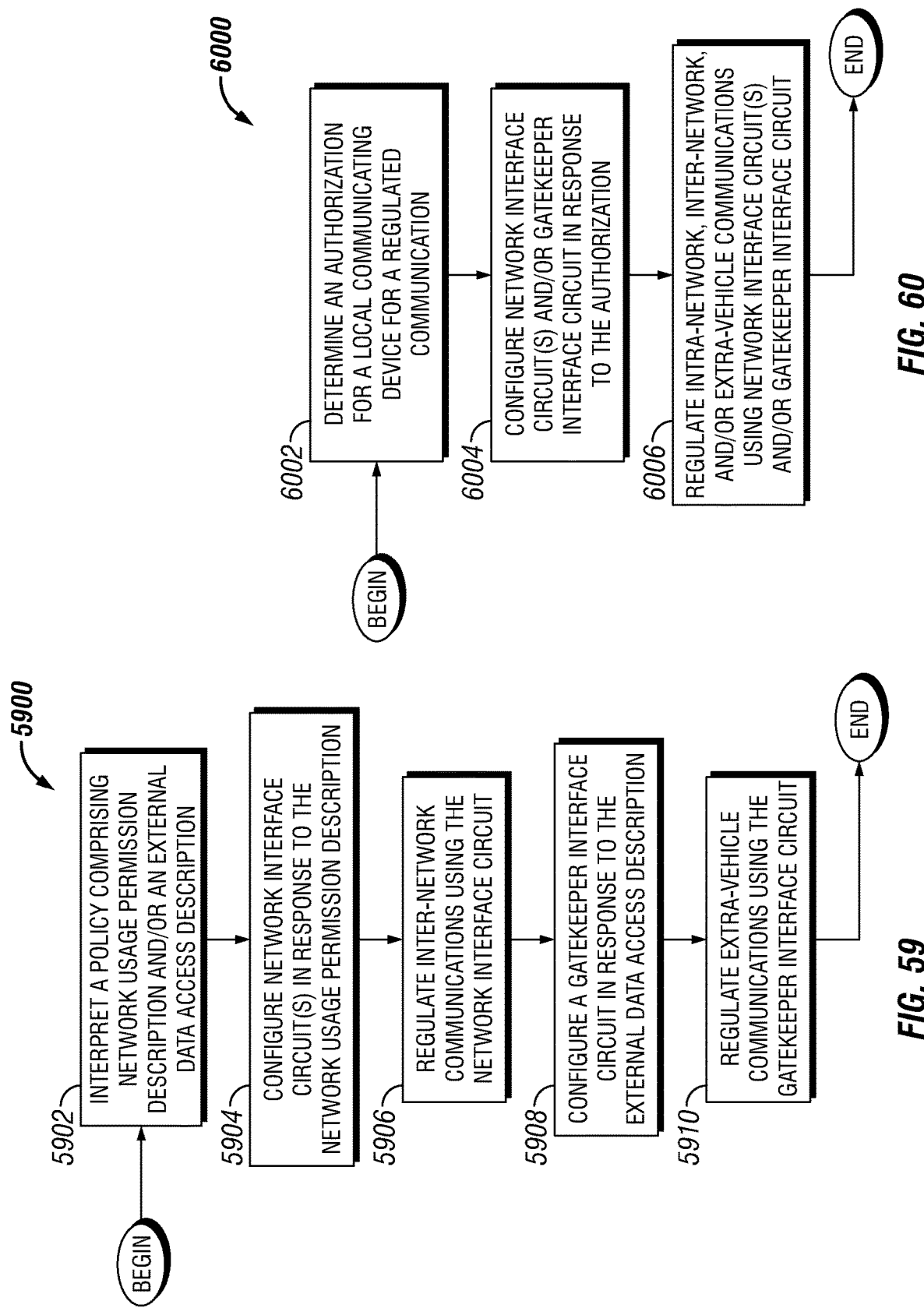

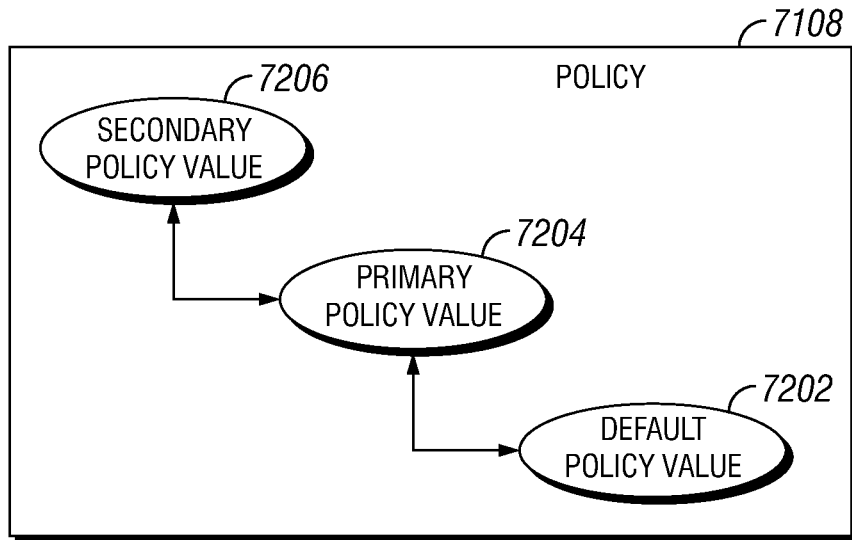
FIG. 72
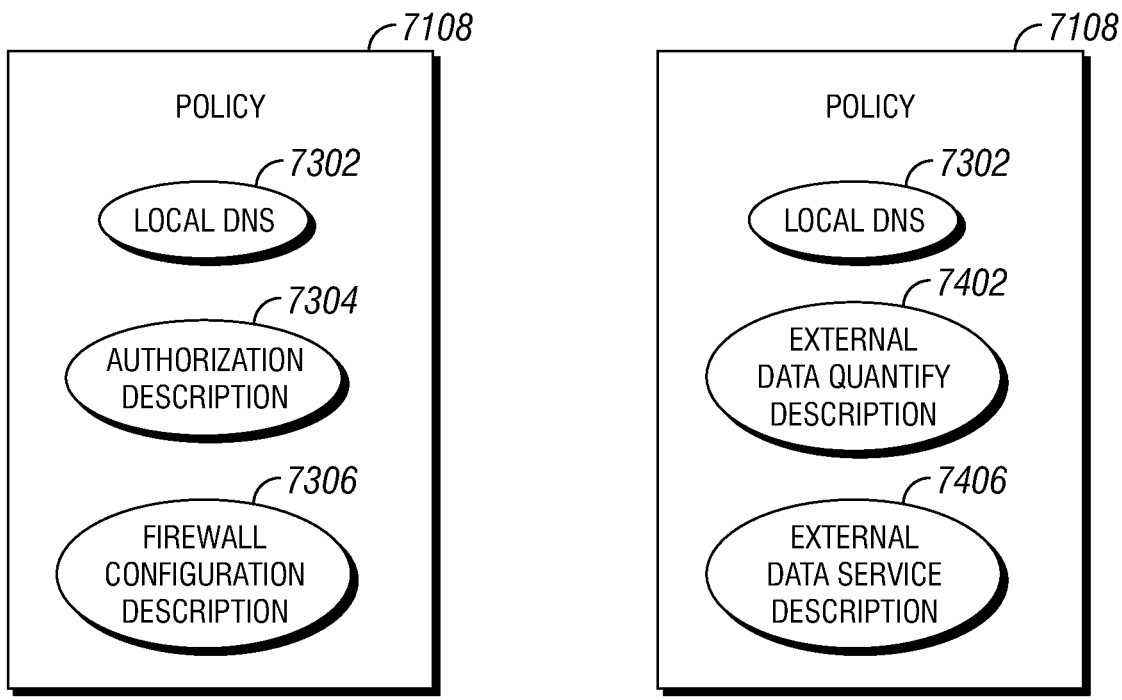
FIG. 73  FIG. 74

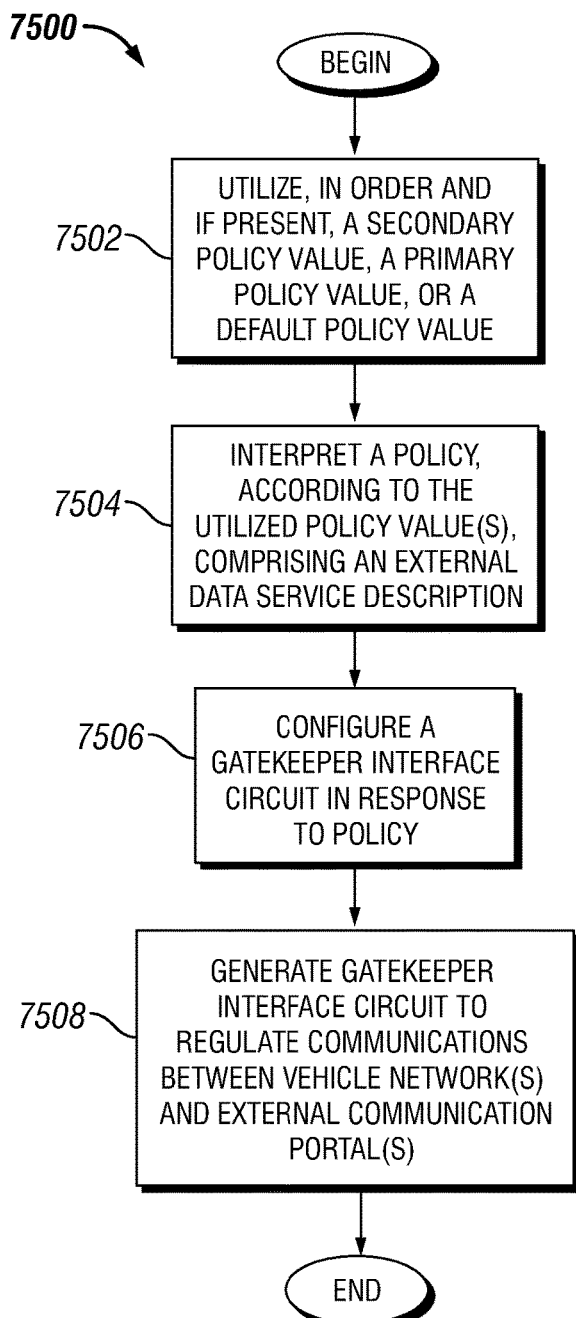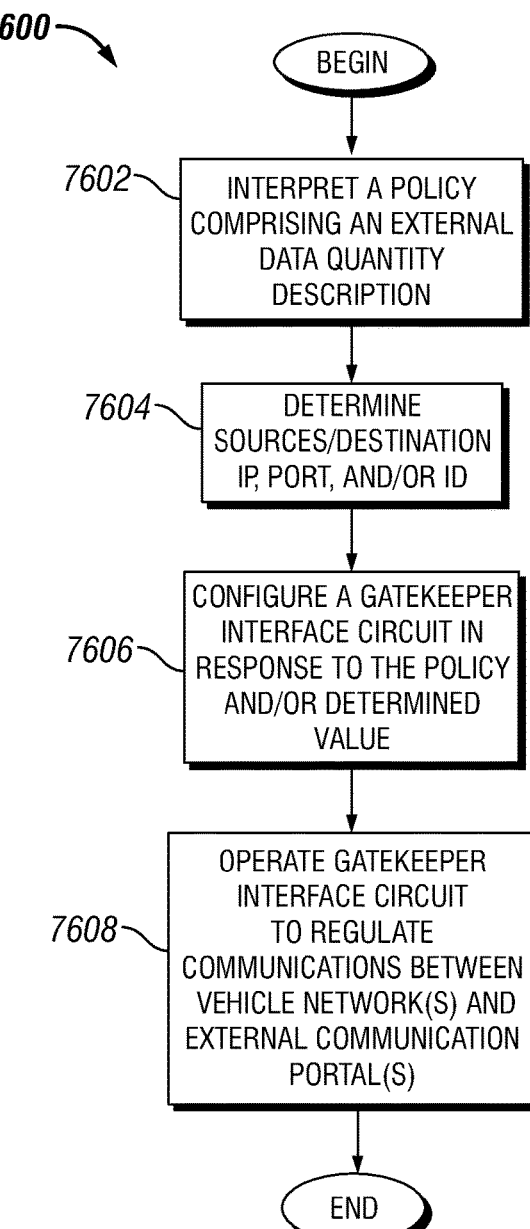
FIG. 75
FIG. 76

SYSTEM, METHOD, AND APPARATUS FOR EXTRA VEHICLE COMMUNICATIONS CONTROL

CROSS-REFERENCE TO RELATED APPLICATIONS

This application is a continuation of and claims priority to U.S. patent application Ser. No. 17/570,738, filed Jan. 7, 2022, now Publication No. US 2022-0131753 A1 and entitled SYSTEM, METHOD, AND APPARATUS TO EXTRA VEHICLE COMMUNICATIONS CONTROL.

Application Ser. No. 17/570,738 is a continuation of and claims priority to U.S. patent application Ser. No. 17/027,187, filed Sep. 21, 2020, now U.S. Pat. No. 11,228,496, issued Jan. 18, 2022 entitled SYSTEM, METHOD, AND APPARATUS TO EXTRA VEHICLE COMMUNICATIONS CONTROL.

Application Ser. No. 17/027,187 claims benefit of priority to the following provisional applications: U.S. Application Ser. No. 62/903,462, filed Sep. 20, 2019 entitled SYSTEM, METHOD AND APPARATUS FOR A MIXED VEHICLE NETWORK; U.S. Application Ser. No. 62/911,249 filed Oct. 5, 2019 entitled SYSTEM, METHOD AND APPARATUS FOR A MIXED VEHICLE NETWORK; U.S. Application Ser. No. 62/911,248, filed Oct. 5, 2019 entitled SYSTEM, METHOD AND APPARATUS FOR CLOUD-BASED INTERACTIONS WITH A MIXED VEHICLE NETWORK; U.S. Application Ser. No. 62/986,444, filed Mar. 6, 2020 entitled SYSTEM, METHOD AND APPARATUS FOR IMPLEMENTING CONFIGURABLE DATA COLLECTION FOR A VEHICLE; and U.S. Application Ser. No. 63/024,383, filed May 13, 2020 entitled SYSTEM, METHOD AND APPARATUS TO TEST AND VERIFY A VEHICLE NETWORK.

Each of the foregoing applications is incorporated herein by reference in its entirety.

BACKGROUND

Vehicle communication networks are utilized to connect sensors, actuators, controllers, and communication devices throughout a vehicle. Recent trends have been increasing the burden on these vehicle communication networks, with more devices being connected, more data passing between devices, lower latency requirements to meet vehicle performance, safety, and emissions requirements, and added vehicle features. Additionally, consumers expect increasing connectivity and features that increase the burdens on vehicle communication networks. These trends are expected to continue, and to accelerate, for the foreseeable future.

Traditional vehicle communication networks (CAN, LIN, FlexRay, MOST, LVDS, etc.) suffer from a number of drawbacks and challenges. These vehicle communication networks have been developed to meet the particular challenges of a vehicle environment, and have accordingly developed separately from other networks, such as computer local area networks, wide area networks, massively interconnected networks (e.g., the internet), and wireless networks. Most vehicle networks consist of a data link layer and an application layer, utilizing robust and dedicated equipment such as a Controller Area Network (CAN) bus, with dedicated or shared wiring between devices utilizing specific data protocols (e.g., J1939, OBD, etc.). A modern vehicle may have multiple network buses, with specific commands and communications available, and limited customization and data speed available. E.g., CAN buses typically operate at up to about 1 Mbps, with high capability CAN buses operating up to about 10 Mbps. Additionally, CAN buses experience latency greater than 25 ms, and generally higher from about 60 ms to 500 ms, depending upon the configuration, the traffic on the CAN, the priority for particular messages, and the like.

As the number of devices and the data rate demand from the devices increases, traditional vehicle communication networks require the implementation of higher performance buses. Because the automotive industry is a high volume industry with a very low tolerance for failure of components, automotive manufacturers utilize the same components for a long time, and across a broad range of vehicles—including sharing of components across manufacturers. Additionally, a change to a nominally more capable component may introduce risks, integration costs, re-certification burdens for a given application, or have other undesirable consequences to the system. Accordingly, even if vehicle communication networks transition to a higher capability network configuration, it is desirable to keep network types segregated in the system, and to keep a large number of legacy devices (e.g., CAN compatible) in a system for a long period of time.

Data collection from vehicles includes a number of additional challenges. For example, data collection operations are subject to regulation and liability risks, especially with data collection that may include private information, personally identifiable information, and/or liability related information. Data collectors, including entities that may have ownership or possession of sensitive data are subject to risk while holding data, for example in the event of inadvertent or malicious access to the data. With regard to vehicle data being collected, a large amount of data may be collected, and a large number of purposes for collecting the data may be present, increasing the risks relative to other general data storage applications. Accordingly, it may be desirable to control data collection, storage, and access, to reduce risks, and it may further be desirable to include verification of data access, partitioning or other exclusion of data when the data is not being used, and the like.

Data collection for vehicles is further complicated by the amount and type of data to be communicated between the vehicle and external devices, where the network system of the vehicle is limited by constraints of a mobile application, expenses and/or bandwidth limitations incurred by high data rates and/or large data transfers. Even in light of the foregoing, customer demands, market expectations, increasing requirements for efficiency of vehicle operations, and the increase of functional capability for data related applications are continuing to proliferate the aggregate amount of data to be transferred, the number of off-vehicle applications utilizing transferred data, the number of purposes that the data may be utilized for, and the number of users or entities having a legitimate need for portions of the transferred data. Additionally, applications utilizing the data continue to increase in sophistication and capability, increasing the data demand for the limited available transfer resources, and increasing the cost and complexity of logistical control and storage of the transferred data. For example, higher capability pathing or operational algorithms related to the vehicle, increasing automation of vehicle functions, increasing demand for prognostic determinations and/or maintenance support, and increasing media streams (both the number of media streams and the quality of those media streams) all drive for increased demand in data rates, stored data amounts, and the number of entities or applications accessing the stored data.

SUMMARY

The description herein references vehicle applications as a non-limiting example and for clarity of the present description. However, embodiments herein are applicable to other applications having similar challenges and/or implementations. Without limitation to any other application, embodiments herein are applicable to any application having multiple end points, including multiple data sources, controllers, sensors, and/or actuators, and which may further include end points present in distinct or distributed network environments, and/or applications having historical or legacy networking or communication systems that may be transitioning (within a given system, as a class of systems, and/or as an industry) to newer and/or more capable networking or communication systems. Example and non-limiting embodiments include one or more of: industrial equipment; robotic systems (including at least mobile robots, autonomous vehicle systems, and/or industrial robots); mobile applications (that may be considered "vehicles", or not) and/or manufacturing systems. It will be understood that certain features, aspects, and/or benefits of the present disclosure are applicable to any one or more of these applications, not applicable to others of these applications, and the applicability of certain features, aspects, and/or benefits of the present disclosure may vary depending upon the operating conditions, constraints, cost parameters (e.g., operating cost, integration cost, operating cost, data communication and/or storage costs, service costs and/or downtime costs, etc.) of the particular application. Accordingly, wherever the present disclosure references a vehicle, a vehicle system, a mobile application, industrial equipment, robotic system, and/or manufacturing systems, each one of these are also contemplated herein, and may be applicable in certain embodiments, or not applicable in certain other embodiments, as will be understood to one of skill in the art having the benefit of the present disclosure.

The disclosure herein, as reflected in the described embodiments, has recognized that the complexities and other challenges set forth preceding have synergistic effects that cause the complexity of the vehicle data environment to be even greater than the sum of the individual contributions from each challenge.

As one example, the increasing number of entities or applications accessing the data increases the likelihood that individual data requests will overlap—for example with multiple entities requesting the same or similar data. Further, the increasing number of entities or applications accessing the data increases the likelihood that members of the accessing group will share similar authorization levels, such that the data access for individual members of the entity or application group will benefit from data management.

In another example, regulations regarding sensitive data are increasing, which increases the data management requirements of the system generally, but also increases the likelihood that data management may be subjected to multiple constraints at a given time, and/or changing constraints over time as regulations change, and/or based on the relevant jurisdiction(s) that may change as the location of the vehicle changes.

In yet another example, the complex environment of presently known and transitioning vehicle network architectures—for example vehicles having mixed network types and/or partitioned networks—increase the complexity of data access for individual entities that, without certain aspects of the present disclosure, may otherwise be required to determine requesting parameter specifications for particular data elements, and to update those requesting parameters as vehicle network architectures evolve. In view of the increasing number of entities requesting data access, the aggregate cost to the automotive support market increases non-linearly, as each of the entities incurs the costs to track requesting parameter specifications. Additionally, the trajectory of additional entities requesting data access is moving toward entities that are positioned further away in the technological knowledge space from core automotive functions, and accordingly the intricacies and idiosyncrasies of vehicle and/or automotive applications, including on-vehicle network configurations, specific data descriptions, data requesting and communication protocols, industry standards or customs for presenting information, and the like, are becoming less well known on average for each incremental new entity, further increasing the cost volume function (e.g., the cost over time for a given entity to meet desired data collection deliverables, where the given entity may be an automotive manufacturer, and/or a vehicle market, a geographic market, and/or an industry such as the automotive industry, the passenger car industry, etc.). For example, consider a notional cost volume function such as:

COST=# of entities*basic learning cost*adapting to transition cost trajectory*data trajectory cost*regulatory adaptation cost*data access/ storage liability cost The described COST function is a non-limiting notional example to demonstrate how various challenges and complications with regard to presently known systems interact and synergize to increase the costs to meet future data collection functions for vehicle applications. The cost parameters described are not intended to cover all costs related to the challenges present for the automotive data collection industry or presently known systems. Parameters may be averages or other complex functions, and the values of particular parameters will generally not be known with specificity. In addition, the units of the COST may be expressed in monetary values, as a resource (e.g., engineering hours, computation time, etc.) to meet data collection targets over time, as another non-monetary unit such as equivalent emissions, customer satisfaction, risk incurred, public perception losses or gains, etc. The # of entities parameter reflects generally the number of entities accessing vehicle data over time; the basic learning cost reflects the costs for new entities to learn the specifics of data collection requirements and protocols for a specific vehicle, vehicle type, market, etc.; the adapting to transition cost trajectory reflects the costs to adapt to changing vehicle network configurations, including network types and organization, and interactions with end points or devices on those networks; the data trajectory cost reflects the increasing demand for data collection from relevant vehicles over time, including data communication, storage, and resulting functional consequences such as not being able to support a desired application or costs to enhance data communication infrastructure; the regulatory adaptation cost reflects the costs associated with an increasing number of regulations, an increasing number of regulatory frameworks, and/or an increasing number of regulating entities; and the data access/ storage liability cost reflects the costs incurred for compliance and security of data, and/or losses incurred due to data breaches, unauthorized use, premature expiration of data, or the like.

Without limitation to any other aspect of the present disclosure, aspects of the disclosure herein reduce and/or eliminate any one or more of: a cost per entity added to a data collection system, a basic learning cost for a new entity to implement an application utilizing collected data, an adaptation cost to changing vehicle network configuration(s), a cost incurred to meet the increasing demand for data collection, a cost to adapt to a changing regulatory environment, and/or a cost to secure data and/or losses incurred for breaches or unauthorized use. Certain embodiments and/or aspects of the disclosure herein may address one or more of the described cost parameters. Certain embodiments and/or aspects of the disclosure herein may increase one or more given cost parameters, but nevertheless be beneficial by decreasing the overall cost function for a target vehicle, vehicle type, entity, industry, etc. Certain embodiments and/or aspects of the disclosure herein may increase one or more given cost parameters, but provide other benefits such as improved functionality. In certain embodiments, improved functionality may be achieved at an increased cost, but at a lower cost than previously known systems configured to achieve a similar improved functionality.

Without limitation to any other aspect of the present disclosure, embodiments herein provide for configuration of inter-network, intra-network, and extra-vehicle communications control utilizing off-vehicle devices, such as cloud applications, web based tools or applications, manufacturing tools, OEM tools, service tools, or the like. Embodiments herein provide for execution of active diagnostics, active tests, vehicle control operations, and/or active assistance operations, including operations involving flows, application, service groups, and/or vehicle functions that include both on-vehicle and off-vehicle aspects and/or participating devices. Embodiments herein provide for convenient monitoring, diagnostics, and configuration of inter-network, intra-network, and extra-vehicle communications, including communications traveling between end points, between networks, and/or to external devices, and further including communications involving associated end points, where associations are made according to related flows, vehicle functions, applications, service groups, source and/or destination addresses, and/or source and/or destination ports. Embodiments herein provide for consolidation (physical and/or logical) of extra-vehicle communications control, regulation, data management, security implementation, authorization implementation, permissions implementation, service implementation, and/or subscription implementation. Embodiments herein provide for scheduled implementation of a policy, including updating the policy, adjusting the policy, and/or checking for authorization for changes to the policy. Embodiments herein provide for scheduled implementation of communication service levels and/or QoS implementation, including for communications related to end points, flows, applications, vehicle functions, vehicle controllers, service groups, and/or external communication portals. Embodiments herein provide for scheduled implementation of data utilization, including utilization of particular external communication portals, APNs, and/or data service providers. Embodiments herein provide for adjustment of external communication portals for extra-vehicle communications to reduce costs, improve service levels, limit and/or reduce data utilization of particular external communication portals, improve overall capability of extra-vehicle communications to support the vehicle mission, and/or to make such adjustments transparently to communicating devices (e.g., local communicating devices, and/or external devices, applications, and/or tools).

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

BRIEF DESCRIPTION OF THE FIGURES

FIG. 21 is a schematic, illustrative, example of a local DNS table.

FIG. 22 is a schematic, illustrative, example of vehicle communications data.

FIG. 56 is a schematic flow diagram depicting an example procedure for regulating communications of a vehicle.

FIG. 57 is a schematic flow diagram depicting an example procedure for regulating communications of a vehicle.

FIG. 59 is a schematic flow diagram depicting an example procedure for regulating communications of a vehicle.

FIG. 60 is a schematic flow diagram depicting an example procedure for regulating communications of a vehicle.

FIG. 72 is a schematic, illustrative, example of a policy.

FIG. 73 is a schematic, illustrative, example of a policy.

FIG. 74 is a schematic, illustrative, example of a policy.

FIG. 75 is a schematic flow diagram depicting an example procedure for regulating communications of a vehicle.

FIG. 76 is a schematic flow diagram depicting an example procedure for regulating communications of a vehicle.

DETAILED DESCRIPTION

Figure 1:
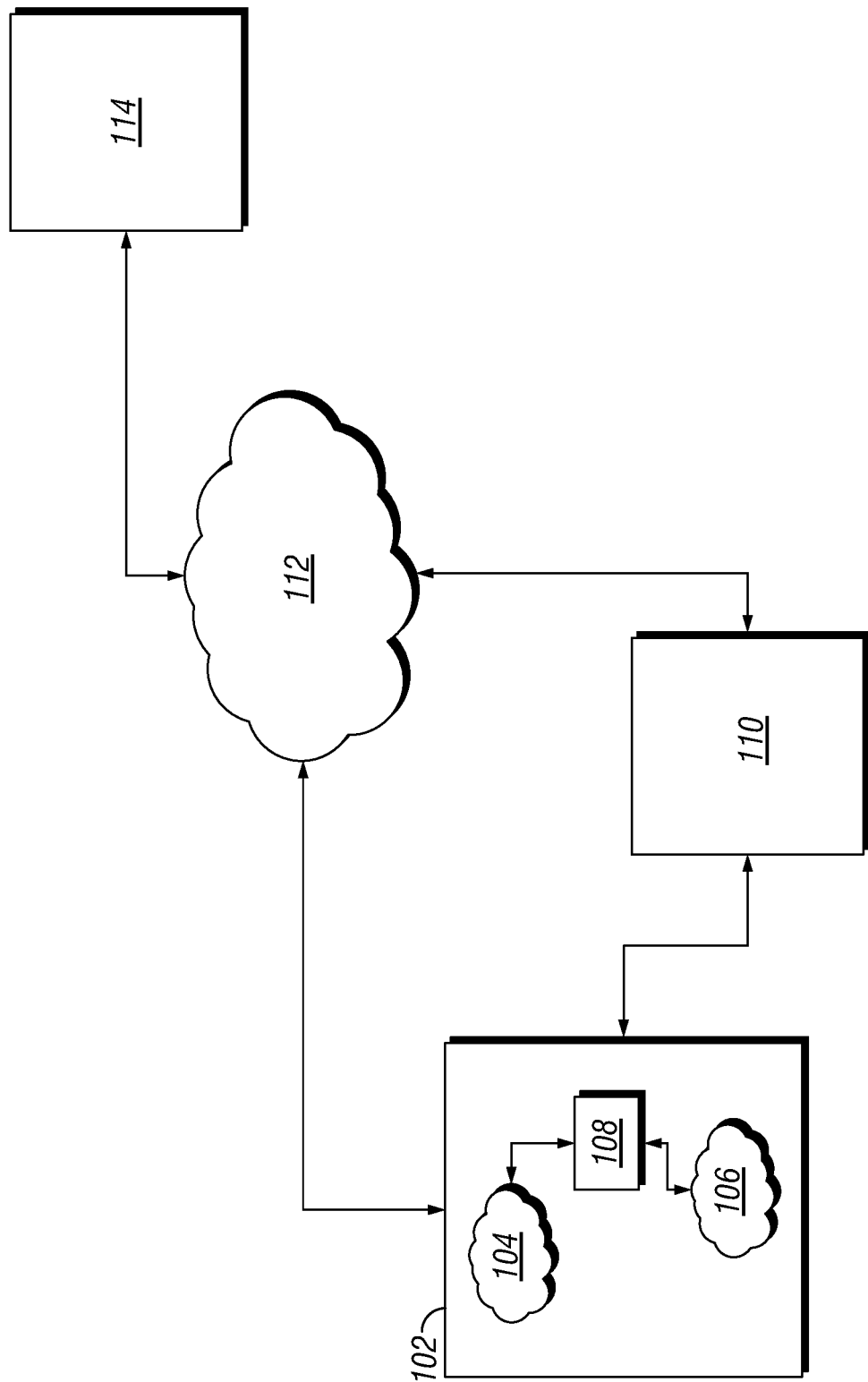
FIG. 1 is a schematic diagram of an example system for regulating networks on a vehicle according to certain embodiments of the present disclosure.

Referencing FIG. 1, an example system schematically depicts aspects of embodiments of the present disclosure. The example system includes an application 102 (e.g., a vehicle) having a first network 104 and a second network 106 thereon. A network, as utilized herein, should be understood broadly, and may include one or more aspects such as: the hardware implementation (e.g., wires and wiring configurations, applicable standards such as connectors, insulation, shielding, wire requirements such as gauging, twisting, coaxial arrangements, etc.), implementations of any layer (e.g., from the ISO 7 layer model, such as: application layer, presentation layer, session layer, transport layer, network layer, data link layer, and/or physical layer; although a given network may have fewer layers, and/or layers organized in a distinct manner); and/or may be wired or wireless in whole or part. Without limitation to any aspect of the present disclosure, example and non-limiting networks include a Controller Area Network (CAN), a Media Oriented Systems Transport (MOST) network, a Local Interconnect Network (LIN), a FlexRay network, a Time-Triggered Protocol (TTP) network, a Low-Voltage Differential Signaling (LVDS) network, and/or an Ethernet implemented network. In certain embodiments, one or more networks may be an electrical signal zone (e.g., a device providing data and/or receiving commands as an electrical signal, such as a voltage value, a frequency value, and indicated resistance value, or the like), such as a sensor or actuator electrically coupled to an interpreting device that is capable to receive information from, and/or pass information or commands to, one or more electrical devices on the electrical signal zone.

An example system includes the first network 104 being of a different type than the second network 106. As utilized herein, two networks having different types should be understood broadly, and includes networks having different protocols, at least one layer distinct from each other (e.g., having a distinct application layer, presentation layer, etc.), two networks that are not operationally compatible (e.g., a device coupled to one of the networks will not function on the second network without changes to connections, communications, or other aspects), and/or two networks that are not message compatible (e.g., messages configured for a first one of the networks could not be directly placed on the second one of the networks, due to a distinction such as addressing, frame construction, message logic compatibility, etc.). An example system includes the first network 104 being an Ethernet implemented network, and the second network 106 of a different type, such as a CAN network and/or a LIN network.

The example system further includes a converged network device (CND) 108 interposed between the first network 104 and the second network 106, and structured to facilitate communications between the first network 104 and the second network 106. The CND 108 interposed between the networks 104, 106 includes embodiments wherein the CND 108 passes communications between the networks 104, 106, for example receiving a communication from the first network 104, translating the communication for the second network 106 (e.g., encapsulating all or a portion of the communication into a message for the second network 106; converting aspects of the communication such as device addresses, bit depths for data, and/or unit values for data; and/or adding or removing aspects of the communication such as priority information, message delivery requests or requirements, industry standard information such as message identifiers, etc.). In certain embodiments, the CND 108 does not physically pass communications, or just passes a portion of the communications, but may regulate, manage, provide permissions, suppress messages, or otherwise control other devices (e.g., switches, routers, gateways, repeaters, or the like) that perform operations to pass communications between the networks. Accordingly, the CND 108 interposed between the networks 104, 106 may, in certain embodiments, be physically positioned between the networks 104, 106, where communications passing between the networks 104, 106 are physically received by a component of the CND 108. In certain embodiments, the CND 108 interposed between the networks 104, 106 may have visibility to communications on the networks 104, 106, and control devices to regulate the passing of messages between the networks. In certain embodiments, the CND 108 interposed between the networks 104, 106 may have visibility of end points on the networks 104, 106, and control devices to regulate the passing of messages between the end points of each network 104, 106.

One of skill in the art, having the benefit of the present disclosure, can readily arrange a CND 108 according to one of these interposition schemes, and/or according to a combination of more than one of these interposition schemes, having information ordinarily available when contemplating a particular system. Certain considerations when designing an interposition scheme for a CND 108 for a given system include, without limitation, include: the number and type of networks on the vehicle; the capabilities of the individual networks (e.g., throughput, bandwidth, address availability, broadcast/unicast/multi-cast availability and desirability of each network and/or end points on a network, requirements and/or availability of acknowledgement for each network and/or end points, and/or requirements and/or availability of encryption for each network and/or end points); the availability, position, and/or control over network implementing controllers (e.g., presence and ownership of switching devices; access to instructions, such as firmware or buffers, for available devices; and/or the connectivity of available devices to the one or more networks, such as whether the devices are arranged to implement desired message passing between networks, desired redundancy, and/or desired failure mode response); capability of network implementing controllers (e.g., buffer sizing and availability, message rate capacity, processing capacity); hardware cost considerations for adding CND-specific components to the system; hardware cost considerations for providing capability for CND operations in other components of the system; integration cost considerations and system capability to implement additional CND-specific components and/or adding capability for CND operations in other components of the system); the number, type, and/or message throughput of end points that utilize cross-network communications; the expected change of any one or more of these aspects over the life of the vehicle (e.g., due to service events, upgrades, and/or campaign events such as product recall events related to the vehicle); and/or the expected change of any one or more of these aspects over a life cycle of a related group of vehicles (e.g., a related fleet of vehicles; model year of vehicles; and/or a group of model years relevant to the system, such as vehicles expected to have a similar network infrastructure, with variance to the distribution of devices, changes to the network, or the like).

In the example of FIG. 1, a first external device 110 is depicted as communicatively coupled to the application 102. The first external device 110 is directly coupled to the application 102, which may include a directed wired connection (e.g., to a service port, OBD port, or other available connection) and/or a wireless connection (e.g., a WiFi connection such as an IEEE 801.11 compatible connection, and/or a Bluetooth connection). The first external device 110 may connect to a specific network (e.g., the first network 104 or the second network 106), and/or may connect to another device (e.g., the CND 108 and/or a device regulated by the CND 108) that manages communications with the external device 110 directly. Whether the external device 110 is coupled to a network 104, 106 or another device such as the CND 108, in certain embodiments the CND 108 is capable to manage communications such that the external device 110 receives only authorized communications, and further to manage communications such that the external device 110 may request communications from an end point on any network 104, 106 and nevertheless receive the requested information. In certain embodiments, the first external device 110 may be a service tool, original equipment manufacturer's (OEM's) tool, a manufacturer's tool, a body builder's tool, and/or an application (e.g., an application communicating through a computing device such as a laptop, desktop, mobile device, and/or mobile phone; e.g., an application operated by an owner, servicer personnel, fleet manager, or the like).

In the example of FIG. 1, a second external device 114 is depicted in communication with the application 102 and/or the first external device 110 through a cloud connection 112. The cloud connection 112 may be a connection of any type, including a mobile connection (e.g., a modem on the application 102 connecting using cellular data or another data service), an internet connection, a wide area network (WAN), and/or combinations of these. The cloud connection 112 may access the application 102 through a transceiver, which may form a part of the CND 108 and/or be regulated, at least in part, by the CND 108. In certain embodiments, an application 102 may have more than one transceiver, where one or more, or all, of the transceivers are regulated, at least in part, by the CND 108. In certain embodiments, the CND 108 may regulate certain vehicle communications (e.g., from certain networks, end points, devices, types of data, flows, and/or applications on the vehicle), but not other communications.

An end point, as used herein, should be understood broadly. An end point is an organizing concept for access to a network 104, 106 of the vehicle, and may include a specific device (e.g., an engine controller, a transmission controller, a door controller, an infotainment system, etc.), a group of devices having a single network access (e.g., multiple devices communicating together through a single network access point, where the network 104, 106 and/or the CND 108 may have visibility to the individual devices, or may only have visibility to the communications from the end point as a group). For example, a door controller (not shown) may be an end point for one of the networks 104, 106, with communications for underlying devices (e.g., door position sensor, door lock actuator and position, window actuator and position, etc.) passing to the network 104, 106 through the door controller end point, where the CND 108 may have visibility to the underlying devices (e.g., a message indicating door position, that includes identifiers that the door position sensor is sending the message), or may have visibility only to the door controller end point (e.g., the message indicating the door position is known to be provided by the door controller, but the CND 108 does not know which underlying device may have sent the message). One of skill in the art, having the benefit of the present disclosure and information ordinarily available about a contemplated system, can readily determine which devices in the system are end points for each network 104, 106. Certain considerations for determining end point arrangements include, without limitation: the availability of hardware ports on the network(s); the distribution of vehicle controllers; the messages that are to be passed between vehicle controllers; the regulating options (e.g., message rates, priorities, data collection, message configuration, identity information of components, addressing management between networks and with external devices, etc.) as set forth in the present disclosure that are to be available for a given end point; the desired granularity of data control (e.g., permissions for specific devices to provide or request information; permissions for applications either on-vehicle or off-vehicle to provide or request information; security authorization and type, such as per-user, per-entity, per-device, per-application, per-flow, etc.); and/or redundancy options that are to be available for the given system (e.g., redundancy of network communications capability, redundancy of control operations and related devices, and/or redundancy of CND operations where CND components are distributed in more than one location of the vehicle).

An application, as utilized herein, should be understood broadly. An example application includes a group of related vehicle functions or operations, for example speed control (e.g., of the vehicle, or a sub-component of the vehicle such as an engine or a driveline), anti-lock brake system (ABS) operations, an advanced driver-assistance system (ADAS), performance control (e.g., achieving a torque request, speed request, or other performance request from an operator), or other function of the vehicle. An example application includes a group of related functions apart from the vehicle, such as an application to support geolocation and/or navigation, to request and/or process service information about the vehicle, and/or a third-party application interacting with the operator (e.g., to find a nearest hotel, selected event, etc.). Applications may be implemented by the vehicle manufacturer, a supplier, an original equipment manufacturer, a body builder, a third party, the operator, service personnel, or the like. Applications, as used herein, provide an organizing concept that may be utilized to relate certain data, certain end points, and/or related functions of the vehicle. In certain embodiments, the CND 108 can utilize an application to identify a data source, a data destination, permissions available for the application, priority information related to the application, or the like, to implement certain data regulating operations herein.

A flow, as utilized herein, should be understood broadly. An example flow includes a related group of data (e.g., speed data, temperature data, audio-visual data, navigation data, etc.), a related group of functions (e.g., among vehicle functions, extra-vehicle functions such as service operations and/or data collection, aggregations between related vehicles, and/or combinations of these that are related for a particular system), a related group of devices (e.g., door actuators), and/or a related group of applications. Flows, as used herein, provide an organizing concept that may be utilized to relate certain data, certain end points, certain applications, and/or related functions of the vehicle or apart from the vehicle. In certain embodiments, the CND 108 can utilize a flow to identify a data source, a data destination, permissions available for the flow, priority information related to the flow, or the like, to implement certain data regulating operations here. In certain embodiments, the utilization of the flow allows the CND 108 to perform separate operations that may involve the same end points to support the desired network management. For example, a vehicle speed management application may have a high priority, and a speedometer end point may be associated with the vehicle speed management application. In the example, if the vehicle speed is being communicated to support the vehicle speed management application, then the CND 108 applies a high priority to the vehicle speed message. However, if the vehicle speed is being communicated to support a trip planning flow (e.g., where a trip planning flow is present and does not have a high priority), the CND 108 may apply a lower priority to the vehicle speed message. In a further example, a failure of a vehicle controller, portion of a network, or other off-nominal condition may result in the migration of the vehicle speed management application to another controller in the system, whereby the vehicle speed message is being communicated (e.g., where the backup controller is on another network) to support the vehicle speed management application, and the CND 108 may apply a higher priority to the vehicle speed message. The utilization of flows and applications to organize the components of the system allows for the same or similar information to be regulated by the CND 108 in a differential manner to support various functions, allowing for improvements in the performance and security of network regulation operations (e.g., reducing unnecessary cross-network traffic, providing information only as needed, and/or regulating communications with external devices), and supports additional functionality relative to previously known systems, such as redundancy support, distributed control, and granular cross-network messaging.

A service group, as utilized herein, should be understood broadly. An example service group includes a related group of applications for the vehicle. The related group of applications may be entirely positioned on the vehicle (e.g., one or more vehicle systems, functions, or other applications of the vehicle), and/or may include aspects that are positioned on external devices (e.g., with supporting processing, data collection or storage, externally sourced data used by the service group, etc.) which may be a web application, web tool, cloud application, service application, or the like. In certain embodiments, any group of local communicating devices may be logically related as a service group. The utilization of service groups to organize the components and/or applications of the system allows for the same or similar information to be regulated by the CND 108 in a differential manner to support various functions, allowing for improvements in the performance and security of network regulation operations (e.g., reducing unnecessary cross-network traffic, providing information only as needed, and/or regulating communications with external devices), and supports additional functionality relative to previously known systems, such as redundancy support, distributed control, and granular cross-network messaging.

Regulated components, as utilized herein, and without limitation to any other aspect of the present disclosure, include any components of a system that are regulated with respect to communications, including data collection, subscriptions, data requests, access to external devices and/or addresses, access to network zones, access to end points, utilization of communication resources (e.g., network zone bandwidth, external communication portals, total data limits or quantities, etc.). Regulated components include, without limitation, one or more of: end points, flows, applications, controllers, service groups, interface circuits, network zones, external communication portals, external devices, source addresses, destination addresses, vehicle functions, entities associated with any of these, users associated with any of these, and/or user roles associated with any of these.

Figure 15:
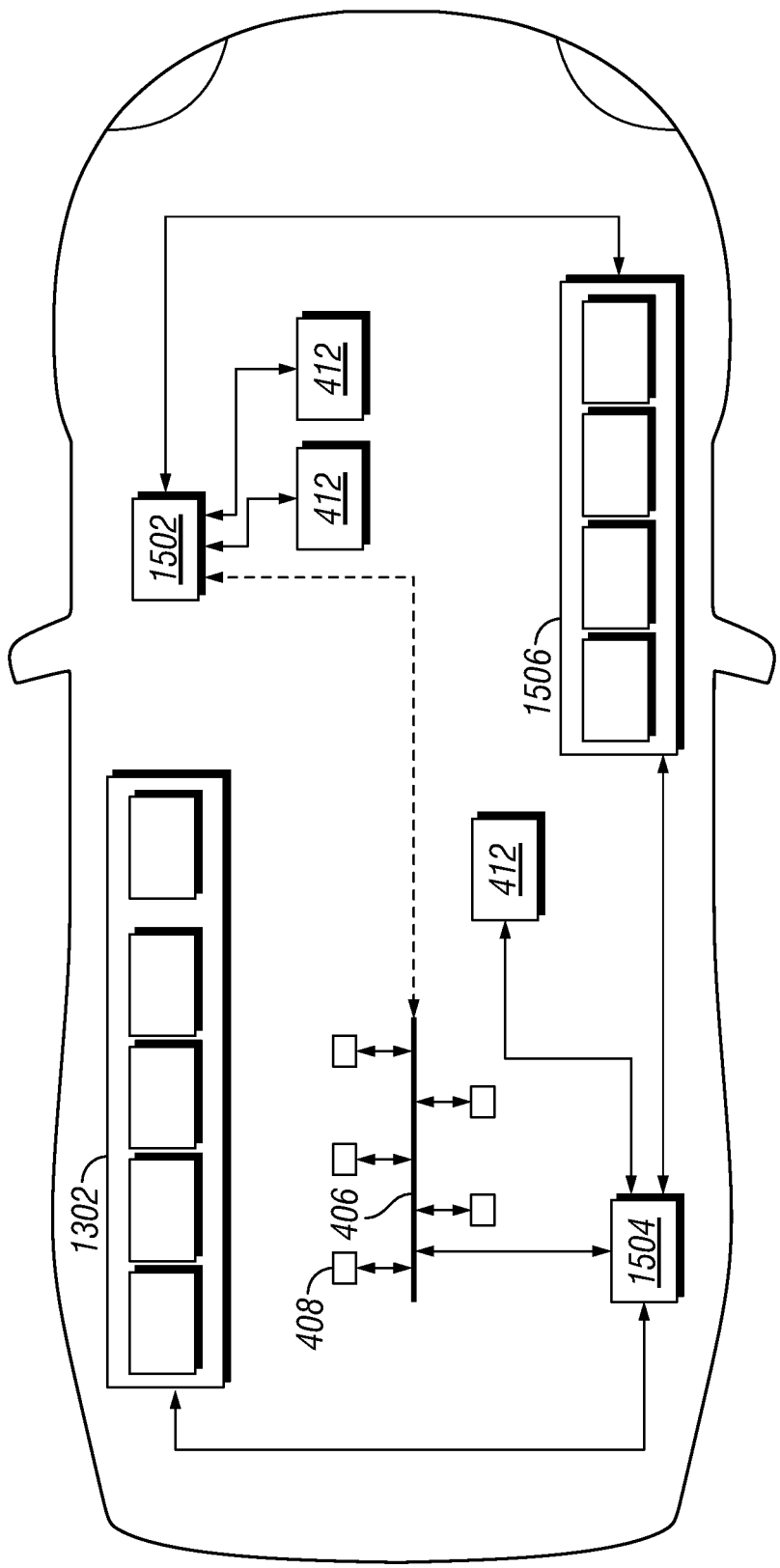
FIG. 15 is a schematic diagram of an example system for regulating networks on a vehicle according to certain embodiments of the present disclosure.

Example operations to regulate communications between end points of network zones, and/or regulating communications with external communication portal(s) and/or external devices include, without limitation, operations such as those described following. Operations to regulate may be performed for end points, for associated groups of end points, and/or for network zones. Associated groups of end points may be associated according to flows, applications, service groups, controllers, vehicle functions, source addresses for communications, and/or destination addresses for communications. In certain embodiments, applications, service groups, and/or flows may be provided with an identifier as an implementation to associate related components such as end points. Operations to regulate may be performed by, without limitation, the CND, a network gateway, a network interface circuit, and/or a gateway interface circuit. Regulating operations are described in the context of certain example regulating devices throughout the present disclosure, but embodiments may be configured to have other devices perform the regulating. Example communication and/or regulating operations include:

providing a communication between a first end point and a second end point (in either direction), including configuring the communication (e.g., protocols, message information, metadata, parameter units, etc.) for the receiving network zone and/or end point device;

encapsulating a message from the first network zone and providing the encapsulated message to the second network zone;

determining if a requesting device (and/or associated flow) on one of the network zones has permission to request a communication from a device on the other one of the network zones, and providing the communication in response to the permission determination;

adjusting at least one of a data rate, requested resolution, and/or requested response time of a communication between devices of the network zones based on a permission determination for a requesting device, a communication performance of a requesting and/or a providing device, and/or a network performance parameter (e.g., current available bandwidth, absolute or current network capability, network utilization, etc.) of one or both network zones, and/or a priority value associated with a requesting device (and/or associated flow) for a communication;

performing an up-sampling and/or down-sampling operation on the communicated data between the network zones;

mirroring communications from a first end point to a port of the second network zone, including encapsulating, configuring, processing, and/or up-sampling or down-sampling the mirrored communications;

providing a communication from a first end point to a device coupled to the second network zone, such as a diagnostic device, OBD device, service tool, manufacturing tool, OEM tool, and/or network monitoring device, and/or where providing the communication includes encapsulating, configuring, processing, and/or up-sampling or down-sampling the provided communications, and/or where the provided communications may be unicast, multi-cast, and/or provided as a subscription service;

providing a communication from a second end point device to a device coupled to either the first network zone or the second network zone, such as a diagnostic device, OBD device, service tool, manufacturing tool, OEM tool, and/or network monitoring device, and/or where providing the communication includes encapsulating, configuring, processing, and/or up-sampling or down-sampling the provided communications, and/or where the provided communications may be unicast, multi-cast, and/or provided as a subscription service;

providing a communication from a device coupled to the second network zone 1908, such as a diagnostic device, OBD device, service tool, manufacturing tool, OEM tool, and/or network monitoring device, to a first end point, and/or where providing the communication includes encapsulating, configuring, processing, and/or up-sampling or down-sampling the provided communications, and/or where the provided communications may be unicast, multi-cast, and/or provided as a subscription service;

further providing the communication as a command value, for example where the first end point executes operations relating to the mission of the mobile application in response to the command value (e.g., setting a set point, target value, or threshold in response to the command value);

providing a communication from a device coupled to the second network zone, such as a diagnostic device, OBD device, service tool, manufacturing tool, OEM tool, and/or network monitoring device, to a first end point, and/or where providing the communication includes encapsulating, configuring, processing, and/or up-sampling or down-sampling the provided communications, and/or where the provided communications may be unicast, multi-cast, and/or provided as a subscription service;

further providing the communication as a test execution value, for example where the first end point executes operations relating to an active text execution operation of the mobile application in response to the command value (e.g., performing certain operations for a service test, active diagnostic operation, or the like);

providing a communication from a first end point to a number of second end point devices, where the provided communications are configured to meet a superset of the requirements of the second end point devices (e.g., data rates, resolution, units, etc.), and where the provided communications may be unicast, multi-cast, and/or provided as a subscription service;

parsing a communication value from a first device (e.g., a first end point, second end point, and/or device coupled to a network zone, such as a diagnostic device, OBD device, service tool, manufacturing tool, OEM tool, and/or network monitoring device), determining a target device (e.g., communication recipient and/or communication provider responsive to the communication value) in response to the parsed communication value, and configuring communications of the target communication recipient and/or communication provider in response to the parsed communication value. For example, the communication value may include a generic and/or normalized component identifier (e.g., turbine temperature, front passenger door actuator, etc.), and the CND determines the respective end point(s) corresponding to the component identifier according to the current configuration of the mobile application, and may further determine communication routing, encapsulation, processing, and the like to translate between the first device and the target device(s). For example, such operations allow for the configuration and placement of devices on network zones to be changed, while not requiring that devices, service personnel, or other requestors keep track of the specific configuration and placement of devices;

additionally or alternatively, such operations include the CND storing configuration information in response to a configuration change (e.g., replacement or moving of a device from one network zone to another, changes to the communication parameters or capabilities of the device, etc.), and/or performing run-time determinations to confirm the location, identity, configuration, communication parameters and/or capabilities of devices, which may be utilized during run-time operations and/or stored for later utilization and/or as a default configuration subject to further updates;

performing any one or more of these operations on a group or sub-group of devices, for example where devices are consolidated in relation to a single end point, but may be treated as separate devices by other end points or devices in communication with a network zone (e.g., a diagnostic device, OBD device, service tool, manufacturing tool, OEM tool, and/or network monitoring device). For example, such operations allow for multiple configurations, updates, and/or upgrades of the mobile application where a first configuration has two (or more) devices with separate end points, and a second configuration has the two (or more) devices utilizing a single end point (and/or the two devices consolidated into a single device). Example and non-limiting embodiments include consolidation of multiple sensors communicating to a network zone through a single interface (e.g., a smart sensor having network communication capability, a multi-plexed signal, etc.), and/or replacing an interface of multiple components behind a single network interface (e.g., a single communicating device, such as an edge gateway or a configurable edge gateway, that interfaces to a single network zone as a single end point and manages communications for related devices). In a further example, such operations allow for devices to communicate across network zones without regard to changes in the configuration, to support upgrades and updates that relate to device relationships with end points, and to support backwards compatibility (e.g., a later configuration, a later control distribution among devices, and the like, where operations of the CND allow an earlier system having a distinct configuration to support the updated configuration and/or control distribution among devices);

additionally or alternatively, such operations include the CND storing configuration information in response to a configuration change (e.g., intervention of a single end point between more than one device and a network zone, consolidation of devices, etc.), and/or performing run-time determinations to confirm the location, identity, configuration, communication parameters and/or capabilities of devices, and/or consolidation status of devices, which may be utilized during run-time operations and/or stored for later utilization and/or as a default configuration subject to further updates;

performing any one or more of these operations on a group or sub-group of devices, for example where devices are distributed between more than one end point but may be treated as a single devices by other end points or devices in communication with a network zone (e.g., a diagnostic device, OBD device, service tool, manufacturing tool, OEM tool, and/or network monitoring device). For example, such operations allow for multiple configurations, updates, and/or upgrades of the mobile application where a first configuration includes a device with a single end point, and a second configuration has the device (or portions thereof) utilizing more than one end point (and/or a previously consolidated device made up of two or more separate devices in the second configuration). Example and non-limiting embodiments include separation of a group of sensors communicating to a network zone through a single end point (e.g., a smart sensor having network communication capability, a multi-plexed signal, etc.) into one or more sensors each having a separate end point (and/or sub-groups of the multiple sensors each having a separate end point). In a further example, such operations allow for devices to communicate across network zones without regard to changes in the configuration, to support upgrades and updates that relate to device relationships with end points, and to support backwards compatibility (e.g., a later configuration, control distribution among devices, and the like, where operations of the CND allow an earlier system having a distinct configuration to support the later configuration);

additionally or alternatively, such operations include the CND storing configuration information in response to a configuration change (e.g., division of devices behind a single end point on a single network zone into more than one end point and/or across more than one network zone), and/or performing run-time determinations to confirm the location, identity, configuration, communication parameters and/or capabilities of devices, and/or consolidation status of devices, which may be utilized during run-time operations and/or stored for later utilization and/or as a default configuration subject to further updates;

implementation of a service oriented architecture, wherein the CND determines available services (e.g., data parameters available for communications, command values available for execution, and/or configurations of these such as rate information, units, resolution, precision, accuracy, availability descriptions, dependent data and/or operating conditions, etc.), publishes the available services, and/or determines subscribing clients (e.g., devices, flows, and/or end points) for the available services;

additionally or alternatively, such operations include the CND determining permissions and/or authorization for publishing available services, for seeing available services (and/or portions of the available services), and/or subscribing to available services;

additionally or alternatively, such operations include the CND determining subscribing entities as an end point, a device, a flow, and/or an external device such as a diagnostic device, OBD device, service tool, manufacturing tool, OEM tool, and/or network monitoring device;

additionally or alternatively, such operations include the CND determining a priority of service oriented communications, which may be dependent upon the publishing device, end point, or related flow, and/or dependent upon the subscribing device, end point, or related flow;

additionally or alternatively, such operations include the CND adjusting the service oriented architecture operations in response to operating conditions (e.g., mobile application operating conditions, network status of one or more affected network zones, communication status of one or more external devices, etc.);

additionally or alternatively, such operations include the CND accessing stored information setting forth available services, publication parameters (permissions, priority, related operating conditions, etc.), and/or subscribing entity information;

additionally or alternatively, such operations include the CND updating stored information in response to one or more of: a received update, such as a policy description, a service configuration description, etc.; run-time updates from end-points, devices, and/or flows, for example, and without limitation, executed during start-up or shut-down operations of the mobile application;

additionally or alternatively, such operations include the CND implementing a service oriented architecture based on run-time operations, with or without storing the information and/or updating the stored information; and/or additionally or alternatively, allowing updates to the stored information, run-time updates to the stored information, and/or run-time operations implementing the service oriented architecture, in response to a priority and/or a permission associated with the device, end point, and/or flow requesting the update and/or run-time implementation;

additionally or alternatively, operations of an example CND include adjusting operations of any one or more of the foregoing in response to operating conditions of the mobile application (e.g., adjusting communication operations during certain operations, such as: high power operation; high transient operation; shut-down operation; start-up operation; a selected operating mode such as vocational operation, power take-off (PTO) operation, charging operation, cruise control operation, autonomous vehicle operation, etc.). Adjustments to communication may be qualitative (e.g., allowing or disallowing certain communication types, certain communication priority thresholds, etc., during certain operating conditions; and/or capturing certain data values during certain operating conditions as a data capturing event), quantitative (e.g., controlling a rate of communications, a network zone utilization, external device communication rates, etc.), or a combination of these (e.g., controller a rate of communications for certain communication types, etc.) of these, and may include increasing or decreasing capability of communications according to the operating condition and/or the communication type (e.g., providing for decreased device communication capability during shut-down operations, but increasing external device communication capability during the shut-down operations; increasing device communication capability for certain devices or flows, but reducing device communication capability for other devices or flows during start-up operations, etc.);

additionally or alternatively, operations of an example CND include adjusting operations of any one or more of the foregoing in response to off-nominal operating conditions relating to the mobile application, where the off-nominal operating conditions include conditions such as: degradation of a network zone (e.g., loss of throughput, loss of communication with one or more end points of a network zone, injection or presence of noise onto a network zone, injection of traffic onto a network zone, a physical failure of at least a portion of the network zone, etc.); a fault condition of one or more devices (e.g., where the CND adjusts a data source related to the faulted device, adjusts a data rate related to the faulted device, implements a back-up data source for the faulted device, re-routes data to a back-up data recipient for data provided to the faulted device, implements an event driven data collection scheme where the fault of the device is an event, etc.); a lost control function of a vehicle controller (e.g., where the lost control function indicates that the vehicle controller is lacking a data value to perform its mission; where the lost control function indicates that the vehicle controller has lost communication with the associated network zone; and/or where the lost control function is an indication, by the vehicle controller or another controller in the system, that the vehicle controller is not able to perform its mission or a part of its mission). Further example operations of the CND, in response to the off-nominal conditions, include one or more of:

providing a data value to a vehicle controller from an alternate source (e.g., from a different end point, network zone, etc., and which may include encapsulating, configuring, processing, and/or up-sampling or down-sampling the alternate source communications, which may result in communications that are identical to the original data value that was lost, or alternative communications that may be sufficient as a backup data value for the vehicle controller);

providing a data value to a second vehicle controller to replace all or a portion of the lost control function of the vehicle controller, for example where a second vehicle controller is configured to act as a backup for the vehicle controller, where the second vehicle controller may be fully capable to perform the lost control function and/or may be capable to perform alternate operations (e.g., with more limited capability) in place of the lost control function; the data value provided to the second vehicle controller may be a same data value as provided to the vehicle controller, an alternate source communication (e.g., having a distinct data rate, resolution, units, precision, etc.), or another data value altogether (e.g., where the second vehicle controller utilizes a distinct data set to perform the fully capable or alternate operations). Additionally or alternatively, the CND is capable to provide data from any network zone to the vehicle controller and/or to the second vehicle controller, which may themselves be on any network zone;

suppressing communication of one or more data values in response to the off-nominal condition, for example where a fault condition, device or end point loss, or the like indicates that the one or more data values are not being utilized; where the one or more data values are low priority in view of the off-nominal condition; and/or where the one or more data values are indicated as invalid in view of the off-nominal condition (e.g., sensor values from a sensor having a fault or failed condition);

shifting of communications from a first network zone (e.g., a degraded network zone) to a second network zone, such as when end points and/or devices are reachable through more than one network zone (e.g., where the zones are logically separated but physically coupled, where more than one physical route is available between relevant end points (e.g., reference FIG. 15), and/or where a second vehicle controller and/or a second end point coupled to the second network zone is capable to perform the operations (or a portion thereof, and/or an alternate thereof) of a first vehicle controller and/or first end point coupled to the first network zone;

repeating communications from a first network zone (e.g., a degraded network zone) on a second network zone;

shifting an end point from a first network zone (e.g., a degraded network zone) to a second network zone, for example where the shifted end point is physically coupled, or couplable, to both the first network zone and the second network zone (e.g., where the separation between the network zones is a logical separation, and/or where the end point is reachable through more than one network zone, such as depicted in FIG. 15), where operations of the CND include adjusting an addressing, protocol, encapsulation operations, and/or any other operations to effect the shift of the end point, which may further include updating the location of the shifted end point with other devices/end points in the system, or translating communications with other devices/end points in the system without notification of the shift;

combinations of these, such as shifting an end point from a first network zone to a second network zone, and shifting related communications to the second network zone and/or repeating related communications on the second network zone;

regulate communications between end points of a first network zone (and/or one or more additional network zones) and an external device (e.g., a diagnostic device, OBD device, service tool, manufacturing tool, OEM tool, network monitoring device, operator device, cloud computing device, and/or a third party application), where the regulating between end points of the first network zone and the external device(s) including any one or more of the foregoing operations, and/or may further include: limiting communications according to off-nominal conditions of a component (e.g., an end point, device, flow, network zone, etc.) of the system; limiting communications according to an operating condition of the mobile application; limiting communications according to a permission and/or priority of the end point(s), associated flows, and/or the external device; limiting communications according to an aggregated data value (e.g., corresponding to an associated data service provider for the communication; corresponding to a group of end points; corresponding to an associated flow; and/or corresponding to an entity related to any one or more of these), which may be aggregated according to time (e.g., daily, weekly, monthly, etc.), operating condition (e.g., trip, event, etc.), and/or where the data value includes one or more of a total data sent/received value, a data rate value, and/or combinations of these; and/or limiting communications according to an external data access type (e.g., cellular, WiFi, Bluetooth, hardware/port plug-in, etc.); and/or combinations of any one or more of the foregoing.

Figure 2:
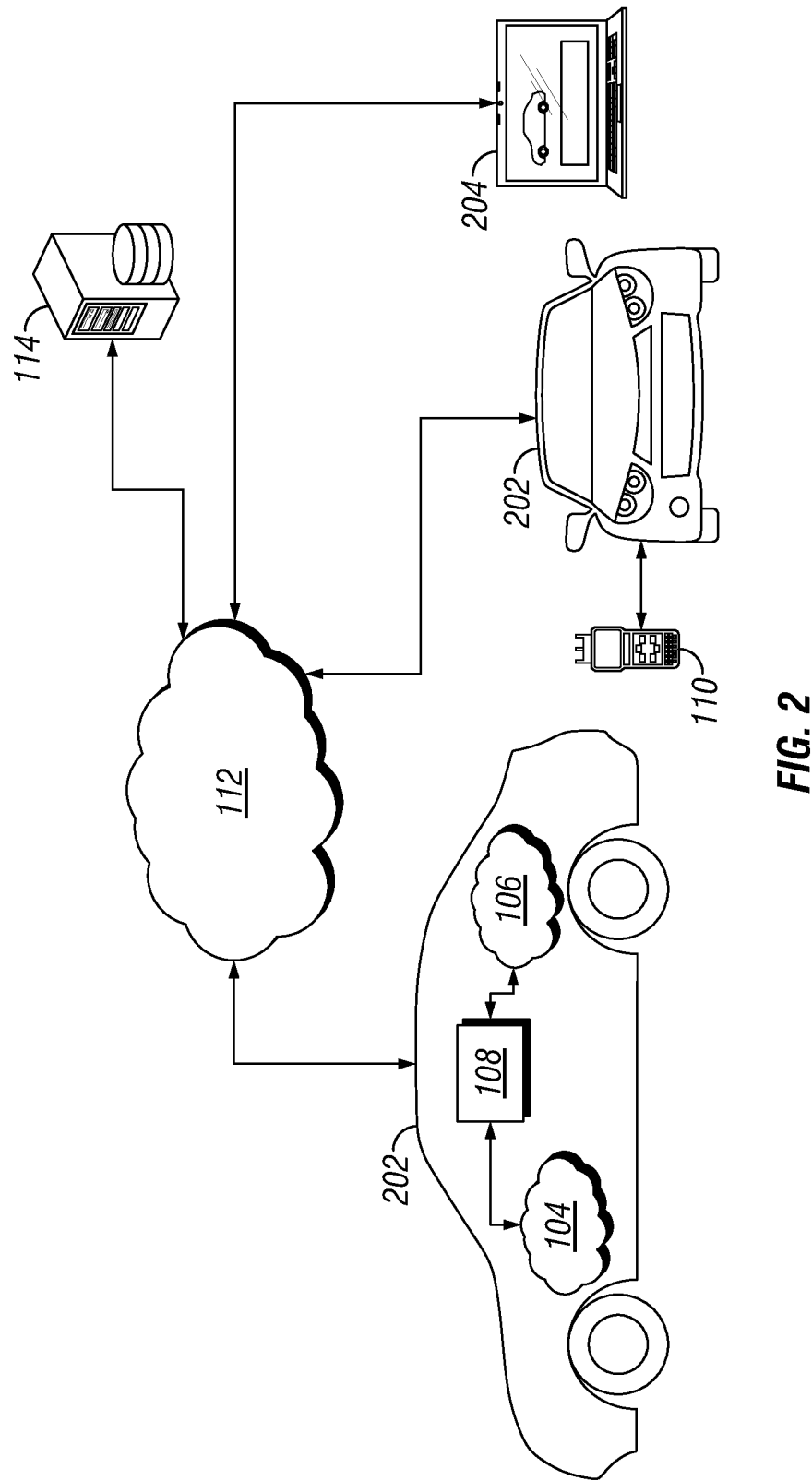
FIG. 2 is a schematic diagram of an example system for regulating networks on a vehicle according to certain embodiments of the present disclosure.

Referencing FIG. 2, an example system includes a vehicle 202 having a first network 104, a second network 106, and a CND 108 interposed between the networks 104, 106. The example system depicts the vehicle 202 communicatively coupled to an external device 110, similar to the depiction of FIG. 1, and/or communicatively coupled to a second external device 114. The example of FIG. 2 depicts another external device 204 communicatively coupled to the vehicle 202, through the cloud connection 112 in the example. The third external device 204 is depicted schematically as a laptop, for example as operated by a fleet service manager, owner, and/or vehicle representative (e.g., a warranty administrator). The example of FIG. 2 is an illustrative depiction to show additional context options and a specific application as a vehicle, but is otherwise similar to the system of FIG. 1.

Figure 3:
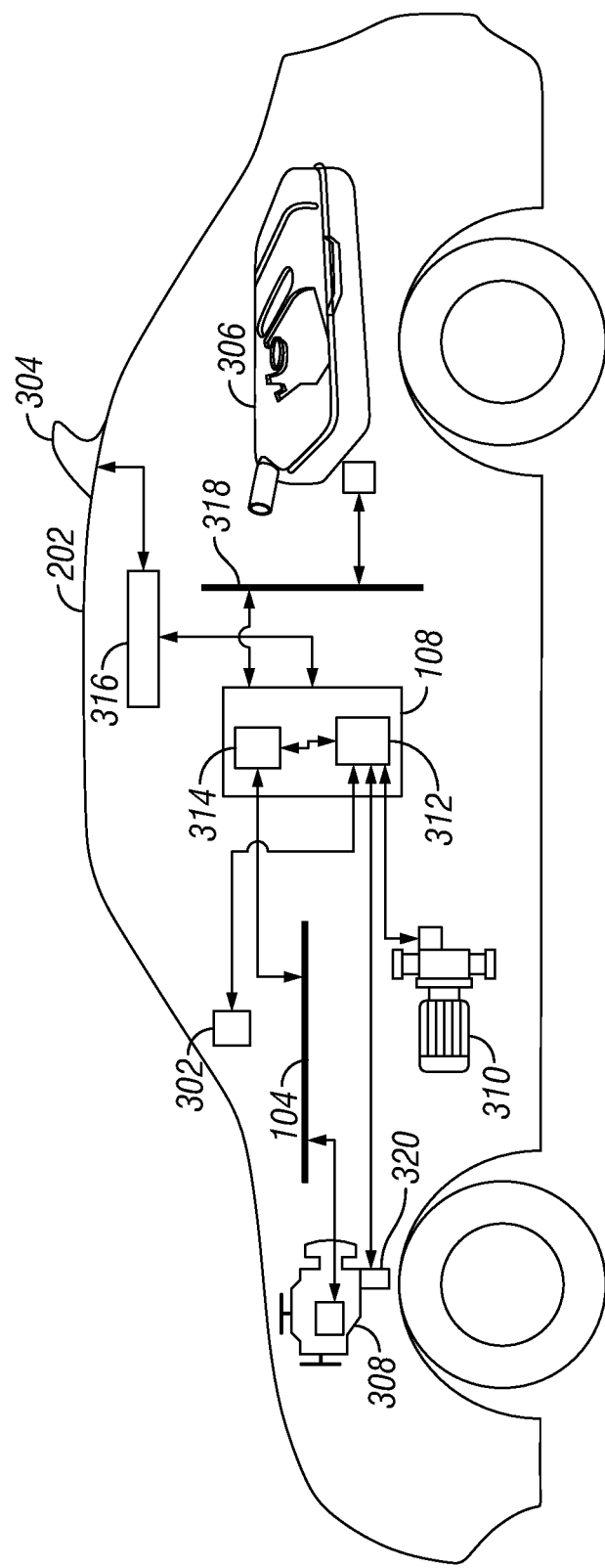
FIG. 3 is a schematic diagram of an example system for regulating networks on a vehicle according to certain embodiments of the present disclosure.

Referencing FIG. 3, an example embodiment including a vehicle 202 is schematically depicted, illustrating certain further details that may be present in certain embodiments. The example system includes the vehicle 202 having a first network 104 and a second network, and a CND 108 interposed between the first network 104 and the second network. In the example of FIG. 3, the second network is an Ethernet network with devices (e.g., an interactive dashboard 302, a door actuator 310, and a transmission controller 320) coupled to an Ethernet switch 312. In the example of FIG. 3, a third network 318 is shown, with a fuel tank sensor 306 coupled to the CND 108. In the example, the third network 318 may be of the same type as one of the other networks, for example segregated from the other networks to improve the cost of installation, risk management, or for other considerations, and/or the third network may be of a different type to support devices—for example a sensor operating on a LIN network. The third network 318 may communicate with the CEG 314, the Ethernet switch 312, or another device (not shown) of the CND 108.

The example of FIG. 3 includes a first device 308 on the first network 104 (e.g., a controller for a prime mover, in the example of FIG. 3), and a number of devices (e.g., an interactive dashboard 302, a fuel tank sensor 306, and a door actuator 310, in the example of FIG. 3) on the second network. The system includes one of the devices 302, 310, 320 on the second network communicating to the first device 308 via the CND 108. For example, the door actuator 310 may lock the door when the vehicle 202 moves, pulling the vehicle movement information (e.g., engine speed, gear position, vehicle speed, and/or a state parameter such as a "VEHICLE MOVING" Boolean value, bit mask, or the like) from the first device 308.

The arrangement of FIG. 3 is a non-limiting example. Additionally or alternatively, a given device (e.g., the prime mover 308) may appear as a single end point or as multiple end points, for example the controller of the prime mover 308 may provide numerous parameters to the first network 104, which may each be provided with an identifier and operate as separate end points (e.g., engine temperature from an engine temperature sensor), and/or may include parameters provided by the prime mover 308 controller as such (e.g., engine temperature from the engine controller).

To illustrate an example of FIG. 3, the first network 104 may be a CAN bus network, where the desired data (e.g., a vehicle movement indicator) is provided according to considerations for the CAN network, and as a CAN message. The door actuator 310 is provided on the second network, for example an Ethernet network where the door actuator 310 is on a port of the second network. The port for the door actuator 310 may be a physical port (e.g., a port of an Ethernet switch 312 dedicated for the door actuator 310) or a virtual port (e.g., an address location for the second network, which may be on a shared physical port with one or more other devices). In the example of FIG. 3, the door actuator 310 cannot receive the CAN message indicating vehicle movement, and the CND 108 interprets a request from the door actuator 310 for the vehicle movement indication, retrieves the message from the first network 104, and sends the message to the door actuator 310 over the second network.

The operations performed to send the message may vary with the application. For example, the CND 108 may publish to devices on the second network that certain parameters are available from the first network 104 (and/or third network 318), and provide selected parameters to devices directly (e.g., providing the vehicle movement indicator to requesting devices), or publish data values representing parameters that are available to subscribing devices for those parameters (e.g., utilizing a broker—not shown—to make subscribed parameters available). In certain embodiments, the CND 108 may limit publication of parameters available to devices, end points, applications, and/or flows that are authorized to see those parameters are available. Stated differently, different devices on the second network may see a different list of parameters available, depending upon the authorization of those devices and/or applications or flows associated with those devices. In certain embodiments, the CND 108 may limit provision of the parameters to devices, end points, applications, and/or flows that are authorized to receive those parameters—for example by denying a subscription request for a parameter and/or suppressing the sending of a parameter to an unauthorized device despite the subscription. Accordingly, in certain embodiments, a device may be able to see that a parameter is available (e.g., in a published list of available parameters), but be unable to receive data values of the parameter. In certain embodiments, a device may be limited to seeing available parameters that the device is authorized to receive.

In certain embodiments, a device may have only limited availability to receive a parameter, for example the CND 108 may limit the rate of a data value to support reduced network utilization, data security considerations (e.g., limiting the accuracy, resolution, and/or data rate of sensitive parameters such as vehicle position), and/or to support proprietary considerations (e.g., limiting the accuracy, resolution, and/or data rate of parameters that may relate to a proprietary control operation, for example to limit the ability for an application to reverse engineer or otherwise determine how the control operation functions).

In certain embodiments, the CND 108 determines which parameters to publish, to provide, and the conditions to provide them, based upon stored data defining permissions and/or capabilities of devices, end points, applications, flows, and the like. In certain embodiments, the CND 108 further accesses stored data defining processing or adjustment operations to the data, for example encapsulation operations (e.g., to pass CAN messages to an Ethernet network), unit conversions, time stamp definitions, and the like. In certain embodiments, the CND 108 determines the authorization for applications and/or flows that are on vehicle, off vehicle (e.g., operating on an external device such as 110, 114, 204), or combined on and off vehicle. In certain embodiments, the CND 108 may support prioritization of data flow, including the rate at which devices provide information or receive information, based upon a prioritization of the related device, end point, application, flow, or other parameter. In certain embodiment, the CND 108 may support differential prioritization based upon the vehicle status or operating condition, for example using a first priority scheme during startup operations, a second priority scheme during run-time operations, a third priority scheme when the vehicle is moving, etc. In certain embodiments, the CND 108 may be responsive to any defined vehicle condition, such as charging, regenerating, aftertreatment operations, control regimes (e.g., cruise versus operator control), emergency conditions, fault conditions, a service condition, or the like.

The example CND 108 of FIG. 3 includes a first device 314 that communicates with the first network 104. An example first device 314 includes a configurable edge gateway (CEG), that reads communications from the first network 104, and provides them to the second network 106. In certain embodiments, the first device 314 translates the communications for the second network, for example encapsulating the communication, a portion of the frame of the communication, and/or a payload of the communication, into a message for the second network. In certain embodiments, the first device 314 is capable to request communications from devices on the first network 104, for example requesting a parameter that is available but is not currently being communicated onto the first network 104. In certain embodiments, the first device 314 is not a part of the CND 108, but is controlled by the CND 108, for example by responding to command from the CND 108, accessing stored data that is written, in whole or part, by the CND 108, or through other operations as provided throughout the present disclosure.

The example CND 18 of FIG. 3 includes a second device 312 that communicates with the second network. An example second device 312 includes an Ethernet switch, which may be configurable, that reads communications from the second network. In certain embodiments, the second device 312 receive messages from the first network 104 through the first device 314, for example receiving messages in a format that is communicable on the second network. An example first device 314 includes a CEG that communicates to the Ethernet switch through a port on the Ethernet switch that is provided for messages from the first device 314. Accordingly, FIG. 3 provides an illustration of a second device 312 on a second network, that communicates with the first device 308 via the CND 108.

An example system includes an external device 110, 114, 204 that communicates with the CND 108. In the example of FIG. 3, the external device 110, 114, 204 may communicate through a transceiver 304, and/or via direct access to a network of the vehicle 202 (e.g., using a service port, OBD port, WiFi, Bluetooth, etc.). The external device is structured to adjust a configuration of the CND 108—for example by changing the stored data that provides for published available data, associated permissions, defined applications, defined flows, defined end points, defined devices, and the like. In certain embodiments, the external device has an associated permission value, and the CND 108 permits changes according to the associated permission value, for example blocking adjustments to changes associated with certain networks, devices, end points, applications, flows, or the like.

An example system includes the first network as a bus network, which may further be a CAN bus network. An example system includes the second network as an Ethernet network, which may have any selected topology such a data bus architecture. In certain embodiments, the Ethernet network may have a data bus architecture as a hardware topology, but operate in a distinct manner logically (e.g., as a switched network).

Figure 4:
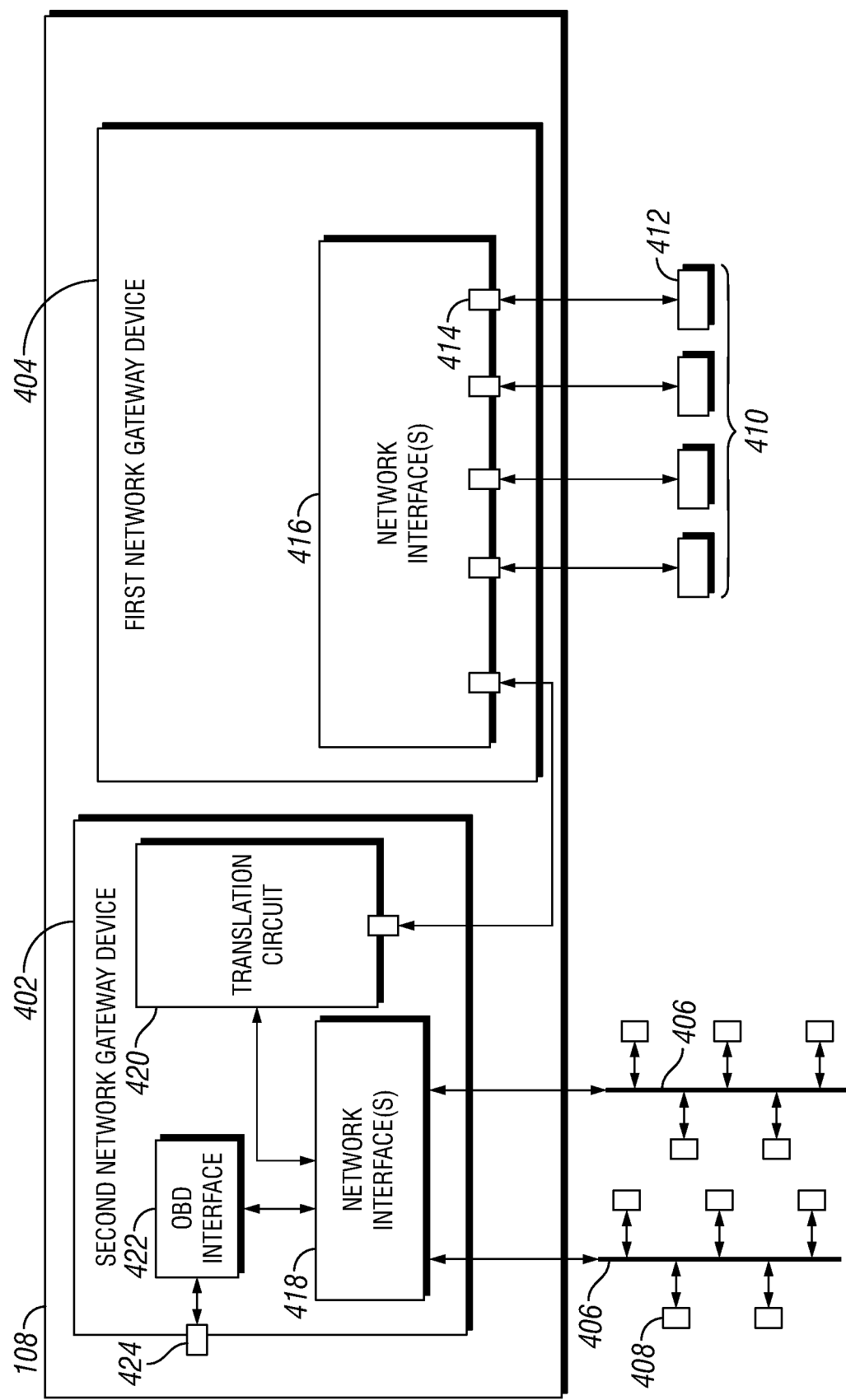
FIG. 4 is a schematic diagram of a converged network device (CND).

Referencing FIG. 4, an example system includes a CND 108 having a first network gateway device 404 and a second network gateway device 402. In the example of FIG. 4, the first network gateway device 404 is a CEG that accesses one or more CAN based networks 406, each having one or more end points 408—for example devices coupled to the CAN network 406 that provide communications to, and/or receive communications from, the respective CAN network 406. The example of FIG. 4 depicts two CAN networks 406, which may be arranged for convenience of integration (e.g., to divide components of the vehicle logically by function, by position in the vehicle, and/or any other arrangement such as a related group of components communicating on a common CAN network 406). In the example, the first network gateway device 404 communicates with both CAN networks 406, although the CND 108 may include, and/or may be configured to regulate, more than one CEG, for example having one CEG accessing each CAN network 406, and/or each CEG accessing a subset of the CAN networks 406 on the vehicle. The example of FIG. 4 depicts bus networks 406, and the networks 406 are described as CAN networks for purposes of illustration, but the networks 406 may be of any type as described throughout the present disclosure. The end points 408 may be any type of end point capable to communicate with the network 406, such as a controller, smart sensor or actuator, or other device capable to provide communications to the network 406, and/or receive communications from the network 406.

The example of FIG. 4 describes the CND 108 as including the network gateway devices 402, 404, but the CND 108 may be separate from one or more of the network gateway devices 402, 404, and may configure operations of the network gateway devices 402, 404, for example by adjusting stored data thereon, adjusting stored data accessible to the devices 402, 404, providing commands thereto, and/or performing any other operations as set forth throughout the present disclosure.

In the example of FIG. 4, the second network gateway device 402 is an Ethernet switch that accesses an Ethernet based network 410, depicted schematically as a number of end points 412 communicating with a number of ports 414 of the Ethernet switch 404. The ports 414 are depicted schematically, and may be logical ports, hardware ports, or combinations of these. The physical topology of the Ethernet network 410 may be a bus arrangement, a hub arrangement, a star arrangement, or any other type of network topology, and which may be distinct from the logical topology of the Ethernet network 410. The second network gateway device 402 is depicted as having a network interface 416, which may include the physical port connection(s). In certain embodiments, the second network gateway device 402 is a configurable Ethernet switch, which may include a processor, computer readable storage (e.g., to store instructions, configuration information, buffering for data communication and/or collection operations, and the like). These aspects are not shown for clarity of the depiction and the present description, but they may be present on the second network gateway device 402, within a same housing as the second network gateway device 402, on a separate board (e.g., mounted on a separate printed circuit board) from the network interface 416 and/or from the remainder of the second network gateway device 402, positioned on another device in the system and in communication with the second network gateway device 4040 (e.g., on the first network gateway device 404, on a vehicle controller, and/or on another controller in the system), and/or distributed across a combination of these locations.

In the example of FIG. 4, the first network gateway device 404 includes one or more network interface(s) 418 (and/or network interface circuit) that communicatively couple the first network gateway device 404 to the network(s) 406, and a translation circuit 420 that configures messages from the Ethernet network 410 for communication to the network(s) 406, and/or that configures messages from the network(s) 406 for communication to the Ethernet network 410. Additionally or alternatively, the translation circuit 420 configures messages for passage from one of the network(s) 406 to another one of the network(s) 406—for example where the networks 406 are of different types, utilize different protocols, would otherwise have conflicting source or destination information, and/or otherwise have distinct characteristics that are managed by the first network gateway device 404 to ensure message compatibility, successful mission operation of the vehicle, and/or to implement any other configuration operations as set forth in the present disclosure. The translation circuit 420 is depicted schematically as a single device, but may be implemented as one or more devices, for example with a number of translation circuit 420 components each implementing a type of configuration, interacting with a type of network 406, to distribute processing and/or memory operations of the translation circuit 420, or for any other reason according to the particular system. In the example of FIG. 4, the first network gateway device 404 provides messages to the Ethernet switch in response to a corresponding message on the CAN based network 406. In the example of FIG. 4, the first network gateway device 404 provides the message to a port 414 of the Ethernet switch. In the example of FIG. 4, any messages provided from the networks 406 appear on the Ethernet network 410 as a message on the port between the translation circuit 420 and the network interface 416, and is received from the Ethernet network 410 through the port between the translation circuit 420 and the network interface 416. The translation circuit 420 allows for configuration operations between messages, such end points on each network 406, 410 can communicate therebetween, as regulated by the CND 108.

The example of FIG. 4 further includes an on-board diagnostic (OBD) interface 422, which in the example communicates with a dedicated OBD port 424. The example of FIG. 4 is non-limiting for purposes of illustration, and the OBD interface 422 may be associated with any network, or more than one network (e.g., to support multiple OBD tools that may connect to the vehicle). An example embodiment includes the OBD interface 422 associated with the second network gateway device 402, for example where the OBD system is largely CAN based, allowing for reduced traffic between the translation circuit 420 and the network interface 416, as many of the OBD parameters are native to one or more of the CAN networks 406. The OBD interface 422 may alternatively be present on the Ethernet network 410, or present on more than one network 406, 410 of the system. Regardless of the location of the OBD interface 422 and the network 406, 410 origination of OBD related data, OBD requests and information can be made available to the OBD port 424 (which may be a physical connection, a wireless connection, or another external connection including a mobile data connection) via operations of the CND 108 to authorize and provide cross-network communication from end points of any of the networks 406, 410. Additionally, the example of FIG. 4 utilizes an OBD interface 422 as a non-limiting example, but any type of special, dedicated, and/or proprietary interface may be provided in a similar manner, with an interface and port that can make any data from any end point on a network 406, 410 available, subject to configurable regulation by the CND 108.

An example system includes the CND 108 interposed between an electrical sensor and one of the networks 406, 410, and structured to provide a sensed value on the network in response to an electrical response of the electrical sensor. For example, one of the networks 406 may be an electrical connection to the second network gateway device 402, with a corresponding end point 408 as the electrical sensor, and whereby the translation circuit 420 converts the electrical signal from the sensor to a communication for the respective network (e.g., network 410, or another network 406). In the example, the translation circuit 420 may perform processing operations on the electrical signal, such as analog/digital (A/D) processing, determination of indicated bits, determination of an indicated value, de-bouncing of the signal, filtering of the signal, diagnostic bit detection (e.g., determination of a fault, and conversion to a corresponding fault value; and/or conversion of predetermined voltage values to a corresponding fault value), saturation management (e.g., limiting outputs to predetermined values), slew limitations (e.g., applying rate-of-change limits to the indicated value), and the like. Electrical signals from the sensor, where present, may be voltage values, frequency values, indicated resistance values, or any other type of sensor electrical value as known in the art.

In another example, a system includes the CND 108 interposed between an electrical actuator and one of the networks 406, 410, and structured to provide a command value from the network as a configured electrical response to the electrical actuator. For example, one of the networks 406 may be an electrical connection to the second network gateway device 402, with a corresponding end point 408 as the electrical actuator, and whereby the translation circuit 420 converts the communication from the respective network (e.g., network 410, or another network 406) to an electrical signal for the actuator. In the example, the translation circuit 420 may perform processing operations on the electrical signal, such as digital-to-analog processing, determination from indicated bits to corresponding values, diagnostic bit provision, saturation management, slew limitations, and the like. Electrical signals to the actuator, where present, may be voltage values, frequency values, modulated values, or any other type of actuator electrical value as known in the art. In certain embodiments, an electrical actuator may additionally have sensing values (e.g., position feedback, acknowledgement, etc.), and/or other feedback values (e.g., certain electrical values indicating the actuator has a fault condition, is non-responsive, is stuck, is saturated, etc.) which may be provided on the same or a distinct electrical connection, and which may logically be part of the same network 406 or a distinct network (e.g., actuation on one network 406, and feedback on a second network 406).

It can be seen that the embodiment of FIG. 4 provides for communication between end points on distinct networks, without the end points requiring knowledge about how communications to other end points are to be performed, or where other end points are positioned. Without limitation to any other aspect of the present disclosure, the embodiment of FIG. 4 provides the capability for operation of vehicle networks with devices distributed across distinct networks, including networks of a different type. Additionally, the embodiment of FIG. 4 provides for operation of the vehicle as devices move between networks, without limitation to whether the device has changed communication capability. For example, a first device on a CAN network that is moved to the Ethernet network can continue to function, with appropriate configuration of the CND 108, as messages that were utilized by the device from the CAN network can be moved to the Ethernet network and made available to the device in the new position. In certain embodiments, the migrated device can continue to utilize previous algorithms (e.g., the same local control)—for example computer readable instructions specifically built for the specifics of the former CAN messages, including bit depth, resolution information, message rates, floating/fixed point data nature, and the like, with the CND 108 configured to encapsulate the entire original CAN message into an Ethernet message (e.g., a frame, a packet, and/or in a specified manner), such that the migrated device can receive the former CAN message as originally presented and utilized by that same local control. Accordingly, the embodiment of FIG. 4, and the principles set forth in relation to FIG. 4, allow for changes in the end point device mix between networks, whether across a number of vehicles (e.g., changes that occur over a course of design revisions, model years, or the like) or within a same vehicle (e.g., changes that occur during service, upgrades or changes to end points, upgrades, upfits, recall replacements, etc.), with only an update to the CND 108 configuration to support the changes. In certain embodiments, the embodiment of FIG. 4 and the principles set forth in relation to FIG. 4 allow for changes in the end point device mix between networks without requiring an update to the CND 108 configuration, for example where a range of end points are contemplated to be available in more than one possible network location and/or configuration, and where the CND 108 is configured to determine the end point arrangement present on the vehicle and to utilize a selected configuration (e.g., from among two or more available configurations) accordingly. Accordingly, the embodiment of FIG. 4, and the principles set forth in relation to FIG. 4, further allow for changes to the end point device mix between networks, at least within a predetermined range of end point devices and configurations, to support vehicle operations without any changes to the vehicle, and even with only intermittent or no communication with external devices for configuration of the CND 108.

Figure 5:
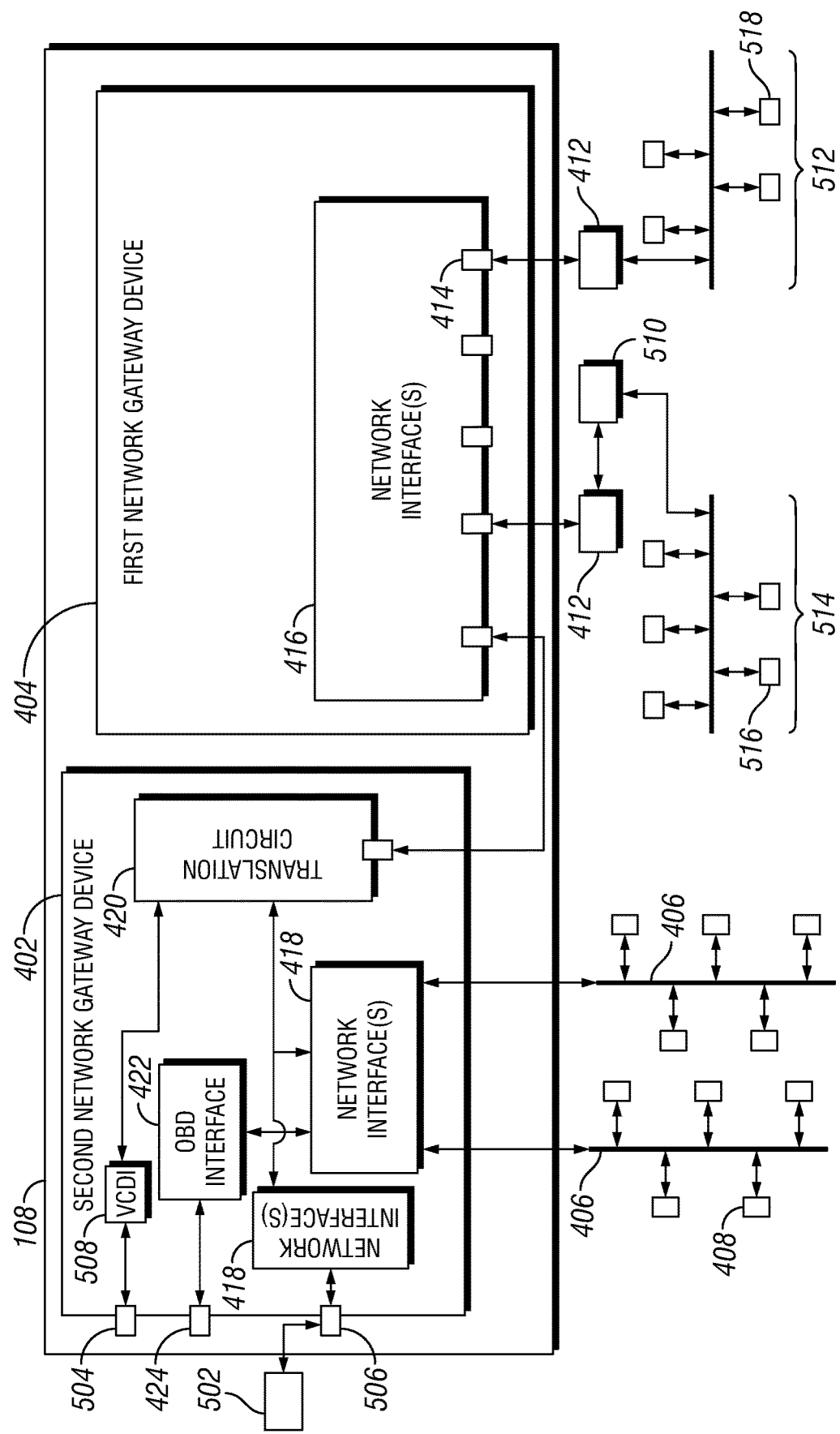
FIG. 5 is a schematic diagram of a converged network device (CND).

Referencing FIG. 5, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 5 is generally consistent with the embodiment of FIG. 4, with some differences depicted to highlight certain aspects of the present disclosure. The example of FIG. 5 includes additional interfaces 504, 506, which may be separate networks or network zones relative to the networks 406. The example of FIG. 5 depicts a vehicle control device interface (VCDI) 508, which may be an interface to a vehicle controller (e.g., engine controller, transmission controller, anti-lock brake system (ABS) controller, advanced driver-assistance system (ADAS) controller, door controller, battery controller, head unit, interactive dashboard, etc.) of any type, including a controller providing communications at the end point 504, and/or an electrical interface such as to a sensor, actuator, or combined sensor and actuator. The example of FIG. 5 depicts an additional interface 506 to an end point 502, which may be a communicative device of any type as understood in the art or set forth herein. In the embodiment of FIG. 5, network interface circuits 418, 508 are depicted between the end points 408, 502 and the translation circuit 420, to allow for the translation circuit 420 to interface with numerous network types that may be present on the vehicle. The interface circuits 418, 508 may be positioned with the translation circuit 420, or located elsewhere and communicatively coupled to the associated network(s) and to the translation circuit 420. The example of FIG. 5 additionally depicts networks 512, 514 that are communicatively coupled to the first network gateway device 404 through end points 412 on same network as the network interface 416. In certain embodiments, the CND 108 does not have or need specific knowledge about the networks 512, 514 or associated end points 516, 518, as communications to the networks 512, 514 are provided through the end points 412. However, the CND 108 is structured to provide communications from networks in communication with the second network gateway device 402, such as networks 406, and/or networks interfaced at end points 504, 506. Communications from the second network gateway device 402 may provide the requested information (e.g., ambient temperature, door position, vehicle speed), for example as an encapsulated payload that provides the information, or as a native message (e.g., a CAN message indicating ambient temperature, door position, vehicle speed; and/or a LIN message having associated sensor information). Accordingly, end points 516, 518 can send and receive tunneled messages with networks 406 (or other networks) in a shared format, or otherwise receive information from any network on the vehicle, subject to regulation by the CND 108.

Figure 6:
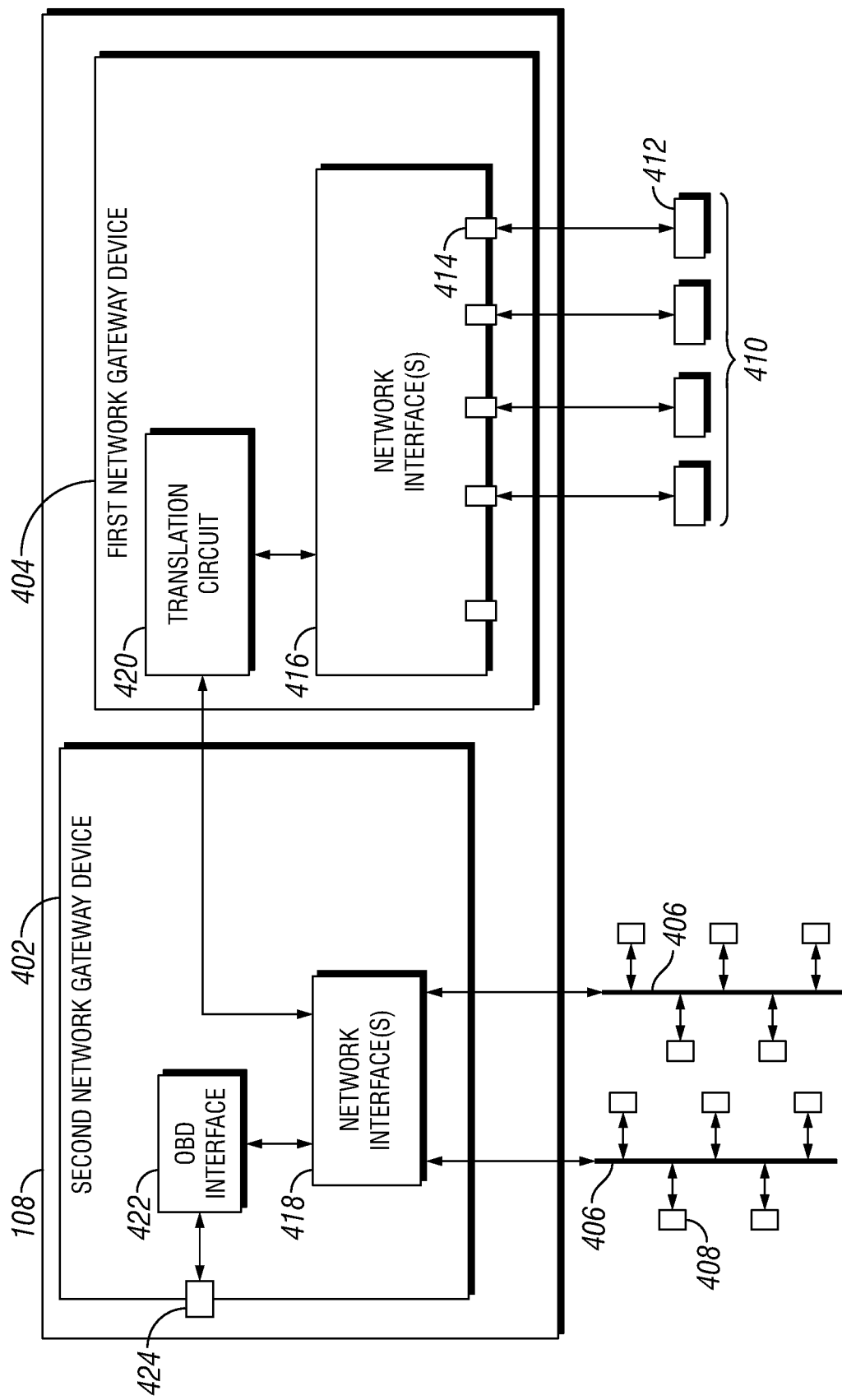
FIG. 6 is a schematic diagram of a converged network device (CND).

Referencing FIG. 6, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 6 is generally consistent with the embodiment of FIG. 4, with some differences depicted to highlight certain aspects of the present disclosure. Without limitation to any of the flexibility of arrangements depicted in FIG. 4, the example of FIG. 6 depicts the translation circuit 420 positioned in the first network gateway device 404.

Without limitation to any other aspect of the present disclosure, co-location as depicted in FIG. 6, and as utilized herein, can indicate physical co-location (e.g., the translation circuit 420 positioned within a shared housing with the first network gateway device 404, and/or on a same board with the first network gateway device 404) and/or logical co-location (e.g., the grouping of operational responsibility of implementing hardware, such as connections, connectivity, operational instructions, stored data, data storage, and/or processing resources, etc.). The determination of a co-location scheme depends upon the purpose of the co-location (e.g., sharing hardware resources, reducing external interfaces, simplifying and/or diversifying risk profiles of the co-located components and/or of other components in the system related to the co-located components); the nature of the co-located components (e.g., hardware implementations, processing and/or memory resources related to the co-located components); the division of ownership of the co-located components (e.g., manufacturer, supplier, service party, vehicle owner, vehicle operator); operational responsibility of components and/or the vehicle (e.g., warranty, operational liability, service, insurance, uptime responsibility, etc.); and/or integration responsibility of components (e.g., installation, design, meeting a footprint requirement, tradeoffs between components, and/or ability to influence these). Accordingly, in certain embodiments, co-locating components may include one or more of: positioning components within a shared housing or group of housings; positioning components in a selected geometric proximity; positioning components in a selected logical arrangement (e.g., associating in a same flow or group of flows, associating in a same application or group of applications, providing operational constraints such as parameter naming, memory assignment, execution order, or the like); positioning components in a selected risk profile arrangement (e.g., positioning in a same impact zone, a same temperature environment, a same NVH environment, a same EMI environment, subject to a same failure mode (e.g., electrical, logical, fault, physical impact, and/or dependency on a physical component such as a pump, cooling system, etc.)); on a same board; and/or within a shared memory location (e.g., computer readable instructions positioned in a shared memory location, and/or executed by a same processor resource). In the example, NVH is the "noise, vibration, and harshness" environment, and EMI is the "electro-magnetic interference" environment. One of skill in the art, having the benefit of the present disclosure and information ordinarily available when contemplating a particular system, can readily determine implementations of components that are co-located as set forth in the present disclosure. It can be seen that components arranged in one or more of the described co-location schemes may be co-located for certain embodiments, or not co-located for other embodiments, and/or may be co-located for the purposes of certain operating conditions, but not co-located for the purposes of other operating conditions. Certain considerations to determine whether components are to be co-located, and the selected co-location scheme for those components, include (without limitation): the purpose of the co-location; operational costs of resources (e.g., communications, processing resources, operational limitations to the vehicle mission, operational impact to the vehicle mission such as cooling requirements, power consumption, and the like); capital costs of resources (e.g., computing power, network infrastructure, memory resources, individual component quality or capability requirements, shielding requirements, data throughput whether intra-vehicle or extra-vehicle, etc.); integration costs for components (e.g., footprint availability and cost, interface management, design flexibility and lock-down trajectory, and/or ability to trade-off and/or optimize with other aspects of the system); and/or the ability to distribute costs to other interested parties related to the system (e.g., suppliers, manufacturers, customers, and/or service parties; and which may include the ability to distribute increased costs related to increased capabilities, and/or to trade costs between interested parties).

In the example of FIG. 6, the translation circuit 420 may provide communications by, without limitation, populating and/or reading from a shared memory with the network interface 416, and/or by communicating with a port 414 (not shown).

Figure 7:
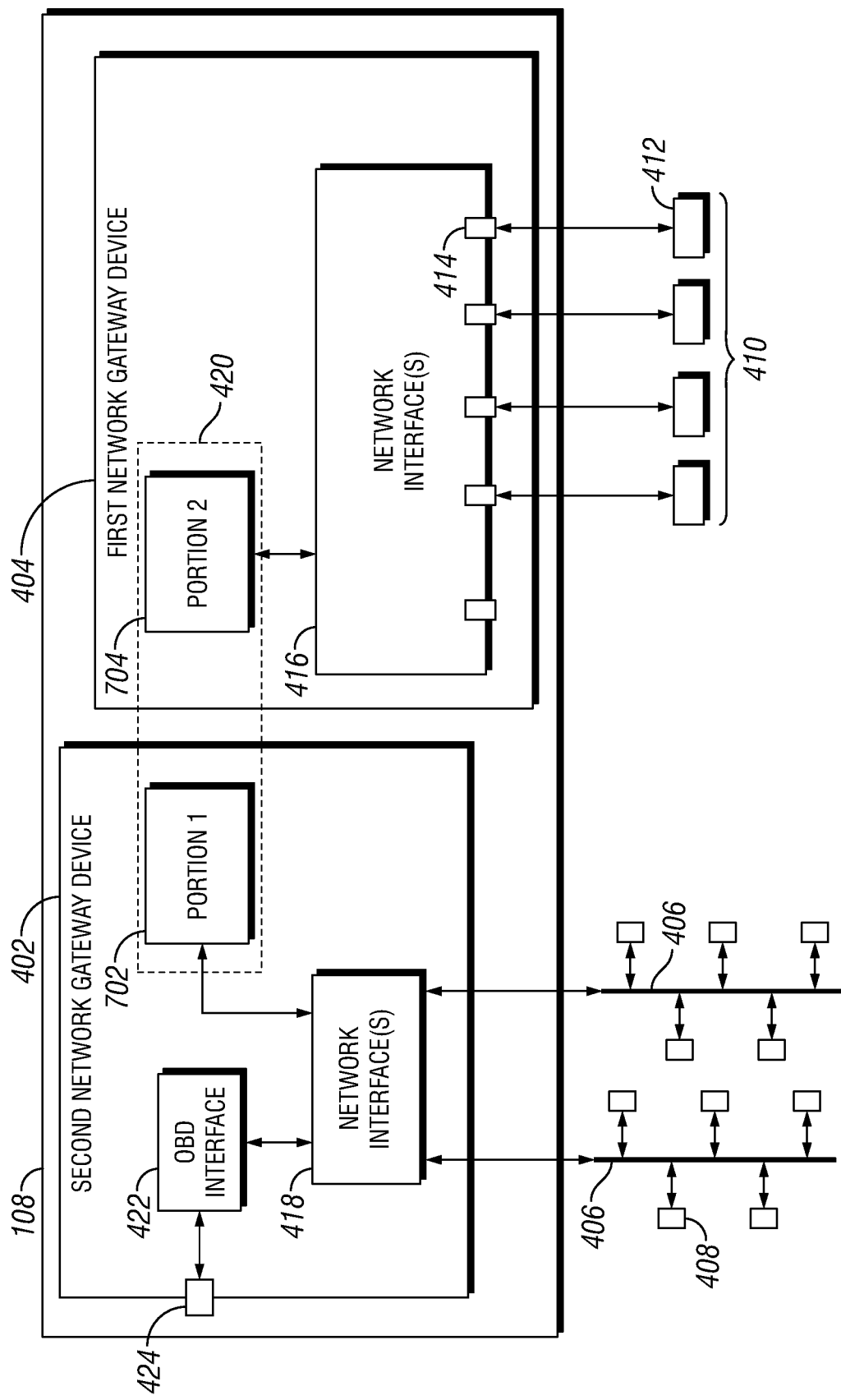
FIG. 7 is a schematic diagram of a converged network device (CND).

Referencing FIG. 7, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 7 is generally consistent with the embodiment of FIG. 4, with some differences depicted to highlight certain aspects of the present disclosure. Without limitation to any of the flexibility of arrangements depicted in FIG. 4, the example of FIG. 7 depicts the translation circuit 420 having a first portion 702 co-located with the second network gateway device 402 and a second portion 704 co-located with the first network gateway device 404. The portions 702, 704 of the translation circuit 420 may be separated for any reason, including at least separating translation operations by network (e.g., which network 406 is being serviced), by predetermined end points, by flows, by translation operation (e.g., processing of frame information, processing of payload information, managing capability differences by down-sampling, up-sampling, buffering, providing communication commands, encapsulation of a message into another message format, etc.), and/or by direction of communication (e.g., direction between selected networks, between the gateway devices, between end points, between flows, or combinations of these).

Figure 8:
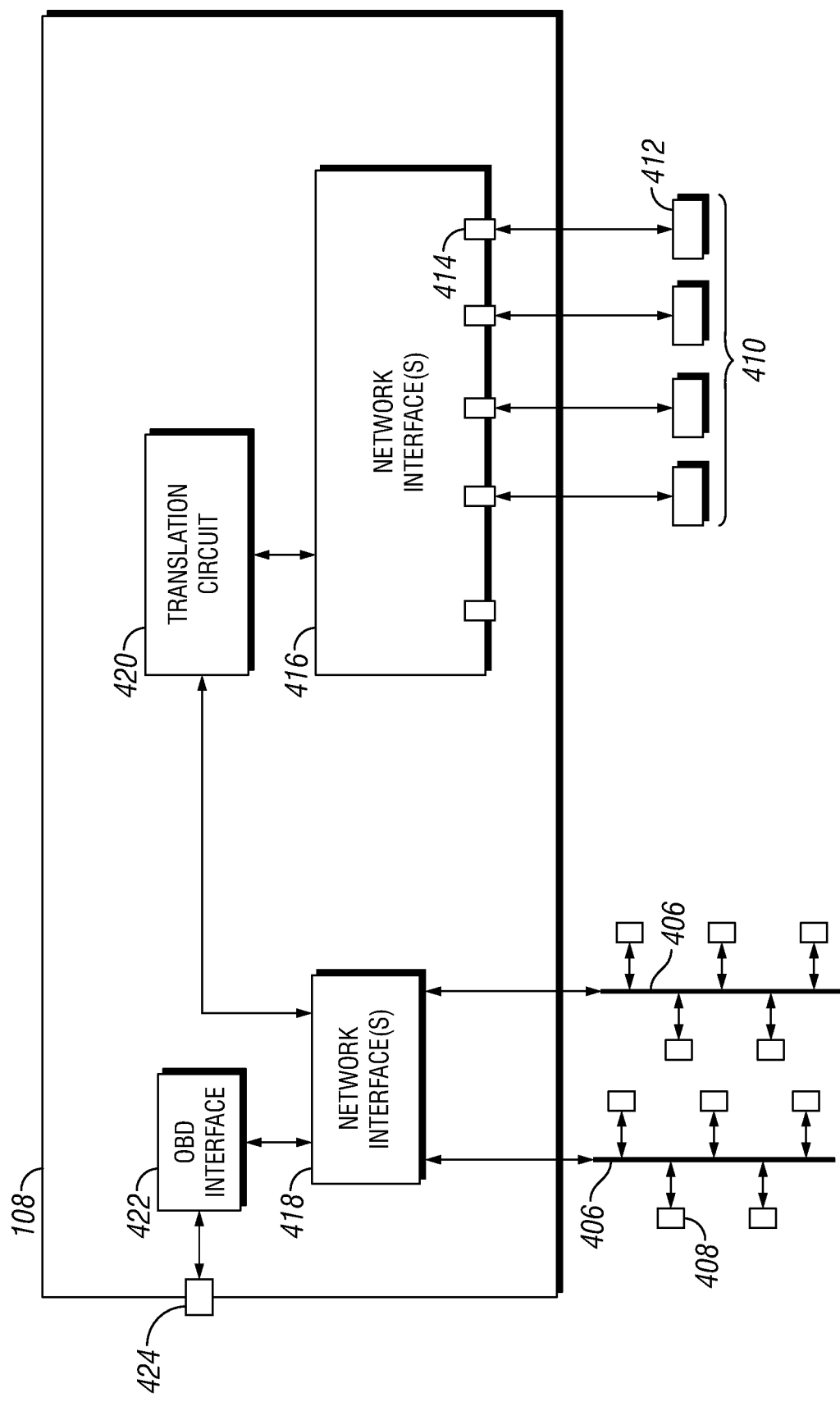
FIG. 8 is a schematic diagram of a converged network device (CND).

Referencing FIG. 8, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 8 is generally consistent with the embodiment of FIG. 4, with some differences depicted to highlight certain aspects of the present disclosure. In the example of FIG. 8, the first network gateway device and the second network gateway device are co-located, and omitted as being depicted as part of the CND 108. In certain embodiments, the CND 108 of FIG. 8 may alternatively be a combined gateway device that is regulated by the CND 108, rather than forming a part of the CND 108. In certain embodiments, one or more portions of the combined gateway device(s) may form a part of the CND 108, with other portions of the combined gateway device(s) regulated by the CND 108.

A policy, as utilized herein and without limitation to any other aspect of the present disclosure, includes a description of data to be collected, such as data parameters, collection rates, resolution information, priority values (e.g., ordering data collection values for selection in response to off-nominal conditions where not all data collection parameters can be serviced, etc.). In certain embodiments, a policy further includes event information, which may be stipulated as parameter or quantitative based events (e.g., a given data value exceeds a threshold, etc.), and/or categorical events (e.g., a particular fault code, operational condition or state, or vehicle location/jurisdiction occurs). In certain embodiments, a policy further includes an event response, such as data values to be captured in response to the occurrence of the event, and/or other changes in the data collection scheme such as increased or reduced data collection rates, changes in collected resolution, or the like. In certain embodiments, an event response further includes a time frame associated with the event occurrence, for example a time period after the event occurrence to utilize the adjusted data collection scheme, and/or a time period preceding the event occurrence (e.g., utilizing a rolling buffer or other data collection operation, providing temporary information that can subsequently be captured if the event occurs). In certain embodiments, changes to the data collection scheme for an event can include multiple changes—for example changes over a period of time, further changes based upon the progression of the event (e.g., if the event severity gets worse), and/or criteria to determine that an event is cleared. In certain embodiments, changes to a data collection scheme may be implemented based on event related clearance of the same or another event, for example implementing a data collection change until a next shutdown event of the vehicle, until a service technician clears the event, for a selected number of shutdown events occurs, or the like. A policy may additionally or alternatively include parameters for performing any regulating operations for any regulated components as set forth throughout the present disclosure.

The utilization of a policy herein may reference a partial policy, for example the implied policy that would be implemented in response to a single data collection scheme from a single user, wherein the full policy is prepared, verified, and communicated to the vehicle after one or more partial policies are aggregated. The utilization of a policy herein may reference an unverified policy, for example after a policy responsive to a number of users is aggregated, but verification operations of the policy are not yet completed (e.g., before it is determined if the data collection implied by the policy can be performed). The utilization of a policy herein may reference a previously applied policy (e.g., a policy present on a vehicle before an updated version of the policy is communicated to the vehicle and/or implemented on the vehicle). The utilization of a policy herein may reference an updated policy, for example a verified policy that is pending for communication to the vehicle and/or confirmed by the vehicle (e.g., from the CND 108).

Figure 9:
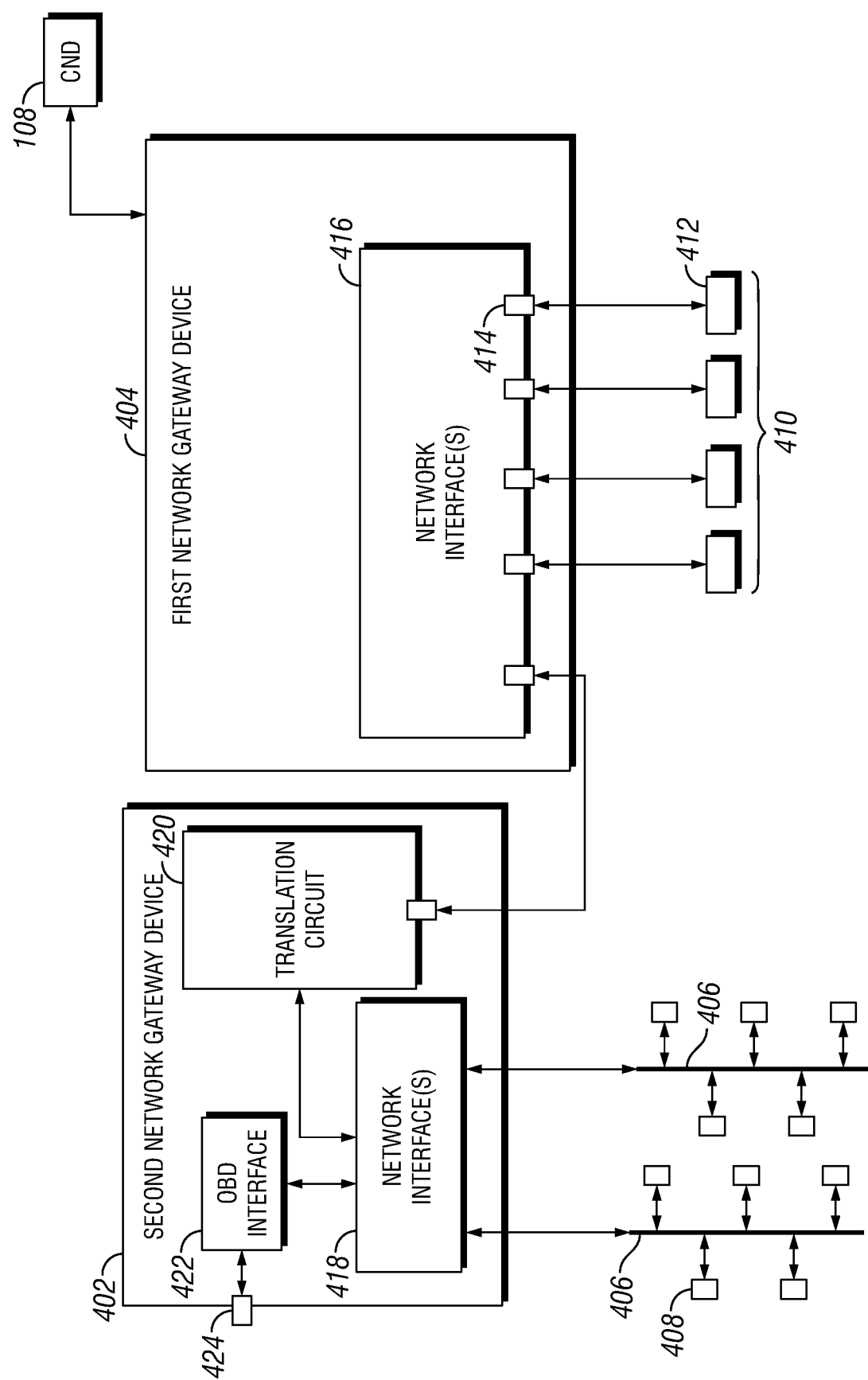
FIG. 9 is a schematic diagram of a converged network device (CND).

Referencing FIG. 9, an example system includes a CND 108 regulating communication between networks on a vehicle, where the networks may be separated physically, logically (e.g., as virtual local area networks (VLANs), or other logical separation schemes), and/or two or more of the networks may be different types. The embodiment of FIG. 9 is generally consistent with the embodiment of FIG. 4, with some differences depicted to highlight certain aspects of the present disclosure. In the example of FIG. 9, the first network gateway device 404 and the second network gateway device 402 are not co-located, and the CND 108 is depicted in communication with the first network gateway device 404. The CND 108 may be in communication with any one or more of the network gateway device(s), and/or may be positioned at least partially on one or more of the network gateway device(s). Additionally or alternatively, the CND 108 may regulate communication between the networks by accessing and/or adjusting a memory location (e.g., a policy, configuration instructions, a configuration table, or the like) available to one or more of the network gateway device(s), where a relevant portion of the instructions (if any) may be passed to other network gateway device(s) if the CND 108 does not communicate directly with those devices. In certain embodiments (not shown), the CND 108 may communicate to one or more of the network gateway devices utilizing one or more of the networks, for example at a port 414 of the first network gateway device 404. In certain embodiments, the CND 108 may be positioned, at least partially, on one or more of the network gateway devices, co-located with one or more of the network gateway devices, and/or included (at least partially) in a component of one or more of the network gateway devices (e.g., a translation circuit and/or a network interface circuit).

Figure 10:
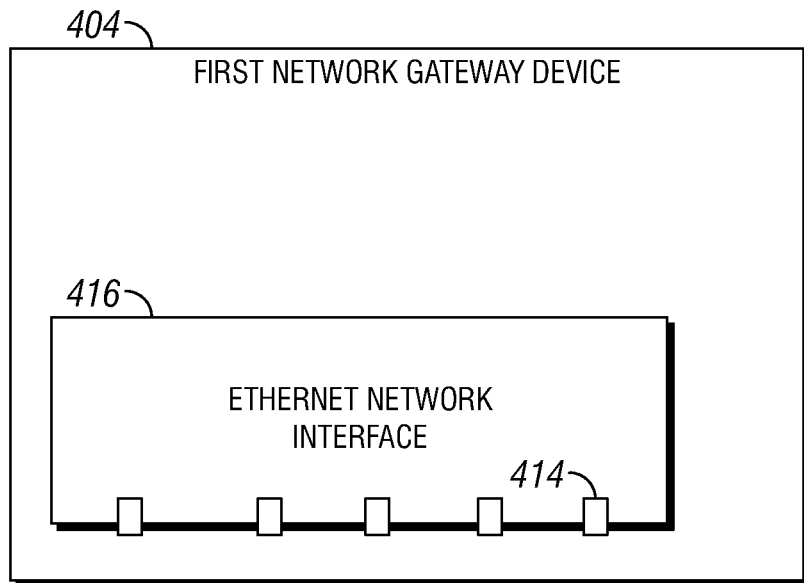
FIG. 10 is a schematic diagram of a configurable ethernet switch.

Referencing FIG. 10, an example first network gateway device 404 is depicted. In the example of FIG. 10, the first network gateway device 404 is a configurable Ethernet Switch, including an Ethernet network interface 416 (or Ethernet network interface circuit) having a number of ports 414 for communication with an Ethernet network. The ports 414 may be physical ports, logical ports, or a combination thereof.

Figure 11:
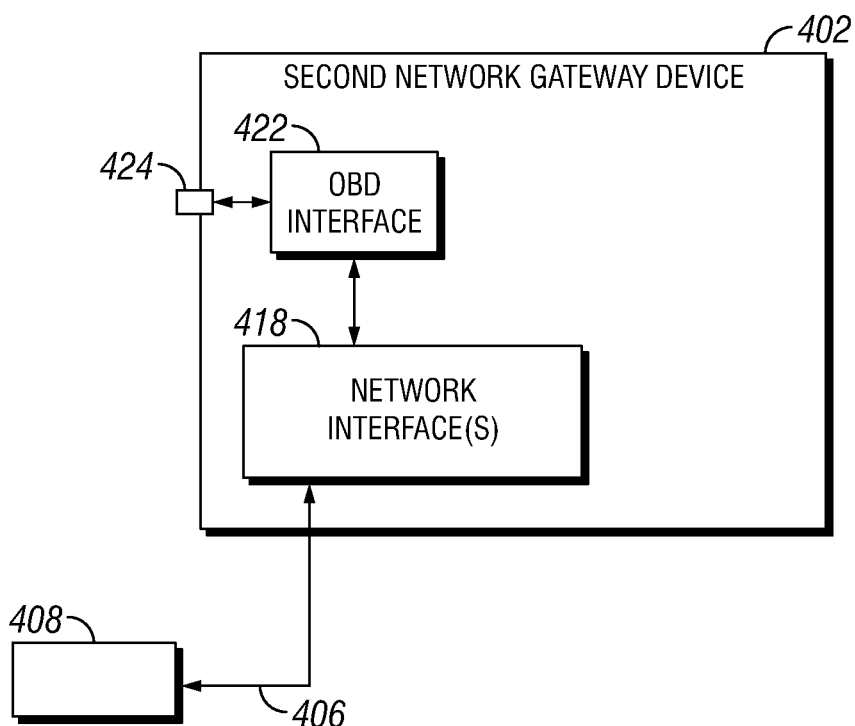
FIG. 11 is a schematic diagram of a configurable edge gateway.

Referencing FIG. 11, an example second network gateway device 402 is depicted. In the example of FIG. 11, the second network gateway device 402 is a configurable edge gateway (CEG), providing translation between a secondary network 406 and a primary network interface (e.g., an Ethernet network such as network 410). The utilization of secondary and primary to reference networks merely indicates a logical arrangement of networks, where interfaces to other networks than the primary are referenced as edge interfaces (e.g., interfaced with an edge gateway). In certain embodiments, the primary network may have a higher capability (e.g., bandwidth, throughput, and/or resource dedication), a greater number of devices or end points thereon, a migration target network (e.g., over the life of a vehicle, a group of vehicles, a period of model years, etc.) for end points over time, and/or a main entry network for external communications (e.g., over-the-air updates, configuration updates, data collection, etc.), although a particular embodiment may have some, all, or none of these considerations present for a network considered as a primary network. The example of FIG. 11 depicts an optional OBD interface 422, which may be present elsewhere in the system, or not present in the system.

Figure 12:
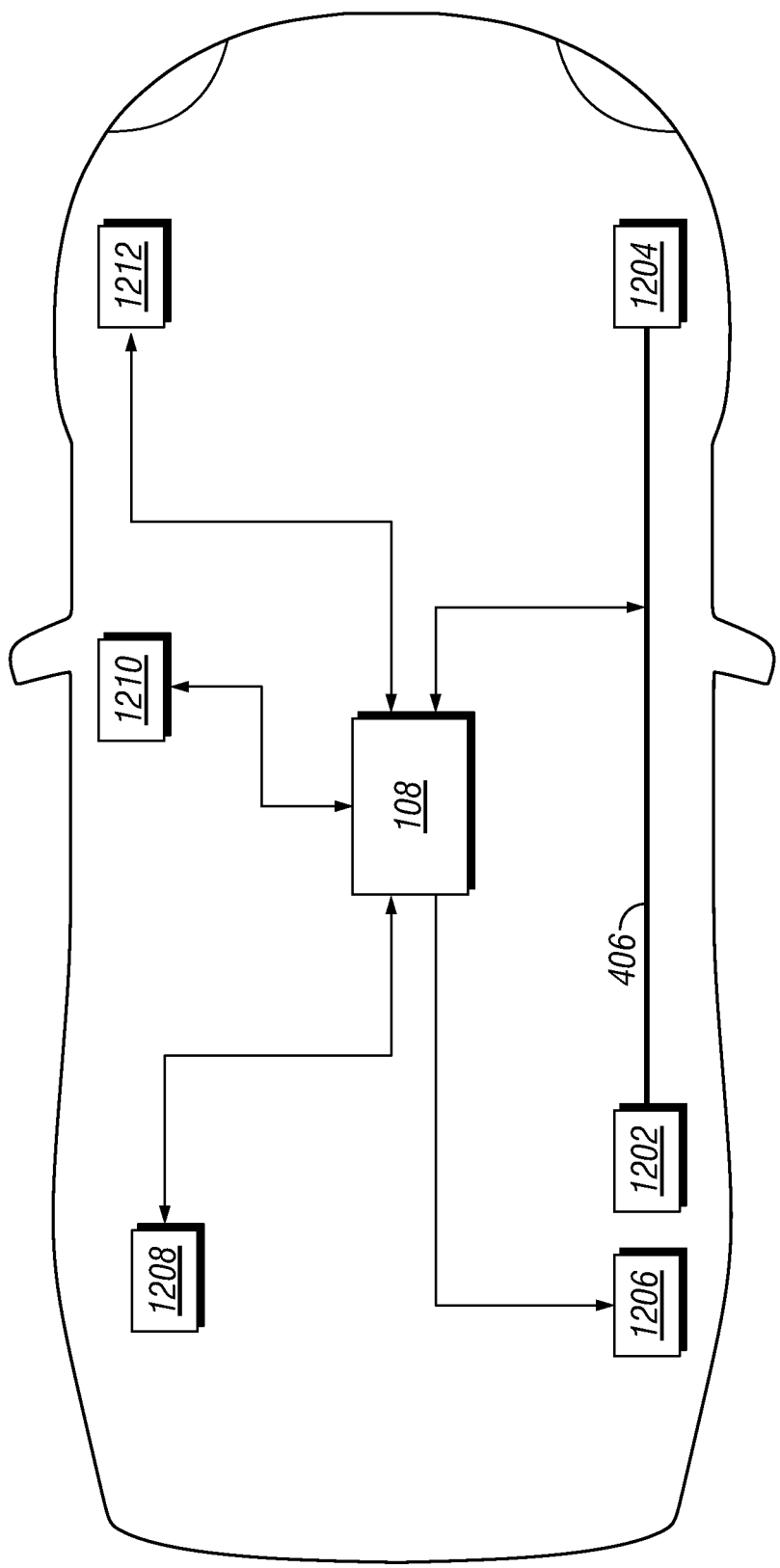
FIG. 12 is a schematic diagram of an example system for regulating networks on a vehicle according to certain embodiments of the present disclosure.

Referencing FIG. 12, a vehicle having a number of networks thereon, where communications between the networks are regulated by a CND 108, is schematically depicted. The arrangement of FIG. 12 is provided to illustrate certain aspects of the present disclosure, and is a non-limiting arrangement. The example of FIG. 12 includes end points 1202, 1204 (e.g., one or more vehicle controllers) coupled to a first network 406, and a number of end points 1206, 1208, 1210, 1212 coupled to a second network (e.g., an Ethernet network, with a switch co-located with the CND 108 and/or at least partially separate from the CND 108). In the example of FIG. 12, the controllers 1202, 1204, 1206, 1208, 1210, 1212 are able to pass communications, as regulated by the CND 108, between disparate networks of the vehicle. In certain embodiments, a given controller can be switched between networks, and communications with other controllers within the vehicle, and/or communications external to the vehicle, can be maintained, and further can be maintained whether the related controllers (or external controllers, applications, or devices) have knowledge of the switch or not.

Figure 13:
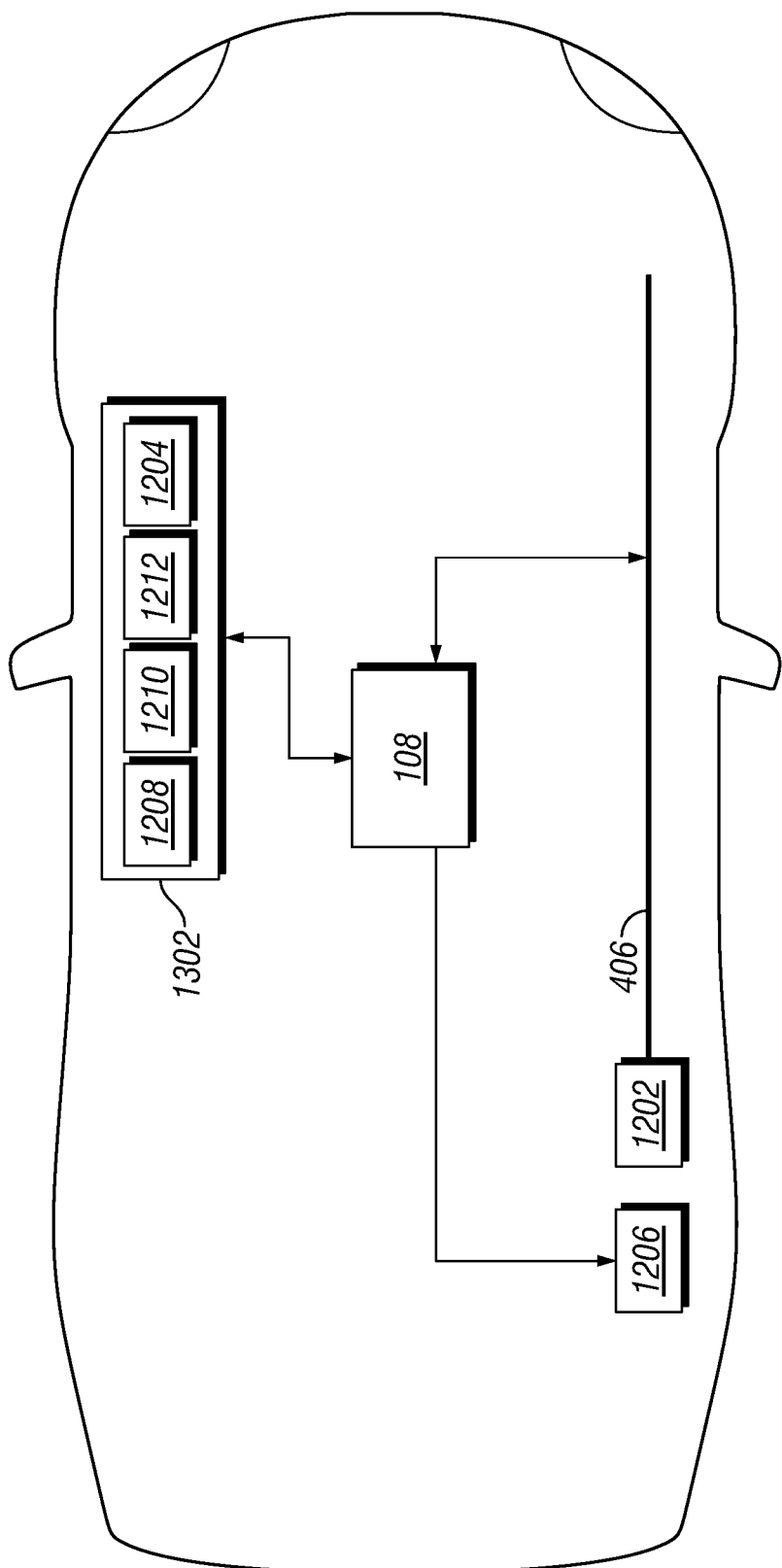
FIG. 13 is a schematic diagram of an example system for regulating networks on a vehicle according to certain embodiments of the present disclosure.

Referencing FIG. 13, a vehicle having a number of networks thereon, where communications between the networks are regulated by a CND 108, is schematically depicted. For purposes of illustration, the example of FIG. 13 includes the same networks and set of controllers as the example of FIG. 12. In the example of FIG. 13, the controllers 1204, 1208, 1210, and 1212 have been co-located 1302, and the controller 1204 has additionally been moved from the first network 406 to the second network. The co-location 1302 of the controllers 1204, 1208, 1210, 1212 can be any implementation, including consolidation of the controllers into a lesser number of housings (e.g., 1-3 total housings instead of 4), onto a lesser number of boards (e.g., 1-3 boards, instead of 4), and/or utilizing at least partially shared computing resources (e.g., shared processing, shared memory, shared caches, and/or combinations of these). In certain embodiments, the utilization of the CND 108 allows for the arrangement of FIG. 13, including the consolidation of vehicle controllers, by providing for communication regulation, and maintained connectivity, with only a configuration update to the CND 108, and/or with consolidation changes of vehicle controllers that fit within available predetermined configurations of the CND 108 (and thereby can be implemented without an update to the CND 108). Additionally, the consolidation of controllers may provide a number of benefits, such as reduction in network costs, reduction in network traffic, selected distribution of risk (e.g., arrangement of controller positions and/or network routing in a lower risk, or diversified risk, position; and/or reduction of risk to another system component utilizing the footprint gains and/or cost savings of the controller consolidation). In certain embodiments, the consolidation of controllers may enable deeper sharing of information between controllers (e.g., due to increased available network capacity, bypassing of network limitations with shared controllers, and/or utilization of shared memory resources), which may allow for more capable operations of the controllers, and/or operations previously unavailable because the shared information between controllers was not as readily available. In certain embodiments, the CND 108 further enables the consolidation of controllers, by de-coupling the controller locations from end point locations (not shown) that are required to be distributed (e.g., sensors and actuators that need to be placed in certain locations to perform their function no longer need to be located near the respective controller due to operations of the CND 108, and/or CEG 402). In certain embodiments, the consolidation of controllers allows for reduced costs and/or increased capability, for example by reducing hardware costs for shared computing resources, enabling higher capability (e.g., processing power and/or memory) computing resources, or combinations of these. The operations of the CND 108 thus allow for consolidation operations of vehicle controllers that were not previously available. In certain embodiments, the example of FIG. 13 may be a consolidation of controllers relative to FIG. 12, and/or an illustration of an unrelated embodiment.

Figure 14:
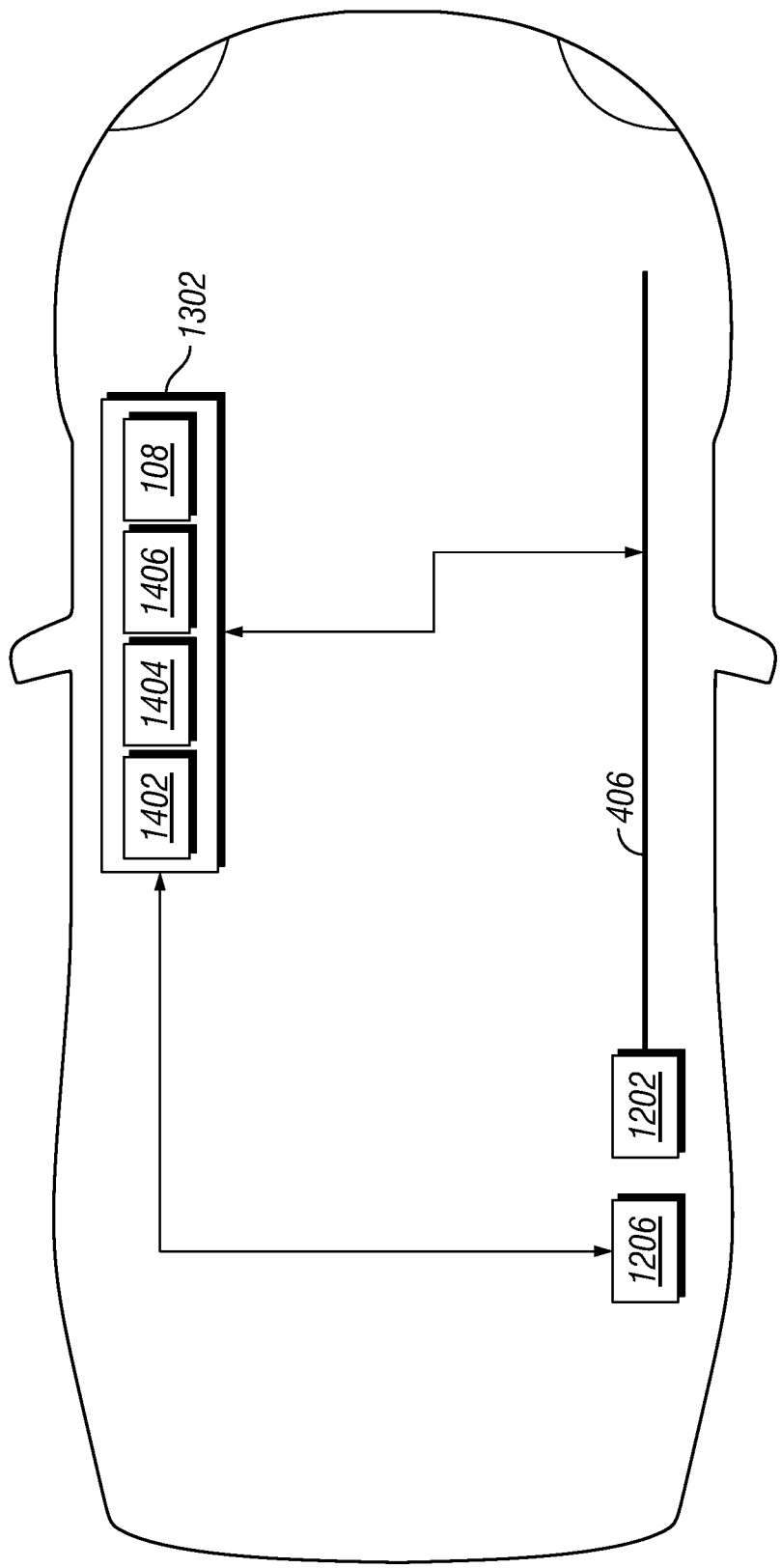
FIG. 14 is a schematic diagram of an example system for regulating networks on a vehicle according to certain embodiments of the present disclosure.

Referencing FIG. 14, a vehicle having a number of networks thereon, where communications between the networks are regulated by a CND 108, is schematically depicted. For purposes of illustration, the example of FIG. 14 includes the same networks and a similar set of controllers as the example of FIG. 12. In the example of FIG. 14, the co-located 1302 controllers include a set of controllers 1402, 1404, 1406, and the CND 108 depicted as a controller on the co-located 1302 controller. The CND 108 may be positioned, at least in part, on one or more of the co-located controllers 1402, 1404, 1406, and/or may be separate as depicted. In certain embodiments, the example of FIG. 14 may be a further consolidation of controllers relative to FIG. 13, and/or an illustration of co-located 1302 controllers unrelated to the examples of FIGS. 12 and 13.

Referencing FIG. 15, a vehicle having a number of networks thereon, where communications between the networks are regulated by a CND 1502, 1504, is schematically depicted. For purposes of illustration, the example of FIG. 15 utilizes two consolidated controllers 1302, 1506, each including a group of co-located vehicle controllers as set forth throughout the present disclosure. The example of FIG. 15 includes a first CND 1502 (or CND portion) interposed between a first network 406 and a second network (end points 412 directly coupled to the CND 1502 and the consolidated controller 1506 directly coupled to the CND 1502), and a second CND 1502 (or CND portion) interposed between the first network 406 and a second network (end points 412 directly coupled to CND 1504 and the consolidated controller 1302 directly coupled to the CND 1502). In certain embodiments, the second network associated with the first CND 1502 may be a separate network relative to the second network associated with the second CND 1504, but may be a same type of network (e.g., an Ethernet network) and/or may utilize the same or electrically coupled hardware relative to each other. The example of FIG. 15 illustrates the CND 1504 as having primary network regulation for the first network 406, but regulation of the first network 406 may be distributed, shared, regulated according to end points, applications, and/or flows, or the like. In certain embodiments, regulation of the second network(s) may be performed by only one of the CNDs 1502, 1504, and/or distributed, shared, regulated according to end points, applications, and/or flows.

A number of representative aspects of FIG. 15 are described following, any one or more of which may be present in certain embodiments. An example aspect of FIG. 15 includes shared regulation of networks by the CNDs 1502, 1504, with either of the CNDs 1502, 1504 fully or partially capable to support regulation of all networks, for example if an end point, network, the other CND (or portion), and/or controller experiences a failure, a fault, or diminished operational capability. An example aspect of FIG. 15 includes primary regulation of networks by one the CNDs 1502, 1504, with the other CND capable to fully or partially support regulation of the networks, for example if an end point, network, primary CND, and/or controller experiences a failure, fault, or diminished operational capability. An example aspect of FIG. 15 includes one or more of the consolidated controllers 1302, 1506 capable to at least partially assume control operations for the other of the consolidated controllers 1506, 1302 if one of the consolidated controllers loses capability, connectively with an end point, or the like. In certain embodiments, the CNDs 1502, 1504 are capable to pass parameters that were previously only available to the original controller 1302, 1506 in response to the assumption of the control operations by the replacement controller 1506, 1302. In certain embodiments, the redundant network routing availability is usable by the CNDs 1502, 1504, to provide at least partial connectivity between end points that lose connection when a part of the network goes down. The CNDs 1502, 1504 may provide equivalent parameters (e.g., another end point that is capable to provide equivalent data), substitute parameters (e.g., another end point that is capable to provide a substitute or backup parameter that is usable, at least partially, as a substitute for the lost parameter), the same parameters (e.g., where the data from the original end point, or the same data value from another end point, can be routed through the remaining network infrastructure), and/or may provide managing parameters such as controller hand-off communications, heart beat or status communications, or the like. In certain embodiments, one or both of the CNDs 1502, 1504 or CND portions may be co-located with another system component, such as one of the consolidated controllers 1302, 1506. In certain embodiments, network routing for networks on the vehicle is provided to yield distinct risk profiles for networks on the vehicle, reducing the risk of a single failure rendering the vehicle inoperable for the mission, and/or inoperable for at least a limp home operation, controlled shutdown, data capture, or the like. In certain embodiments, controller, CND, and/or consolidated controller locations may be selected to provide distinct risk profiles for related devices, reducing the risk of a single failure rendering the vehicle inoperable for the mission, and/or inoperable for at least a limp home operation, controlled shutdown, data capture, or the like. In certain embodiments, network routing for networks on the vehicle is provided to yield a lower operating cost, installation cost, integration cost, overall risk profile, distribution of weight and/or footprint of components on the vehicle, or the like.

Resolution of competing priority interests may be performed in any manner, such as always favoring the highest priority requestor, providing a weighted response based on the priority (e.g., servicing a high priority request more often than a lower priority request), and/or utilizing a credit based scheme that allows lower priority requests to be serviced after a period of time and/or number of requests, while favoring higher priority requests. Resolution of competing priority interests may include meeting service performance requirements (e.g., QoS values) for higher priority requests, and servicing lower priority requests to the extent possible while meeting performance requirements for higher priority requests.

As utilized herein, the mission of a device (e.g., a controller, end point, vehicle, mobile application, etc.) should be understood broadly, and includes at least the related functions, structures, capability, and operations of the device to support operation of the mobile application to perform the intended function or primary function of the mobile application. Without limitation to any other aspect of the present disclosure, an intended function or primary function of the mobile application includes one or more of: motive operation of the mobile application, in accordance with the designed motive capabilities (e.g., with specified torque, speed, responsiveness, etc.); and/or non-motive operation (e.g., industrial operations, vocational operations, pumping operations, provision of shaft power, movement range, and control thereof) of the mobile application, with the designed non-motive capabilities. In certain embodiments, the intended function or primary function of the mobile application includes off-nominal operational response that may be less capable than the designed motive or non-motive capabilities, such as operation in a limp home mode, communication of fault or failure conditions, and/or prevention of further degradation of the vehicle and/or mobile application. In certain embodiments, the intended function or primary function of the mobile application includes sending and/or receiving external data, performing update operations, facilitating service operations, facilitating update and/or upgrade operations, or the like. Accordingly, the mission of a device may vary between mobile applications, according to the current operating condition of the mobile application, and/or according to the current status of the mobile application and/or components, devices, and/or controllers thereof. One of skill in the art, having the benefit of the present disclosure and information ordinarily available when contemplating a specific mobile application, will readily understand the mission of the mobile application, the mission of devices of the mobile application, and the variability of these across operating conditions and status conditions of the mobile application.

Figure 16:
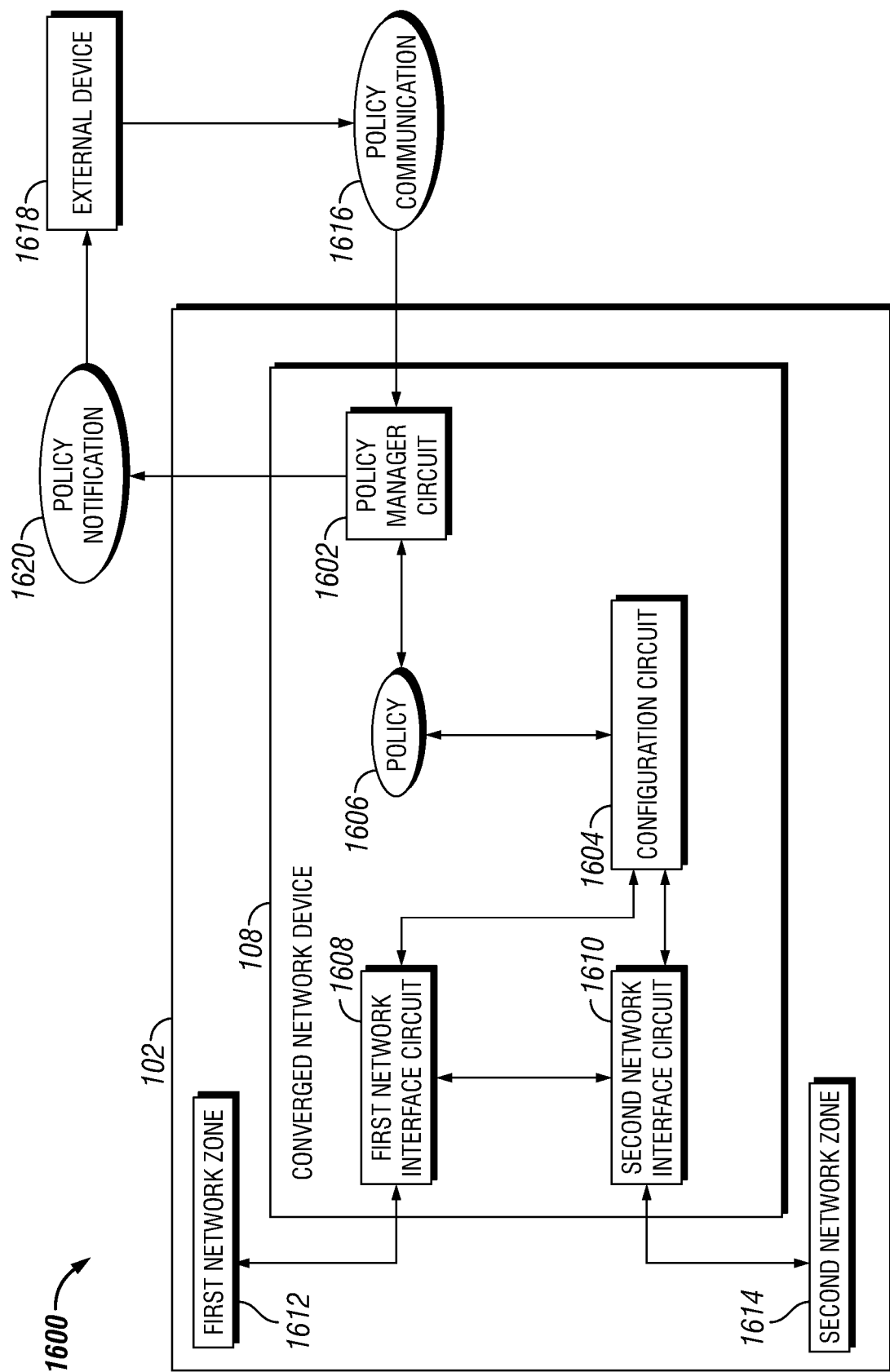
FIG. 16 is a schematic diagram of a system for regulating network communications of a vehicle.

Referencing FIG. 16, an example system 1600 is provided for providing extra-vehicle communication control, consistent with embodiments of the present disclosure. Systems described throughout the present disclosure may be provided on a mobile application such as a vehicle or as described throughout the present disclosure. Example systems herein recite particular arrangements, for example of a converged network device (CND) 108, circuits, controllers, or other components. The arrangements are provided for clarity of the present description, but components may be distributed, combined, divided, and/or have distinct relationships to those depicted to form systems and to perform procedures described herein.

Circuits, controllers, processors, or other devices set forth herein are configured to functionally perform operations as described herein, and may include computing components such as processors, memory, and/or communications components. Additionally or alternatively, such devices may include logic circuits, hardware configured to perform one or more functions of the device, sensors, actuators, and/or display devices of any type. A given circuit, controller, processor, or other such device may be distributed and/or grouped, in whole or part, with other such devices.

Certain operations herein are described as interpreting or receiving parameters, or obtaining parameter values using other similar language depending upon the context. Any such operations include receiving the parameter value as a network communication; receiving the parameter value from a sensor; receiving the parameter value as a feedback value (e.g., an actuator position, a reported fault code value, etc.); retrieving the parameter value from a memory location accessible to the interpreting or receiving device; receiving the parameter value as a command; receiving the parameter value as a response to a request from the receiving or interpreting device; and/or receiving pre-cursor values from which the parameter is, at least in part, determined (e.g., operating a virtual sensor using other information to determine the interpreted or received parameter value; determining a state value based upon the received information, where the state value is the received or interpreted value for the purpose of the description; and/or using received information to infer the interpreted value). Any such operations may further include more than of these (e.g., interpreting a parameter value in distinct ways at different times, operating conditions, during off-nominal conditions, depending upon a source of the parameter value, and/or depending upon the usage or purpose of the interpreted parameter value at a given time or during certain operating conditions), and/or combinations of these (e.g., operating a virtual sensor on received information to determine a pre-cursor value, and determining the interpreted parameter value in response to the pre-cursor value).

The example system 1600 includes a vehicle 102 having a first network zone 1612 and a second network zone 1614, where the first network zone 1612 and the second network zone 1614 are different types of networks. Without limitation to any other aspect of the present disclosure, different types of networks as described herein contemplates any difference in the networks, such as: a difference in a network capability (e.g., band width, message size, latency, noise sensitivity, etc.); a difference in a network protocol at any layer (e.g., hardware type; message frame requirements; addressing schemes; acknowledgement types, requirements, or capabilities; casting availability such as unicast, multicast, and/or broadcast); a network standard type (e.g., Controller Area Network (CAN); Media Oriented Systems Transport (MOST) network; Local Interconnect Network (LIN); FlexRay network; Time-Triggered Protocol (TTP) network; Low-Voltage Differential Signaling (LVDS) network; Audio Video Bridging (AVB) compliant network; a customized version of any one or more of the foregoing; and/or a proprietary version of any one or more of the foregoing). An example network zone includes an electrical signal zone (e.g., a network where a corresponding network interface circuit interprets an electrical signal value as a communication, and/or provides an electrical signal value as a communication to an end point of the electrical signal zone, such as a sensor providing certain electrical values indicating a sensed parameter value, a diagnostic value, or the like, and/or an actuator responsive to certain electrical values to move to a selected position and/or apply a selected force, and/or where the actuator may additionally or alternatively provide feedback information and/or diagnostic information on the electrical signal zone). Electrical signals for an electrical signal zone may be of any type, including at least: voltage values; frequency values; current values; and/or configured pulse-width modulated (PWM) values such as duty cycles, amplitudes, selected periods, and the like.

The example system 1600 further includes a policy manager circuit 1602 that interprets a policy 1606 including a network regulation description (not shown), and a configuration circuit 1604 that configures at least one network interface circuit (e.g., a first network interface circuit 1608 corresponding to the first network zone 1612 and/or a second network interface circuit 1610 corresponding to the second network zone 1614) in response to the policy 1606. For example, the policy 1606 may be provided by an external device 1618, and/or may be previously stored (e.g., at a time of manufacture, assembly, and/or during a previous update from the external device 1618), where the policy 1606 includes the network regulation description having selected indications of devices on the vehicle 102 for capability to utilize the network zones 1612, 1614, to communicate between zones, and/or to communicate with external devices 1618.

An example system 1600 includes the first network interface circuit 1608 provided as a part of a CEG, where the first network zone 1612 is a CAN bus network, and the second network interface circuit 1610 provided as a part of a CES, where the second network zone 1614 is provided as an ethernet network. In the example, the first network interface circuit 1608 provides selected communications from the first network zone 1612 to the second network interface circuit 1610 at a selected port of the ethernet network, and/or receives selected communications from the second network zone 1614 at the selected port of the ethernet network, thereby providing for inter-network communications between the first network zone 1612 and the second network zone 1614. In the example, communications from the first network zone 1612 to an external device 1618 may be provided through the second network zone 1614 (e.g., where the external device 1618 is coupled to the second network zone 1614 and/or connected wirelessly to the vehicle 102), or directly to the external device 1618 (e.g., where the external device 1618 is coupled directly to the first network zone 1612 or CAN bus).

An example system 1600 includes the first network zone 1612 as a virtual local area network (VLAN), logically separated from the second network zone 1614, but positioned on at least partially shared hardware with the second network zone 1614. In the example, the first network interface circuit 1608 and second network interface circuit 1610 may be operated as elements of a network switch or router, controlling communication between end points of the first network zone 1612 and second network zone 1614 in response to the policy 1606.

Devices on the vehicle 102 that are regulated by the policy include, without limitation, one or more of: an end point of a network zone; a flow associated with a communicating device (e.g., an end point or an application); an application associated with a communicating device (e.g., an end point). For example, an end point of the first network zone 1612 (e.g., a backup camera on the vehicle 102) may request or perform communications on a network of the vehicle, but may be associated with more than one application or flow (e.g., associated with a first flow relating to vehicle reverse movement operations at a first operating condition, and associated with a second flow relating to vehicle security operations at a second operating condition), and accordingly the communications of the backup camera on the vehicle 102 may have different regulation parameters depending upon the flow associated with the operations at the moment. In certain embodiments, an end point is associated with more than one application or flow, and the end point is regulated according to a highest priority one of the associated applications or flows (e.g., to reduce communication requirements, such as determining the application or flow that is requesting the immediate communication to be regulated, and/or to reduce processing time to determine which application or flow is requesting the immediate communication). In certain embodiments, an end point is associated with more than one application or flow, and the end point is regulated according to priority of the application or flow requesting the immediate communication.

Devices on the vehicle 102 that are regulated by the policy may be referenced herein, without limitation, as a local communicating device. Local communicating devices include, without limitation: an end point of a network zone; an application; a flow; a sensor device; a service group; a vehicle function (e.g., power management, cabin comfort, traction control, etc.); and/or a vehicle controller (e.g., an engine controller, a transmission controller, an anti-lock brake system (ABS) controller, an advanced driver assistance system (ADAS) controller, etc.). It can be seen that a given component, such as an end point of a network zone, may be a first local communicating device during one operating condition, and a second local communicating device during another operating condition—for example depending upon the vehicle operating condition (e.g., shutdown, motive operation, parked operation, etc.), and/or may be a first local communicating device for a first purpose (e.g., a brake controller performing active traction control operations) and a second local communicating device for a second purpose (e.g., the brake controller providing data to be stored for diagnostic operations). Additionally, it can be seen that the distribution of communicating devices between applications, flows, controller, vehicle functions, and the like, depends upon the organizing strategy of the particular system, design choices made by a manufacturer or other entity having design and/or configuration control of the system, and the like. For example, traction control may be provided by a unified vehicle controller for a given system (e.g., which may treat the traction control as a vehicle controller for network regulation purposes); provided by distributed controllers for another system (e.g., which may treat the traction control as a vehicle function for network regulation purposes); and/or may be treated as a logically grouped set of operations for another system (e.g., which may have any hardware organization including the previously described organizations, and which may treat the traction control as an application or flow for network regulation purposes). One of skill in the art, having the benefit of the present disclosure and information ordinarily available when contemplating a particular system, can readily determine the organizational scheme and network regulation for local communicating devices of the system. The organizational scheme for local communicating devices includes the inclusion and/or association of end points of the network zones, and/or certain communications (including source or destination communications for the end point(s)) with one or more of: particular end points, vehicle controllers, vehicle functions, applications, and/or flows of the system.

Certain considerations to determine the organizational scheme include, without limitation: the number, types, capabilities, and inter-connection bandwidth of network zones of the system; the available size and/or granularity for policy (ies) of the system; the available processing power available for implementation of the policy(ies) of the system; the number and distribution of vehicle controllers and other controllers throughout the system; the expected change of the system over time (e.g., availability to reconfigure, remanufacture, and/or re-spec the vehicle; expected changes in coming model years associated with the vehicle; and/or the level of consumer and/or third-party customization of the vehicle that is available or expected); the number and distribution of sensors and/or actuators throughout the system, and the connectivity of the sensors and/or actuators to a network zone (e.g., consolidation at controllers, and/or consolidation using smart sensors/actuators capable to directly interface with a network zone); the presence, number, and distribution of multi-purpose communicating elements on the system (e.g., sensors, actuators, controllers, and/or data values that service multiple vehicle functions, flows, and/or applications); the presence, number, and distribution of multi-purpose data elements on the system (e.g., sensors, actuators, controllers, and/or data values that provide redundant capability to support a given vehicle function, flow, and/or application); and/or the expected utilization of a network aspect (e.g., communications on a network zone, external communication data rate and/or aggregate data communicated, inter-network communications, etc.) relative to a related capacity (e.g., a bandwidth of a network zone, external communication bandwidth, external communication data limit, inter-network communications, etc.).

An example policy manager circuit 1602 receives a policy communication 1616 from an external device 1618, and interprets the policy 1606 by performing an operation such as storing the policy 1606 (e.g., in a memory location accessible to the policy manager circuit 1602, and/or distributed throughout a number of memory locations) and/or updating a stored policy 1606. In certain embodiments, the policy manager circuit 1602 configures the policy 1606 for utilization by network regulating aspects of the system 1600, for example by updating a number of configuration files utilized by interface circuits 1608, 1610, adjusting high level descriptions of the policy communication 1616 (e.g., limit external communication data to 32 GB per month) to executable commands by network regulating aspects of the system 1600, adjusting reference values of the policy communication 1616 (e.g., associating a local address value of an end point referenced in the policy communication 1616, such as when an end point has moved without notification to the external device 1618, and/or where specific addressing information of local devices is abstracted from the external device 1618, etc.), associating system-specific nomenclature to elements of the policy description 1620 (e.g., local parameter value names or IDs, flow names or IDs, application names or IDs, etc.), or the like.

An example system 1600 includes the external device 1618 communicatively coupled to the policy manager circuit 1602 through at least one of the first network zone 1612 or the second network zone 1614—for example using a CAN bus port, OBD port, ethernet port, proprietary port, or other direct coupling to a network zone. An example system 1600 includes the external device 1618 communicatively coupled to the policy manager circuit 1602 through a wireless connection, such as a WiFi connection, cellular connection, and/or Bluetooth connection.

An example system 1600 includes the policy manager circuit 1602 verifying the policy 1606, as communicated by the policy communication 1616, before performing the storing and/or updating of the policy 1606. For example, the policy manager circuit 1602 may require an authentication of the external device 1618, and/or a determination of the permissions associated with the external device 1618, before performing a change to the policy 1606. In certain embodiments, the policy manager circuit 1602 may determine permissions associated with the external device 1618, an entity utilizing the external device 1618, an application or flow utilizing the external device 1618, or the like, before performing a change to the policy 1606. In certain embodiments, the policy manager circuit 1602 may reject the policy communication 1616 if the policy 1606 implied by the policy communication 1616 exceeds an authority associated with the external device 1618, and/or if the policy 1606 cannot be implemented (e.g., executing the policy 1606 would exceed the capability of the system 1600, such as a bandwidth of a network zone, an external communications limit, a memory storage limit, or the like). In certain embodiments, the policy manager circuit 1602 may partially implement the policy communication 1616 if the policy 1606 implied by the policy communication exceeds an authority associated with the external device 1618, and/or if the policy 1606 cannot be fully implemented. For example, the policy manager circuit 1602 may implement the authorized portions of the policy communication 1616, and/or implement portions of the policy communication 1616 than the system 1600 has capability to implement. In certain embodiments, the policy manager circuit 1602 implements portions of the policy communication 1616, for example where a system capability would be exceeded by a full implementation, according to: a priority of associated end points, flows, applications, vehicle functions, etc. of the policy communication 1616 (e.g., implementing higher priority aspects until a limit is reached); and/or maximizing an implementation value of the policy communication 1616 (e.g., associating a value for each aspect according to an associated priority, importance, benefit description, etc. of the given aspects; for example where meeting a group of slightly lower priority aspects of the policy would exceed the value of meeting only a single higher priority aspect of the policy).

An example policy manager circuit 1602 provides a policy notification 1620 to the external device 1618 in response to verifying the policy 1606. An example policy notification 1620 includes a confirmation that the policy 1606 is updated and/or stored according to the policy communication 1616. An example policy notification 1620 includes a notification that the policy 1606 has not been implemented (e.g., where the external device 1618 does not have authorization to implement the policy communication 1616). An example policy notification 1620 includes a reason for the rejection of the policy communication 1616 (e.g., a lack of authorization, lack of capability, etc.). An example policy notification 1620 includes one or more aspects of a partial implementation of the policy communication 1616, for example a description of which aspects of the policy communication 1616 have been implemented or rejected, and/or a reason for the partial implementation. In certain embodiments, the policy manager circuit 1602 may provide the policy notification 1620 to a separate external device (not shown), either instead of the policy notification 1620 to the first external device 1618, and/or in addition to the policy notification 1620 to the first external device 1618. In certain embodiments, the policy notification 1620 to separate external devices may have the same information, or separate information. For example, the policy manager circuit 1602 may provide a simple policy notification 1620 to the requesting external device 1618 (e.g., a rejection of the policy communication 1616), and a more detailed policy notification 1620 to a separate external device (e.g., indicating authorizations that prevent the implementation of the policy communication 1616, capacities that prevent the implementation of the policy communication 1616, and/or details related to a partial implementation of the policy communication 1616). In certain embodiments, the policy manager circuit 1602 may provide a more detailed policy communication 1616 to the requesting external device 1618, and a simpler policy communication 1616 to the separate external device(s).

In certain embodiments, the policy notification 1620 may include providing a prompt to a user interface of an external device (not shown), for example allowing an authorized external device, user, entity, or the like, to provide a permission to allow a policy 1606 update in response to the policy communication 1616. In a further example, the prompt to the user interface of the external device may include a prompt to one or more of a vehicle owner, a vehicle operator, a vehicle manufacturer, an administrator related to the vehicle (e.g., a network administrator, fleet owner, fleet service operator, compliance personnel associated with the vehicle, etc.).

Without limitation to any other aspect of the present disclosure, example aspects of a policy 1606 include: a data collection parameter (e.g., data available to at least one network zone of the vehicle, such as data from any sensor, actuator, controller, and/or end point at least selectively couplable to a network zone and/or in communication with an end point of a network zone); a data collection permission value (e.g., a sampling or communication rate; a permission to provide the data value to a network zone; a permission to request the data value from a network zone; a resolution value associated with the data; a time lag permission associated with the data; a storage permission associated with the data such as an amount of data storage authorized, data expiration criteria, and aged data treatment parameters such as compression and/or summarization operations to be performed on aging data and/or to be performed if permitted storage becomes limited due to inability to communicate the stored data externally or competing storage priorities intervene with the planned available storage); a service publication permission value (e.g., an authorization to publish the availability of a service, which may include scheduled authorization to publish to some local communicating devices, external applications, and the like, but not to others; and/or an authorization to publish details of the available service such as data parameters provided, actuators available, etc.); a service subscription permission value (e.g., published services that are visible to the associated local communicating device; service details that are available to the associated local communicating device; and/or permissions to subscribe to services for the associated local communicating device); and/or an external communication permission value (e.g., data rates, associated parameters, external addresses allowed, APNs allowed, aggregate data communication permissions, etc.). The policy 1606 includes any one or more of the foregoing associated with local communicating devices (e.g., end points, controllers, vehicle functions, flows, applications, etc.), external devices (e.g., specific devices or device categories, entities, and/or applications). In certain embodiments, a given flow, application, or vehicle function may include aspects associated with a local communicating device, and other aspects associated with an external device (e.g., a route predictor application that utilizes local communicating devices combined with an external application such as a cloud based application or a web based application).

Figure 17:
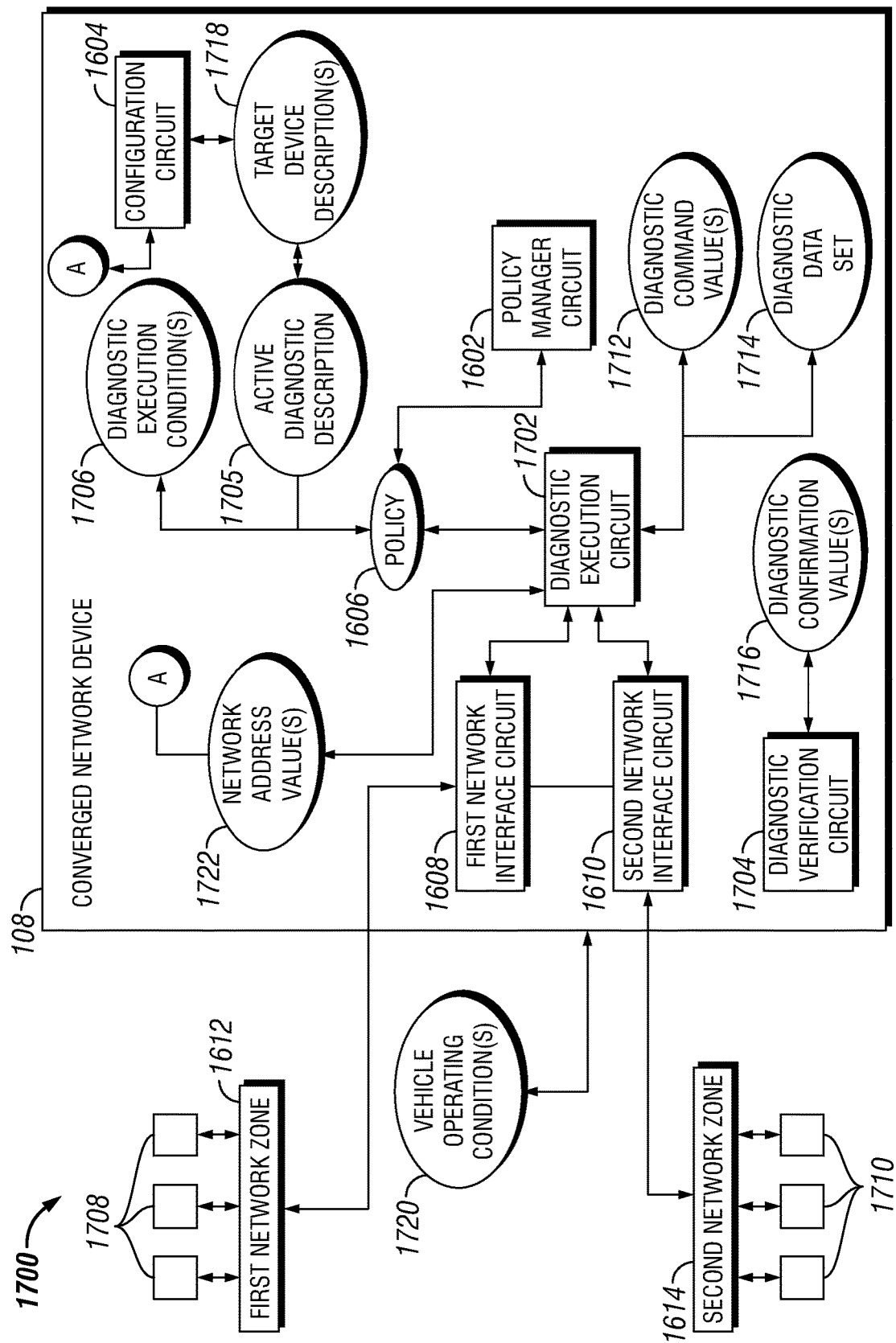
FIG. 17 is a schematic diagram of a CND.

Referencing FIG. 17, an example system 1700 is provided for providing extra-vehicle communication control, consistent with embodiments of the present disclosure. The example system includes a vehicle 102 having a first network zone 1612 and a second network zone 1614, where the second network zone 1614 is of a different type than the first network zone 1612. The example system 1700 includes a CND 108 interposed between the first network zone 1612 and the second network zone 1614. The CND 108 interposed between the network zones 1612, 1614, includes physical interposition (e.g., communications between the network zones 1612, 1614 pass through the CND 108, and/or through a device controlled by the CND 108 such as a CEG, CES, or other network interface circuit) and/or a logical interposition (e.g., where communications between the network zones 1612, 1614 pass through a device controlled by the CND 108, and/or where the CND 108 regulates communications between the network zones 1612, 1614 such as data values passed, configuration of the data values, data rates, up-sampling and/or down-sampling of data, encapsulation operations, frame inclusion and/or processing of passed communications, etc.).

The example system 1700 further includes a policy manager circuit 1602 that interprets a policy 1606 including an active diagnostic description 1705, and a diagnostic execution circuit 1702 that provides a diagnostic command value 1712 to an end point of a network zone 1612, 1614 in response to the active diagnostic description 1705. The example system 1700 includes end points of the first network zone 1612 (end points 1708) and end points of the second network zone 1614 (end points 1710). In the example system 1700, an end point 1708, 1710 includes a device responsive to the diagnostic command value 1712. Example and non-limiting diagnostic command values 1712 include: a command to collect one or more data values; a command to operate an actuator; and/or a command to operate a vehicle function (e.g., provide an engine speed, power level, or higher level function such as executing a regeneration mode, scheduled test operation, etc.). The example system 1700 allows for the execution of an active diagnostic test, requested by an external device, to be successfully performed regardless of the distribution of end points 1708, 1710 throughout networks of the vehicle, including where an end point has moved between networks, and/or where a given diagnostic command value 1712 is utilized to perform active diagnostic tests across a range of vehicles having varying network configurations and distribution of end points 1708, 1710.

Figure 18:
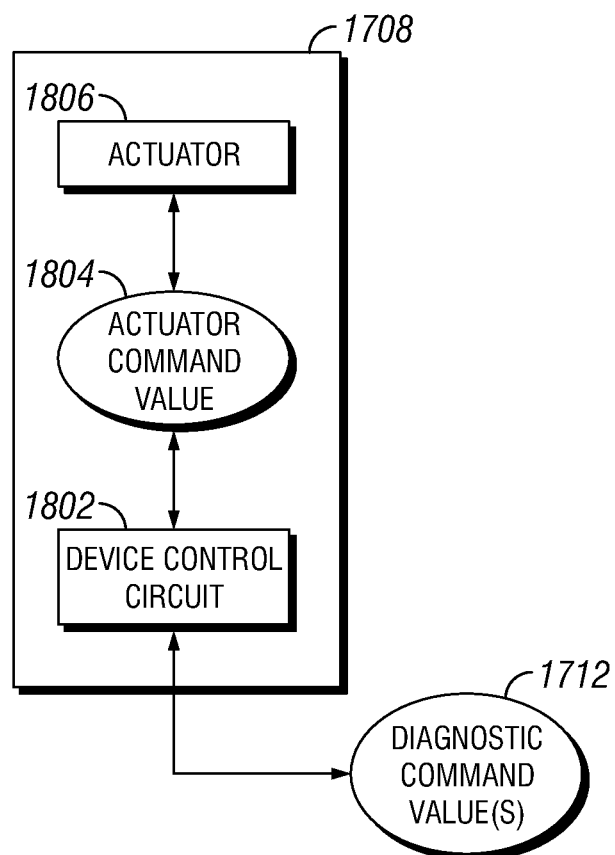
FIG. 18 is a schematic diagram of an end point of a network responsive to an actuator command value.

Referencing FIG. 18, an example end point 1708 includes a device control circuit 1802 that interprets the diagnostic command value 1712, and provides an actuator command value 1804 in response to the diagnostic command value 1712. The example end point 1708 includes, or is associated with, an actuator 1806 responsive to the actuator command value 1804. For example, a diagnostic command value 1712 may include a command such as "lock the driver door", "close an exhaust gas recirculation valve", "raise a motor temperature to 80° C.", etc., allowing for an abstraction between the diagnostic command value 1712 and actuator 1806 responses to achieve the diagnostic command value 1712. Additionally or alternatively, the diagnostic command value 1712 may be associated with a complex operation or series of operations, such as a full test sequence or the like, and accordingly numerous end points 1708, 1710 and/or actuators 1806 throughout the system 1700 may be implicated by a single diagnostic command value 1712.

An example system 1700 further includes the diagnostic execution circuit 1702 determining whether a vehicle operating condition 1720 is consistent with the diagnostic command value 1712 before providing the diagnostic command value 1712 to the end point(s) 1708, 1710. For example, the diagnostic command value 1712 may include a diagnostic test that adjusts torque delivery of a prime mover of the vehicle, and associated vehicle operating conditions 1720 may include parameters such as: ensuring the vehicle is out-of-gear; ensuring the vehicle is not in a motive power mode; and/or ensuring the vehicle is in a selected test mode. In certain embodiments, the vehicle operating conditions 1720 for a given diagnostic command value 1712 may be set forth in the active diagnostic description 1705, allowing for active control of vehicle operating conditions 1720 for test performance (e.g., target temperatures; diagnosing specific conditions such as vehicle launch, altitude operation, or the like) and/or extra-test considerations (e.g., operator or service personnel safety, fuel economy or emissions, impact to network communication rates, processing demand, and/or memory storage, etc.). In certain embodiments, the vehicle operating conditions 1720 for the given diagnostic command value 1712 may be enforced by another flow, application, vehicle function, or the like associated with the vehicle (e.g., torque commands cannot be adjusted separate from operator commands unless specified vehicle conditions 1720 are present, etc.). An example system 1700 includes the policy 1606 including a diagnostic execution condition 1706, where the diagnostic execution circuit 1702 further determines whether the vehicle operating condition(s) 1720 are consistent with the diagnostic command value 1712 in response to the diagnostic execution condition(s) 1706.

An example system 1700 includes the diagnostic execution circuit 1702 further performing a diagnostic data collection operation in response to the active diagnostic description 1705, and storing a diagnostic data set 1714 in response to the diagnostic data collection operation. For example, the active diagnostic description 1705 may include a number of data parameters to be collected, vehicle state conditions to be monitored, and/or parameter threshold values to be determined (e.g., a temperature above a threshold value). The stored diagnostic data set 1714 may include the collected data, vehicle state conditions determined based on the collected data, parameter threshold confirmation values determined based on the collected data, or combinations of these. The collected data may be from end points 1708, 1710 responsive to the diagnostic command values 1712 (e.g., confirmation that actuators have responded to commands, diagnostic data or fault codes associated with responsive actuators, etc.), or from end points 1708, 1710 apart from those responsive to commands (e.g., observation of a temperature, pressure, speed value, state confirmation, etc. that is not associated directly with the actuating end points 1708, 1710).

An example diagnostic execution circuit 1702 performs a processing operation on data collected in the diagnostic data collection operation, and stores the diagnostic data set 1714 in response to the processing operation. For example, the stored diagnostic data set 1714 may include state information, virtual sensor information, negative information (e.g., only storing data associated with operations where a threshold is not met), up-sampled and/or down-sampled values for the data collected, and/or any other processing operations set forth throughout the present disclosure. Example and non-limiting processing operations for the data collected, or portions thereof, include: compressing the data collected; summarizing the data collected; operating a virtual sensor utilizing the data collected; determining a vehicle operating condition parameter in response to the data collected; determining the diagnostic data set in response to a determined vehicle operating parameter; performing an up-sampling operation on the data collected; and/or performing a down-sampling operation on the data collected.

An example diagnostic execution circuit 1702 further communicates the diagnostic data set 1714 to an external device (e.g., 1618) in response to the diagnostic data collection operation. The external device receiving the diagnostic data set 1714 may be the same or a different external device than an external device supplying the active diagnostic description 1705. An example diagnostic execution circuit 1702 further processes the collected data before communicating to the external device, which may include the initial processing to determine the stored diagnostic data set 1714, and/or a further processing operation on the stored diagnostic data set 1714 before communicating to the external device. For example, the diagnostic execution circuit 1702 may store the diagnostic data set 1714, and send a portion of the diagnostic data set 1714 (e.g., selected parameters, active diagnostic outcomes, etc.) to the external device. The example diagnostic execution circuit 1702 then performs selected operations such as: further processing the diagnostic data set 1714 before communicating it to the external device (e.g., to reduce external data communications, in response to selected data for transmission by the external device, etc.); communicates the diagnostic data set 1714 to the external device (e.g., responsive to availability of an external communication such as a WiFi connection, connected external device, or the like; and/or responsive to a request from the external device for all of the diagnostic data set 1714); communicates selected additional portions of the diagnostic data set 1714 (e.g., requested data by the external device); keeps the diagnostic data set 1714 and/or a further processed form of the diagnostic data set 1714 stored for a selected time period; and/or deletes the diagnostic data set 1714 after the diagnostic execution operation (e.g., according to an outcome of the active diagnostic test, and/or according to a request of the external device). It can be seen that operations of system 1700 allow for execution of active diagnostic operations by an external device (e.g., a service tool, service application, cloud-based application, fleet service computing device, and/or third party application) that engages end points on a vehicle across a mixed network, allowing for diagnostic operations that do not require knowledge of the location and/or organization of end points on the vehicle, that can support multiple configurations of a vehicle, and/or can support changing configurations of the vehicle. Additionally or alternatively, operations of system 1700 allow for scheduled transmission of data, including reduction of data transmitted while achieving robust active diagnostic capability, and scheduled consumption of processing, memory, and inter-network communication resources on the vehicle while achieving the robust active diagnostic capability.

An example system 1700 includes a diagnostic verification circuit 1704 that determines a diagnostic confirmation value 1716 based on a response of the actuator to the diagnostic command value 1712 (e.g., confirming whether the actuator performed the commanded function, and/or across a group of actuators whether the vehicle has performed the active diagnostic according to the active diagnostic description 1705). The example diagnostic verification circuit 1704 stores the diagnostic confirmation value 1716 (e.g., as a part of the diagnostic data set 1714) and/or communicates the diagnostic confirmation value 1716 to an external device. In certain embodiments, the diagnostic verification circuit 1704 adjusts storage and/or communication of the diagnostic data set 1714 in response to the diagnostic confirmation value 1716—for example ensuring that the diagnostic data set 1714 is related to a performance of the active diagnostic. In certain embodiments, the diagnostic execution circuit 1702 may store all or a portion of the diagnostic data set 1714 as a rolling buffer of data, saving a selected portion of the diagnostic data set 1714 in response to the diagnostic verification circuit 1704 providing the diagnostic confirmation value 1716 (e.g., where a diagnostic has a timed value or actuator position as a part of the diagnostic execution, allowing the diagnostic to be determined complete when the timer or other accumulating condition is completed).

An example active diagnostic description 1705 includes a target device description 1718 (e.g., a fueling actuator, engine controller, door actuator, mirror position adjustment actuator, etc.) that does not identify which network zone 1612, 1614 that an end point corresponding to the target device description 1718 is positioned on. The example system includes a configuration circuit 1604 that determines a network address value 1722 for the end point in response to the target device description 1718 (e.g., a port number of an ethernet network, a message ID for a CAN network, etc.), and the diagnostic execution circuit 1702 provides the diagnostic command value 1712 to the end point further in response to the network address value 1722. For example, the target device description 1718 may include a standardized description for the end point (e.g., engine speed, ambient temperature, passenger seat occupancy sensor, etc.), and the configuration circuit 1604 may access a configuration table relating the standardized description to the local network address for the intended component. Additionally or alternatively, the target device description 1718 may have a description that matches a baseline product (e.g., a 2020 LX version of a given vehicle), a description that matches an original version of the vehicle (e.g., as the vehicle was configured after manufacture), and/or a description that matches an earlier version of the vehicle (e.g., as the vehicle was configured as of a certain date). In certain embodiments, the configuration table or other information utilized by the configuration circuit 1604 to determine the network address value 1722 may be one or more configuration file(s) maintained by a network interface circuit, a configuration file maintained by a policy manager circuit, a configuration file maintained by the CND, and/or a configuration file maintained as a part of the policy 1606.

An example active diagnostic description 1705 includes a target device description 1718 (e.g., a fueling actuator, engine controller, door actuator, mirror position adjustment actuator, etc.) that identifies the end point is on one network zone (e.g., the first network zone 1612), and the configuration circuit 1604 determines the end point is on another network zone (e.g., the second network zone 1614) in response to the target device description 1718. For example, the configuration circuit 1604 may determine that the target device description 1718 is pointing to the wrong device, or a non-existent device, and/or may further determine that the external device is utilizing a previous, different, and/or standardized configuration file to provide the target device description 1718, where the configuration circuit 1604 utilizes a local configuration file to determine the proper network address value and/or network zone for the end point intended by the target device description 1718. In certain embodiments, the configuration circuit 1604 determines the proper network address value and/or network zone for the end point utilizing other information from the target device description 1718, such as parameter names, intended functions, or the like. Similarly, the configuration circuit 1604 can correct the target device description 1718 indicating an incorrect address other than the wrong network zone, such as an address on a first network zone, where the correct address is another address on the first network zone.

The operations of the configuration circuit 1604 allow for simplification of active diagnostic definition (e.g., external devices do not require system-specific information about end point locations and network distribution); adaptation of diagnostic execution as end points and/or local communicating devices of the vehicle are moved and/or upgraded; and/or allow for a layer of abstraction between external devices and the configuration of the vehicle. The simplification and/or abstraction of the active diagnostic definition from the vehicle network configuration allow for reduced cost of active diagnostic development and roll-out, and increased user base for active diagnostic development (e.g., with enhanced protection of confidential information such as vehicle configuration information and/or data compartmentalization) which can enhance overall diagnostic capability, enhance vehicle operator experience, and increase competition and implied competition for active diagnostic development and implementation.

Figure 19:
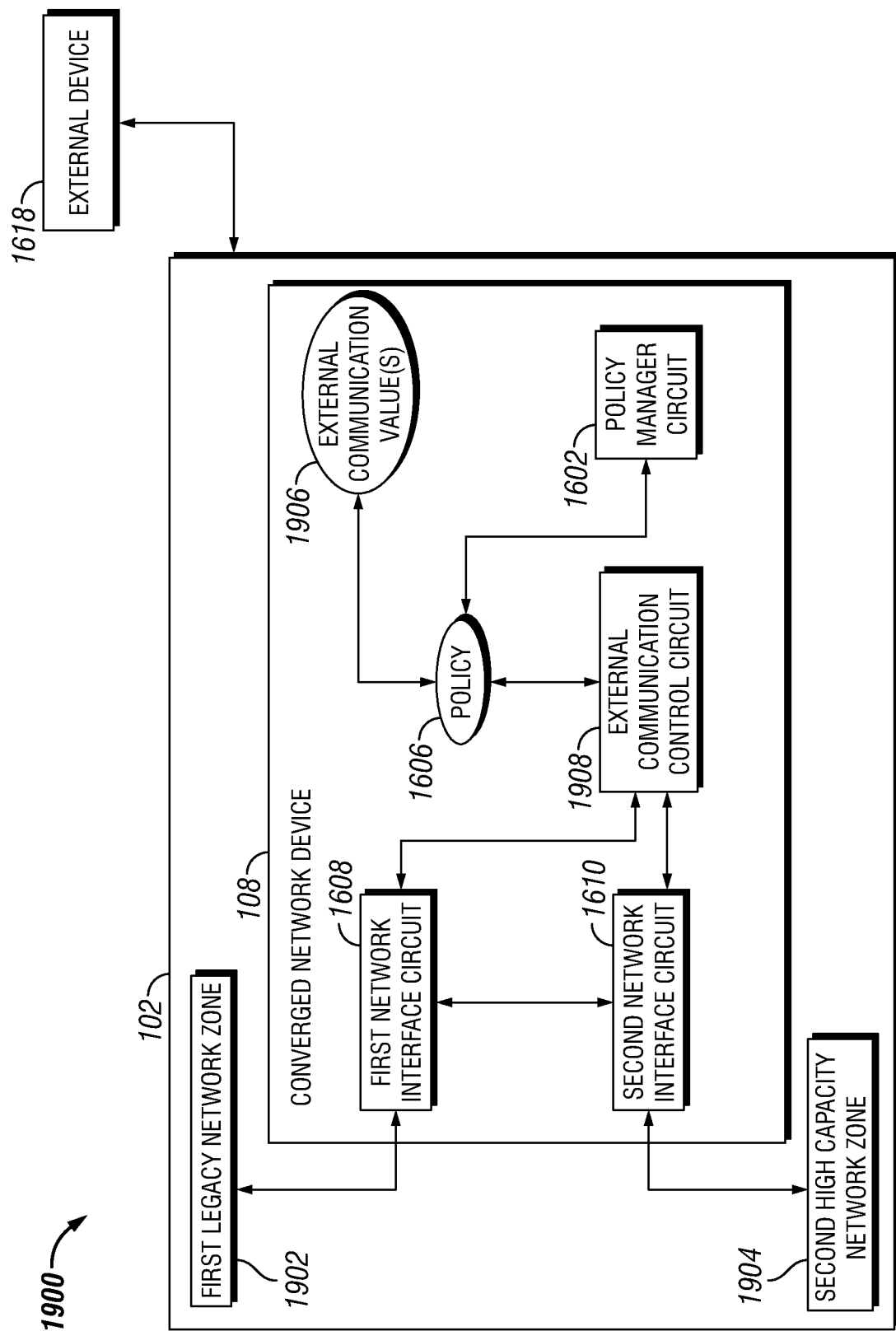
FIG. 19 is a schematic diagram of a system for regulating network communications of a vehicle.

Referencing FIG. 19, an example system 1900 includes a vehicle 102 having a first legacy network zone 1902 and a second high capability network zone 1904. For example, the first legacy network zone 1902 may be a first network type, such as a CAN bus, and the second high capability network zone 1904 may be a second network type, such as an ethernet network. In certain embodiments, the second high capability network zone 1904 may be of the same type as the first legacy network zone 1902, but may be a higher capability version such as a high speed CAN bus, a higher speed ethernet network, or the like. In certain embodiments, a system 1900 such as that depicted in FIG. 19 may be present where a vehicle is migrating to an upgraded network type, such as during a transition over a number of model years of the vehicles, as new components are added to a vehicle that utilize a higher capability network, and the like.

The example system 1900 includes CND 108 interposed between the first legacy network zone 1902 and the second high capability network zone 1904, where the CND 108 includes a policy manager circuit 1602 that interprets a policy 1606 including an external communication value 1906, and an external communication control circuit 1908 that regulates communications between an external device 1618 and end points of the first legacy network zone 1902 and/or end points of the second high capability network zone 1904 in response to the external communication value 1906. For example, external communications between end points of the first legacy network zone 1902 may be limited to reduce traffic on the first legacy network zone 1902 that are created by communications to and from the external device 1618, and/or due to a sensitivity of end points on the first legacy network zone 1902 (e.g., where vehicle controls and/or proprietary information are maintained on the first legacy network zone 1902, and/or where security protocols associated with the first legacy network zone 1902 are more limited than those available with the second high capability network zone 1904). In another example, external communications between end points of the second high capability network zone 1904 may be limited to reduce external transmissions (e.g., through a transceiver of the vehicle, utilizing a particular data provider, etc.) from the vehicle (e.g., where higher capability devices on the second high capability network zone 1904 may have the capability to generate high data rates), due to the potentially large number of devices on the second high capability network zone 1904, including devices that may be recently added to the vehicle (and accordingly do not have a long history of know usage, security vetting, and/or vehicle operations impact data) and/or devices that may be added by entities that are not as closely controlled as providers of devices on the first legacy network zone 1902 (e.g., devices that may be provided by third parties, that relate to recently developed vehicle capabilities, and/or that are not related to core vehicle functions, such as entertainment providers). The provided reasons for limiting external traffic between end points on various networks and external devices are non-limiting and provided for illustration, but the external communication control circuit 1908 may regulate communications between end points of any network zone and any external device for any reason.

An example system 1900 includes the external communication value 1906 including an active diagnostic description—for example diagnostic operations and/or data collection to be performed as a diagnostic operation, and which may involve commands to, data collected from, and/or communications with any end point on any network zone of the vehicle. An example system 1900 includes the external communication value 1906 including an active test description—for example a test operation (e.g., a test of any end point, actuator, sensor, flow, application, vehicle function, and/or vehicle controller on the vehicle), and which may involve commands to, data collected from, and/or communications with any end point on any network zone of the vehicle. An example system 1900 includes the external communication value 1906 including a data request value (e.g., collection of a data parameter from any end point, and/or including processing of the data parameter) and/or a vehicle command value (e.g., command of any actuator, display, controller, etc. with any end point). Example and non-limiting external device(s) 1618 include a service tool, a manufacturer tool, a dealer tool, and/or a cloud based tool.

An example external communication value 1906 includes a target device description including an identification of a target end point (e.g., a network zone, local address, sensor name, actuator name, data parameter name, etc.), where the external communication control circuit 1908 determines that the end point has a different configuration (e.g., a different network zone, local address, sensor name, actuator name, data parameter name, etc.) than the identification provided in the target device description. In certain embodiments, the external communication control circuit 1908 may include or utilize a configuration circuit 1604 (e.g., reference FIGS. 16, 17 and the related descriptions) to determine the proper identification for the target end point. An example external communication value 1906 does not include an identification of a target end point, and the external communication control circuit 1908 provides a proper identification for the target end point based on the external communication value 1906 (again referencing FIGS. 16, 17, and the related descriptions, including operations of the configuration circuit 1604). It can be seen that the operations of system 1900 allow for external devices 1618 to operate across a number of vehicle configurations, without specific knowledge of end point locations, parameter names, local addresses, or the like, to implement active diagnostics, testing, and data collection. The vehicle configurations may represent changes of a vehicle after servicing, replacement of components (e.g., end points), upgrading of components and/or executable instructions stored on a computer readable medium, changes over the course of model years, and/or changes to a vehicle due to campaigns, upgrades, and/or remanufacturing.

Figure 20:
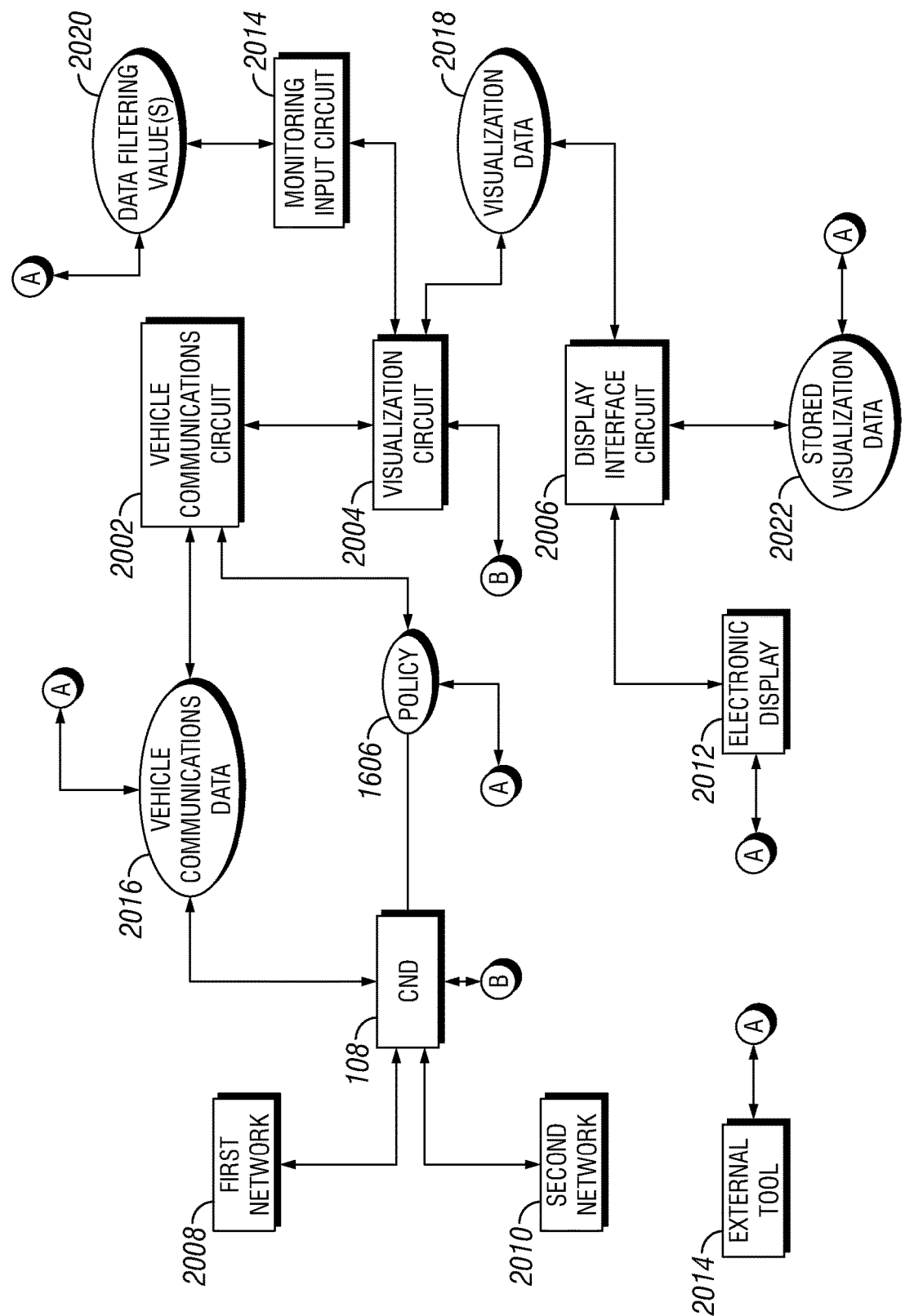
FIG. 20 is a schematic diagram of a system for providing visualization data of a network of a vehicle.

Referencing FIG. 20, an example apparatus 2000 is depicted for providing an external network view for one or more networks of a vehicle having a mixed network. The example apparatus 2000 may be utilized in conjunction with any vehicle described throughout the present disclosure, and aspects of the apparatus 2000 may be positioned on the vehicle, on an external device at least selectively in communication with the vehicle, on a cloud server, and/or on a web application.

The example apparatus 2000 includes a vehicle communication circuit 2002 that interprets vehicle communications data 2016, which may be data collected from the vehicle and/or data to be provided to the vehicle. The example apparatus 2000 further includes a visualization circuit 2004 that generates visualization data 2018 in response to the vehicle communications data 2016. Example visualization data 2018 includes a first network identifier (e.g., identifying a network zone, end point, or other network identifier for corresponding data) and a second network identifier. Example visualization data 2018 can include network identifiers corresponding to each of at least two distinct network zones of the vehicle, and/or each of at least two distinct end points of the vehicle. An example network identifier includes an ethernet based protocol and/or a CAN based protocol. Another example network identifier includes one or more of a cellular based protocol, a WiFi based protocol, and/or a Bluetooth based protocol.

The example apparatus 2000 further includes a display interface circuit 2006 that transmits the visualization data 2018, providing stored visualization data 2022 and/or providing the visualization data 2018 to an electronic display 2012. The transmission of the visualization data 2018 may include any one or more operations selected from the operations such as: transmitting the visualization data 2018 from the vehicle to a tool; transmitting the visualization data 2018 from the vehicle to a cloud server; transmitting the visualization data 2018 from the vehicle to a display device (e.g., an electronic display 2012 such as a vehicle display, a service tool, an external computing device such as an operator device, a service device, a manufacturer device, a fleet owner or service device, a vehicle communications administrator device, and/or a third-party device, etc.); transmitting the visualization data 2018 from a cloud server to a tool; transmitting the visualization data 2018 from a cloud server to a display device; and/or transmitting the visualization data 2018 from a first cloud server to a second cloud server (e.g., allowing separate storage criteria for the stored visualization data 2022 between the cloud servers, including anonymization of data, aggregation of data, compartmentalization of aspects of the data, etc.). In certain embodiments, transmission of the visualization data 2018 may include transmitting the visualization data 2018 to an on-vehicle storage (e.g., a dedicated memory space available for the stored visualization data 2022 for later access, requested access, and/or later transmission to an off-vehicle location), and/or to a closely coupled storage (e.g., a USB device coupled to the vehicle, to a mobile device such as an operator's mobile phone, and/or to a computing device in close-range wireless communication such as a WiFi or Bluetooth connection). Additionally or alternatively, the transmission of the visualization data 2018 may include any one or more operations selected from the operations such as: storing the visualization data 2018 on a shared storage of the vehicle; storing the visualization data 2018 on a shared storage of the vehicle, and selectively transmitting the stored visualization data 2022 to an external device; transmitting the visualization data 2018 to a secured cloud storage; and/or transmitting the visualization data 2018 to a secured cloud storage, and providing selected access to the stored visualization data 2022 to a monitoring tool, an external application, a service tool, and/or a user device.

An example apparatus 2000 includes an electronic display 2012 that interprets and displays the visualization data 2018. An example electronic display 2012 accesses the stored visualization data 2022 and displays at least a portion thereof, and/or a processed visualization element determined from the visualization data 2018 and/or stored visualization data 2022. Example visualization data 2018 includes topology data corresponding to a network topology of the first network and/or second network (e.g., depicting the network(s) and/or selected end points associated with each of the networks). The topology data may include a visual representation, a table listing, or other visualization of the topology data.

An example visualization circuit 2004 is further structured to include portion of meta-data of the vehicle communications data 2016 in the visualization data 2018. Example and non-limiting meta-data of the vehicle communications data 2016 includes data such as a source address, destination address, time stamp, vehicle operating condition or state condition, fault code information, status parameters for end points, flows, applications, and/or vehicle functions, or the like. In certain further embodiments, meta-data of the vehicle communications data 2016 includes information relating to the trajectory of the vehicle communications data 2016 through the vehicle network, for example frame data related to an originating communication (e.g., frame data from a communication on a first network 2008, where communication is encapsulated and passed to the vehicle communication circuit 2002 from the second network 2010), processing information for a payload and/or frame of the vehicle communications data 2016 (e.g., processing operations performed on the payload and/or the frame of the communication, for example allowing reverse calculation of the processing, an up-sampling and/or down-sampling description, or the like). In certain embodiments, the meta-data may have predetermined values, for example a first data value associated with a first processing operation (e.g., filtering, a resolution change, etc.), a second data value associated with a second processing operation, whereby the meta-data communicates the processing operation (or other operations) according to the value of selected portions (e.g., specified bits) of the vehicle communications data 2016.

An example apparatus 2000 includes a monitoring input circuit 2014 that interprets a data filtering value 2020 (e.g., a description of filtering operations, such as: a selection of certain end points and/or local communicating devices; a selection of certain network zones; communications meeting specified criteria; a down-sampling description for selected communications; communications relating to off-nominal conditions such as end points, flows, vehicle functions, and/or applications having an associated fault value, and/or communications relating to end points having lost packets, high or low expected communication rates, etc.). Example and non-limiting data filtering values 2020 include a network address association, a vehicle control device association, a vehicle system association, a network protocol type, an end point identifier, a data type, an application association, and/or a flow association. Example and non-limiting data filtering values 2020 include a reference to a system, such as an engine system, a steering system, a braking system, a fuel system, a prime mover system, an anti-lock braking system, a traction control system, and/or a drivetrain control system. Still further example and non-limiting data filtering values 2020 include a reference to a system such as a security system, a lighting system, a safety system, an environmental control system, an ADAS, and/or an infotainment system.

The example apparatus 2000 includes the visualization circuit 2004 filtering, based at least in part on the data filtering value 2020, portions of the vehicle communications data 2016 to generate the visualization data 2018. In certain embodiments, the data filtering value 2020 may be provided in a policy 1606, communicated from an external device 1618, and/or received through a user interface operated (e.g., by the display interface circuit 2006) on an electronic display 2012, external tool 2014, and/or a user device such as a device of a vehicle owner or operator, service personnel, manufacturer, fleet owner, fleet service personnel, vehicle communications administrator, and/or an interaction with a cloud-based or web-based application.

Referencing FIG. 22, an example user interface to retrieve and filter vehicle communications data 2016 is depicted. The example user interface may be implemented on an external device, web application, cloud-based application, external tool, or the like. In the example of FIG. 22, "Switch 0" corresponds to a first network zone, and "Switch 1" corresponds to a second network zone, allowing a user to select end points from each network zone that are to be monitored. In the example, filter selections allow for reduction from monitored end points (e.g., selections on the left side) according to filtering criteria, such as including only selected end points, flows, applications, etc. (selections on the right side). In the example of FIG. 22, monitored parameters may be further down-sampled (selections at the bottom). Further in the example of FIG. 22, a selected mirroring timeout may be set (e.g., where monitoring is performed using port mirroring). The example user interface of FIG. 22 illustrates certain aspects of the network monitoring and filtering operations described herein, and is not limiting to the present disclosure.

An example apparatus 2000 includes the visualization data 2018 including a traffic monitoring visualization. For example, a traffic monitoring visualization can provide a visualization corresponding to one or more of: an end point on one of the first network or the second network (e.g., showing incoming and/or outgoing traffic from the end point); a vehicle system; an application; a flow; a vehicle controller; a vehicle function; a selected one of the first network or the second network; or a port of one of the first network or the second network. An example visualization data 2018 includes a port counter visualization, for example displaying messaging traffic corresponding to a port (a physical port or a logical port) of one of the network zones. An example visualization data 2018 includes an end point data flow monitoring visualization, for example displaying messaging traffic corresponding to an end point of one of the network zones.

Figure 23:
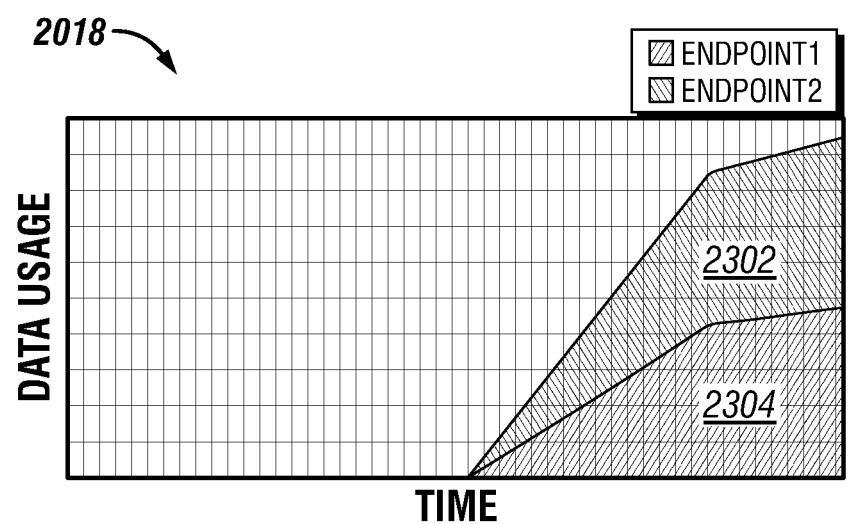
FIG. 23 is a schematic, illustrative, example of visualization data.

Referencing FIG. 23, an example visualization data 2018 is depicted including a traffic monitoring visualization. The example of FIG. 23 depicts network traffic (e.g., messages, bits, etc.) for a first end point 2302 and a second end point 2304. The example of FIG. 23 is a non-limiting example, and traffic monitoring may be depicted in any manner, and may be organized according to any grouping, such as per-network, per-port, all traffic associated with an application, all traffic associated with a flow, all traffic associated with a vehicle function, all traffic associated with a service group, etc.

An example apparatus 2000 includes the visualization data including a network activity profile, where the network activity profile is provided for one or more of: an end point on one of the first network or the second network; a vehicle system; an application; a flow; a vehicle controller; a vehicle function; a selected network zone; and/or a selected port of one of the network zones.

Figure 24:
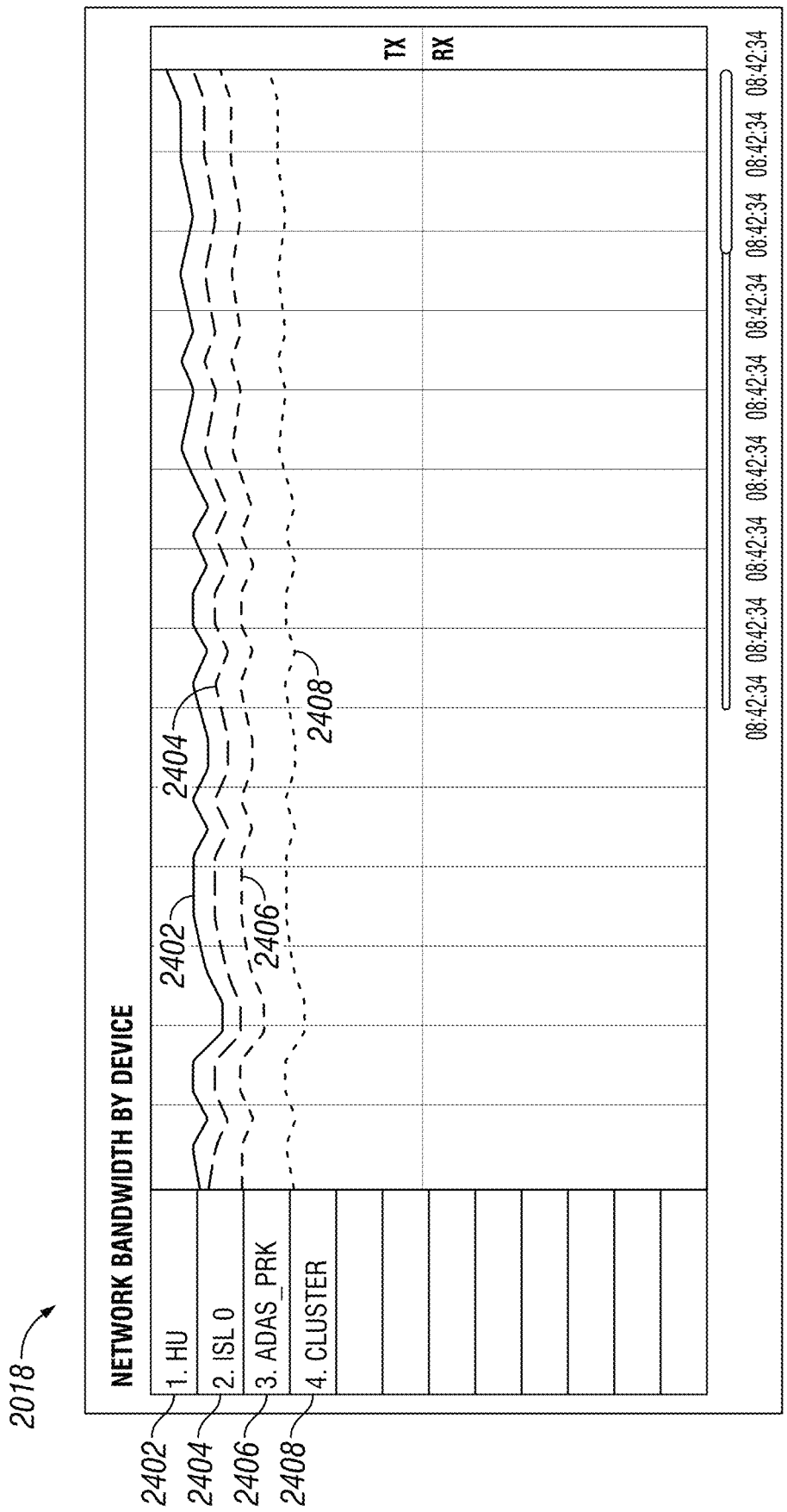
FIG. 24 is a schematic, illustrative, example of visualization data.
Figure 25:
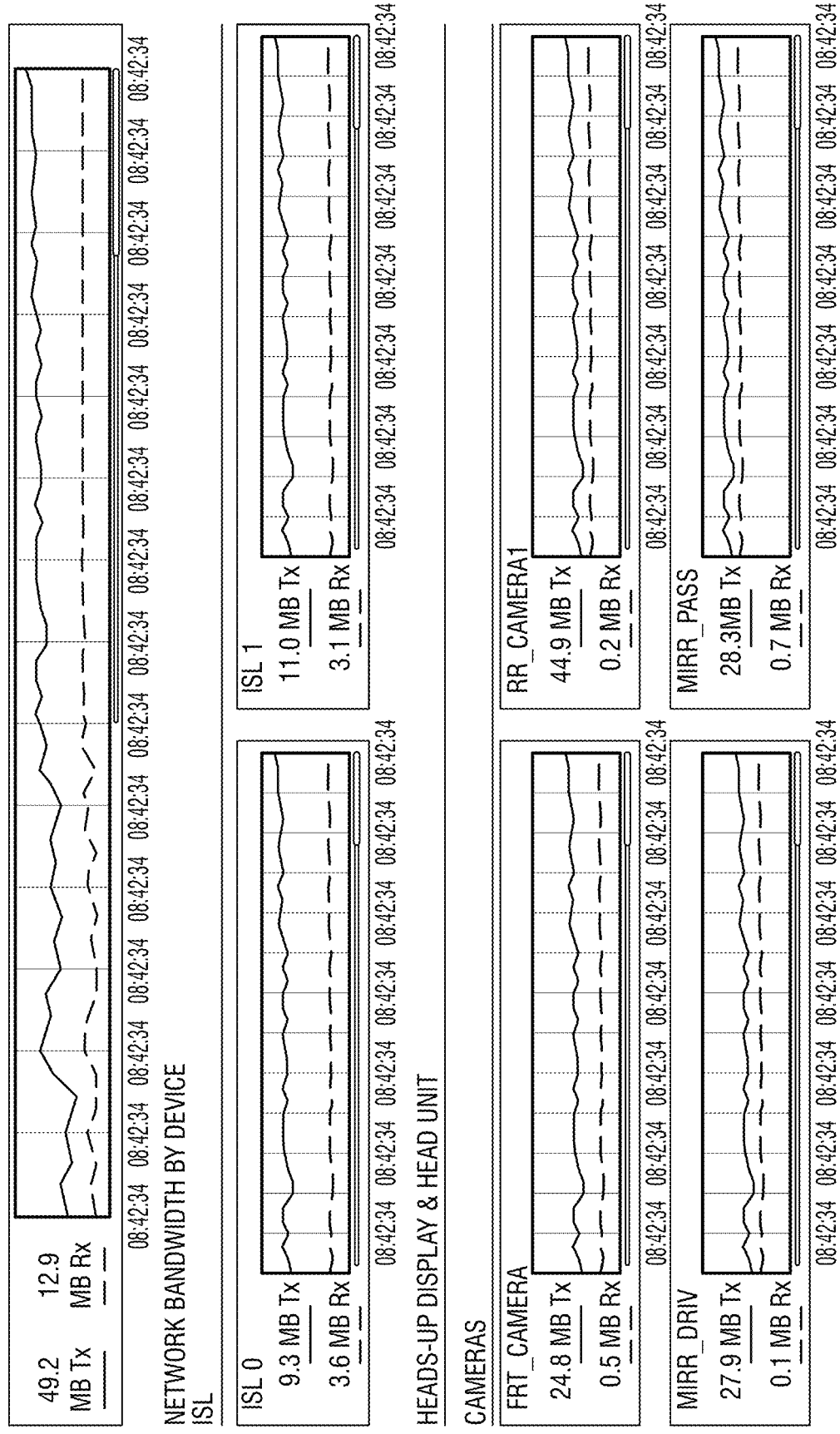
FIG. 25 is a schematic, illustrative, example of visualization data.

Referencing FIG. 24, an example visualization data 2018 is depicted including a network activity profile. The example of FIG. 24 depicts network bandwidth utilization for a selected network zone, with a number of utilization plots 2402, 2404, 2406, 2408, each associated with an end point of the selected network zone. Referencing FIG. 25, an example visualization data 2018 is depicted including a network activity profile for a selected network zone. The example of FIG. 24 depicts a total activity for the network zone at the top, a network bandwidth utilization for particular devices (e.g., ISL 0, ISL 1) in the middle, and network bandwidth utilization for a vehicle controller (e.g., a Heads-up display and head unit) at the bottom, with the network bandwidth utilization for the vehicle controller further depicting utilization for a number of specific devices broken out (e.g., various cameras, in the example). The example of FIGS. 24 and 25 are non-limiting, and network activity profile data may be determined and displayed in any manner, and further may be grouped and/or sub-grouped in any manner, including by end point, flow, application, vehicle function, vehicle controller, etc.

An example vehicle communication circuit 2002 interprets the vehicle communications data 2016 by performing one or more operations such as: interpreting the vehicle communications data 2016 from a policy 1606 stored on a memory positioned on the vehicle and communicatively coupled to the vehicle communication circuit 2002; receiving the vehicle communications data 2016 from a service tool communicatively coupled to vehicle communication circuit 2002; receiving the vehicle communications data 2016 from an application communicatively coupled to the vehicle communication circuit 2002; or receiving the vehicle communications data 2016 from a monitoring tool communicatively coupled to the vehicle communication circuit 2002.

In certain embodiments, retrieving vehicle communications data 2016 including traffic monitoring, network activity, and/or messages corresponding to an end point of a network zone and/or corresponding to a port of a network zone includes mirroring traffic from a first port of a network zone to a second port of the network zone, and monitoring the second port of the network zone to determine the vehicle communications data 2016. For example, a first port of the second network zone 2010 may correspond to an end point to be monitored, where the operation to retrieve the vehicle communications data 2016 includes an operation to mirror the first port of the second network zone 2010 to a second port of the second network zone 2010 (e.g., where the vehicle communications circuit 2022 and/or a monitoring tool such as external tool 2014 are communicatively coupled to the second port), and monitoring the second port of the second network zone 2010 to determine the vehicle communications data 2016.

Figure 26:
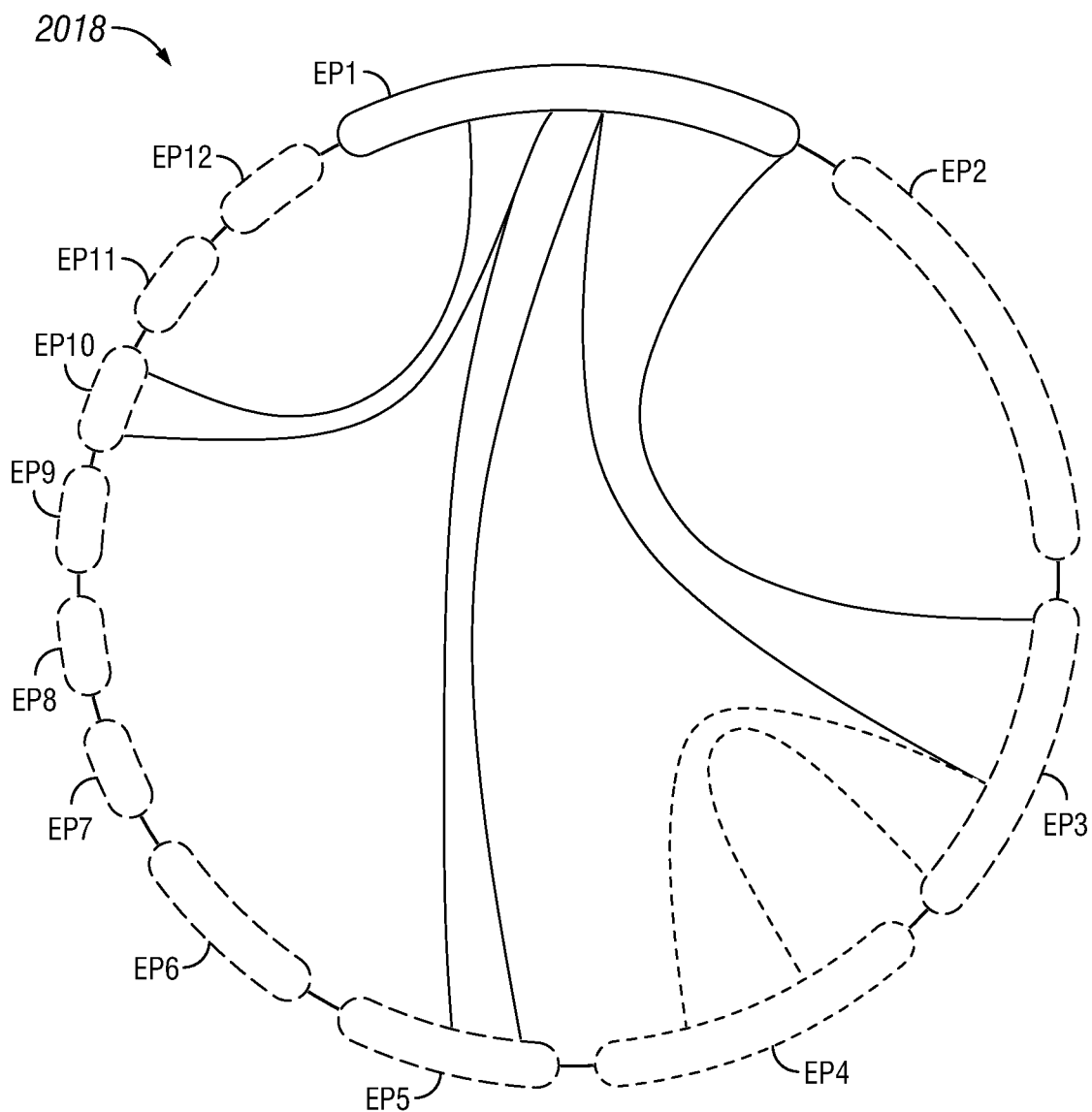
FIG. 26 is a schematic, illustrative, example of visualization data.
Figure 27:
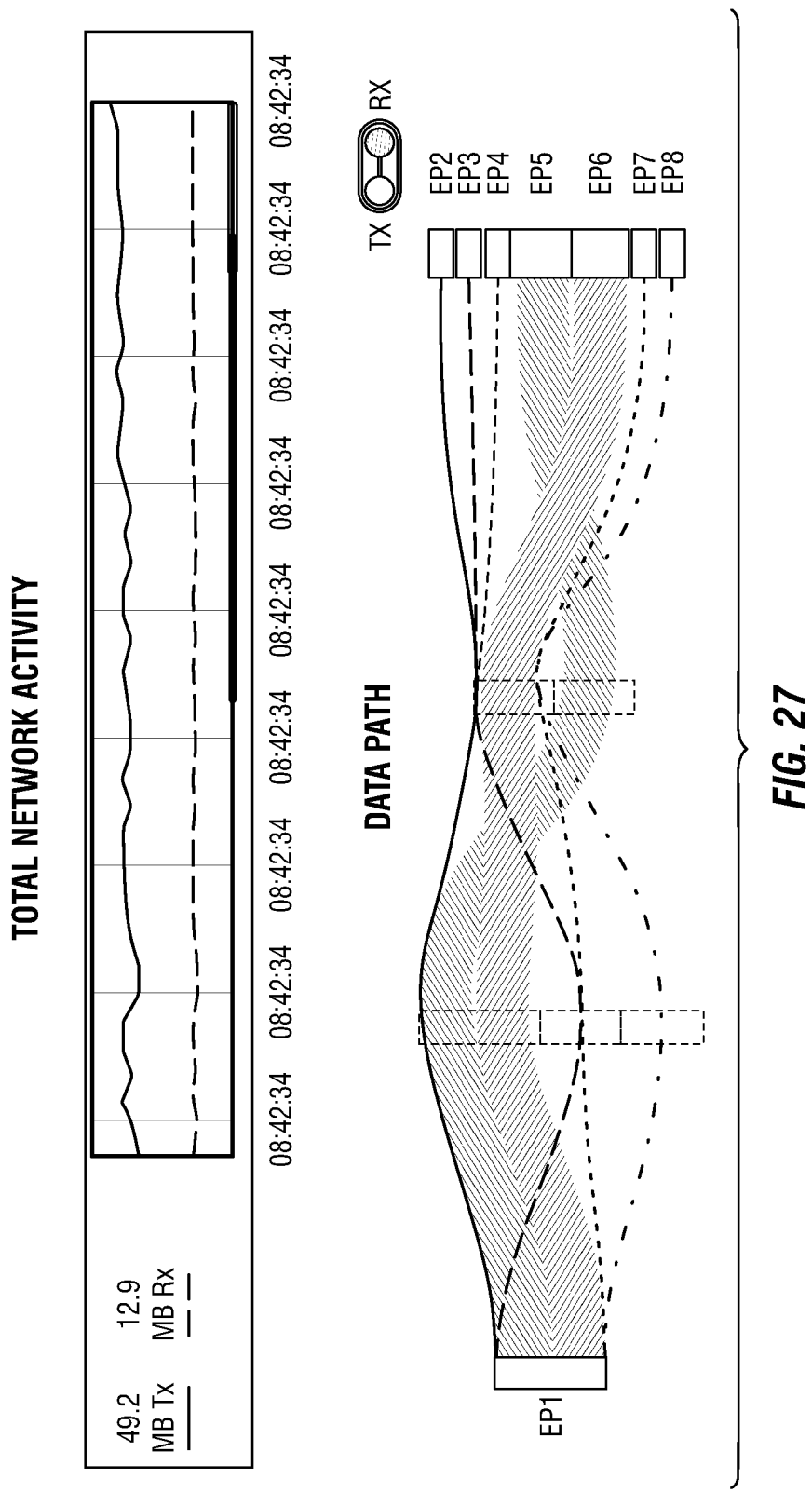
FIG. 27 is a schematic, illustrative, example of visualization data.

Referencing FIG. 26, an example visualization data 2018 is depicted including data flows between selected network participants (e.g., end points, flows, applications, vehicle controllers, etc.). The example of FIG. 26 depicts data flows between selected end points, in the example depicting data flows with the "EP1" (e.g., an end point, such as a head unit) and the other end points (e.g., EP3, EP5, EP10, in the example, such as an ADAS related component, a parking controller, etc.). The example of FIG. 26 allows monitoring of the network to determine if expected data flows are occurring, if off-nominal data flow is occurring, and the like. Referencing FIG. 27, an example visualization data 2018 is depicted showing total network activity for a selected network zone (at the top), and data pathing from a selected end point to other end points (the data path at the bottom) in the system. In the example, user interface elements may be provided, for example allowing selection of a time (top depiction) that is utilized for the data pathing depiction at the bottom, allowing for selection of the target end point (e.g., EP1 at the left), and/or whether transmission, receipt, or both, are depicted. In certain embodiments, the visualization data 2018 may be presented as a user interface, for example allowing a user to select components and have the related data flows depicted. It can be seen that a visualization such as those depicted in FIGS. 26 and 27 can be utilized to confirm expected operations, to diagnose issues (e.g., degraded operation of a component, diagnoses of a network issue, and/or detect off-nominal operating conditions such as those indicated by communication between components that more substantially communicate during certain off-nominal operating conditions). Additionally or alternatively, a visualization such as that depicted in FIG. 26 can be utilized to: improve network topology design, hardware selection, and/or protocol selection; to consolidate applications, flows, vehicle functions, etc. on vehicle controllers (e.g., to reduce network traffic requirements); and/or to identify potential redundant or unnecessary network communications.

Referencing FIG. 21, an example local address table 2100 is depicted, schematically depicted configuration information consistent with various embodiments of the present disclosure. The example local address table 2100 may be part of the policy 1606 and/or a configuration file (e.g., accessible in whole or part by interface circuit(s) and/or a configuration circuit). The local address table 2100 may be provided as a data structure in a memory location accessible to the interface circuit(s), configuration circuit(s), and/or other implementing components described throughout the present disclosure. The local address table 2100 may be provided as a distributed data structure, with portions of the local address table 2100 provided as a data structure in memory location(s) accessible to the implementing components. The example local address table 2100 is depicted schematically to provide an illustration of the type of local address information that may be utilized to implement aspects of the present disclosure, but the details of the stored information and the organization of data structures implementing the local address table 2100 may be configured according to the implemented embodiments. The example local address table 2100 includes an end point identifier 2102, which may be a local identifier of end points present in the system. In a further example, non-local end point identifiers (not shown) may further be included, for example to allow external devices to reference end points using an industry-standard terminology, or other selected terminology. The example local address table 2100 includes a network zone identifier 2104, for example indicating which network zone the end point is considered to be a part of. The example address table 2100 further includes a local address value 2106, for example indicating how the respective end point is addressed on the appropriate network zone. In certain embodiments, the local address value 2106 may be a TCP/IP address, a port number, or other identifier. In certain embodiments, for example on a logical bus architecture such as a CAN bus, the local address value 2106 may include a message identifier, such as a value included in a message that indicates the intended recipient (or the source) of messages to or from the end point. The example local address table 2100 includes an external address value 2108, which may, for example, include an address utilized to identify the end point by external devices.

The utilization of the external address value 2108 allows for external devices to abstract knowledge of the end point, including local addressing and/or associated network zones, from operations to utilize and/or collect data from the corresponding end points. It can be seen that further information may be included in a local address table 2100, such as additional external address values (e.g., to allow for multiple external addresses to associate with a given end point of the system), and/or the inclusion of one or more additional non-local end point identifiers (e.g., to allow for multiple industry standards, proprietary nomenclature, informal nomenclature, etc., to successfully associate with a given end point of the system). In certain embodiments, one or more of the external addresses 2108 and/or non-local end point identifiers may further be associated with versions (e.g., interface versions, vehicle model descriptions, etc.), allowing for the implementing components using the local address table 2100 to interpret data commands and/or requests from external applications, algorithms, etc. to properly associate a desired end point to the data command and/or request, as changes occur within the vehicle (e.g., end points move between network zones and/or addresses) or external to the vehicle (e.g., external applications are updated for updated vehicle configurations that are no longer applicable to the specific vehicle of the system).

It can be further seen that the utilization of the local address table 2100 allows for multiple addressing support for end points of the vehicle, for example providing both IPv4 and IPv6 addressing for end points of the vehicle. In certain embodiments, the local address table 2100 can be expanded, or alternatively a separate data structure maintained, allowing for association of end points with applications, flows, vehicle functions, vehicle controllers, APNs, external data routing paths, network zone trajectories, or the like. Accordingly, a given application such as "route management" can be associated with particular end points of the vehicle, and the associations can survive through a movement of the end point (e.g., from one network zone to another network zone). The utilization of a local address table 2100, and/or extended or alternate data structures as described herein, allows for configuration of priorities, permissions, subscription management (both publishing of services and subscribing to services), and/or any other communication regulating activities as set forth herein.

In certain embodiments, the local address table 2100 can be expanded, or alternatively a separate data structure maintained, allowing for addresses of external devices to be configured according to end points, applications, flows, vehicle functions, and/or vehicle controllers. For example, a given vehicle function may be allowed access to a given external resource (e.g., a routing function that accesses an external resource having maps, traffic reporting, etc.), with an associated external address associated with the vehicle function that provides access to the external resource. In the example, other vehicle functions may not be allowed access to the given external resource, with an associated external address associated with those vehicle functions (and/or with a lacking association for those other vehicle functions, depending upon the implementation), such that when those other vehicle functions request access to the external resource, a default address, protected space, null communication, or other selected behavior is instead implemented. Accordingly, a first application of the vehicle requesting accessing to an external resource, such as http://www.google.com may receive a typical expected access to the external IP address corresponding to the Google website, where a second application of the vehicle requesting access to the same external resource may receive an access denied indication, a default external resource indication (e.g., a cloud-based resource in a protected space indicating the requested resource is not permitted), or other selected response from the system. Accordingly, the local address table 2100, and/or an expanded, extended, or alternate version thereof, may be utilized as a local DNS and/or an external DNS. In certain embodiments, for example where access to an external resource is requested, where the external DNS does not have an address for the resource, and where a permission to the requestor (e.g., end point, application, flow, vehicle function, and/or vehicle controller) is not denied to access the external resource, an off-vehicle external DNS (e.g., on a cloud server, from an internet provider, etc.) may be accessed to provide the external address. In certain embodiments, the on-vehicle external DNS may be updated based on an address retrieved from the off-vehicle external DNS.

Figure 28:
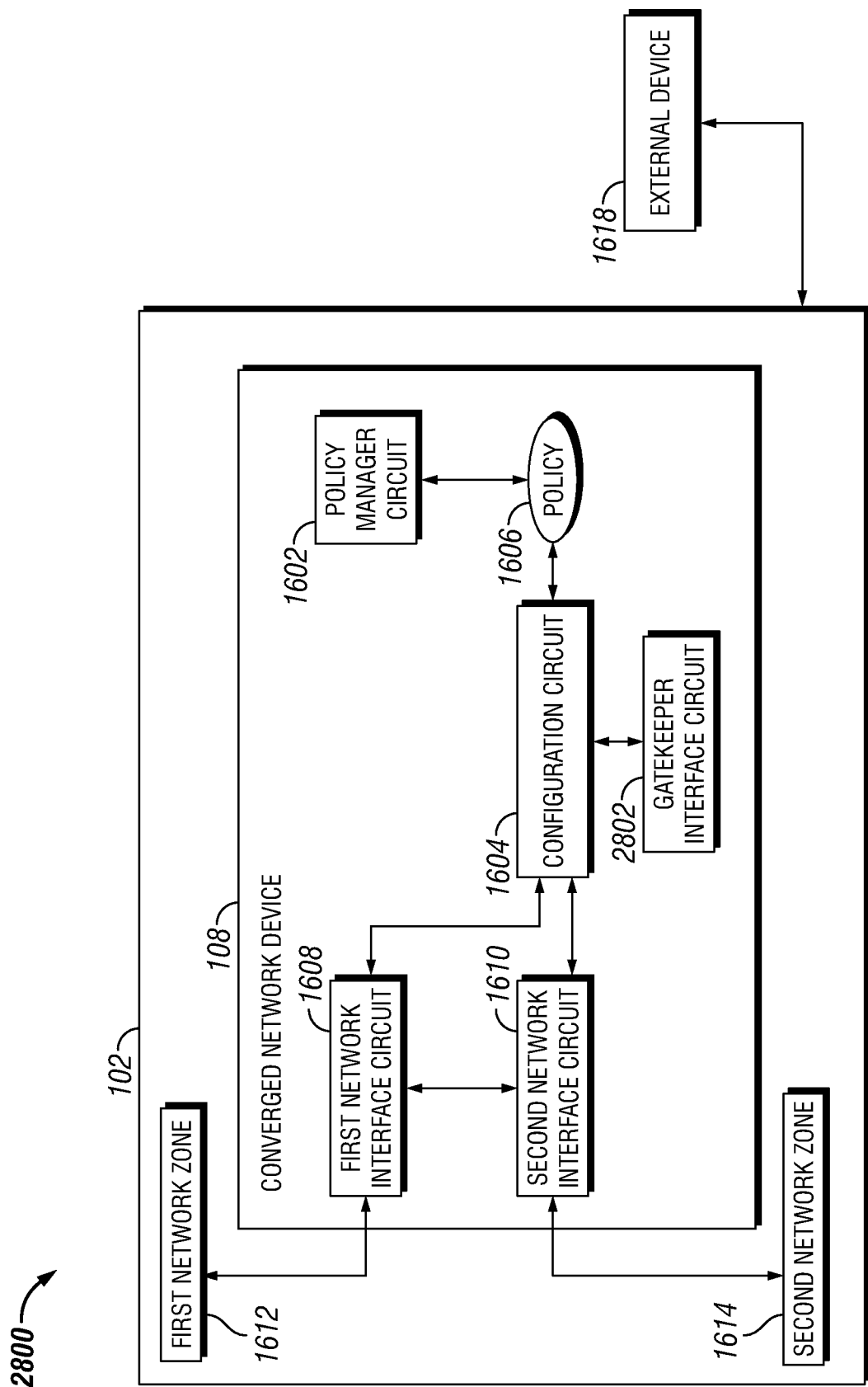
FIG. 28 is a schematic diagram of a system for regulating networks on a vehicle according to certain embodiments of the present disclosure.

Referencing FIG. 28, an example system 2800 includes a vehicle 102 having a first network zone 1612 and a second network zone 1614 is depicted, where the first network zone 1612 and the second network zone 1614 are of different types. The example of FIG. 28 includes a CND 108 interposed between the network zones 1612, 1614. The example CND 108 includes a policy manager circuit 1602 that interprets a policy 1606 including a network regulation description, a configuration circuit 1604 that configures a first network interface circuit 1608 in response to the network regulation description, where the first network interface circuit 1608 regulates communications between end points of the first network zone 1612 and end points of the second network zone 1614. Additionally or alternatively, the configuration circuit 1604 configures a gatekeeper interface circuit 2802 in response to the network regulation description, where the gatekeeper interface circuit 2802 regulates communications between end points of at least one of the network zones 1612, 1614 and external communication portal(s) and/or the external device 1618. An example first network interface circuit 1608 includes a CEG, where the first network zone 1612 is not a primary network (e.g., the first network zone 1612 is a CAN network, and the second network zone 1614 is an ethernet network), and where the first network interface circuit 1608 is communicatively coupled to a port of the second network zone 1614 to send and receive communications that are passed between the network zones 1612, 1614.

Figure 29:
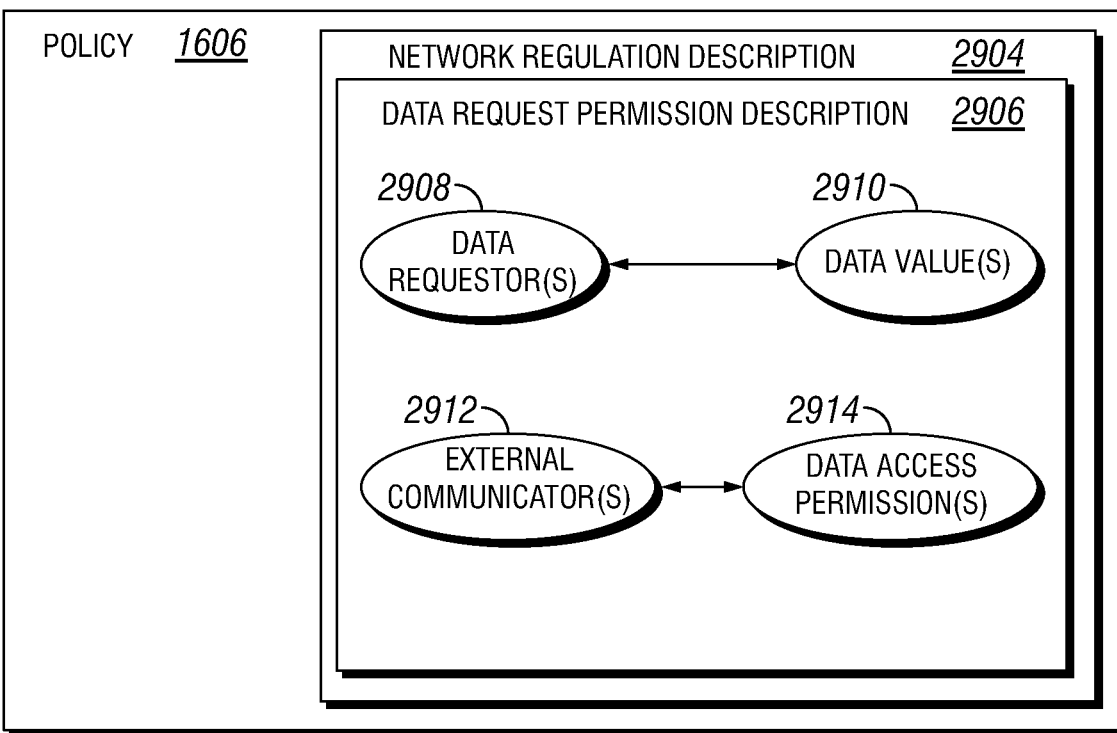
FIG. 29 is a schematic, illustrative, example of a policy.

Referencing FIG. 29, an example network regulation description 2904 includes a data request permission description 2906 including data values 2910 associated with data requestors 2908 (e.g., end points each on one of the network zones 1612, 1614). An example first network interface circuit 1608 regulates communications between end points of the first network zone 1612 and the second network zone 1614 in response to the data request permission description 2906, for example limiting associated data requestors 2908 to authorized data values 2910, and/or preventing associated data requestors 2908 from accessing unauthorized data values 2910. In certain embodiments, the first network interface circuit 1608 further regulates communications between end points of the first network zone 1612 (e.g., from a first end point to a second end point, both on the first network zone 1612) in response to the data request permission description 2906.

An example system 2800 further includes the configuration circuit 1604 configuring the second network interface circuit 1610 in response to the network regulation description, where the second network interface circuit 1610 regulates communications of end points of the second network zone 1614. Again referencing FIG. 29, an example second network interface circuit 1610 regulates communications between end points of the second network zone 1614 and the first network zone 1612 in response to the data request permission description 2906, for example limiting associated data requestors 2908 to authorized data values 2910, and/or preventing associated data requestors 2908 from accessing unauthorized data values 2910. In certain embodiments, the second network interface circuit 1610 further regulates communications between end points of the second network zone 1614 (e.g., from a first end point to a second end point, both on the second network zone 1614) in response to the data request permission description 2906.

An example system 2800 further includes the configuration circuit 1604 configuring a gatekeeper interface circuit 2802 in response to the network regulation description 2904, where the gatekeeper interface circuit 2802 regulates communications between end points of both the first network zone 1612 and the second network zone 1614 with an external device 1618. The example external device 1618 may be coupled to the first network zone 1612, the second network zone 1614, or both. Additionally or alternatively, the external device 1618 may be coupled to a transceiver (not shown) of the vehicle 102, which may be a cellular, WiFi, and/or Bluetooth transceiver. In certain embodiments, the transceiver may be communicatively coupled to a network zone, for example as a port on one of the network zones. In certain embodiments, the first network zone 1612 is a non-primary network zone, the second network zone 1614 is a primary network zone, and the transceiver is communicatively coupled to the second network zone 1614. In a further example embodiment, the second network zone 1614 is an ethernet network, and the transceiver is coupled to the second network zone 1614 by communicating with the second network interface circuit 1610 through a port of a CES including the second network interface circuit 1610.

Example and non-limiting external devices 1618 include one or more of: a cloud server based application, a web based application, and/or a mobile device application. Again referencing FIG. 29, an example data request permission description 2906 includes a data access permission 2914 associated with each one of a number of external communicators 2912. Example external communicators 2912 include identified external devices 1618, external applications, external flows, external entities (e.g., service, manufacturer, owner, operator, etc.), external addresses, etc. Example and non-limiting data access permissions 2914 include permissions to communicate with particular end points, flows, applications, vehicle functions, network zones, vehicle controllers, and the like. In certain embodiments, the data access permissions 2914 may be distinct for transmitted and received communications—for example a given external communicator 2912 may not have permissions to request data from a first end point on the vehicle, but the first end point on the vehicle may have permissions to send data to the given external communicator 2912. An example data request permission description 2906 includes data access permissions associated with one or more of: an external device; an external communicator; a flow associated with an end point, external device, and/or external communicator; a vehicle function associated with an end point, external device, and/or external communicator; and/or an application associated with an end point, external device, and/or external communicator. Example and non-limiting data access permissions 2914 include one or more of: an ability to request, transmit, and/or publish data; an ability to request, transmit, and/or particular data values; and/or an external communication bandwidth limitation (e.g., a data rate, aggregated data amount per unit time, and/or a share of an available bandwidth). An example system 2800 further includes the gatekeeper interface circuit 2802 regulating communications between end points of the network zones 1612, 1614 with external devices 1618 (and/or external communicators 2912) in response to the data request permission description 2906 and/or the data access permissions 2914.

An example gatekeeper interface circuit 2802 further regulates communications with external device(s) 1618 (and/or external communicator(s) 2912) in response to one or more of: a flow associated with the regulated communication(s) (e.g., adjusting permissions based on a priority of the associated flow, a role of the associated flow and/or current operation conditions, etc.); a data type associated with the regulated communication(s) (e.g., prioritizing or de-prioritizing certain data types, limiting certain data types to certain communication conditions such as availability of high data rate communications, typing data according to criteria such as age of the data and adjusting permissions accordingly, etc.); a data service provider associated with the regulated communication(s) (e.g., configuring data rate, bandwidth, and/or aggregate data values in response to an associated data service provider for the data); a vehicle function associated with the regulated communication(s) (e.g., prioritizing certain vehicle functions); and/or a connection type of a communicative coupling with the external device(s) 1618 (and/or external communicator(s) 2912) (e.g., allowing for greater communication rates when a high rate and/or low cost data connection is available).

An example system 2800 includes a configuration circuit 1604 that receives a policy update (e.g., from the policy manager circuit 1602) including a change to the network regulation description 2904, and updating the configuration(s) of the first network interface circuit 1608, second network interface circuit 1610, and/or gatekeeper interface circuit 2802 in response to the change to the network regulation description 2904. In a further example, the policy manager circuit 1602 interprets an authorization associated with the policy update, for example based on a permission of an external device 1618 and/or external communicator 2912 providing the policy update. The example policy manager circuit 1602 suppresses the policy update, in whole or part, in response to the authorization indicating the requesting unit (e.g., the external device 1618 and/or external communicator 2912) is not authorized to make the change to the network regulation description of the policy update. In certain embodiments, policy manager circuit 1602 may additionally or alternatively provide one or more policy notifications 1620, to the requesting unit and/or to other external devices 1618 or external communicators 2912, in response to suppressing or partially suppressing the policy update (e.g., reference FIG. 16 and the related description). Example and non-limiting requesting units include one or more of: an entity associated with the policy update; an application associated with the policy update; a flow associated with the policy update; a vehicle function associated with the policy update; an identifier of the external device communicating the policy update; and/or an identifier of an external communicator associated with the policy update.

Figure 30:
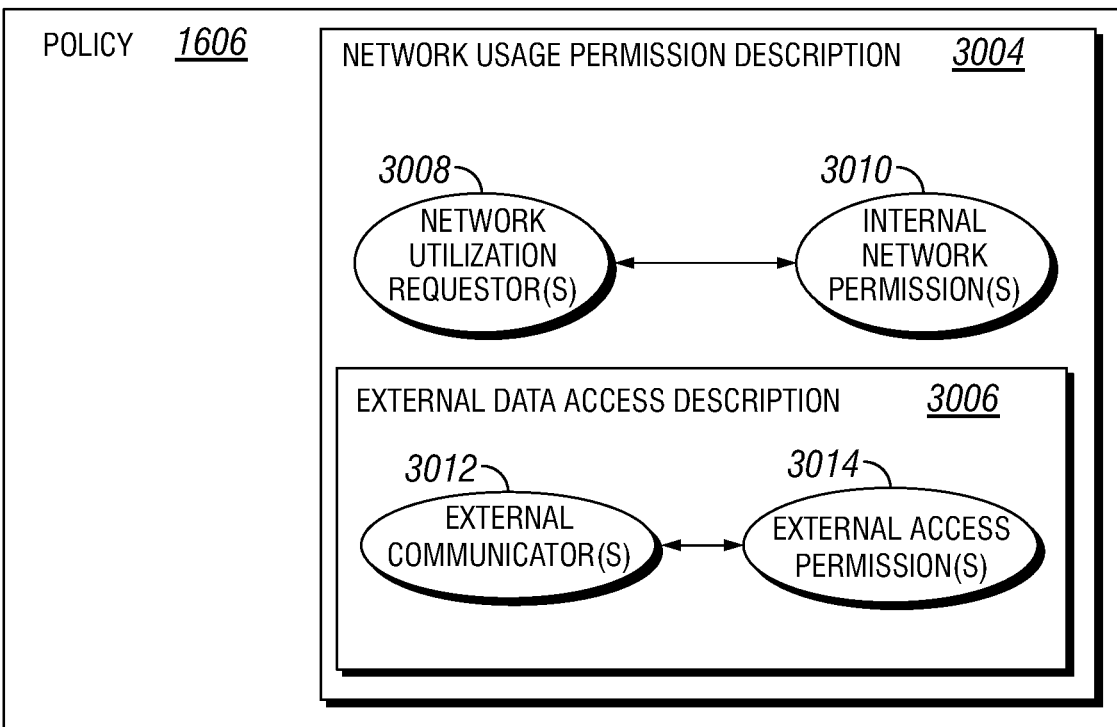
FIG. 30 is a schematic, illustrative, example of a policy.

Again referencing FIG. 28, an example policy manager circuit 1602 interprets a policy 1606 including a network usage permission description 3004 (reference FIG. 30). An example network usage permission description 3004 includes an external data access description 3006, where the configuration circuit 1604 further configures the gatekeeper interface circuit 2802 in response to the external data access description 3006, and where the gatekeeper interface circuit 2802 regulates communications with an external device 1618 in response to the external data access description 3006. An example external data access description 3006 includes external access permission(s) 3014 associated with external communicator(s) 3012, such as identified external devices 1618, external applications, external flows, external entities (e.g., service, manufacturer, owner, operator, etc.), external addresses, etc. In certain embodiments, external communicators(s) 3012 include one or more local communicating devices requesting an external communication, such as a flow of the vehicle, an application, a network zone of the vehicle, an end point of a network zone, or the like. For example, an example gatekeeper interface circuit 2802 regulates external communications based on a flow association of a communicating one of the end points of the first network zone and/or the second network zone (e.g., limiting external communications to permitted communications according to the external access permission(s) 3014, and/or allowing external communications that are not excluded by the external access permission(s) 3014). An example gatekeeper interface circuit 2802 regulates external communications based on an application association of a communicating device (e.g., an external device 1618, and/or an end point), for example limiting external communications to permitted communications according to the external access permission(s) 3014 and/or allowing external communications that are not excluded by the external access permission(s) 3014. An example gatekeeper interface circuit 2802 regulates external communications based on a network zone association of a communicating device (e.g., a network zone associated with an end point that requests the external communication, or source zone; and/or that is the target of an external communication, or destination zone), for example limiting external communications to permitted communications according to the external access permission(s) 3014 and/or allowing external communications that are not excluded by the external access permission(s) 3014. In certain embodiments, the first network zone and the second network zone may be separate virtual local area networks of the vehicle, and may have separate external access permissions 3014.

An example policy 1606 includes an external data quantity description (not shown), where the configuration circuit 1604 configures the gatekeeper interface circuit 2802 in response to the external data quantity description. An example external data quantity description includes a data limit for an application, and where the gatekeeper interface circuit further regulates external communications based on an association of a communicating device with the application. An application may be a vehicle operation related application (e.g., an application operating on the vehicle, and/or operating on an external device with communicative interactions with the vehicle) or an application not related to vehicle operation (e.g., a infotainment application, an operator application, web browsing utilizing a network zone of the vehicle, a third party application communicating with the vehicle, etc.). An example external data quantity description includes a data limit for an end point of one of the network zones, and the gatekeeper interface circuit regulates communications based on a source or a destination end point of regulated communications. An example external data quantity description includes a data limit for a flow, and the gatekeeper interface circuit regulates external communications based on an association of a communicating device with the flow.

Example and non-limiting data limits include one or more of: an amount of communicated data corresponding to a selected time period (e.g., MB per hour, GB per month, etc.); an amount of communicated data corresponding to a selected vehicle operating condition (e.g., MB per trip; data rate during idling operation; data rate at rated operation; data rate during high transient operation; etc.); an amount of communicated data corresponding to a data provider associated with the application, end point, and/or flow; a bandwidth share of the transceiver utilized for the communications; a bandwidth volume of the transceiver utilized for the communications; a bandwidth share of a channel of the transceiver (e.g., where the transceiver includes more than one channel, where the bandwidth share is limited for channel(s) servicing external communications for the application, end point, and/or flow); and/or a bandwidth volume of a channel of the transceiver (e.g., where the transceiver includes more than one channel, where the bandwidth volume is limited for channel(s) servicing external communications for the application, end point, and/or flow).

Figure 31:
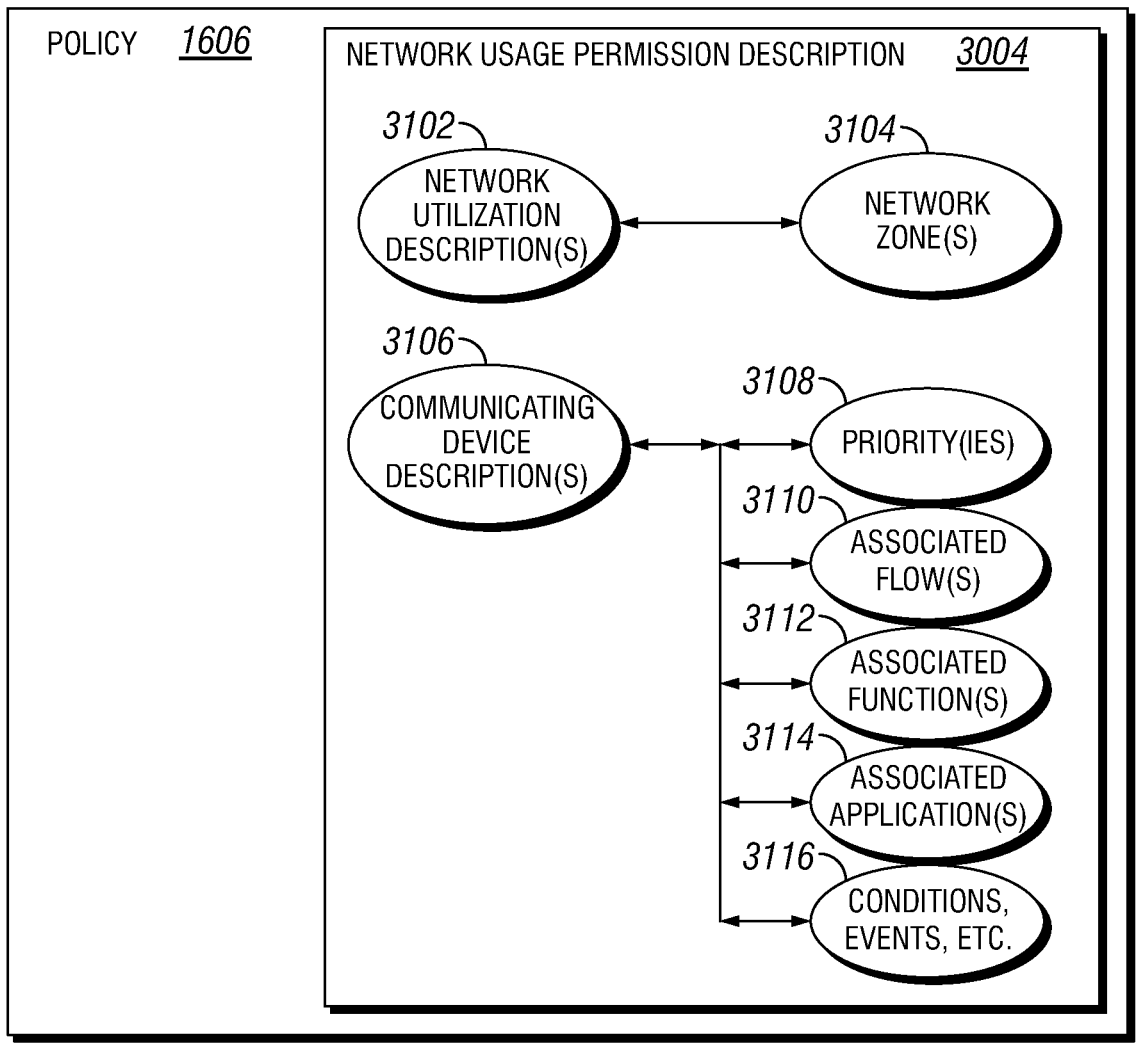
FIG. 31 is a schematic, illustrative, example of a policy.

Referencing FIG. 31, an example network usage permission description 3004 includes a network utilization description 3102 corresponding to a network zone 3104, and a communicating device description 3106 corresponding to a local communicating device, such as an end point, a flow, a vehicle function, and/or an application. In the example, the gatekeeper interface circuit 2802 further regulates external communications based on the network utilization description 3102, and an associated communicating device (e.g., corresponding to the communicating device description 3106) with the regulated communication. An example network utilization description 3102 includes determining a priority 3108, an associated flow 3110, an associated vehicle function 3112, an associated application 3114, and/or an associated condition or event 3116 (e.g., a triggering event to implement an aspect of the policy 1606, vehicle or other conditions to be present to allow implementation of the aspect of the policy 1606, and/or vehicle or other conditions which, if present, adjust or suppress an aspect of the policy 1606) with the communicating device to regulate the external communications. The network utilization description 3102 may include one or more of: a bandwidth of the network zone 3104 available to be utilized to support external communications; a data rate on the network zone 3104 available to be utilized to support external communications; a bandwidth limitation of the network zone 3104 (e.g., where external communications would cause a general exceedance, they may be suppressed or reduced); and/or a data rate limitation of the network zone 3104 (e.g., where external communications would cause a general exceedance, they may be suppressed, reduced, or delayed). In certain embodiments, priorities 3108 or other information related to the external communications may be compared with priorities of on-vehicle communications utilizing the network zone, and an external communication may take priority over the on-vehicle communication, which may be suppressed, reduced, or delayed until the external communication is serviced. In certain embodiments, service requirements (e.g., QoS parameters) for on-vehicle end points, flows, applications, vehicle functions, etc. (e.g., local communicating devices), may be considered in determining an external communication permission, and the external communication may be allowed while the service requirements can be met.

Figure 32:
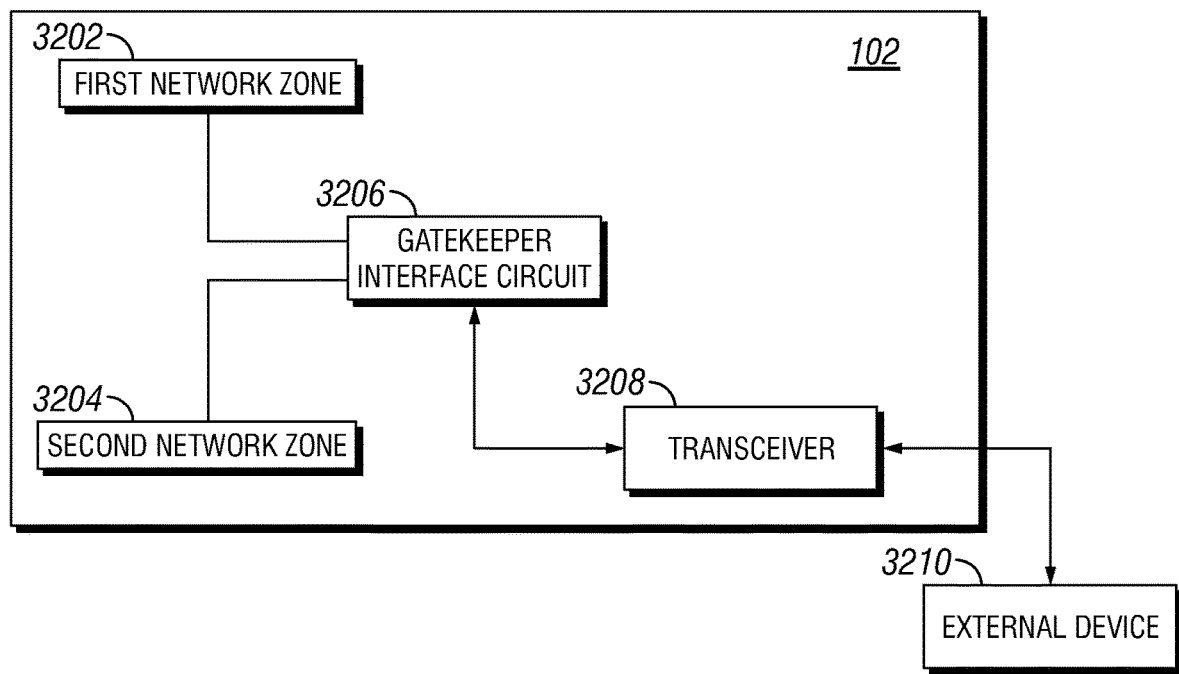
FIG. 32 is a schematic diagram of a system for regulating extra-vehicle communications according to certain embodiments of the present disclosure.

Referencing FIG. 32, an example vehicle 102 includes a first network zone 3202, and a second network zone 3204 that is of a different type than the first network zone 3202. The example vehicle includes a gatekeeper interface circuit 3206 that is interposed between the first network zone 3202 and an external device 3210, and between the second network zone 3204 and the external device 3210. The gatekeeper interface circuit 3206 may be physically interposed, for example where communications between the zones 3202, 3204 and the external device 3210 pass through the gatekeeper interface circuit 3206, or logically interposed, for example where communications between the zones 3202, 3204 and the external device 3210 are regulated by the gatekeeper interface circuit 3206. In the example of FIG. 32, a transceiver 3208 provides communicative coupling with the external device 3210, and the gatekeeper interface circuit 3206 is interposed between the zones 3202, 3204 and the transceiver 3208. The transceiver 3208 of FIG. 32 is depicted as a single device, although a given vehicle may have a number of transceivers (not shown). An example gatekeeper interface circuit 3206 regulates communications between a selected number of zones 3202, 3204 on the vehicle 102 and selected transceiver(s) 3208. For example and without limitation, operations of the gatekeeper interface circuit 3206 may limit external communications with selected zones 3202, 3204 to ensure security of vehicle data and operations, to ensure protection of private and/or proprietary information, and to preserve functionality of the vehicle to perform the selected mission (e.g., limiting extraneous and/or malicious network traffic on the selected zones 3202, 3204). In another example and without limitation, operations of the gatekeeper interface circuit 3206 may limit utilization of selected transceiver(s) 3208, preserving external communication bandwidth, limiting the amount and/or rate of data through the transceiver(s) 3208, and/or ensuring external data communications are attributed to a proper local communicating device and/or data service provider.

Figure 33:
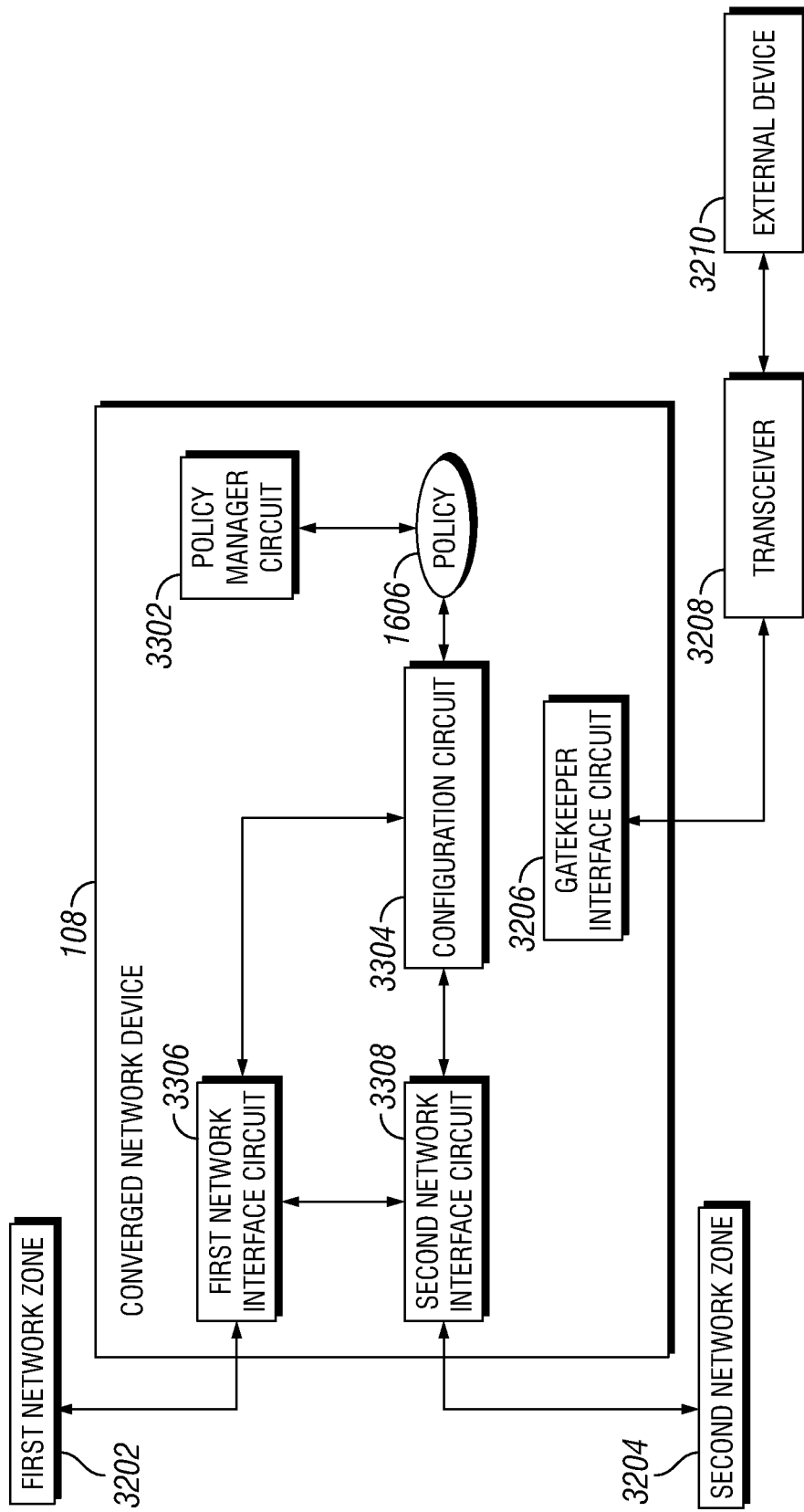
FIG. 33 is a schematic diagram of a system for regulating extra-vehicle communications according to certain embodiments of the present disclosure.
Figure 34:
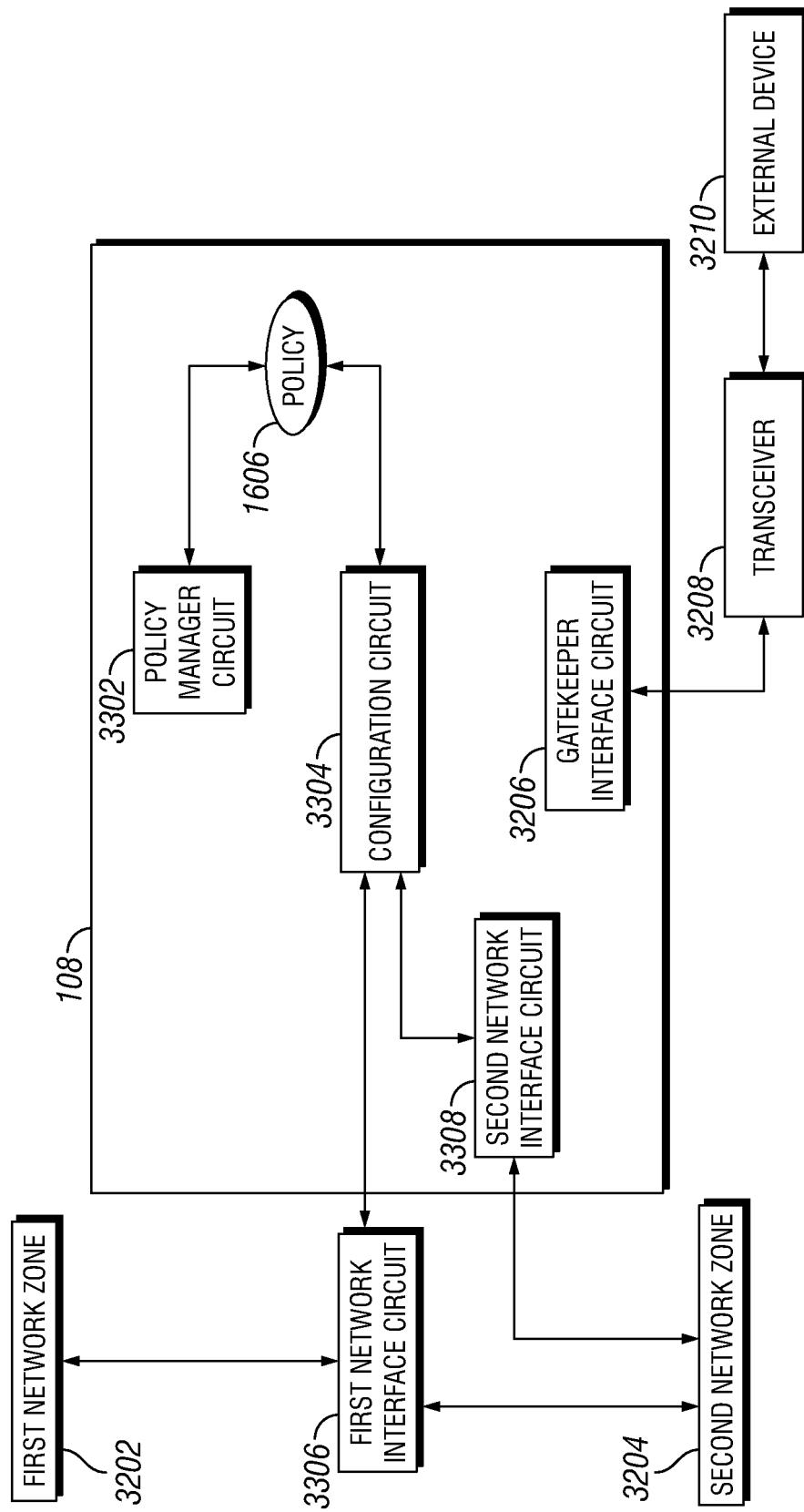
FIG. 34 is a schematic diagram of a system for regulating extra-vehicle communications according to certain embodiments of the present disclosure.

Referencing FIG. 33, an example CND 108 is depicted, consistent with the example of FIG. 32 in certain embodiments of the present disclosure. The example CND 108 includes the gatekeeper interface circuit 3206, and further includes a policy manager circuit 3302 that interprets a policy 1606 including a network regulation description, a configuration circuit 3304 that configures a first network interface circuit 3306 and/or a second network interface circuit 3308 in response to the policy 1606, and where the network circuit(s) 3306, 3308 regulate communications between end points of the respective network zone (intra-network communications) and/or between end points across the respective network zones (inter-network communications). The example of FIG. 33 depicts two network interface circuits 3306, 3308, although operations of the gatekeeper interface circuit 3206 may be performed in relation to only one network interface circuit, a subset of available network interface circuits, or all network interface circuits. Referencing FIG. 34, an example CND 108 includes the second network interface circuit 3308, where the gatekeeper interface circuit 3206 regulates communications between the second network zone 3204 and the external device 3210. In the example of FIG. 34, external communications from the first network zone 3202 are provided through the first network interface circuit 3306 to the second network zone 3204, and are thereby regulated by the gatekeeper interface circuit 3206 as communications on the second network zone 3204. Additionally or alternatively, external communications from a network zone (such as the first network zone 3202) may not be regulated by the gatekeeper interface circuit 3206, and/or external communications from a network zone (such as the first network zone 3202) may not be possible.

Figure 35:
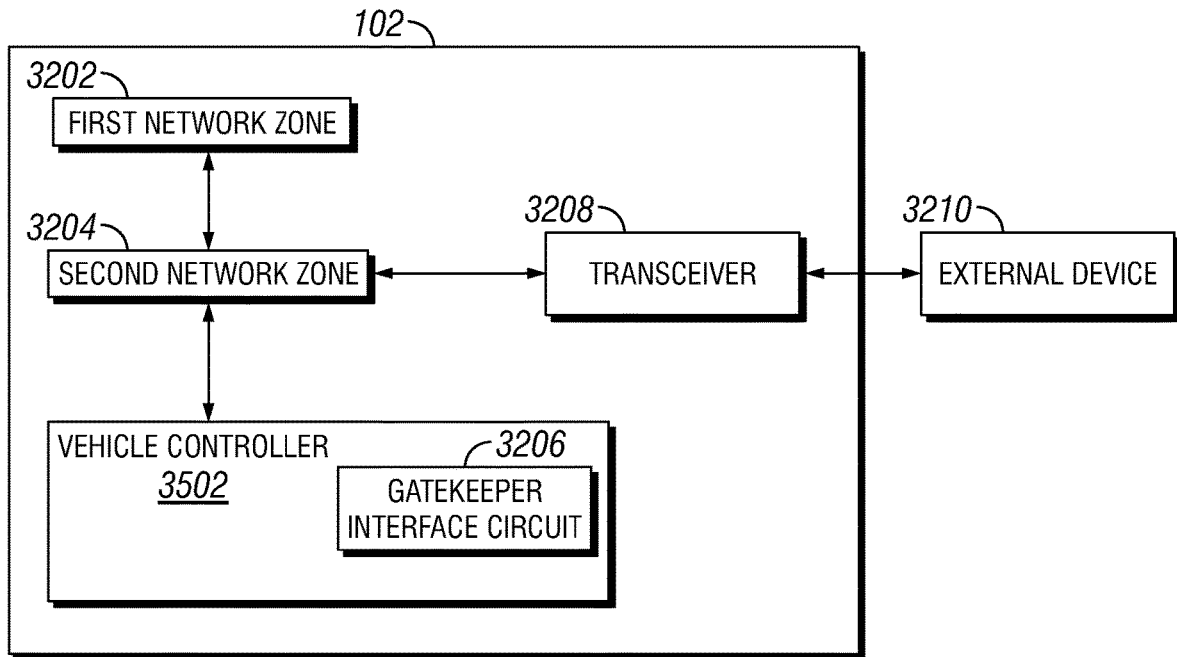
FIG. 35 is a schematic diagram of a system for regulating extra-vehicle communications according to certain embodiments of the present disclosure.
Figure 36:
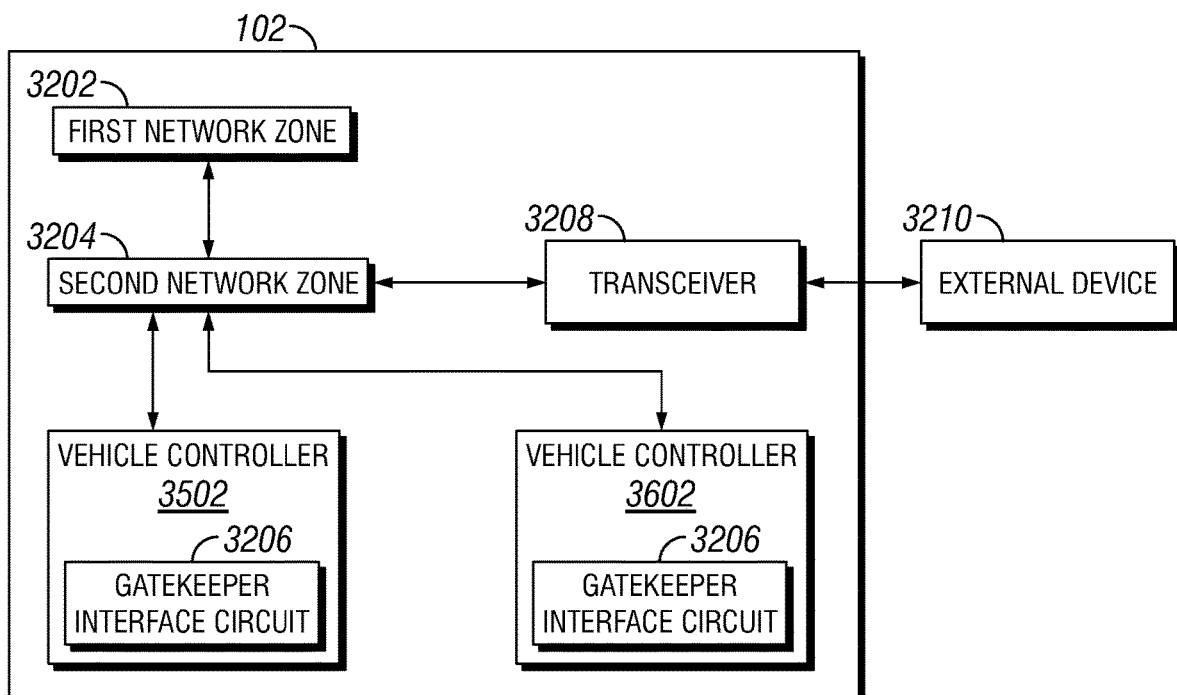
FIG. 36 is a schematic diagram of a system for regulating extra-vehicle communications according to certain embodiments of the present disclosure.

Referencing FIG. 35, an example vehicle 102 includes a vehicle controller 3502, where the gatekeeper interface circuit 3206 is positioned on the vehicle controller 3502. The example gatekeeper interface circuit 3206 regulates external communications between selected network zones 3204, 3202 and an external device 3210. An example gatekeeper interface circuit 3206 may be an end point of the second network zone 3204, and/or the vehicle controller 3502 may be an end point of the second network zone 3204. Referencing FIG. 36, an example gatekeeper interface circuit 3206 is distributed between two vehicle controllers 3502, 3602, with each of the vehicle controllers 3502, 3602 provided as an end point of the second network zone 3204.

Figure 37:
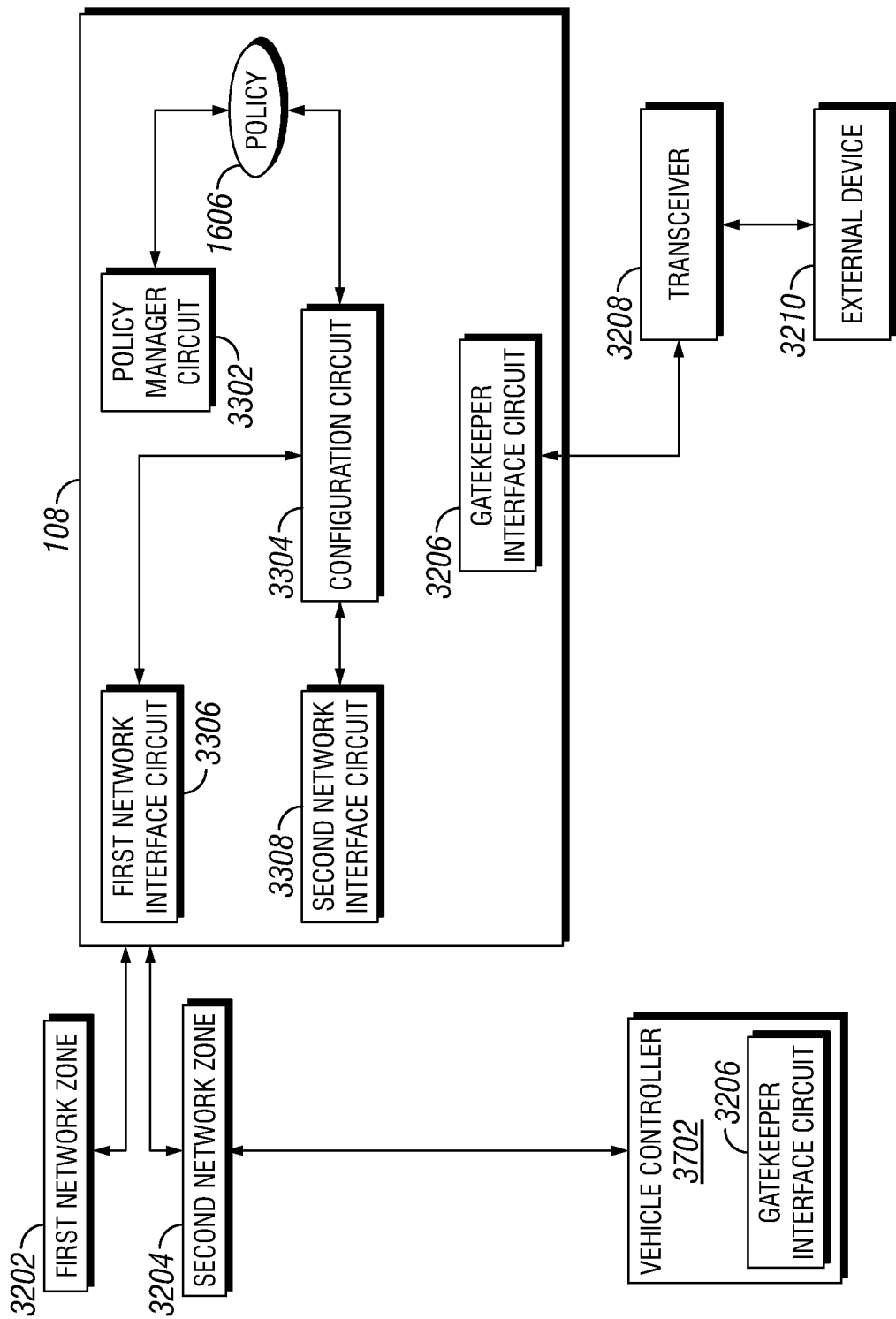
FIG. 37 is a schematic diagram of a system for regulating extra-vehicle communications according to certain embodiments of the present disclosure.

In certain embodiments (not shown), the vehicle controllers 3502, 3602 may be end points on separate network zones 3204. In the examples where the gatekeeper interface circuit 3206 is distributed, each gatekeeper interface circuit 3206 portion may regulate portions of external communications, such as communications with an associated network zone, and/or may be capable to regulate all external communications of the selected network zones, for example to provide for redundant capability if communications with one of the gatekeeper interface circuit 3206 portions is lost or degraded. Referencing FIG. 37, an example gatekeeper interface circuit 3206 is distributed between a first portion on a CND 108, and a second portion on a vehicle controller 3702. The example vehicle controller 3702 is an end point on the second network zone 3204. Similar to the example of FIG. 36, each gatekeeper interface circuit 3206 portion may regulate portions of external communications, such as communications with an associated network zone, and/or may be capable to regulate all external communications of the selected network zones, for example to provide for redundant capability if communications with one of the gatekeeper interface circuit 3206 portions is lost or degraded.

Figure 38:
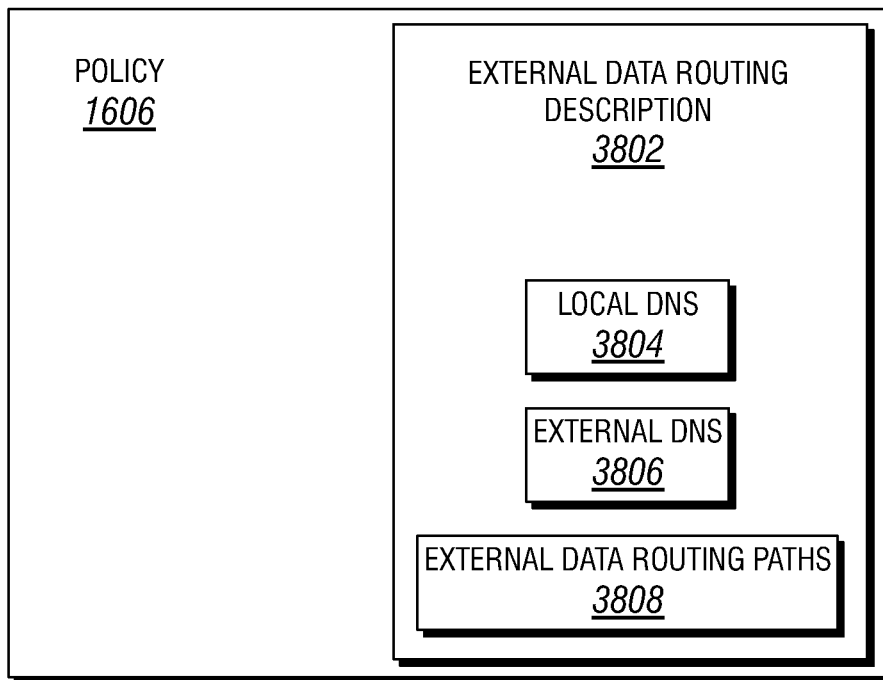
FIG. 38 is a schematic, illustrative, example of a policy.

Referencing FIG. 38, an example policy 1606 includes an external data routing description 3802, where the configuration circuit 1604 configures the gatekeeper interface circuit in response to the external data routing description 3802. An example external data routing description 3802 includes one or more of a local DNS 3804, an external DNS 3806, and/or one or more external data routing paths 3808.

Figure 39:
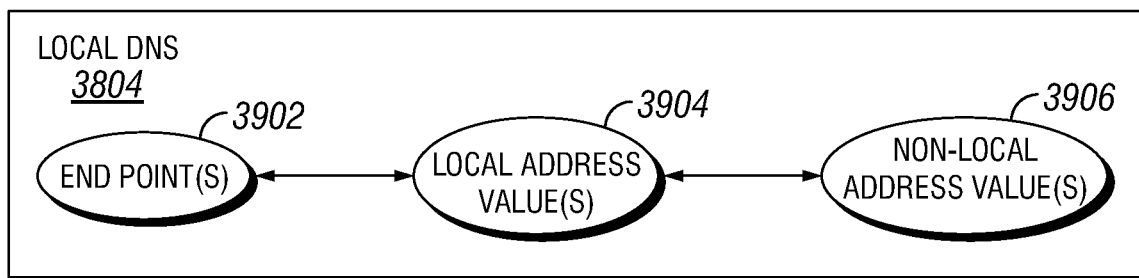
FIG. 39 is a schematic, illustrative, example of a local DNS table.

Referencing FIG. 39, an example local DNS 3804 includes a number of local address values 3904 for end points 3902 of network zone(s), each corresponding to at least one non-local address value 3906. An example local DNS 3804 may be stored as a data structure, as a part of the policy 1606, and may be included with a local address table 2100 (reference FIG. 21) or as a separate data structure. The example local DNS 3804 may be utilized in a network address translation (NAT) operation. An example non-local address value 3906 includes an address utilized by an external device (e.g., an IPv4 or IPv6 address directed to an end point, where the IPv4 or IPv6 address may not match the local address value 3904, but may be a value from a previous configuration, a normally used value by an entity associated with the external device, etc.). An example non-local address value 3906 includes a standardized value for the end point (e.g., an industry standard, a customary value, a value utilized by a standards body such as SAE, etc.). An example non-local address value 3906 includes a proprietary value for the end point (e.g., a value normally utilized by a manufacturer, after-market entity, etc.). An example non-local address value 3906 includes a previous local address value for an end point (e.g., a local address value 3904 utilized when the vehicle was manufactured, utilized for a previous configuration of the vehicle, utilized for a previous configuration of a related vehicle such as an earlier model year, etc.). The utilization of the local DNS 3804 allows for external devices to address end points 3902 of the vehicle using a separate non-local address value 3906, without requiring knowledge of the network configuration, location, or other information about end points 3902 of the vehicle. The utilization of the local DNS 3804 additionally allows for changes to the vehicle configuration, such as the movement of end points between network zones, consolidation of end points, and/or any other changes to the end points of the vehicle and/or the network topology of the vehicle, while still allowing external devices, applications, and the like to function properly. The utilization of the local DNS 3804 also provides for separation of knowledge about the vehicle from external applications, allowing for a greater number of users to access vehicle information, isolating external users from the vehicle information, and reducing external application development times and/or resource requirements. The utilization of the local DNS 3804 also provides for ease of incremental changes to the network topology of related vehicles, such as migration of end points from a first network zone to a second network zone over a number of model years or other configuration iterations.

An example policy manager circuit 1602 determines an address change of an end point of the first network zone and/or second network zone, and updates the local DNS 3804 in response to the address change. For example, the policy manager circuit 1602 may detect a move of the end point between network zones (e.g., detecting communications from the end point, receiving an identifier from the end point at a new location, and/or receiving a notification of the change from the end point, a service tool, or the like), and update the local DNS 3804 with a local address value 3904 corresponding to the new location (e.g., network zone, address value, etc.) in response to the move. In another example, the policy manager circuit 1602 may detect a change of a non-local address value 3906 for an end point, and updates the local DNS 3804 in response to the non-local address value 3906 change. For example, a change to the policy 1606 from an external device may indicate that a non-local address value 3906 change has occurred (e.g., "AmbTempSens" is now "Ambient temperature sensor"), and/or a published listing of non-local address values 3906 may be updated (e.g., a listing provided on a memory of a cloud server, where the policy manager circuit 1602 periodically and/or episodically surveys the listing for changes). An example policy manager circuit 1602 determines an authorization of an external device providing for the change of the non-local address value 3906, for example allowing only authorized devices, entities, applications, or the like to adjust the non-local address value 3906. The operations of the policy manager circuit 1602 to update the non-local address value(s) 3906 allow for convenient compliance with industry standards, manufacturer preferences, and/or systematic changes to a number of vehicles without having to configure individual vehicles when changes to proprietary or standard references to end points. It can be seen that operations to update the non-local address values 3906 can also improve memory utilization, as the size of the local DNS 3804 (and/or local address table 2100) can be reduced over time as a group of related vehicles synchronize on accepted address values, and superfluous relationships of no longer utilized non-local address values 3906 are eliminated.

Figure 40:
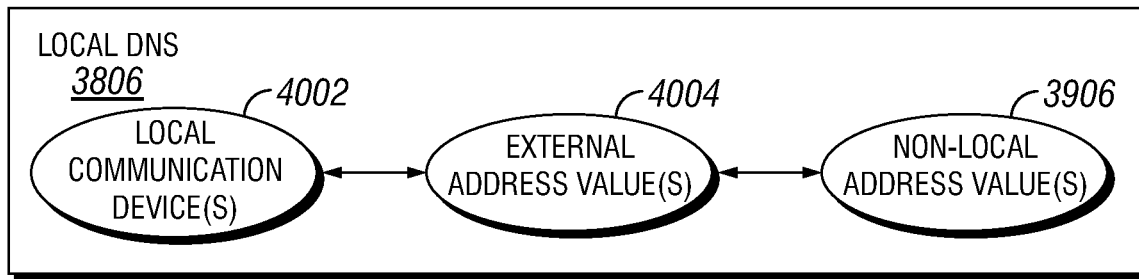
FIG. 40 is a schematic, illustrative, example of a local DNS table.

Referencing FIG. 40, an example external data routing description includes an external DNS 3806 including a number of external address value(s) 4004 for external network access locations, each corresponding to a local communicating device 4002. The external DNS 3806 allows for the gatekeeper interface circuit 2802 to control access for local communicating devices 4002 to external network access locations. In certain embodiments, the external DNS 3806 is operated to allow only permitted external access (e.g., where an external address value 4004 is provided). In certain embodiments, the external DNS 3806 is operated to prevent external access (e.g., where a listed external address 4004 listed may not be accessed). In certain embodiments, both the access permissions and/or the access type may be adjusted according to the local communicating device 4002. For example, certain end points, flows, applications, vehicle functions, and the like may be limited to external access where an external address value 4004 is available, and other end points, flows, applications, vehicle functions, and the like may be permitted external access except where a particular external address value 4004 is listed preventing access. In certain embodiments, the external DNS 3806 includes a non-local address value 3906—for example an IP address corresponding to the external address value 4004 which may be a common name such as a website address as listed in written language. The utilization of the non-local address value 3906 allows for rapid external access without having to use an external DNS (e.g., from a cloud server and/or internet provider), and also allows for differential response to local communicating devices 4002 for a given external address value 4004 (e.g., allowing for some local communicating devices to access a given external web address, and re-directing others to a selected location). Example and non-limiting external network access locations include one or more of: an internet address, a wide area network address, and/or an external device and/or external application identifier (e.g., "Route planning agent", "Service assistance agent", an IPv6 address, etc.).

An example external data routing path 3808 includes a network zone trajectory of a regulated external communication corresponding to a local communicating device. An example network zone trajectory includes a data configuration for the communication, such as one or more of: an up-sampling description; a down-sampling description; an encapsulation description; a data processing description; a communication frame processing description; and/or a data rate description. For example, the network zone trajectory allows for external communications to be provided with selected processing of the communication, including a payload and/or a frame of the communication, and/or to be provided at a selected data rate. The selected data rate may be according to a request of the data rate from an external device, and/or according to a data rate limit associated with the external communication (e.g., to limit network utilization, transceiver utilization, data transmissions associated with a data provider, etc.). The network zone trajectory additionally or alternatively allows for selected encapsulation of the communication, for example when a message is passed through an intervening network zone (e.g., a CAN message from a first network zone passing through as an ethernet message on a second network zone) before being transmitted externally to the vehicle.

An example network zone trajectory further includes an external communication portal 4102 (e.g., reference FIG. 41 and the related description) for the regulated communication, where the gatekeeper interface circuit 3206 further regulates communication between the local communicating device (e.g., an end point of a network zone) and the external communication portal 4102. Example and non-limiting external communication portals 4102 include a transceiver selection (e.g., where more than one transceiver is available), an access point name (APN) selection, a hardware port selection (e.g., a hardware port of a network zone, an OBD port, a proprietary communication port, a USB port, etc.), a WiFi adapter, a Bluetooth adapter, and/or a cellular communication. The example network zone trajectory allows for the gatekeeper interface circuit 3206 to utilize external communications having the lowest cost, lowest impact on vehicle and/or network performance, to attribute external communications to a proper service provider, to ensure QoS parameters for local communicating devices, and/or to ensure security of external communications. An example gatekeeper interface circuit 3206 adjusts the network zone trajectory in response to an operating condition of the vehicle (e.g., vehicle shutdown, service mode, idling, operating at a rated condition, available external communication portals 4102, etc.). An example gatekeeper interface circuit 3206 adjusts the network zone trajectory in response to an operating condition of a network zone and/or a transceiver (e.g., current utilization, connectivity, fault status, etc.).

An example external data routing path includes an APN of a regulated communication (e.g., specifying an associated data service provider for the communication). An example gatekeeper interface circuit 3206 adjusts the APN in response to an operating condition of the vehicle, a network zone, and/or the transceiver (e.g., where a communication is supporting more than one application, vehicle function, and/or flow, operations to adjust the APN in response to the operating condition of the vehicle allow for the regulated communication to be attributed to a "primary consumer" of the communication). An example gatekeeper interface circuit 3206 aggregates a regulated communication from a number of local communicating devices (e.g., where a communication supports more than one end point, application, vehicle function, and/or flow), and distributes the aggregated regulated communications between more than one APN associated with the local communicating devices (e.g., where a communication is supporting multiple consumers, the aggregate amount of communications can be distributed across APNs, allowing for a reduction in total external communications by avoiding redundancy, while attributing all external communications). In certain embodiments, operations to adjust APNs, aggregate regulated communications, and/or distribute aggregated regulated communications between APNs are performed in response to an attribution description of the policy 1606.

An example policy manager circuit 1602 determines a change to the external data routing path, for example provided by an external device 1618, and updates the external data routing description in response to the change of the external data routing path. An example policy manager circuit 1602 determines an authorization of an external device providing the change of the external data routing path, and suppresses all or a portion of the change to the external data routing path in response to determining the change is not authorized or is not fully authorized. An example policy manager circuit 1602 changes the external data routing path in response to a change of a local communicating device (e.g., changing the routing in response to an end point moving from one network zone to another network zone). Example and non-limiting changes to a local communicating device include one or more of: a movement of an end point from one of the first network zone or the second network zone to the other one of the first network zone or the second network zone; a change in a flow, where the change comprises a change in a priority, a subscription, or a permission; a change in an application, where the change comprises a change in a priority, a subscription, or a permission; and/or or a change in a quantity, configuration, or type of data communicated by the local communicating device.

Figure 41:
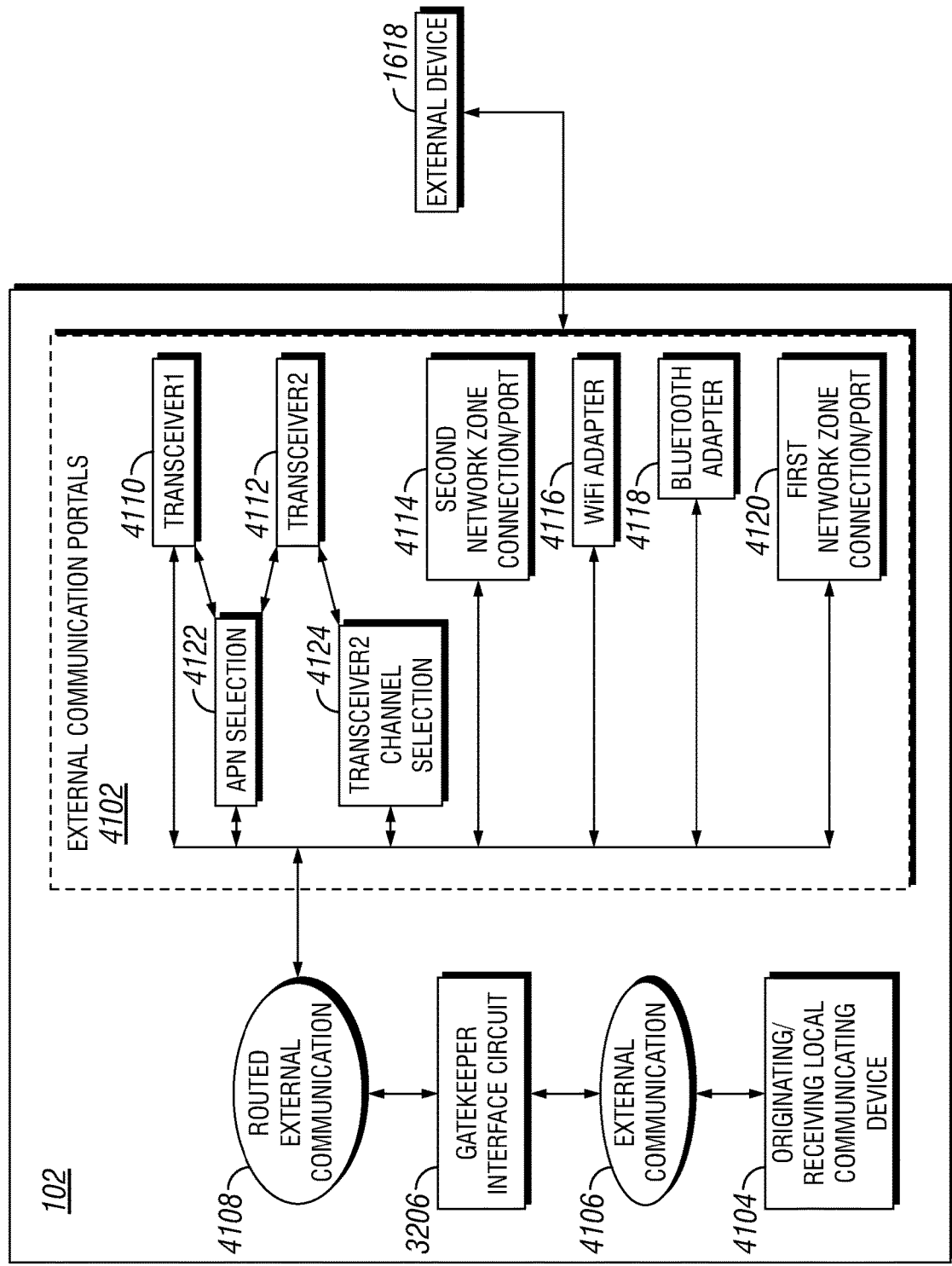
FIG. 41 is a schematic diagram of a system for regulating extra-vehicle communications according to certain embodiments of the present disclosure.

Referencing FIG. 41, an example vehicle 102 includes a gatekeeper interface circuit 3206 that regulates communications between local communicating devices and an external device 1618. The example vehicle 102 includes a local communicating device originating a communication and/or targeted to receive a communication from the external device 1618 ("originating/receiving local communicating device 4104), and the gatekeeper interface circuit 3206 providing a routed external communication 4108 in response to the originated or received communication, and further in response to a policy 1606 including an external data routing path, permissions associated with the local communicating device, and/or permissions associated with the external device 1618. In certain embodiments, the gatekeeper interface circuit 3206 selects an external communication portal 4102 for the routed external communication 4108, which includes selecting a device through which the routed external communication 4108 will be communicated to the external device 1618. Example external communication portals 4102 include one or more of: a first transceiver 4110 and/or an APN selection 4122 for the first transceiver 4110 (e.g., allowing for selection of a data provider associated with the communication 4108); a second transceiver 4112, an APN selection 4122, and/or a channel selection 4124 for the second transceiver 4112 (e.g., allowing for selection of a data provider and/or a channel of the transceiver 4112); a second network zone connection 4114 (e.g., a port of an ethernet network zone); a WiFi adapter 4116 (e.g., utilizing a WiFi connection if available); a Bluetooth adapter 4118 (e.g., utilizing a Bluetooth connection if available); and/or a first network zone connection 4120 (e.g., a port of a CAN network zone). The example of FIG. 41 depicts the first transceiver 4110 and second transceiver 4112 for convenience of the description to indicate that a transceiver 4110, 4112 may have channels or not, although a given vehicle 102 may have any number of transceivers 4110, 4112, of which some, all, or none may have channeled operations. The example of FIG. 41 depicts a single connection to each network zone for convenience of the description to indicate that any network zone may have a connection, although a given network zone may have no connection, or more than one connection (e.g., an OBD port and a proprietary port, etc.). Without limitation to any other aspect of the present disclosure, the gatekeeper interface circuit 3206 may adjust routing operations based on available external communication portals 4102, vehicle operating conditions, network operating conditions, permissions of any entity in the communication chain, priority of any entity in the communication chain, service requirements of any entity related to the vehicle, and/or data rate and/or quantity limitations.

Figure 42:
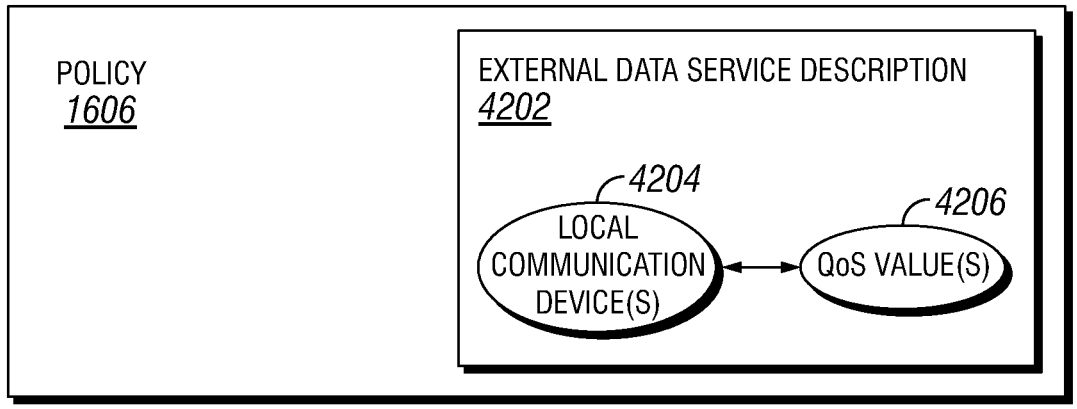
FIG. 42 is a schematic, illustrative, example of a policy.

Referencing FIG. 42, an example policy 1606 includes an external data service description 4202, where the configuration circuit 1604 configures the gatekeeper interface circuit 3206 in response to the external data service description 4202. An example external data service description 4202 includes a number of local communicating devices 4204, each corresponding to a QoS value(s) 4206. Example and non-limiting QoS values 4206 include one or more of: a priority value; a packet delay value (e.g., a maximum, average, or other packet delay description); a packet loss rate value (e.g., a maximum, average, longest gap time, or other packet loss description); a data rate value; a maximum drop-out time value; an acknowledgement value (e.g., whether acknowledgement for communications relevant to the associated local communicating device, if available, are required); a data buffering priority value (e.g., which may be utilized to determine a buffer size, buffer priority, and/or data expiration parameters for buffered data); a data buffering size value (e.g., a data buffer size, buffered time, or other storage size related parameters); and/or a data life cycle description (e.g., indicating storage life for associated data, expiration time, and/or deletion priority). Without limitation to any other aspect of the present disclosure, a local communicating device includes one or more of: an end point of a network zone; an application; a flow; a vehicle function; and/or a vehicle controller. In certain embodiments, the gatekeeper interface circuit 3206 regulates external communications using a QoS value 4206 corresponding to the local communicating device 4204 associated with a regulated communication. In certain embodiments, for example where more than one local communicating device 4204 is associated with a regulated communication (e.g., an end point and a flow), the gatekeeper interface circuit 3206 utilizes the QoS value(s) 4206 associated with a highest priority one of the local communicating devices 4204, and/or applies a super-set of applicable QoS values 4206 that meet the highest service values for all of the associated local communicating devices 4204.

An example policy manager circuit 1602 determines a change of the external data service description, for example through an update of the policy from an external device, and the configuration circuit 1604 updates the configuration of the gatekeeper interface circuit 3206 in response to the updated policy. An example policy manager circuit 1602 determines an authorization of an external device providing the change of the external data service description, and suppresses all or a portion of the change to the external data service description in response to determining the change is not authorized or is not fully authorized.

Again referencing FIG. 40, an example external data routing description includes an external DNS including a number of external address values 4004 for external network access locations, each corresponding to a local communicating device 4002 (e.g., an end point of a network zone). An example gatekeeper interface circuit 3206 further accesses an off-vehicle external DNS (not shown) in response to a request by an end point to communicate with an external address value, where the requested external address value is not found on the external DNS 3806. An example gatekeeper interface circuit 3206 further updates the external DNS 3806 in response to accessing the off-vehicle external DNS.

Again referencing FIG. 28, an example vehicle 102 includes a first network zone 1612 and a second network zone 1614, where the second network zone 1614 is of a different type than the first network zone 1612. The example vehicle 102 includes a policy manager circuit 1602 that interprets a policy 1606 including an eternal data routing description and an external data service description. The example vehicle 102 includes a configuration circuit 1604 that configures a gatekeeper interface circuit 2802 in response to the external data routing description and the external data service description. In the example, the gatekeeper interface circuit 2802 is interposed between the first network zone and at least one external communication portal 4102 (e.g., reference FIG. 41) selectively couplable to an external device 1618, and further interposed between the second network zone and the at least one external communication portal 4102. The gatekeeper interface circuit 2802 regulates communications between end points of the network zones 1612, 1614 and the external communication portal(s) 4102. An example external data routing description includes a number of local communicating devices, each corresponding to an external data routing path. Example external data routing paths include a network zone trajectory of a regulated communication. An example network zone trajectory includes a data configuration such as: an up-sampling description; a down-sampling description; an encapsulation description; a data processing description; a communication frame processing description; and/or a data rate description. An example network zone trajectory includes at least one external communication portal 4102 for the regulated communication.

An example external data service description includes a number of local communicating devices, each corresponding to one or more QoS values. In a further example, the external communication portal(s) 4102 include a first transceiver and a second transceiver, where the gatekeeper interface circuit further distributes the regulated communications between the first transceiver and the second transceiver in response to the external data service description. In another example, the external communication portal(s) 4102 include a first channel associated with a transceiver and a second channel associated with the transceiver, and where the gatekeeper interface circuit further distributes the regulated communications between the first channel and the second channel in response to the external data service description.

Example external communication portal(s) 4102 include one or more external access points such as: a transceiver; a wireless transceiver; a Bluetooth transceiver; a hardware port on the first network zone; a hardware port on the second network zone; an on-board diagnostic (OBD) port; a proprietary network port; an external network utilizing wireless communication with the vehicle (e.g., where communications with the external device are direct to the external network, and/or tunneled through the external network); an external network utilizing cellular communication with the vehicle; an external network utilizing Bluetooth communication with the vehicle (e.g., where communications with the external device are direct to the external network, and/or tunneled through the external network); more than one channel of a transceiver; more than one transceiver; and/or a number of channels distributed across at least two transceivers.

An example gatekeeper interface circuit 2802 further distributes the regulated communications between the at least two external access points. In a further example, each QoS value includes a service description such as: a priority value; a packet delay value; a packet loss rate value; a data rate value; a maximum drop-out time value; an acknowledgment value; a data buffering priority value; a data buffering size value; and/or a data life cycle description.

Certain aspects of the present disclosure are set forth as procedures to perform operations related to the present disclosure. Operations may be performed, without limitation, by any controllers, circuits, devices, components, sensors, actuators, logic circuits, or other aspects as set forth in the present disclosure. Procedures are depicted schematically as illustrative examples, and operations may be omitted, combined, divided, and/or re-ordered in whole or part. In certain embodiments, one or more operations of a first procedure may be combined with one or more operations of another procedure.

Figure 43:
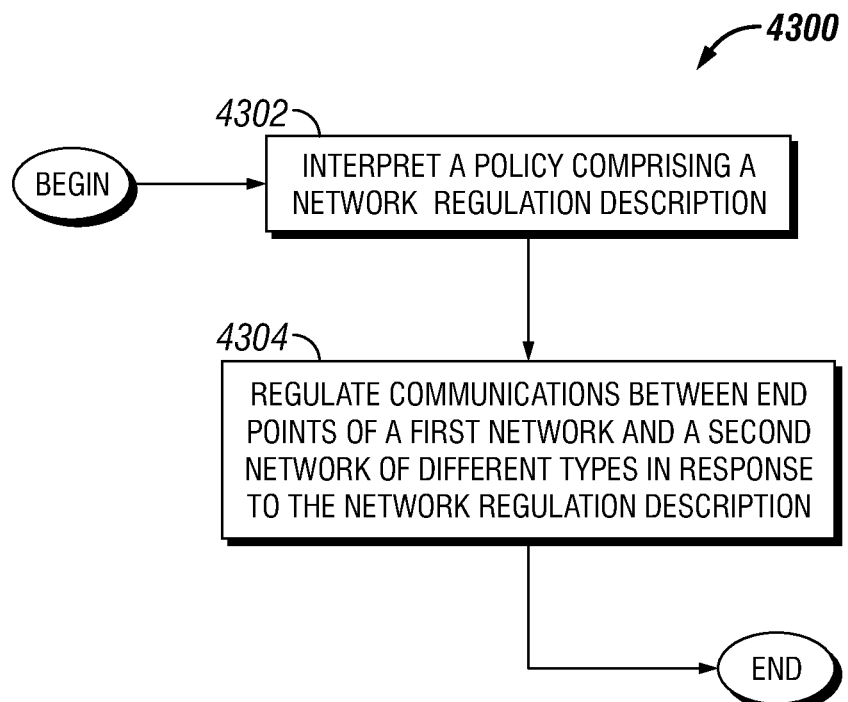
FIG. 43 is a schematic flow diagram depicting an example procedure for regulating communications of a vehicle.

Referencing FIG. 43, an example procedure 4300 to regulate communications between networks of a different type on a vehicle is schematically depicted. The example procedure 4300 includes an operation 4302 to interpret a policy including a network regulation description, and an operation 4304 to regulate communications between end points of a first network and end points of a second network in response to the network regulation description.

Figure 44:
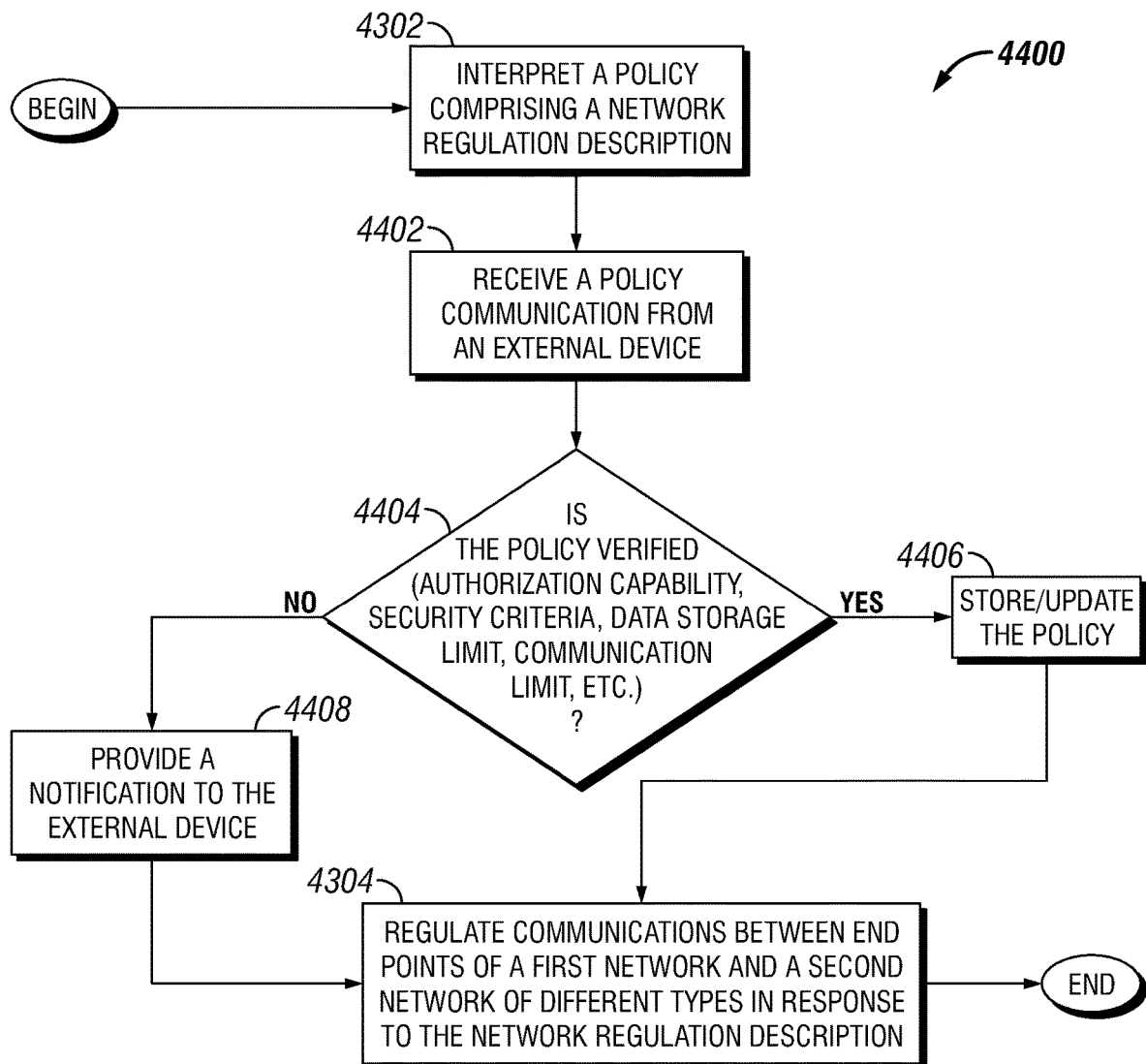
FIG. 44 is a schematic flow diagram depicting an example procedure for regulating communications of a vehicle.

Referencing FIG. 44, an example procedure 4400 to regulate communications between networks of a different type on a vehicle is schematically depicted. The example procedure 4400 includes an operation 4302 to interpret a policy including a network regulation description, and an operation 4402 to receive a policy communication from an external device. The procedure 4400 includes an operation 4404 to determine whether the policy is verified—for example if the external device is authorized to update the policy, if the system is capable to perform according to the policy, if the policy violates any security criteria, if the performance of the policy would exceed a data storage limit or a communication limit, etc. In response to operation 4404 indicating YES, the procedure 4400 includes an operation 4406 to store and/or update the policy, and the operation 4304 to regulate communications between end points of a first network and end points of a second network in response to the network regulation description. In response to operation 4404 indicating NO, the procedure 4400 optionally includes an operation 4408 to provide a notification to the external device (and/or to other external devices), and the operation 4304 to regulate communications between end points of a first network and end points of a second network in response to the network regulation description (e.g., utilizing the previous policy, a default policy, or the like).

Figure 45:
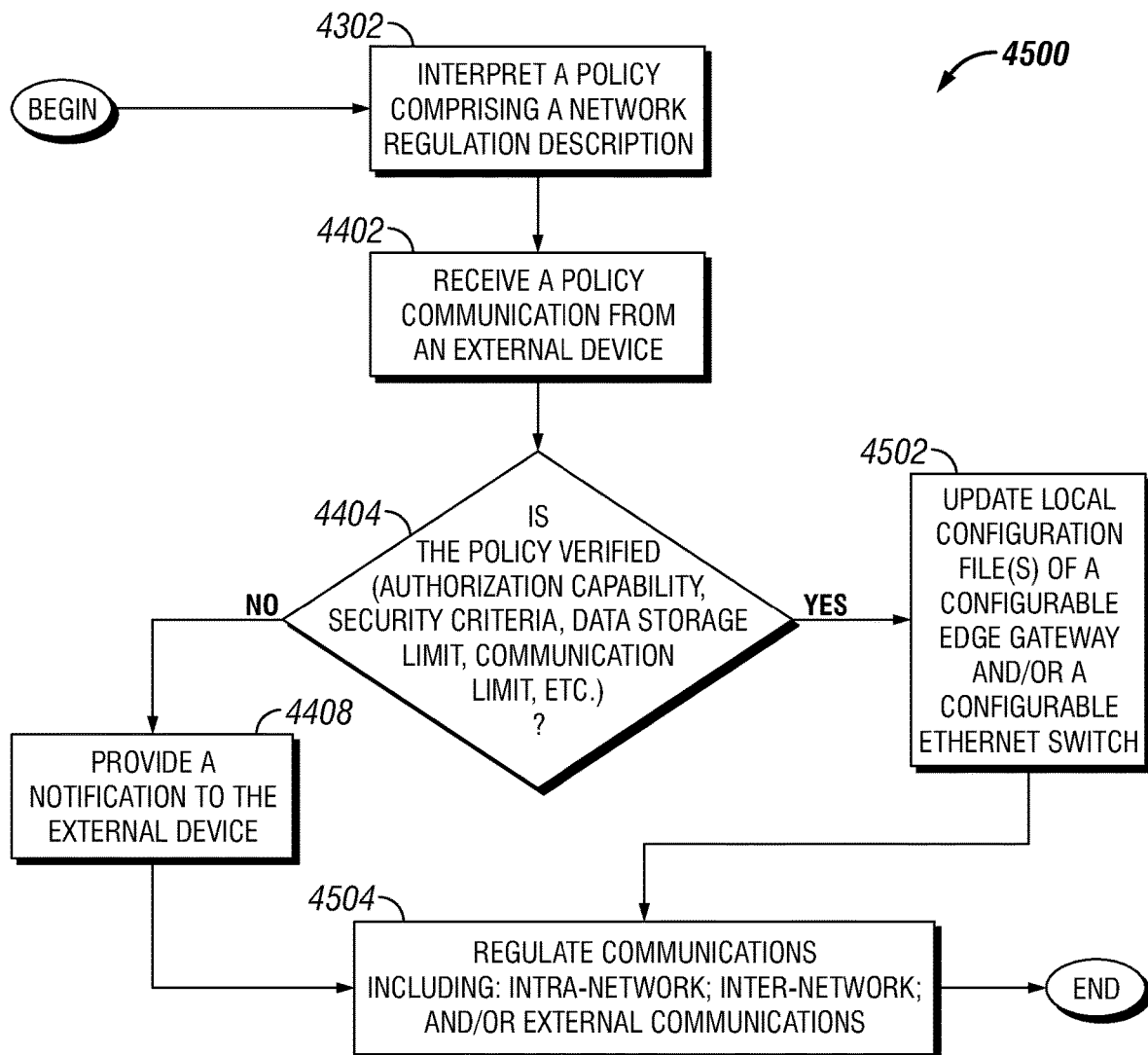
FIG. 45 is a schematic flow diagram depicting an example procedure for regulating communications of a vehicle.

Referencing FIG. 45, an example procedure 4500 to regulate communications between networks of a different type on a vehicle is schematically depicted. The example procedure 4500 includes an operation 4302 to interpret a policy including a network regulation description, and an operation 4402 to receive a policy communication from an external device. The procedure 4500 includes an operation 4404 to determine whether the policy is verified—for example if the external device is authorized to update the policy, if the system is capable to perform according to the policy, if the policy violates any security criteria, if the performance of the policy would exceed a data storage limit or a communication limit, etc. In response to operation 4404 indicating YES, the procedure 4500 includes an operation 4502 to update local configuration files of one or more of: a network interface circuit, a CEG, a CES, and/or gateway interface circuit. In response to operation 4404 indicating NO, the procedure 4500 optionally includes an operation 4408 to provide a notification to the external device (and/or to other external devices). The procedure 4500 includes an operation 4504 to regulate intra-network, inter-network, and/or external communications, using the network interface circuit(s), CEG(s), CES(s), and/or gateway interface circuit(s) (e.g., whether updated or not).

Figure 46:
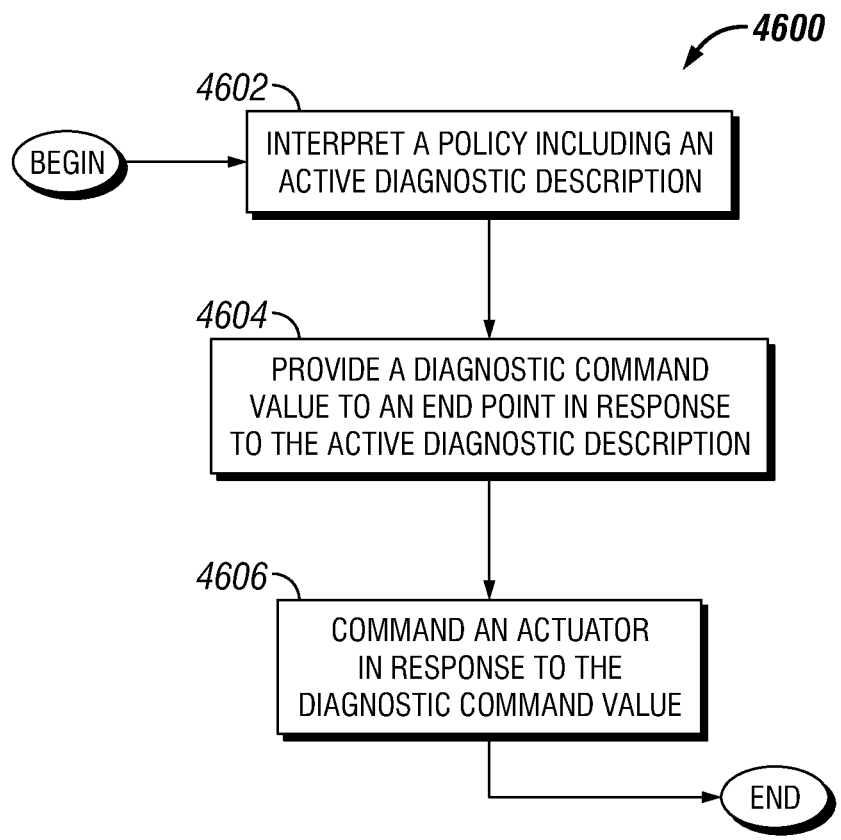
FIG. 46 is a schematic flow diagram depicting an example procedure for regulating communications of a vehicle.

Referencing FIG. 46, an example procedure 4600 to command an actuator in response to a diagnostic command value is schematically depicted. The example procedure 4600 includes an operation 4602 to interpret a policy including an active diagnostic description, an operation 4604 to provide a diagnostic command value to an end point in response to the active diagnostic condition, and an operation 4606 to command an actuator in response to the diagnostic command value.

Figure 47:
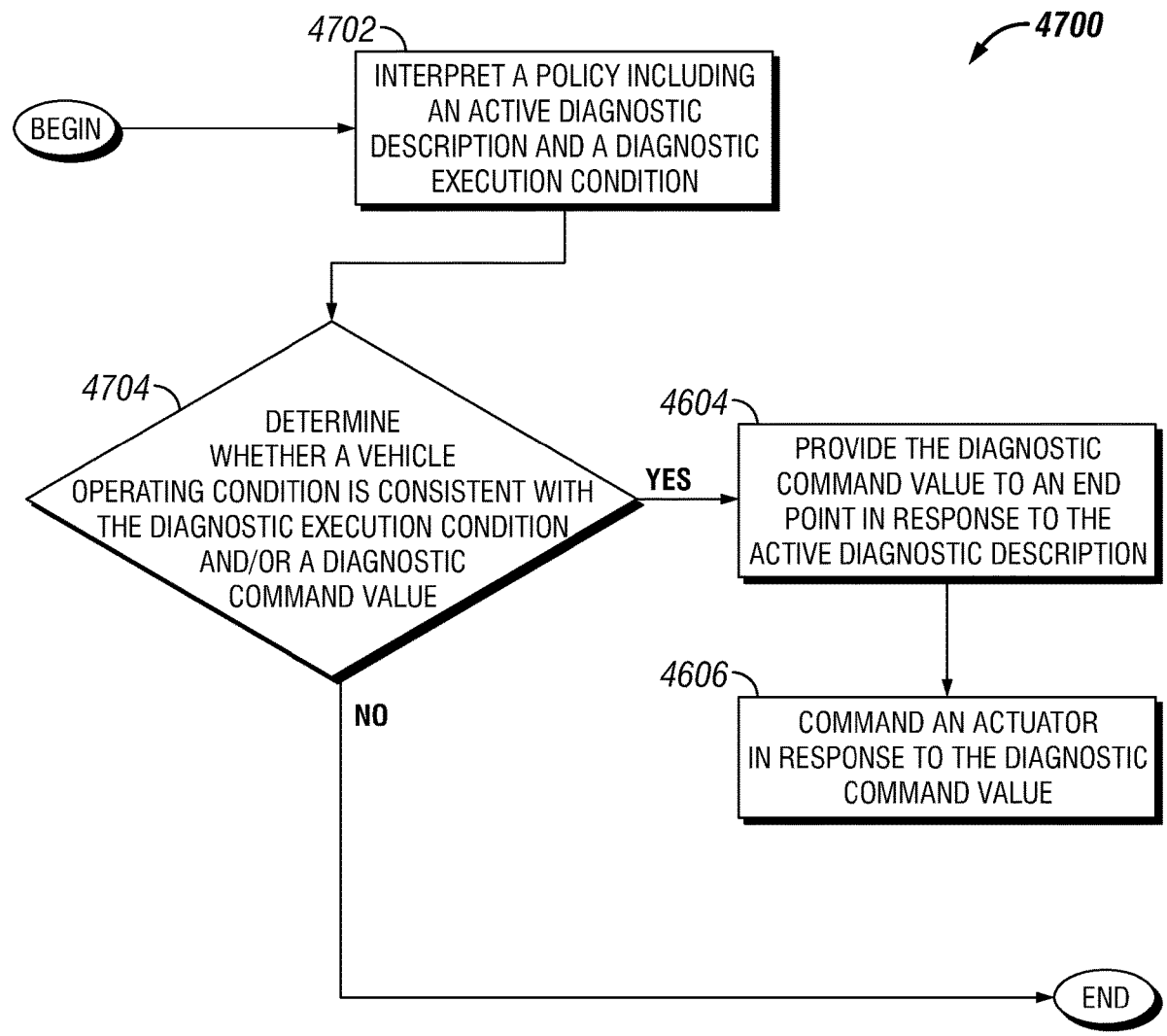
FIG. 47 is a schematic flow diagram depicting an example procedure for regulating communications of a vehicle.

Referencing FIG. 47, an example procedure 4700 to command an actuator in response to a diagnostic command value is schematically depicted. The example procedure 4700 includes an operation 4702 to interpret a policy including an active diagnostic description and a diagnostic execution condition, and an operation 4704 to determine whether a vehicle operating condition is consistent with the diagnostic execution condition and/or a diagnostic command value (e.g., determined from the active diagnostic description). In response to the operation 4704 determining YES, the procedure 4700 includes an operation 4604 to provide a diagnostic command value to an end point in response to the active diagnostic condition, and an operation 4606 to command an actuator in response to the diagnostic command value.

Figure 48:
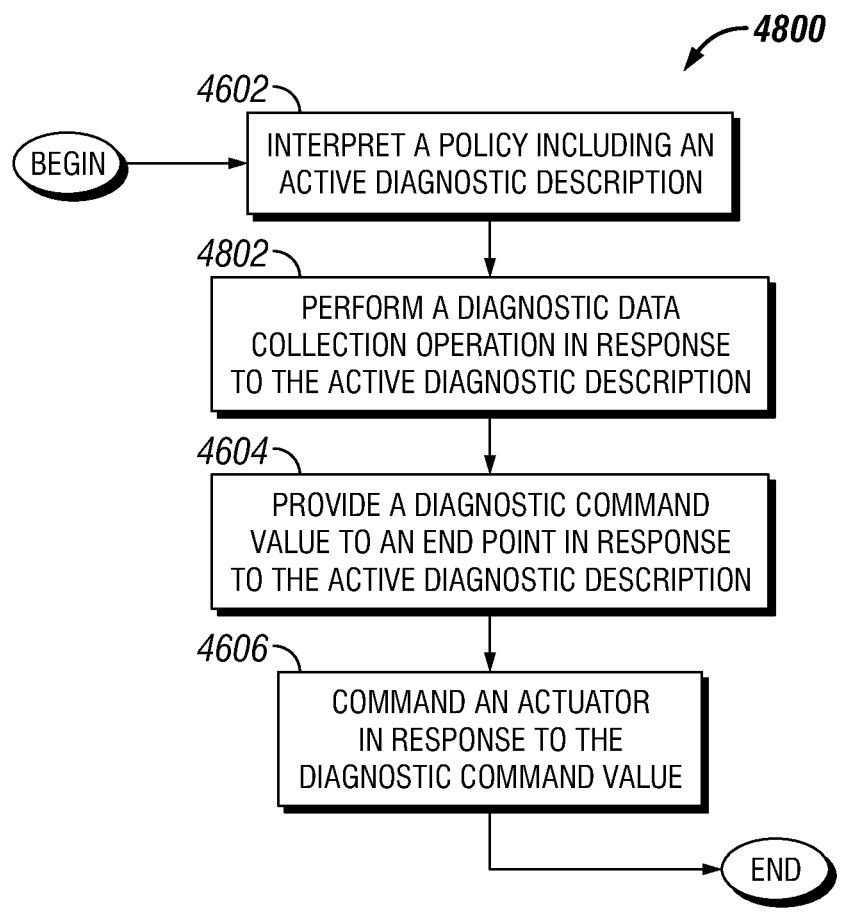
FIG. 48 is a schematic flow diagram depicting an example procedure for regulating communications of a vehicle.

Referencing FIG. 48, an example procedure 4800 to command an actuator in response to a diagnostic command value is schematically depicted. The example procedure 4800 includes an operation 4602 to interpret a policy including an active diagnostic description, and an operation 4802 to perform a diagnostic data collection operation in response to the active diagnostic description. The example procedure 4800 further includes an operation 4604 to provide a diagnostic command value to an end point in response to the active diagnostic condition, and an operation 4606 to command an actuator in response to the diagnostic command value.

Figure 49:
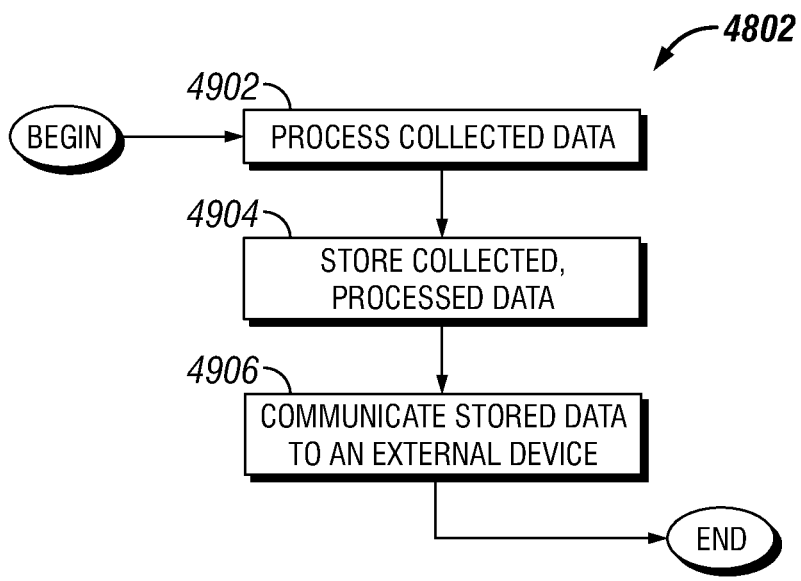
FIG. 49 is a schematic flow diagram depicting an example procedure for regulating communications of a vehicle.

Referencing FIG. 49, an example procedure 4802 to perform a diagnostic data collection operation is schematically depicted. The example procedure 4802 includes an operation 4902 to process collected data (e.g., processing a payload and/or frame information of messages of the collected data), an operation 4904 to store the collected, processed data, and an operation 4906 to communicate at least a portion of the stored data to an external device.

Figure 50:
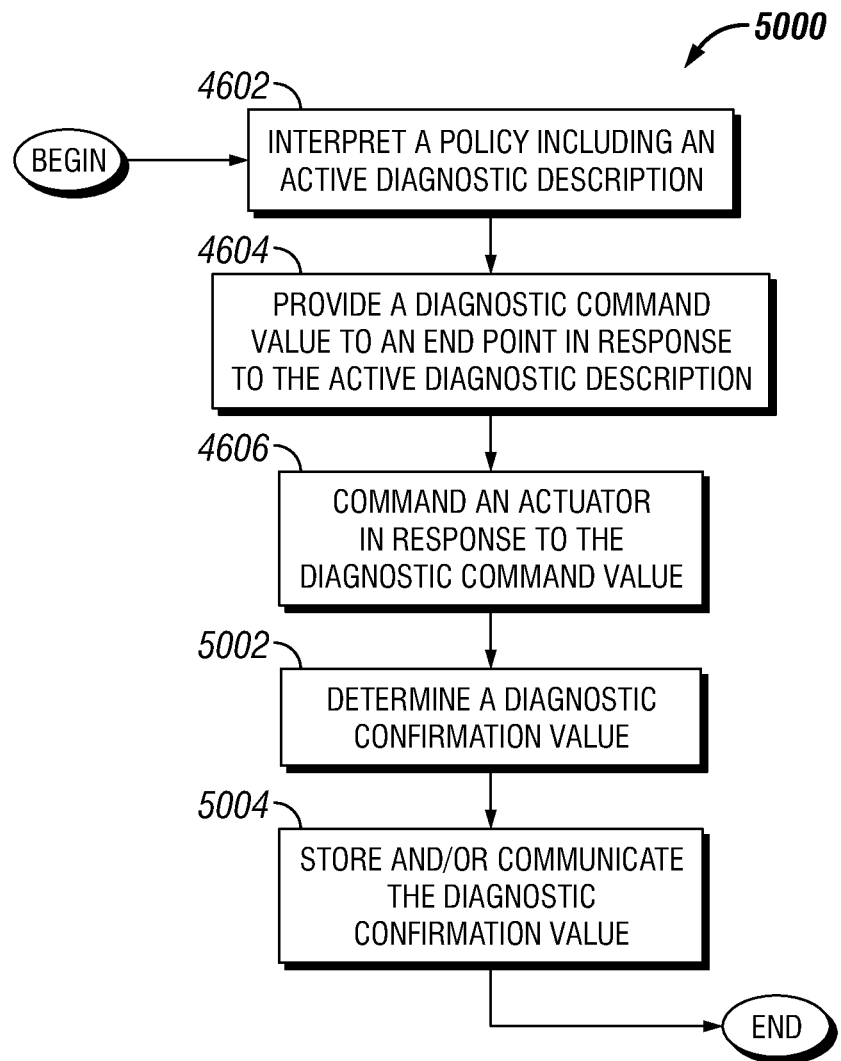
FIG. 50 is a schematic flow diagram depicting an example procedure for regulating communications of a vehicle.

Referencing FIG. 50, an example procedure 5000 to store and/or communicate a diagnostic confirmation value is schematically depicted. The example procedure 5000 includes an operation 4602 to interpret a policy including an active diagnostic description, an operation 4604 to provide a diagnostic command value to an end point in response to the active diagnostic condition, and an operation 4606 to command an actuator in response to the diagnostic command value. The example procedure 5000 further includes an operation 5002 to determine a diagnostic confirmation value, and an operation 5004 to store and/or communicate the diagnostic confirmation value to one or more external devices.

Figure 51:
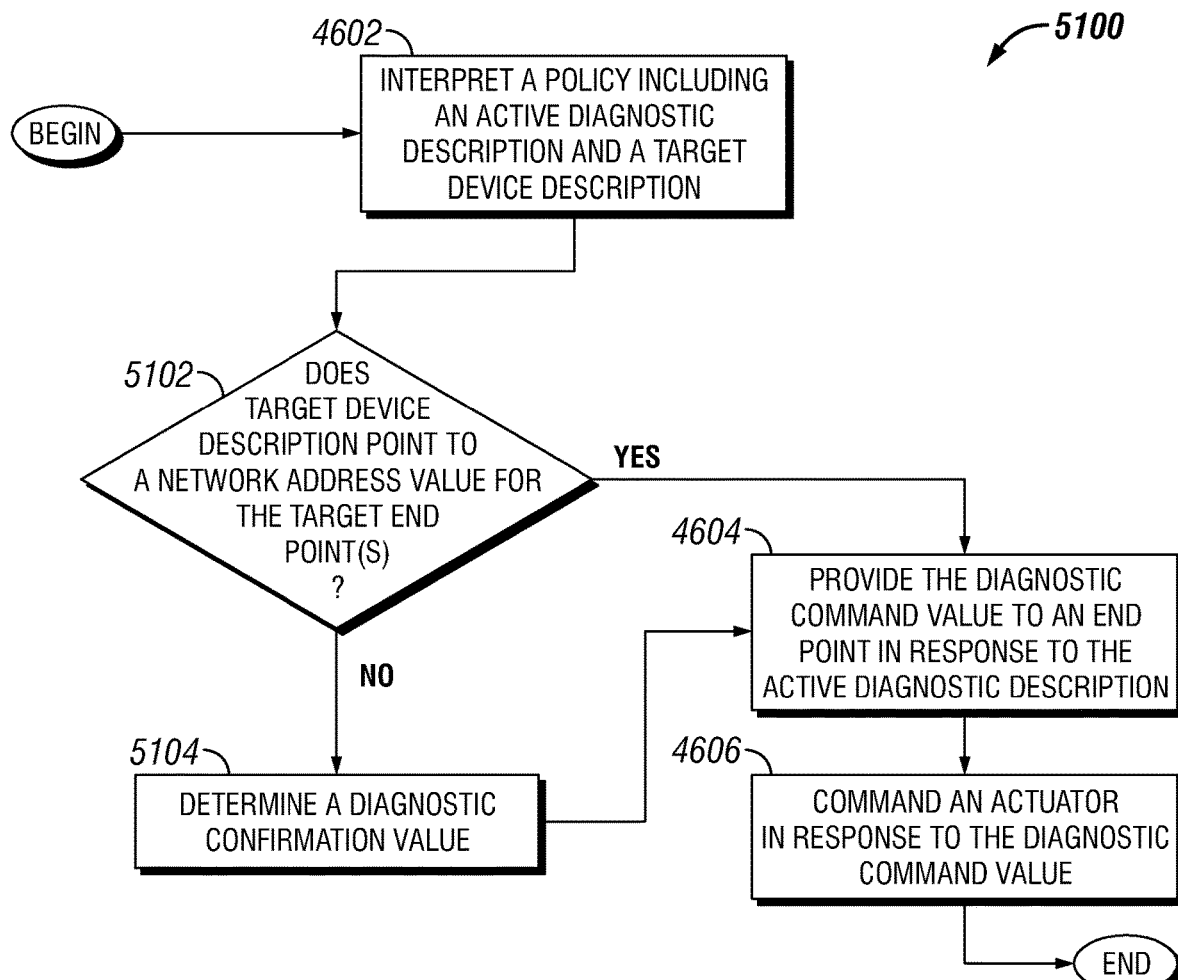
FIG. 51 is a schematic flow diagram depicting an example procedure for regulating communications of a vehicle.

Referencing FIG. 51, an example procedure 5100 to command an actuator in response to a diagnostic command value is schematically depicted. In addition to operations recited in relation to FIG. 46 preceding, the example procedure 5100 includes an operation 5102 to determine whether a target device description points to a network address value for the target end point(s) related to a commanded actuator (e.g., if the target device description does not point to a network address value, or points to an incorrect network address value, then operation 5102 determines NO). In response to operation 5102 determining YES, the procedure 5100 proceeds to operation 4604. In response to operation 5102 determining YES, the procedure 5100 includes an operation 5104 to supply or adjust a network address value for the target end point(s), and then to operation 4604.

Figure 52:
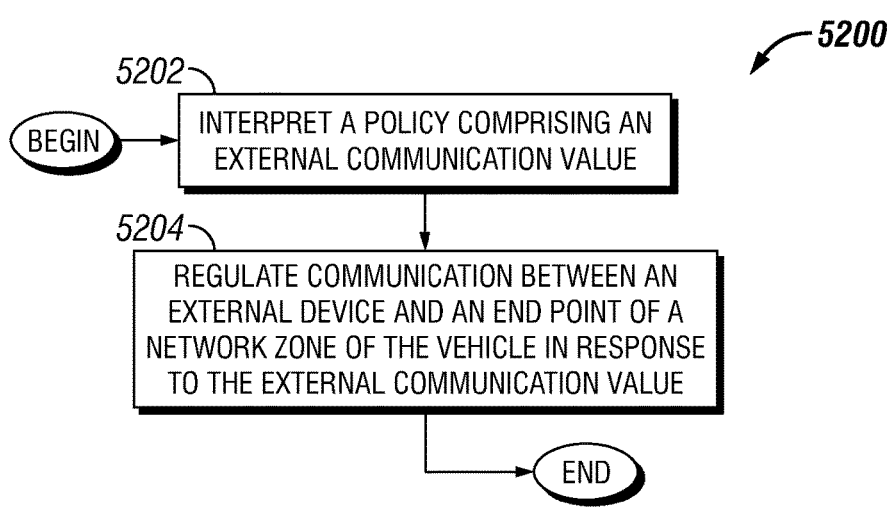
FIG. 52 is a schematic flow diagram depicting an example procedure for regulating communications of a vehicle.

Referencing FIG. 52, an example procedure 5200 to regulate communications between an external device and an end point of a network zone for a vehicle is schematically depicted. The example procedure 5200 includes an operation 5202 to interpret a policy including an external communication value, and an operation 5204 to regulate communications between the end point(s) of the network zone(s) and the external device in response to the external communication value.

Figure 53:
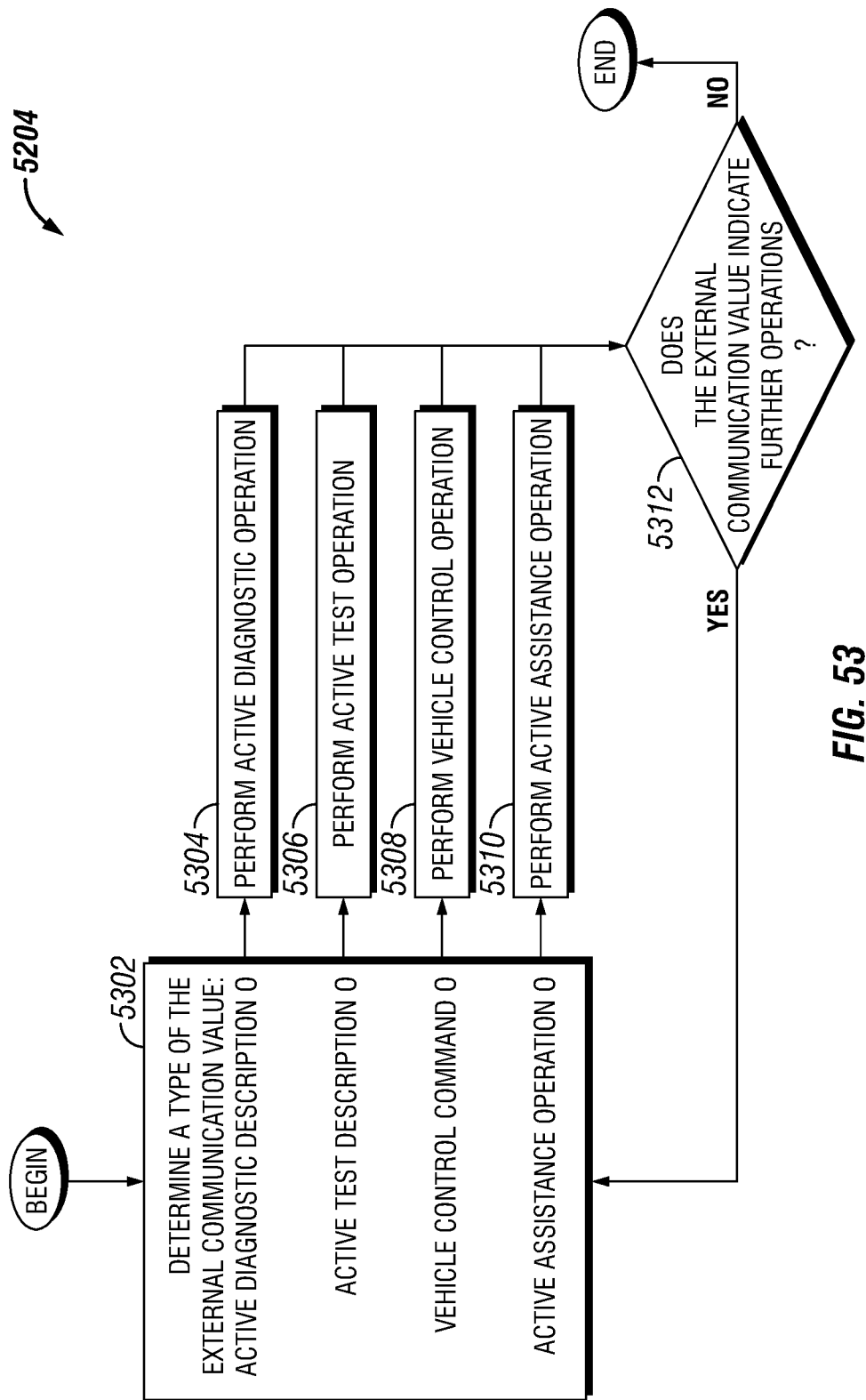
FIG. 53 is a schematic flow diagram depicting an example procedure for regulating communications of a vehicle.

Referencing FIG. 53, an example procedure 5204 to regulate communications between an external device and an end point of a network zone for a vehicle is schematically depicted. The example procedure 5204 includes an operation 5302 to determine a type of the external communication value. In response to operation 5302 determining the type as an active diagnostic description, the procedure 5204 includes an operation 5304 to perform an active diagnostic operation. In response to operation 5302 determining the type as an active test description, the procedure 5204 includes an operation 5306 to perform an active test operation. In response to operation 5302 determining the type as a vehicle control command, the procedure 5204 includes an operation 5308 to perform a vehicle control operation. In response to operation 5302 determining the type as an active assistance operation, the procedure 5204 includes an operation 5310 to perform an active assistance operation. Example and non-limiting operations 5310 include one or more of: a service personnel contacting an operator of the vehicle, the service personnel commanding a specified active diagnostic operation 5304, the service personnel commanding a specified active test operation 5306, and/or the service personnel commanding a specified vehicle control operation 5308. The example procedure 5204 further includes an operation 5312 to determine if the external communication value indicates further operations, and in response to operation 5312 indicating YES, the procedure 5204 includes returning to operation 5302.

Figure 54:
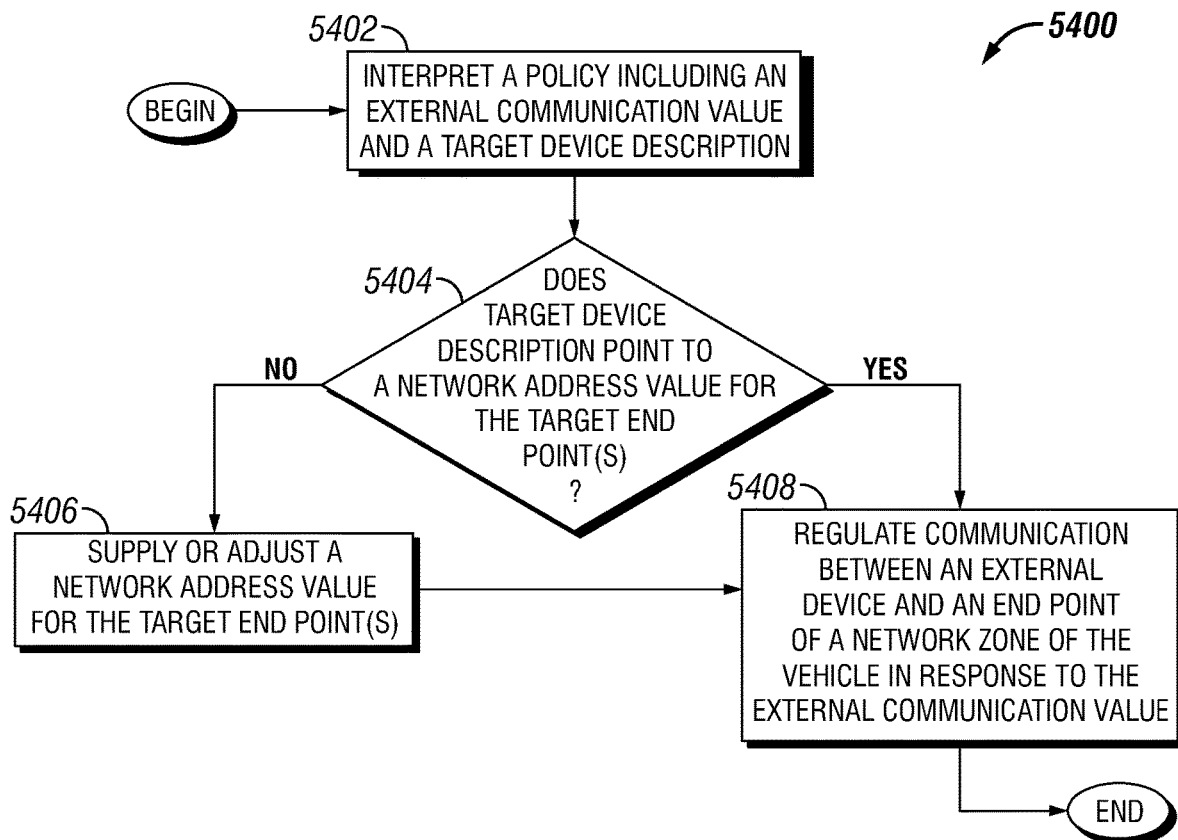
FIG. 54 is a schematic flow diagram depicting an example procedure for regulating communications of a vehicle.

Referencing FIG. 54, an example procedure 5400 to regulate communications between an external device and an end point of a network zone for a vehicle is schematically depicted. The example procedure 5400 includes an operation 5402 to interpret a policy including an external communication value and a target device description. The example procedure 5400 further includes an operation 5404 to determine whether the target device description points to a network address value for the target end point(s). In response to operation 5404 determining YES, the example procedure 5400 includes an operation 5408 to regulate communications between the external device and end point(s) of network zone(s) in response to the external communication value. In response to operation 5404 determining NO, the example procedure 5400 includes an operation 5406 to supply or adjust a network address value for the target end point(s), and operation 5408.

Figure 55:
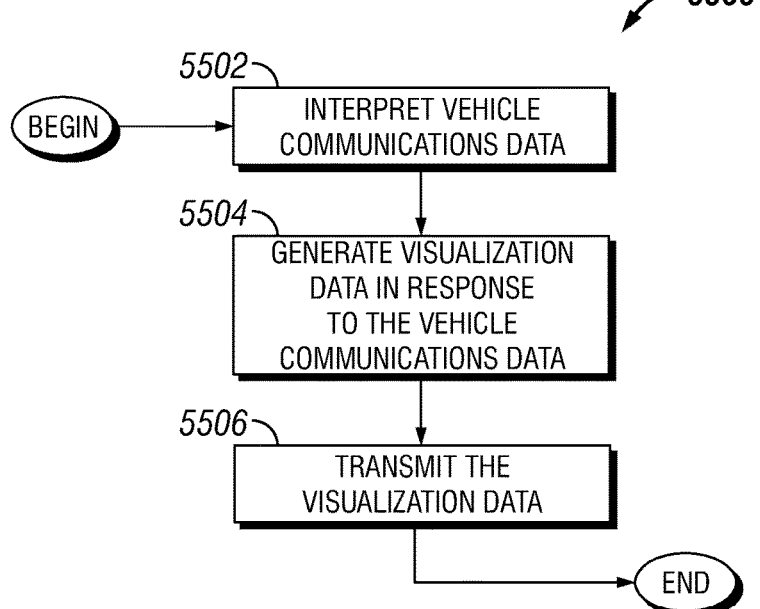
FIG. 55 is a schematic flow diagram depicting an example procedure for regulating communications of a vehicle.

Referencing FIG. 55, an example procedure 5500 to transmit visualization data is schematically depicted. The example procedure 5500 includes an operation 5502 to interpret vehicle communications data, an operation 5504 to generate visualization data in response to the vehicle communications data, and an operation 5506 to transmit the visualization data.

Referencing FIG. 56, an example procedure 5600 to transmit visualization data is schematically depicted. The example procedure 5600 includes an operation 5502 to interpret vehicle communications data, an operation 5602 to interpret a data filtering value, and an operation 5604 to filter at least a portion of the vehicle communications data based, at least in part, on the data filtering value. The example procedure 5600 further includes an operation 5504 to generate visualization data in response to the vehicle communications data, and an operation 5506 to transmit the visualization data.

Referencing FIG. 57, an example procedure 5700 to regulate inter-network, intra-network, and/or extra-vehicle communications is schematically depicted. The example procedure 5700 includes an operation 5702 to interpret a policy including a network regulation description, an operation 5704 to configure network interface circuit(s) in response to the network regulation description, and an operation 5706 to regulate inter-network communications and/or intra-network communications using the configured network interface circuit(s). The example procedure 5700 further includes an operation 5708 to configure a gatekeeper interface circuit in response to the network regulation description, and an operation 5710 to regulate extra-vehicle communications using the configured gatekeeper interface circuit.

Figure 58:
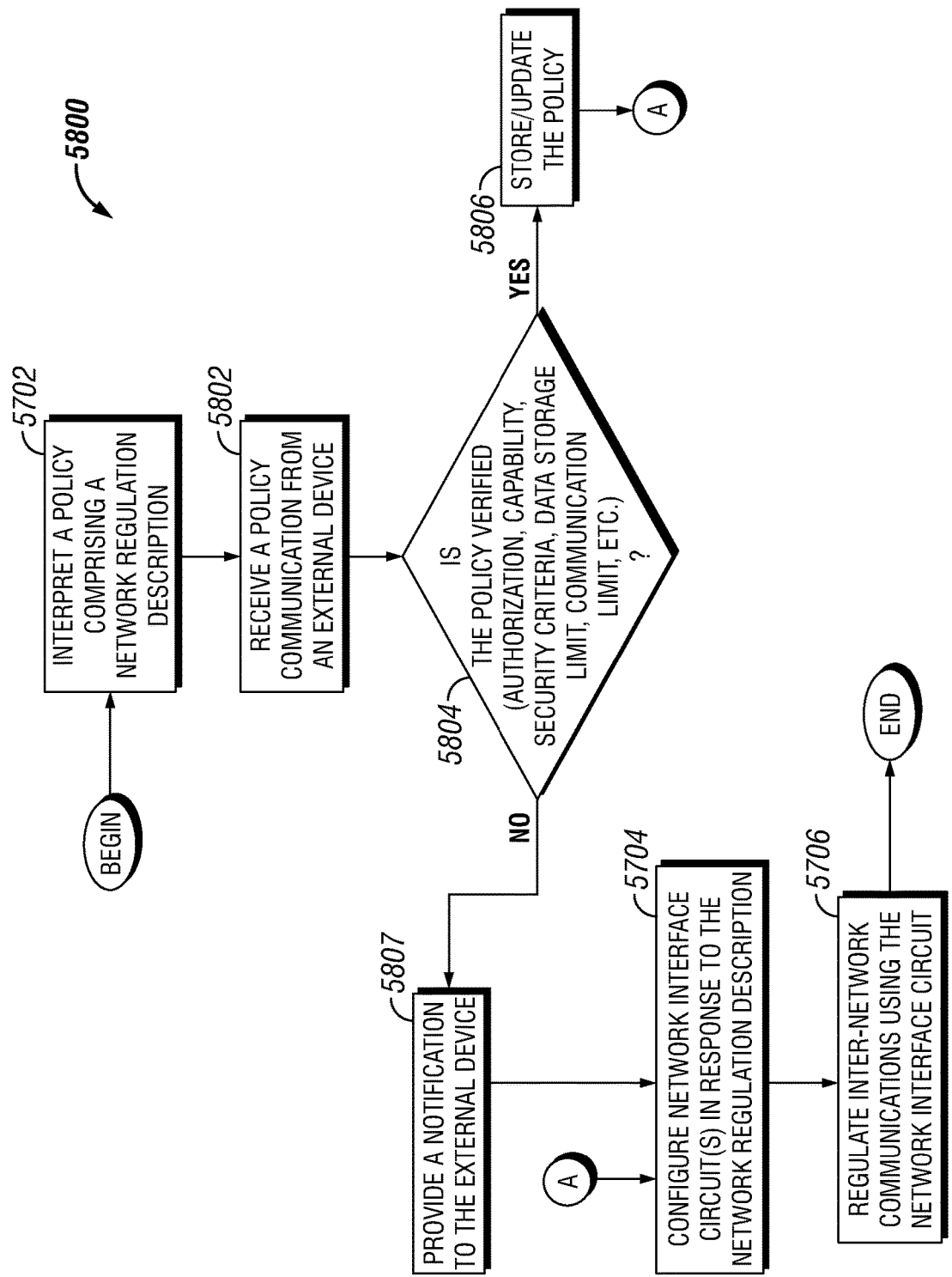
FIG. 58 is a schematic flow diagram depicting an example procedure for regulating communications of a vehicle.

Referencing FIG. 58, an example procedure 5800 to regulate inter-network, intra-network, and/or extra-vehicle communications is schematically depicted. In addition to operations depicted in relation to procedure 5700, the example procedure 5800 includes an operation 5802 to receive a policy communication from an external device, and an operation 5804 to determine whether the policy is verified—for example if the external device is authorized to update the policy, if the system is capable to perform according to the policy, if the policy violates any security criteria, if the performance of the policy would exceed a data storage limit or a communication limit, etc. In response to operation 5804 determining YES, the example procedure includes operation 5806 to store and/or update the policy, and operations 5704 (which may further include configuring the gatekeeper interface circuit), operation 5706 (and/or operation 5710). In response to operation 5804 determining NO, the example procedure 5800 optionally includes an operation 5807 to provide a notification to one or more external devices, and proceeds to operation 5704.

Referencing FIG. 59, an example procedure 5900 to regulate extra-vehicle communications is schematically depicted. The example procedure 5900 includes an operation 5902 to interpret a policy including a network usage permission description and/or an external data access description, an operation 5904 to configure network interface circuit(s) in response to the network usage permission description, and an operation 5906 to regulate intra-network and/or inter-network communications using the network interface circuit(s). The example procedure 5900 includes an operation 5908 to configure a gatekeeper interface circuit in response to external data access description, and an operation 5910 to regulate extra-vehicle communications using the gatekeeper interface circuit.

Referencing FIG. 60 an example procedure 6000 to regulate inter-network, intra-network, and/or extra-vehicle communications is schematically depicted. The example procedure 6000 includes an operation 6002 to determine an authorization for a local communicating device for a regulated communication, an operation 6004 to configure network interface circuit(s) and/or a gatekeeper interface circuit in response to the authorization, and an operation 6006 to regulate intra-network, inter-network, and/or extra-vehicle communications using the network interface circuit(s) and/or gatekeeper interface circuit.

Figure 61:
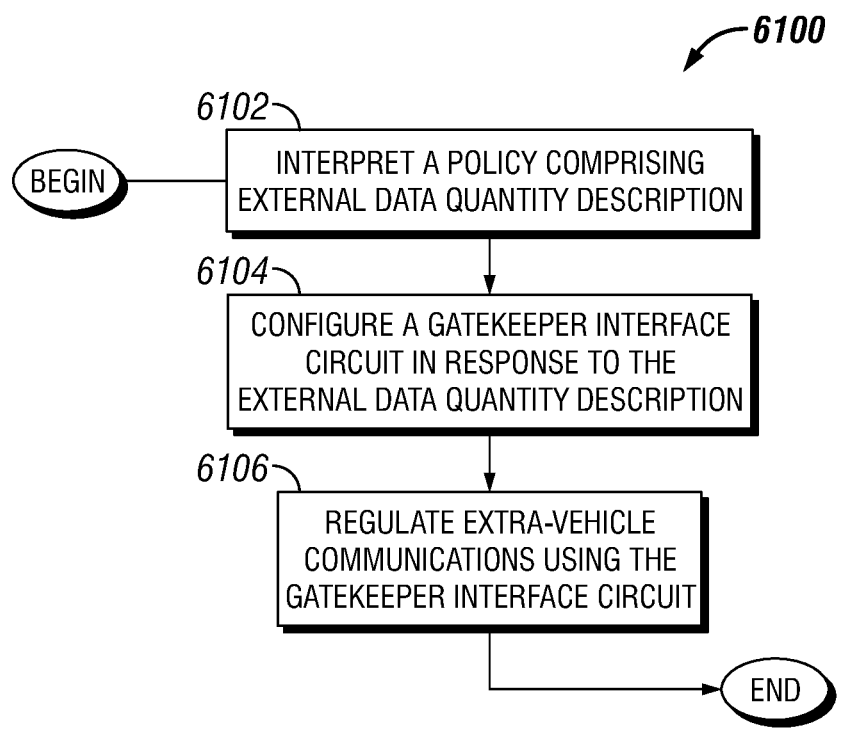
FIG. 61 is a schematic flow diagram depicting an example procedure for regulating communications of a vehicle.

Referencing FIG. 61 an example procedure 6100 to regulate extra-vehicle communications is schematically depicted. The example procedure 6100 includes an operation 6102 to interpret a policy including an external data quantity description, an operation 6104 to configure a gatekeeper interface circuit in response to the external data quantity description, and an operation 6106 to regulate extra-vehicle communications using the gatekeeper interface circuit.

Figure 62:
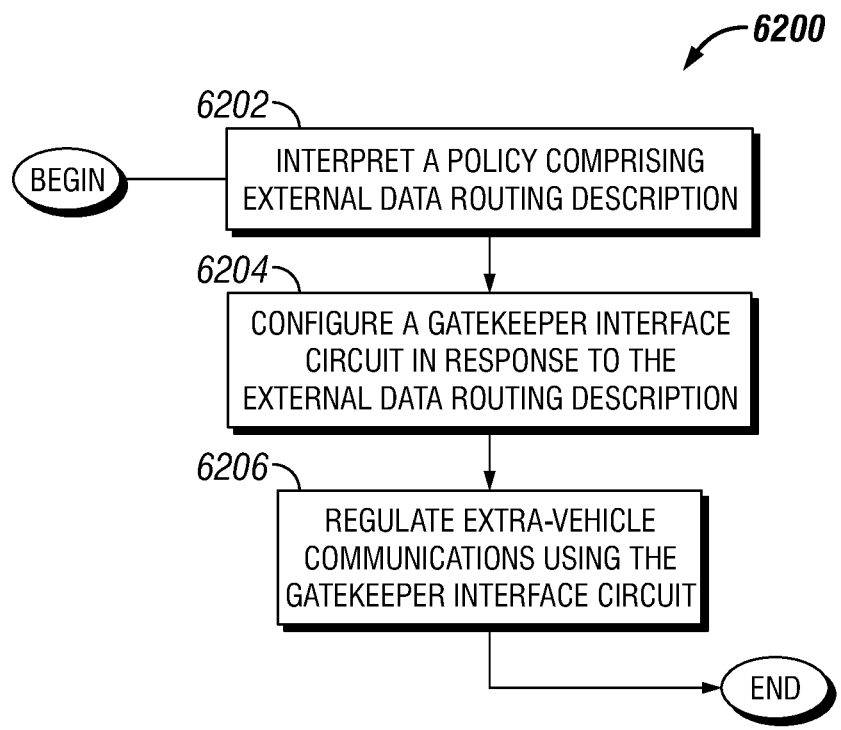
FIG. 62 is a schematic flow diagram depicting an example procedure for regulating communications of a vehicle.

Referencing FIG. 62 an example procedure 6200 to regulate extra-vehicle communications is schematically depicted. The example procedure 6200 includes an operation 6202 to interpret a policy including an external data routing description, an operation 6204 to configure a gatekeeper interface circuit in response to the external data routing description, and an operation 6206 to regulate extra-vehicle communications using the gatekeeper interface circuit.

Figure 63:
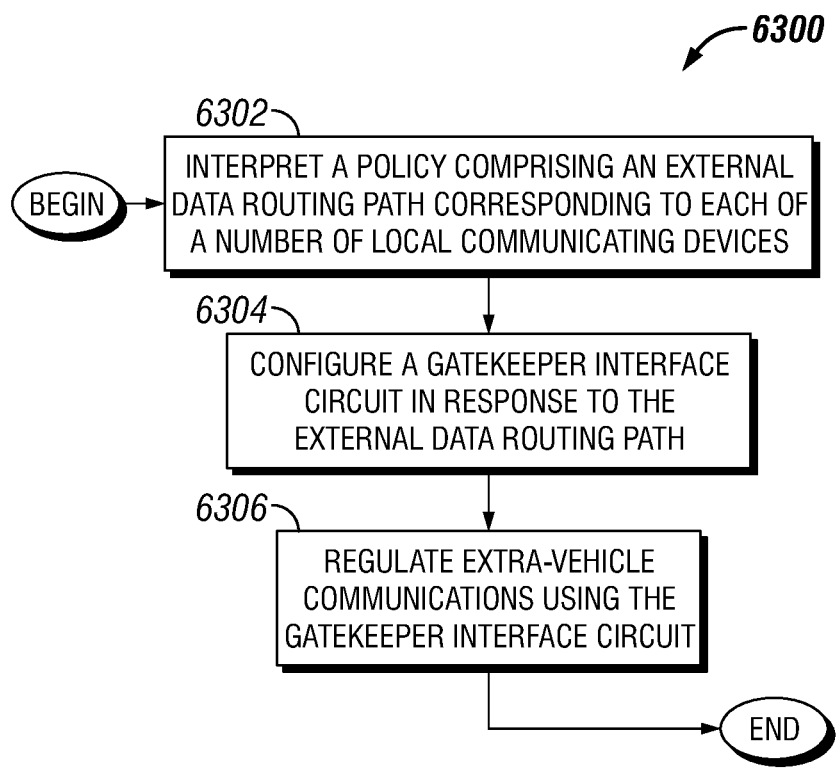
FIG. 63 is a schematic flow diagram depicting an example procedure for regulating communications of a vehicle.

Referencing FIG. 63 an example procedure 6300 to regulate extra-vehicle communications is schematically depicted. The example procedure 6300 includes an operation 6302 to interpret a policy including an external data routing path corresponding to each of a number of local communicating devices, an operation 6304 to configure a gatekeeper interface circuit in response to the external data routing path, and an operation 6306 to regulate extra-vehicle communications using the gatekeeper interface circuit.

Figure 64:
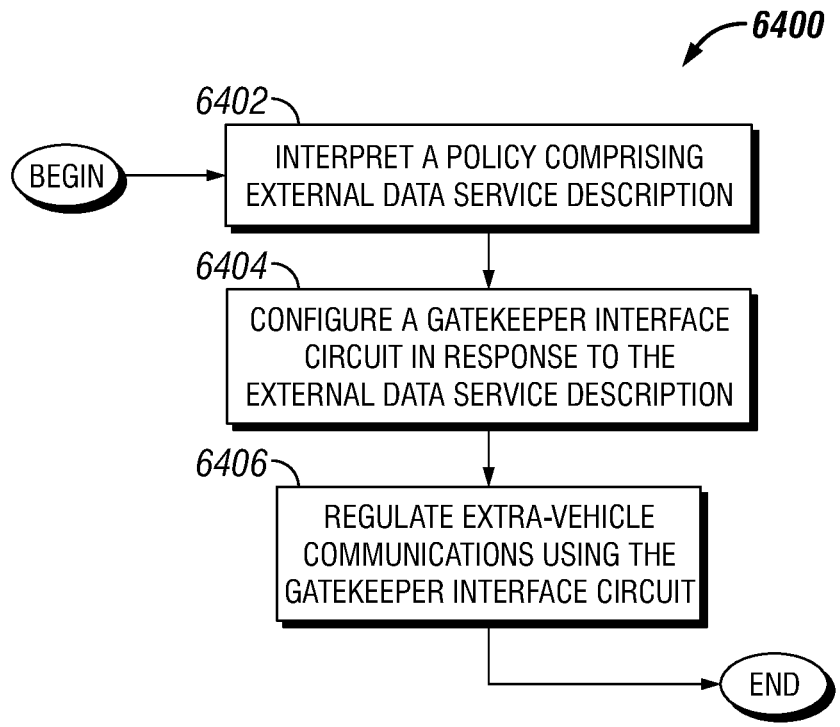
FIG. 64 is a schematic flow diagram depicting an example procedure for regulating communications of a vehicle.

Referencing FIG. 64 an example procedure 6400 to regulate extra-vehicle communications is schematically depicted. The example procedure 6400 includes an operation 6402 to interpret a policy including an external data service description, an operation 6404 to configure a gatekeeper interface circuit in response to the external data service description, and an operation 6406 to regulate extra-vehicle communications using the gatekeeper interface circuit.

Figure 65:
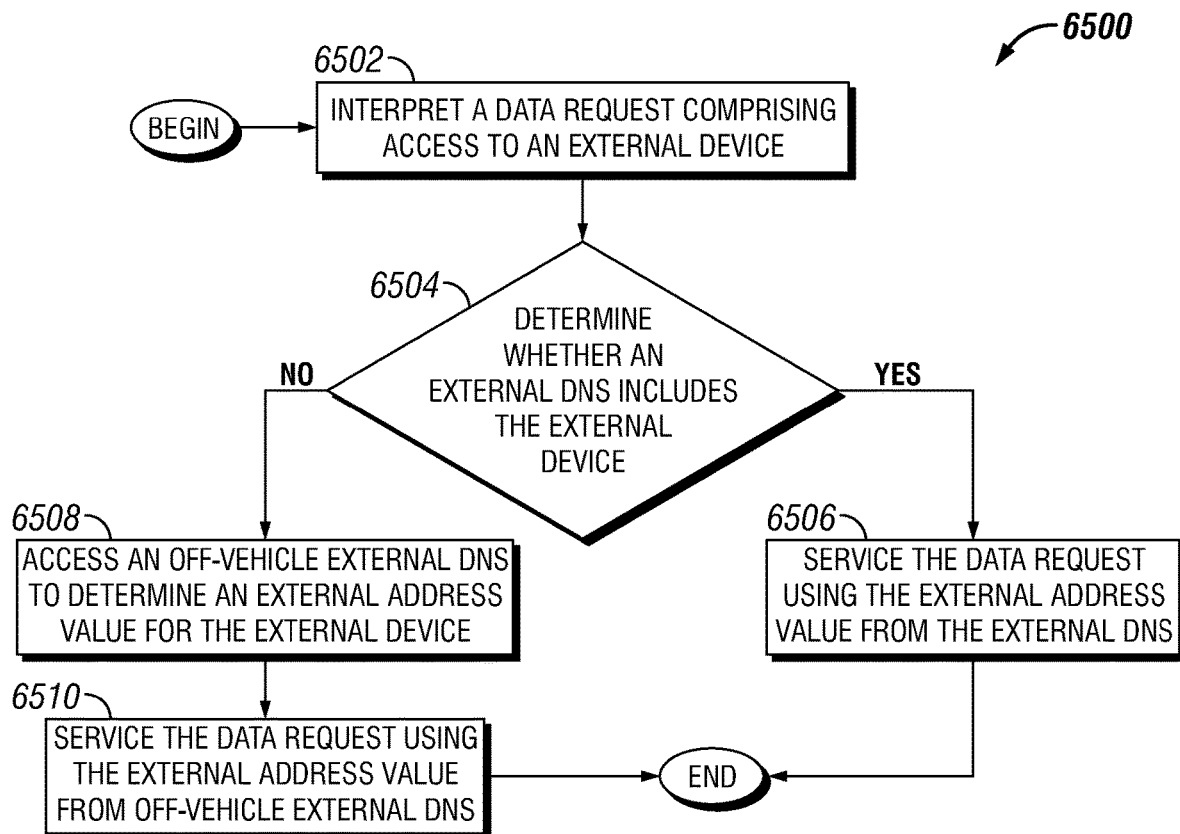
FIG. 65 is a schematic flow diagram depicting an example procedure for regulating communications of a vehicle.

Referencing FIG. 65 an example procedure 6500 to service a data request including access to an external device is schematically depicted. The example procedure 6500 includes an operation 6502 to interpret a data request including access to an external device, and an operation 6504 to determine whether an external DNS includes the external device. In response to operation 6504 determining YES, the example procedure 6500 includes an operation 6506 to service the data request using the external address value from the external DNS. In response to operation 6504 determining NO, the example procedure 6500 includes an operation 6508 to access an off-vehicle external DNS to determine an external address value for the external device, and an operation 6510 to service the data request using the external address value from the off-vehicle external DNS.

Figure 66:
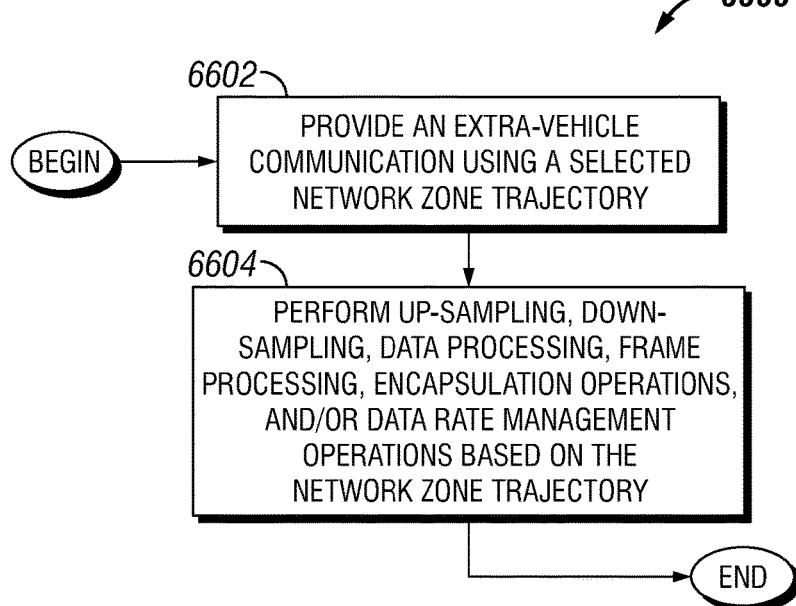
FIG. 66 is a schematic flow diagram depicting an example procedure for regulating communications of a vehicle.

Referencing FIG. 66 an example procedure 6600 to provide an extra-vehicle communication using a selected network zone trajectory is schematically depicted. The example procedure includes an operation 6602 to provide an extra-vehicle communication using a selected network zone trajectory, and an operation 6604 to perform data configuration operations on the extra-vehicle communication based on the network zone trajectory. Example operations 6604 include one or more of: up-sampling, down-sampling, data processing, payload processing, frame processing, encapsulation operations, and/or data rate management operations.

Figure 67:
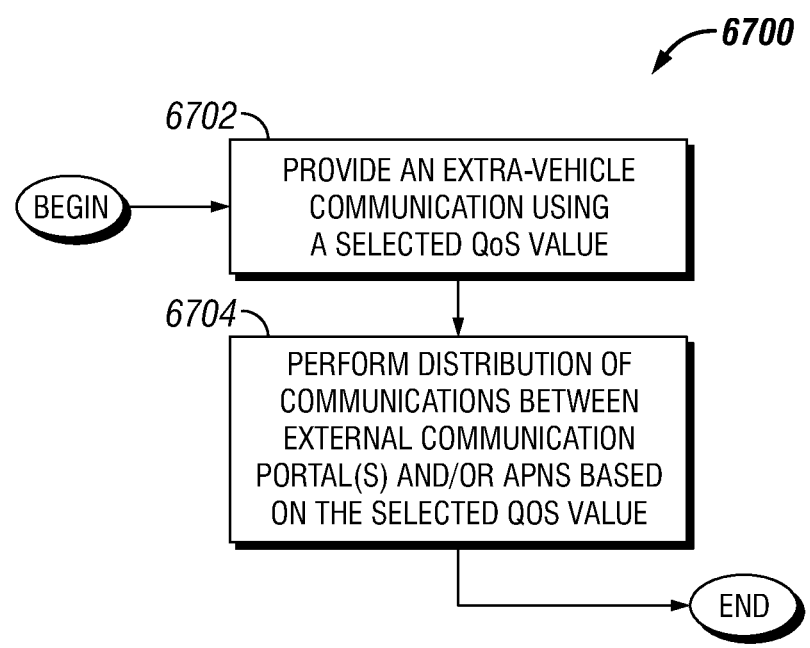
FIG. 67 is a schematic flow diagram depicting an example procedure for regulating communications of a vehicle.

Referencing FIG. 67 an example procedure 6700 to provide extra-vehicle communications using a selected QoS value is schematically depicted. The example procedure 6700 includes an operation 6702 to provide an extra-vehicle communication using a selected QoS value, and an operation 6704 to perform distribution of communications between extra-communication portal(s) and/or APNs based on the QoS value.

Figure 68:
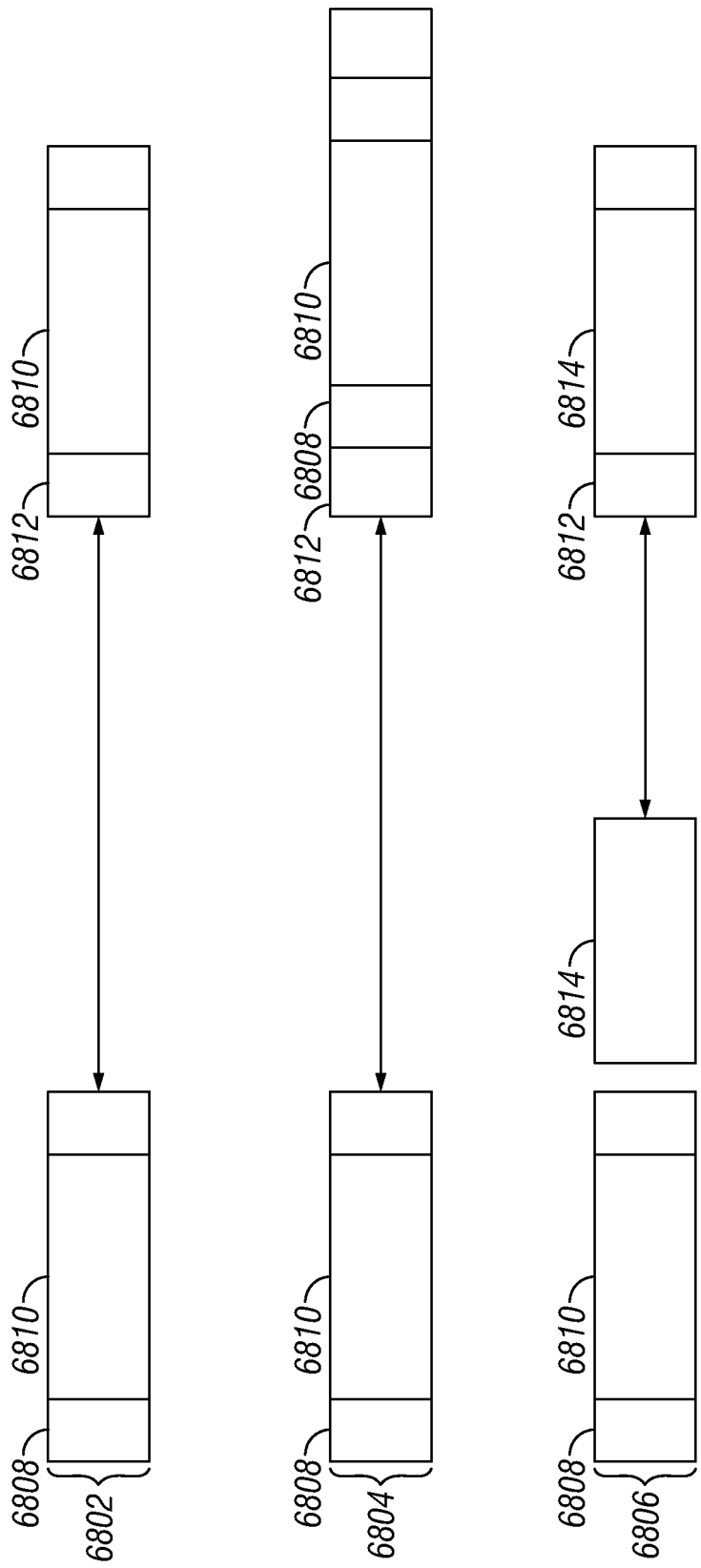
FIG. 68 depicts illustrative operations to process a message.

Referencing FIG. 68, a number of illustrative examples of message translation and/or message encapsulation embodiments are schematically depicted. The examples of FIG. 16 are illustrative to depict certain aspects of the present disclosure, but are non-limiting to the disclosure. In certain embodiments, operations depicted in FIG. 68 may be performed in whole or part by a CEG, a CES, a translation circuit, and/or the CND, and in certain embodiments operations depicted in FIG. 68 may be regulated by the CND. The first example message translation 6802 includes a message from a first network having a payload 6810 and other frame information 6808. The other frame information may include headers, trailing aspects and/or termination bits, and further may be determined by the relevant protocol, network type, source end point, destination end point, or other aspects as known in the art. In certain embodiments, the payload 6810 may be the message data, a data value expressed by the message, or other information considered to be the content of the message. However, in certain embodiments, for certain operations, during certain operating conditions, and/or for certain end points, the payload 6810 may be some other aspect of the message. For example, a network monitoring operation may utilize a time stamp, acknowledgement information, source and/or destination information, or other portions of the message as the payload. The example message translation 6802 includes separating the payload 6810, and packaging the payload into a new frame (or packet) 6812, within information configured for the target network. Additionally or alternatively, the new frame 6812 may include adjustment of an identifier (e.g., a source or destination), a time stamp, or other information allowing end points on disparate networks to be abstracted from knowledge about each other. In certain embodiments, the payload 6810 may be processed, for example to change units utilized, bit depth (e.g., 2 bytes versus 4 bytes), expressed precision, floating point or fixed point conversions, or the like.

The second example message translation 6804 includes the original message 6808, 6810, and is fully encapsulated within a new frame 6812, for example to provide a target end point with the original message as provided by the original source (e.g., allowing a previously developed algorithm to operate as-is, without having to translate to a new message; to allow for certain network monitoring operations utilizing the full original message, etc.). In certain embodiments, either the original payload 6810 or message frame 6808 may be processed, for example processing the payload as described preceding, updating a source identifier, time stamp, or the like to a new convention that is translated to abstract end points from each other, but providing otherwise equivalent or systematically adjusted information.

The third example message translation 6806 includes the original message 6808, 6810, with an adjusted payload 6814. The adjustment to the payload 6814 can include translation of the payload 6814 in some manner (e.g., a corrected value, a virtually sensed or modeled value based on the original payload 6810, an up-sampled or down-sampled payload 6810, or the like), and may additionally or alternatively include processing of the payload. The third example message translation 6806 describes an adjusted payload 6814, although an adjustment may additionally or alternatively be performed on other portions of the message frame 6808. In the third example message, a new frame 6812 is applied for communication to another network.

Figure 69:
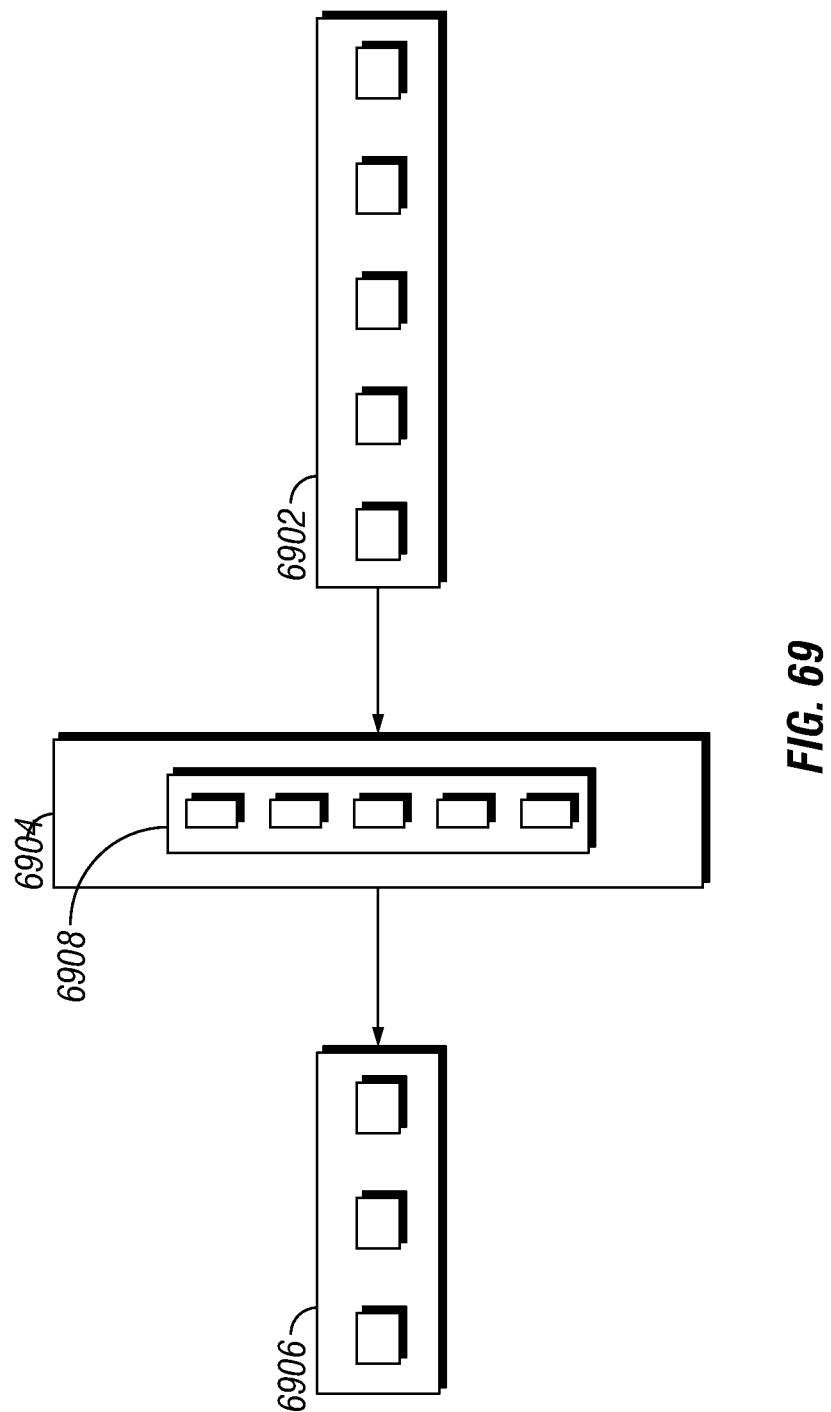
FIG. 69 depicts illustrative operations to down-sample a message.

Referencing FIG. 69, a schematic depiction of an operation to down-sample a sequence of messages 6902 is schematically depicted. In the example of FIG. 69, a message sequence 6902 (e.g., a series of five communications, in the example) is received, for example, at a network interface circuit of one of the network gateway devices. In the example of FIG. 69, the down-sampling operation is responsive to any down-sampling operations described herein, for example to match a receiving end point data rate, to provide the data represented by the messages 6902 at a scheduled rate, to manage bandwidth on a network of the vehicle and/or for extra vehicle communications, to preserve buffer memory, or for any other purpose, including any down sampling operations of the present disclosure. In the example of FIG. 69, the down-sampling device 6904, which may be a translation circuit, network interface circuit, the CND, a circuit associated with the CND, a circuit regulated by the CND, or the like, generates a translated sequence of messages 6908 (e.g., processed as depicted in FIG. 16 and the related disclosure, and/or according to any other message translation and/or message processing operations set forth herein). The example of FIG. 69 depicts the translated sequence of messages 6908 for clarity of the description. However, the translated sequence of messages 6908 may not all be present at the same time, for example as messages are translated and sent they may be removed, deleted, expire from a cache, etc. The sequence of messages 6908 is depicted to illustrate aspects of the present disclosure. Additionally or alternatively, translation of the messages 6908 may be performed after down-sampling operations are performed, for example to reduce utilization of processing resources. For example, some of the messages may be eliminated as a part of the down-sampling before the translation operations (e.g., replacement of frame portions or metadata, encapsulation, processing of the payload and/or frame portions, etc.) are performed. In the example of FIG. 69, a down-sampled sequence of messages 6906 is provided and communicated, for example to a different network gateway device, to a different network of the vehicle from which the first sequence of messages 6902 is received, to an external device (e.g., service tool, cloud server, operator's mobile device, etc.), and/or stored on a memory storage device on the vehicle (e.g., for later data collection operations, as a part of stored vehicle data, etc.). In the example, the five messages of the original sequence 6902 are down-sampled to three messages of the down-sampled sequence 6906. The down-sampling operations can include converting selected messages from the original sequence 6902, for example changing an original 10 ms data stream 6902 to a down-sampled 20 ms data stream 6906 by utilizing every other data message. The down-sampling operations may, additionally or alternatively, include interpolation of data messages between original values. For example, where the original data stream 6902 is a 40 ms data stream, and the down-sampled data stream 6906 is a 100 ms data stream, the down-sampling may include either taking the closest-in-time messages, or performing an interpolation operation (e.g., applying a linear fit, spline fit, polynomial fit, or other interpolation operation for spanning data points), to be utilized as the down-sampled messages 6906.

Spanning data points or values, as utilized herein, indicate data values in the down-sampled messages 6906 that do not align in time with a corresponding original data message 6902. Non-spanning data points or values, as utilized herein, indicate data values in the down-sampled messages 6906 that align in time, or are synchronized, with the corresponding original data message 6902. It will be understood that messages of the original data message 6902 and down-sampled messages 6906 may additionally or alternatively have a phase difference, and accordingly, in certain embodiments, any or all of the original data messages 6902 may be non-spanning messages. In certain embodiments, even where a phase difference between the original data message 6902 and the down-sampled messages 6906 are present, certain messages of the original data messages 6902 may be treated as non-spanning or synchronized data messages, for example to provide a baseline down-sampled message 6906 stream that follows the progression character (e.g., in the time domain) of the original data message 6902 stream, and/or where any phase difference can be ignored for the purpose of devices or operations utilizing the down-sampled message 6906 (e.g., where such devices or operations have a response time, a required reaction time, or the like, that is significantly greater than the magnitude of any such phase difference).

In a further example, synchronized data values (e.g., every $5^{th}$ data value when converting from 40 ms to 100 ms) may be utilized directly, or may also utilize a fitting function (e.g., to provide a smooth, filtered, or otherwise processed stream of data values). In certain embodiments, it may be desirable to utilize actual data values provided from the first data stream 6902 as the down-sampled data values 6906, where minor transient behavior from the different time steps is either not relevant to how the down-sampled data value 6906 is utilized, or where time stamp data is also communicated with the messages and accordingly the differential time steps between messages can be accounted for in processes that utilize the down-sampled data 6906. In certain embodiments, it may be desirable to utilize smoothed data values that simulate the time response behavior of the underlying data, which may be managed utilizing interpolated data for spanning data values (e.g., processes that are responsive to a rate-of-change in the down-sampled data 6906, such as threshold checks on the rate-of-change). In certain embodiments, for example where a downstream process is particularly sensitive to time variation of the data messages 6902 (e.g., a derivative portion of a PID controller), it may be desirable to ensure that all down-sampled data messages 6906 are generated from the same process, and interpolation operations (or smoothing, filtering, or moving average values) may be performed to generate both spanning and non-spanning data values 6906. In certain embodiments, down-sampled data messages 6906 may further include metadata or other embedded information indicating whether the message corresponds directly to an original data message 6902 or is a processed message (e.g., allowing more than one use for the down-sampled data messages 6906, diagnostic operations for a device providing the original data message 6902, and/or for any other purpose).

It can be seen that the down-sampling operations of FIG. 69 allow for communication between devices and/or procedures having differing data rate capabilities, expectations, and/or usage rates of the down-sampled data. Additionally, down-sampling operations of FIG. 69 allow for reduction in network utilization while providing sufficient data for devices and/or procedures to perform the intended functions, and with expected time domain response (e.g., derivative behavior, integrating behavior, step change response, etc.) for proper functionality of devices and procedures that may rely upon the time dynamics of communicated data values. It can be seen that the down-sampling operations of FIG. 69 allow for a progressive updating of communication aspects (e.g., components, devices, procedures, and/or operations each communicatively interacting with a network and/or other components, devices, procedures, and/or operations) of a mobile application having a mixed network configuration and/or a mix of legacy communication aspects (e.g., having a lower data rate capability and/or data rate expectation, and/or distinct network protocols, characteristics, message types, and the like) with updated communication aspects (e.g., having a higher data rate capability and/or data rate expectation, and/or distinct network protocols, characteristics, message types, and the like).

Figure 70:
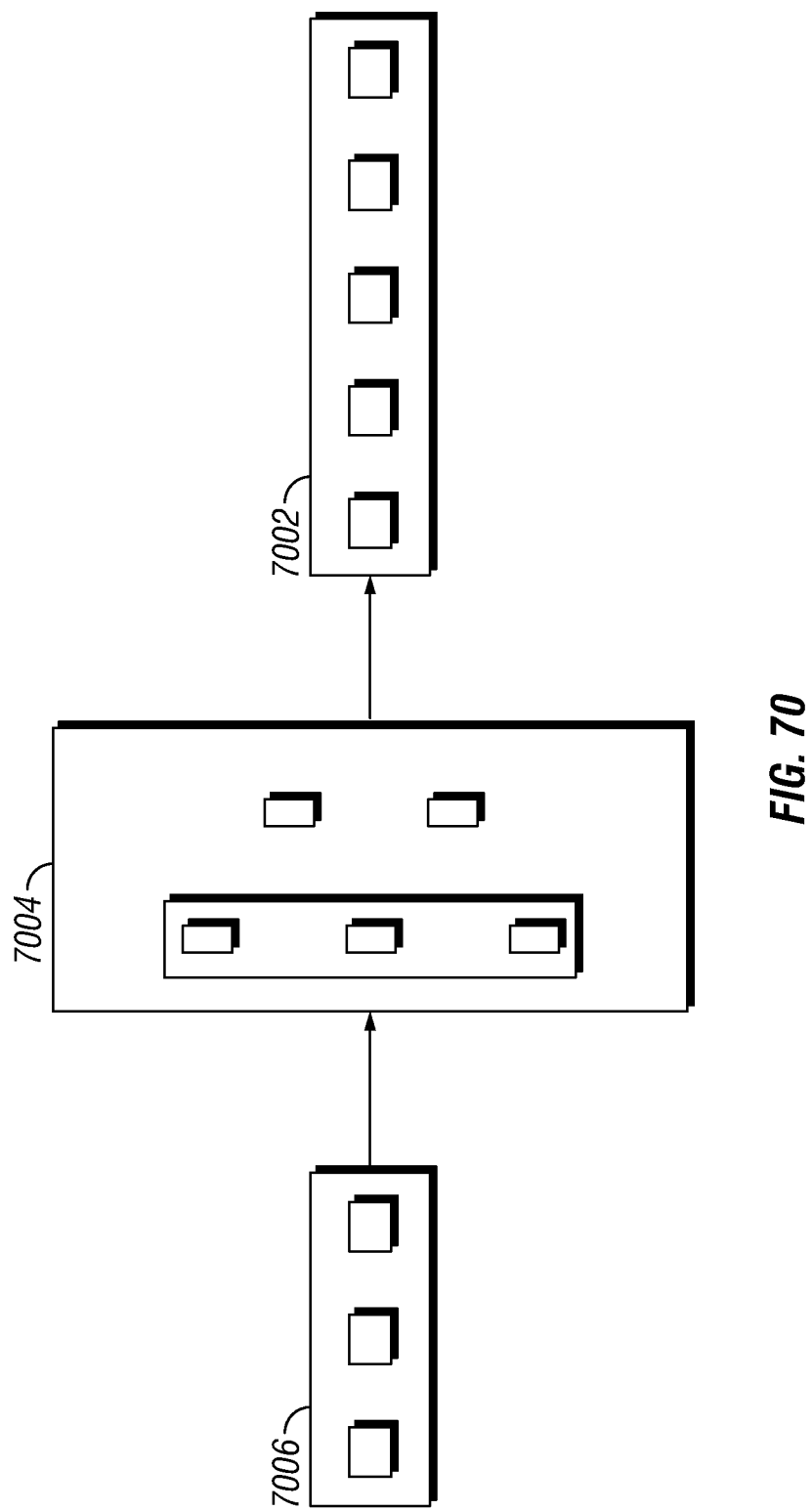
FIG. 70 depicts illustrative operations to up-sample a message.

Referencing FIG. 70, a schematic depiction of an operation to up-sample a sequence of messages 7002 is depicted. In the example of FIG. 70, a message sequence 7006 (e.g., a series of three communications, in the example) is received, for example, at a network interface circuit of one of the network gateway devices. In the example of FIG. 70, the up-sampling operation is responsive to any up-sampling operations described herein, for example to match a receiving end point data rate, to provide the data represented by the messages 7006 at a scheduled rate, to manage bandwidth on a network of the vehicle and/or for extra vehicle communications, to preserve buffer memory, or for any other purpose, including any up sampling operations of the present disclosure. In the example of FIG. 70, the up-sampling device 7004, which may be a translation circuit, network interface circuit, the CND, a circuit associated with the CND, a circuit regulated by the CND, or the like, generates a translated sequence of messages 7008 (e.g., processed as depicted in FIG. 16 and the related disclosure, and/or according to any other message translation and/or message processing operations set forth herein, and). The example of FIG. 70 depicts the translated sequence of messages 7008 for clarity of the description. However, the translated sequence of messages 7008 may not all be present at the same time, for example as messages are translated and sent they may be removed, deleted, expire from a cache, etc. The sequence of messages 7008 is depicted to illustrate aspects of the present disclosure. Additionally or alternatively, translation of the messages 7008 may be performed after up-sampling operations are performed, for example to reduce utilization of processing resources.

For example, some of the messages may be eliminated or adjusted as a part of the up-sampling before the translation operations (e.g., replacement of frame portions or metadata, encapsulation, processing of the payload and/or frame portions, etc.) are performed. In the example of FIG. 70, an up-sampled sequence of messages 7002 is provided and communicated, for example to a different network gateway device, to a different network of the vehicle from which the first sequence of messages 7006 is received, to an external device (e.g., service tool, cloud server, operator's mobile device, etc.), and/or stored on a memory storage device on the vehicle (e.g., for later data collection operations, as a part of stored vehicle data, etc.). In the example, the three messages of the original sequence 7006 are up-sampled to five messages of the up-sampled sequence 7002. The up-sampling operations can include converting selected messages from the original sequence 7006, for example changing an original 50 ms data stream 7006 to an up-sampled 20 ms data stream 7002 by inserting one or more generated messages 7010. The up-sampling operations may, additionally or alternatively, include interpolation and/or extrapolation of data messages between original values. For example, where the original data stream 7006 is a 50 ms data stream, and the up-sampled data stream 7002 is a 20 ms data stream, the up-sampling may include either taking the closest-in-time messages, or performing an interpolation and/or extrapolation operation (e.g., applying a linear fit, spline fit, polynomial fit, moving average, and/or a low-pass filtered progression between available data points and/or between an available data point and a predicted next data point), to be utilized as the up-sampled messages 7002.

Spanning data points or values, as utilized herein, indicate data values in the up-sampled messages 7002 that do not align in time with a corresponding original data message 7006. Non-spanning data points or values, as utilized herein, indicate data values in the up-sampled messages 7002 that align in time, or are synchronized, with the corresponding original data message 7006. It will be understood that messages of the original data message 7006 and up-sampled messages 7002 may additionally or alternatively have a phase difference, and accordingly, in certain embodiments, any or all of the original data messages 7006 may be non-spanning messages. In certain embodiments, even where a phase difference between the original data message 7006 and the up-sampled messages 7002 are present, certain messages of the original data messages 7006 may be treated as non-spanning or synchronized data messages, for example to provide a baseline up-sampled message 7002 stream that follows the progression character (e.g., in the time domain) of the original data message 7006 stream, and/or where any phase difference can be ignored for the purpose of devices or operations utilizing the up-sampled message 7002 (e.g., where such devices or operations have a response time, a required reaction time, or the like, that is significantly greater than the magnitude of any such phase difference).

In a further example, synchronized data values (e.g., every other data value when converting from 50 ms to 20 ms, such as the 0 ms phase value and the 100 ms phase value) may be utilized directly, or may also utilize a fitting function (e.g., to provide a smooth, filtered, or otherwise processed stream of data values). In certain embodiments, it may be desirable to utilize actual data values provided from the first data stream 7006 as the up-sampled data values 7002, for example where minor transient behavior from the different time steps is either not relevant to how the up-sampled data value 7002 is utilized, or where time stamp data is also communicated with the messages and accordingly the differential time steps between messages can be accounted for in processes that utilize the up-sampled data 7002. Accordingly, in certain embodiments, each message of the up-sampled data values 7002 may correspond directly to one or more of the first data stream 7006 values (e.g., selecting a synchronized one, a closest one, and/or a most recent one (e.g., holding the communicated value until a next value is available) of the first data stream 7006 values).

In certain embodiments, it may be desirable to utilize smoothed data values that simulate the time response behavior of the underlying data (e.g., original messages 7006), which may be managed utilizing interpolated/extrapolated data for spanning data values (e.g., processes that are responsive to a rate-of-change in the up-sampled data 7002, such as threshold checks on the rate-of-change), and/or also for non-spanning data values. In certain embodiments, for example where a downstream process is particularly sensitive to time variation of the data messages 7006 (e.g., a derivative portion of a PID controller), it may be desirable to ensure that all up-sampled data messages 7002 are generated from the same process, and interpolation/extrapolation operations (and/or smoothing, filtering, and/or moving average values) may be performed to generate both the spanning and non-spanning up-sampled data values 7002. In certain embodiments, non-spanning up-sampled data values 7002 are utilized directly (e.g., to provide an up-sampled data 7002 stream having the actual content of the data messages 7006 to the extent possible), and spanning up-sampled data values are processed as described herein. In certain embodiments, all original messages 7006 are provided in the up-sampled data 7002 stream, with additional non-spanning messages added to achieve the data rate of the up-sampled data 7002 stream (e.g., to provide all of the original messages 7006, and additionally support the up-sampling rate). In certain embodiments, up-sampled data messages 7002 may further include metadata or other embedded information indicating whether the message corresponds directly to an original data message 7006 or is a processed message (e.g., allowing more than one use for the up-sampled data messages 7002, diagnostic operations for a device providing the original data message 7006, and/or for any other purpose).

In certain embodiments, spanning up-sampled data values 7002 may be determined based on predicted values between non-spanning data values, which may be performed based on a virtual sensor (e.g., a model of the value utilizing other information available in the system) and/or an extrapolation fitting operation. In certain embodiments, determination of spanning up-sampled data values 7002 additionally or alternatively includes providing predicted and/or interpolated/extrapolated values that provide an expressed rate of change of the up-sampled data values 7002 determined according to the original data values 7006 and/or adjusted according to the characteristics of a device, component, operation, and/or procedure utilizing the up-sampled data values 7002. For example, up-sampling operations may include performing a predictive operation and/or interpolation/extrapolation to determine a rate of change for the value, and providing a final spanning up-sampled data value 7002 that provides the predicted rate of change for the up-sampled data value 7002. In certain embodiments, operations to provide the up-sampled data values 7002 include an operation to determine a rate of change (or derivative) determination operation in a device utilizing the up-sampled data values 7002, and adjusting the rate of change of the up-sampled data values 7002 in response to parameters of the rate of change determination in the device—for example interpreting data related to a time step utilized for the derivative operation (e.g., $\Delta T/5$ ms, or change-in-temperature per 5 milliseconds) and/or a time constant (e.g., a time constant of a low-pass filter, a time constant implicit in a moving average calculation, etc.), where the up-sampled data value 7002 is adjusted to provide a desired response in the rate of change calculations that will be performed on the up-sampled data values 7002. For example, where up-sampling operations have a significant difference in time steps between the original data value 7006 and the up-sampled data value 7002 (e.g., 50 ms to 5 ms), operations such as a linear interpolation/extrapolation of data values may provide significant distortion to the output of, for example, a low-pass filter operated by a device utilizing the up-sampled data value 7002, which may be configured to process true 5-ms data. Accordingly, in the example, operations to up-sample the original data values 7006 may include adjusting the original data values 7006 in accordance with a predicted response of a 5-ms device determining the values, which may provide significant differences in trajectory of the up-sampled data value 7002 between non-spanning data points relative to simple linear extrapolation, moving averages, or the like. Operations to adjust the expressed rate of change may be performed for up-sampled data 7002, and/or for down-sampled data 6906, or may be omitted.

In certain embodiments, configuration information for up-sampling and/or down-sampling operations, such as: whether non-spanning original data values 6902, 7006 are to be utilized directly; metadata to be stored with up-sampled and/or down-sampled data 7002, 6906; processing operations to be performed on spanning and/or non-spanning data values; whether all original data values 6902, 7006 are to be communicated; operations to provide an expressed rate of change in the up-sampled and/or down-sampled data 7002, 6906; and/or parameters of a rate of change determination in a device utilizing the up-sampled and/or down-sampled data 7002, 6906 (e.g., filter constants, derivative operations, etc.), may be provided in a memory storage location accessible to a controller and/or circuit performing up-sampling and/or down-sampling operations. Any such configuration information may be provided in whole or part at design time, such as when configuring a mobile application and devices communicating with various networks of the mobile application, and/or may be provided or updated during run-time operations. In certain embodiments, one or more aspects of the configuration information for up-sampling and/or down-sampling operations may be provided as a part of a policy, configuration instructions, and/or a configuration table, which may be accessible to a CND 108 regulating communications between devices on separate networks of the mobile application. In certain embodiments, one or more aspects of the configuration information for up-sampling and/or down-sampling operations may include default values which may be adjusted and/or updated, including as a part of a policy, configuration instructions, and/or a configuration table.

Figure 71:
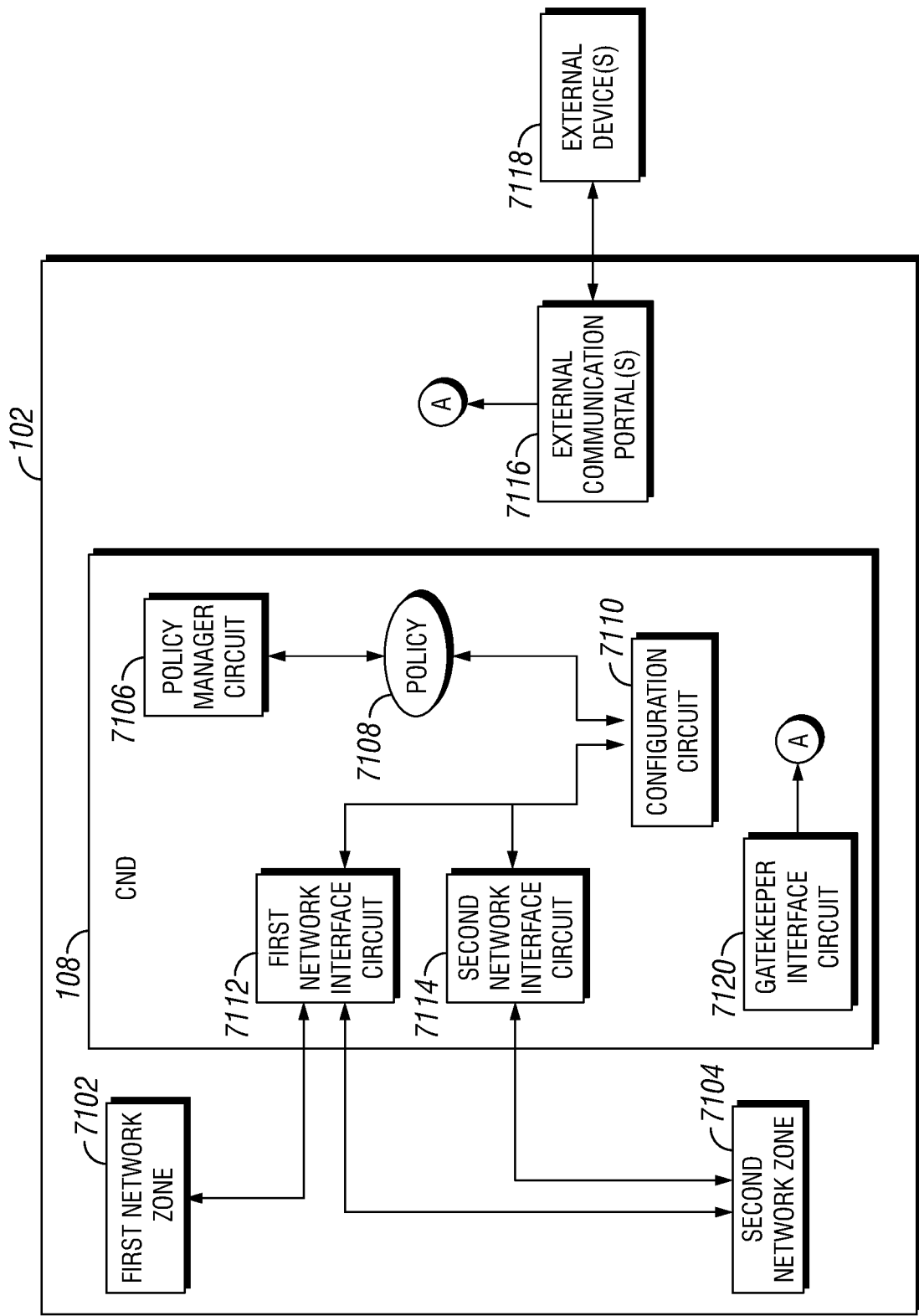
FIG. 71 is a schematic diagram of a system for regulating extra-vehicle communications according to certain embodiments of the present disclosure.

Referencing FIG. 71, an example system for controlling inter-network communications, intra-network communications, and/or extra-vehicle communications utilizing a scheduled policy scheme is schematically depicted. The example system includes a vehicle 102 having at least one network (a first network zone 7102 and a second network zone 7104, in the example of FIG. 71), a policy manager circuit 7106 that interprets a policy 7108 including external data communication parameters, such as an external data routing description and/or an external data service description. The example system includes a configuration circuit 7110 that configures a gatekeeper interface circuit 7120 in response to the policy 7108, and that regulates communications between end points of the network zones 7102, 7104 and an external communication portal 7116. The external communication portal 7116 is selectively coupled to an external device 7118. The external communication portal 7116 includes an external communication portal 7116 as set forth herein, including at least any one or more of the examples depicted in relation to FIG. 41 and the related description. In the example of FIG. 71, the gatekeeper interface circuit 7120 is depicted as coupled to the external communication portal(s) 7116. However, the gatekeeper interface circuit 7120 may regulate communications in any manner, for example by further configuring the network interface circuit(s) 7112, 7114 to allow selected communications, and/or communications having a selected processing, encapsulation, data file format, communication protocol, authorization, and/or any other regulation descriptions as described throughout the present disclosure. In the example of FIG. 71, the policy manager circuit 7106, configuration circuit 7110, and network interface circuit(s) 7112, 7114 are depicted as positioned on the CND 108. As described elsewhere herein, the CND 108 may provide instructions or otherwise regulate components, and the depicted components (and/or the CND 108) may be distributed elsewhere on the vehicle 102 separate, in whole or part, from the CND 108.

Referencing FIG. 72, an example policy 7108 includes one or more of a secondary policy value 7206, a primary policy value 7204, and/or a default policy value 7202. An example configuration circuit 7110 configures the gatekeeper interface circuit 7120 in response to the default policy value 7202 if there is no primary policy value 7204 and/or secondary policy value 7206 present (and/or if the primary policy value 7204 and/or secondary policy value 7206 are not valid), in response to the primary policy value 7204 if there is no secondary policy value 7206 present (and/or valid), and utilizing the secondary policy value 7206 if present (and valid). An example configuration circuit 7110 applies the policies if present (and/or if determined to be valid) in the order described (e.g., using the secondary policy value 7206 if present, and ignoring any remaining policy values 7204, 7202). An example configuration circuit 7110 applies more than one policy value if the policy values are compatible and/or consistent (e.g., applying a secondary policy value 7206, and applying portions of the primary policy value 7204 that are not in conflict with the secondary policy value 7206). In the example of FIG. 72 the default policy value 7202 may be a permanent storage policy (e.g., a policy stored with main executable instructions stored on a computer readable medium that include instructions for at least a portion of operations of the CND 108 and/or associated circuits therefore). In certain embodiments, the primary policy value 7204 and/or the secondary policy value 7206 include policy values that are readily updated in real time, for example stored as data files (e.g., provided at selected memory locations, selected OS logic location, according to certain naming conventions, and/or stored with selected header information, metadata, or the like identifying each policy value as a primary policy value 7204 or a secondary policy value 7206), stored as a part of a calibration set, trim set, or the like.

An example primary policy 7204 is a tool supplied policy, such as a manufacturer tool, OEM tool, service tool, or the like. In certain embodiments, the secondary policy value 7206 is a downloaded policy value, for example a policy value received from an external device through an external communications portal, and from a web based tool, cloud application, or the like. The recited examples are non-limiting, and any of the policy values may be received from any external communications portal. An example implementation includes the default policy value 7202 provided at a time of initialization of the CND 108 or related control components (e.g., a first image file applied to a controller housing executable portions of the CND 108, policy manager circuit 7106, or the like), and which is not generally updated except, for example, as a part of an entire instruction set update (e.g., updating the executable instructions provided for the CND 108 and/or portions thereof). An example implementation includes the primary policy value 7204 provided at a time of manufacture, assembly, or other initial pre-mission service or assembly operation on the vehicle. An example implementation includes the secondary policy value 7206 provided as a downloaded operation, and/or provided during a service operation, trimming and/or application configuration operation (e.g., by an OEM, body builder, or the like). The utilization of the scheduled policy values 7202, 7204, 7206 allows for the implementation of a minimum capability (and/or lowest risk) policy, providing sufficient capability for devices of the vehicle to communicate externally, for example to download and/or act on a replacement policy such as a primary policy value 7204 and/or secondary policy value 7206. The utilization of the scheduled policy values allows for various stakeholders in a manufacture, remanufacture, re-configuration, service, sale or transfer, mission change, or other vehicle related operation to ensure that policy requirements (e.g., permissions for local communicating devices to communicate within a network, across a network, to store data, and/or to communicate with external devices) are met, while allowing for ease of policy updates, implementations, and interfaces for third-parties, owner/operators, fleet owners, and the like to adjust policy values and resulting communication regulation operations. The utilization of the scheduled policy values 7202, 7204, 7206 allows for ease of policy updates, verification, and implementation. The utilization of scheduled policy values 7202, 7204, 7206 allows for re-configuration of a policy and/or regulatory response of communications to be adjusted in real time with a low impact to the mission of the vehicle (e.g., without controller reset operations, adjustment of primary executable instruction files, or the like), for example to adjust policies in response to regulatory characteristics such as geography (e.g., location of the vehicle), jurisdiction (e.g., jurisdictional location of the vehicle), and/or operations where direct control of the vehicle may not be available (e.g., after an accident, towing event, sale or other transfer, etc.). In certain embodiments, the scheduled policy values 7202, 7204, 7206 may be applied by one of a number of devices at different times, for example a default policy value 7202 applied by a first device, the primary policy value 7204 applied by a second device, and the secondary policy value 7206 applied by a third device. In certain embodiments, a given external device may apply more than one of the scheduled policy values 7202, 7204, 7206, and/or apply a later version of one of the scheduled policy values 7202, 7204, 7206 at a later time relative to application of an earlier version. In certain embodiments, more than one version of a given policy value may be present (e.g., a secondary policy value 7206) with a selected one of the versions utilized in response to operating conditions (e.g., vehicle operating conditions, geography, jurisdiction, off-nominal conditions and/or fault code conditions, etc.). In certain embodiments, a given policy value 7206 may include more than one version of an aspect of the policy, for example providing for different data collection operations for a given local communicating device, controller, flow, application, end point, etc., an selecting a version of the aspect of the policy in response to operating conditions.

Referencing FIG. 73, an example policy 7108 includes a local DNS 7302 (e.g., including local addresses to be utilized by end points on any network zone, and/or including non-local addresses to be utilized by external devices, applications, or the like, and/or including external addresses to be utilized by end points on any network zone, etc.). The example policy 7108 further includes an authorization description 7304, which may include authorizations of any type as referenced throughout the present disclosure, including authorizations of network utilization, data access descriptions, subscription authorizations, external access authorizations, policy change and/or update authorizations, and the like. The authorization description 7304 may reference flows, local communicating devices, external devices, end points, network zones, applications, service groups, vehicle controllers, source addresses, destination addresses, any other regulated components, and/or entities, users, and/or user roles associated with any of these. The example policy 7108 includes a firewall configuration description 7306, which may include, for example descriptions utilized by a firewall implementing device (e.g., a gateway interface circuit, CND, and/or an external communication portal) to determine how to operate firewall operations. In certain embodiments, the firewall configuration description 7306 includes a default behavior description (e.g., handling for unknown or unspecified communications, such as blocking communications from unknown external devices or addresses), a data access description (e.g., components of the system having permissions to contact certain addresses, certain communication types such as external devices that are responding to a request by a component, and/or scheduled access according to permissions or authorizations according to the component), and/or a data blocking description (e.g., components of the system that do not have permissions to access external devices or addresses, selected external devices or addresses, external devices or addresses that are specifically blocked, and/or specific communication types that are specifically blocked such as incoming communications requesting access to certain data types, flows, applications, vehicle functions, vehicle controllers, end points, or the like).

Referencing FIG. 74, an example policy 7108 includes a local DNS 7302 and an external data quantity description

7402. The external data quantity description 7402 may include any aspects of an external data quantity description as referenced throughout the present disclosure, including at least data caps for regulated components, data limits (e.g., bandwidth, utilization, amount of data per regulating event such as per unit time, per trip, etc.), data caps or limits associated with APNs and/or data service providers, associated with particular external communication portals, or the like. The example policy 7108 includes an external data service description 7406, which may include any aspects of an external data service description 7406 as referenced throughout the present disclosure (e.g., reference FIGS. 42, 64, and 67, and the related descriptions).

Referencing FIG. 75, an example procedure 7500 for regulating external communications is depicted schematically. The example procedure 7500 includes an operation 7502 to utilize, in order, a secondary policy value if present, a primary policy value if present, and a default policy value (e.g., if neither a secondary policy value or a primary policy value is present). The example procedure 7500 further includes an operation 7504 to interpret a policy according to the utilized policy value(s), where the policy includes an external data routing description and an external data service description. The example procedure includes an operation 7506 to configure a gatekeeper interface circuit in response to the policy, and an operation 7508 to operate the gatekeeper interface circuit to regulate communications between networks of a vehicle and external communication portal(s) of the vehicle, thereby regulating communications between end points of network zones of the vehicle and external devices.

Referencing FIG. 76, an example procedure 7600 for regulating external communications is schematically depicted. The example procedure 7600 includes an operation 7602 to interpret a policy including an external data quantity description, and an operation 7604 to determine a destination and/or source IP address (or other address), a destination and/or source port, and/or a destination and/or source identifier for a regulated communication and/or according to addresses, ports, and/or identifiers provided in the policy. The example procedure 7600 includes an operation 7606 to configure a gatekeeper interface circuit in response to the policy and the determined addresses, ports, and/or identifiers. The example procedure 7600 includes an operation 7608 to operate the gatekeeper interface circuit to regulate communications between networks of a vehicle and external communication portal(s) of the vehicle, thereby regulating communications between end points of network zones of the vehicle and external devices.

Figure 77:
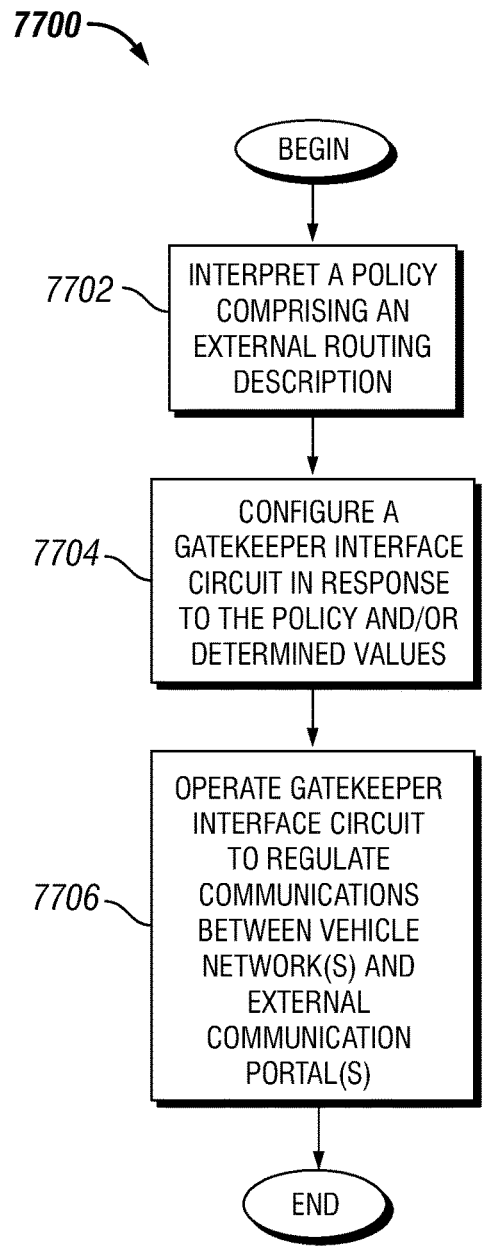
FIG. 77 is a schematic flow diagram depicting an example procedure for regulating communications of a vehicle.

Referencing FIG. 77, an example procedure 7700 for regulating external communications is schematically depicted. The example procedure 7700 includes an operation 7702 to interpret a policy including a data routing description, and an operation 7704 to configure a gatekeeper interface circuit in response to the policy and/or determined values (e.g., reference operation 7604), and an operation 7706 to operate the gatekeeper interface circuit to regulate communications between networks and/or end points of a vehicle and external communication portal(s) of the vehicle, thereby regulating communications between end points of network zones of the vehicle and external devices. An example procedure 7700 provides for routing communications to or from an end point, and switching the external communication portal (e.g., switching from cellular communications to WiFi communications) during communications, where the end point or other regulated component is not aware of, and is not interrupted by, the switch.

Figure 78:
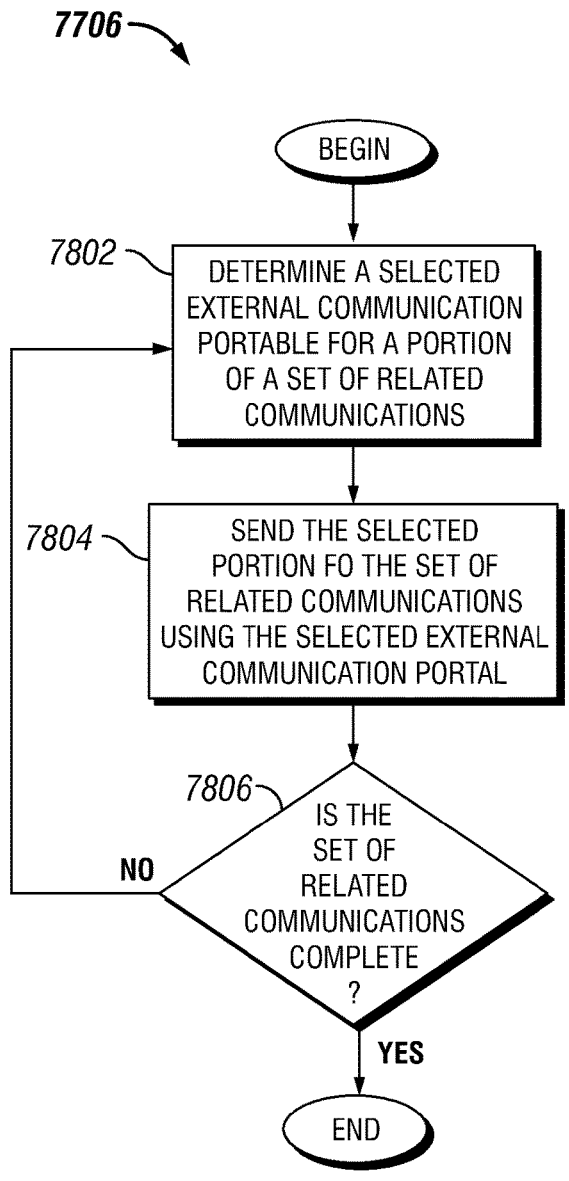
FIG. 78 is a schematic flow diagram depicting an example procedure for regulating communications of a vehicle.

Referencing FIG. 78, an example procedure 7706 to operate the gatekeeper interface circuit to regulate communications between networks and/or end points of a vehicle and external communication portal(s) of the vehicle is schematically depicted. The example procedure 7706 includes an operation 7802 to determine a selected external communication portal for a portion of a set of related communications (e.g., communications to or from an end point and/or a regulated component over a period of time, communications related as a block of data and/or data file, communications performed during a set of operating conditions, etc.). The example procedure 7706 further includes an operation 7804 to send (or receive) the portion of the set of related communications utilizing the selected external communications portal, and an operation 7806 to determine if the set of related communications is complete (e.g., if the period of time has elapsed, the block of data and/or data file is sent, and/or if the operating conditions have changed—such as an operating condition related to the regulated component such as cruise control operation, vehicle backing, an indication from an application, flow, service group, external device, etc. that an operation has completed, etc.). In response to operation 7806 indicating NO, the procedure 7706 includes repeating operation 7802, where the external communication portal may be changed for a next portion of the set of related communications. Operation 7802 to determine the external communications portal may be determined according to any criteria, including at least one or more of: a cost of using the external communications portal; a capability of the external communications portal based on current operating conditions and/or the regulated communications; a data rate availability of the external communications portal; an operating condition of the vehicle; a connection availability of the external communications portal; a data quantity limit of the external communications portal; a service delivery value of the external communications portal and/or associated with the regulated communications; and/or a time to complete the communication operations of the set of related communications utilizing the external communications portal.

Figure 79:
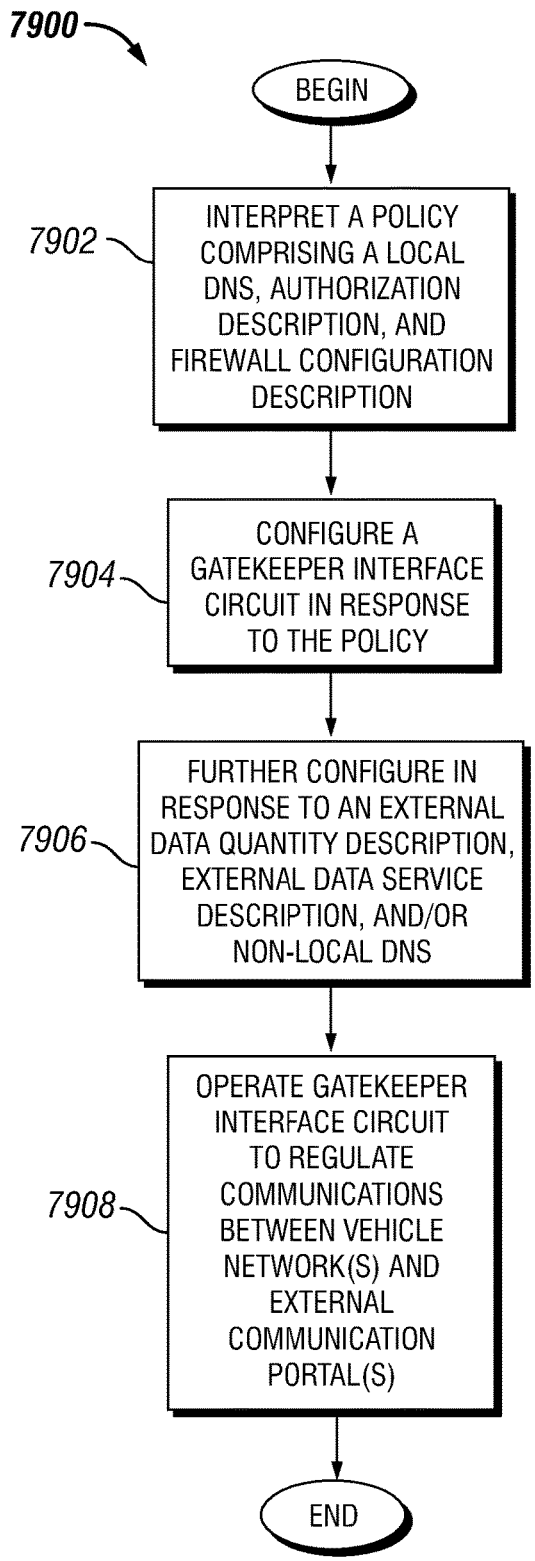
FIG. 79 is a schematic flow diagram depicting an example procedure for regulating communications of a vehicle.

Referencing FIG. 79, an example procedure 7900 for regulating external communications is schematically depicted. The example procedure 7900 includes an operation 7902 to interpret a policy including a local DNS, an authorization description, and a firewall configuration description. The example procedure 7900 includes an operation 7904 to configure a gatekeeper interface circuit in response to the policy, and an operation 7908 to operate the gatekeeper interface circuit to regulate communications between networks and/or end points of a vehicle and external communication portal(s) of the vehicle, thereby regulating communications between end points of network zones of the vehicle and external devices. An example procedure 7900 optionally includes an operation 7906 to further configure the gatekeeper interface circuit in response to one or more of an external data quantity description, an external data service description, and/or a non-local DNS (e.g., from the policy).

Figure 80:
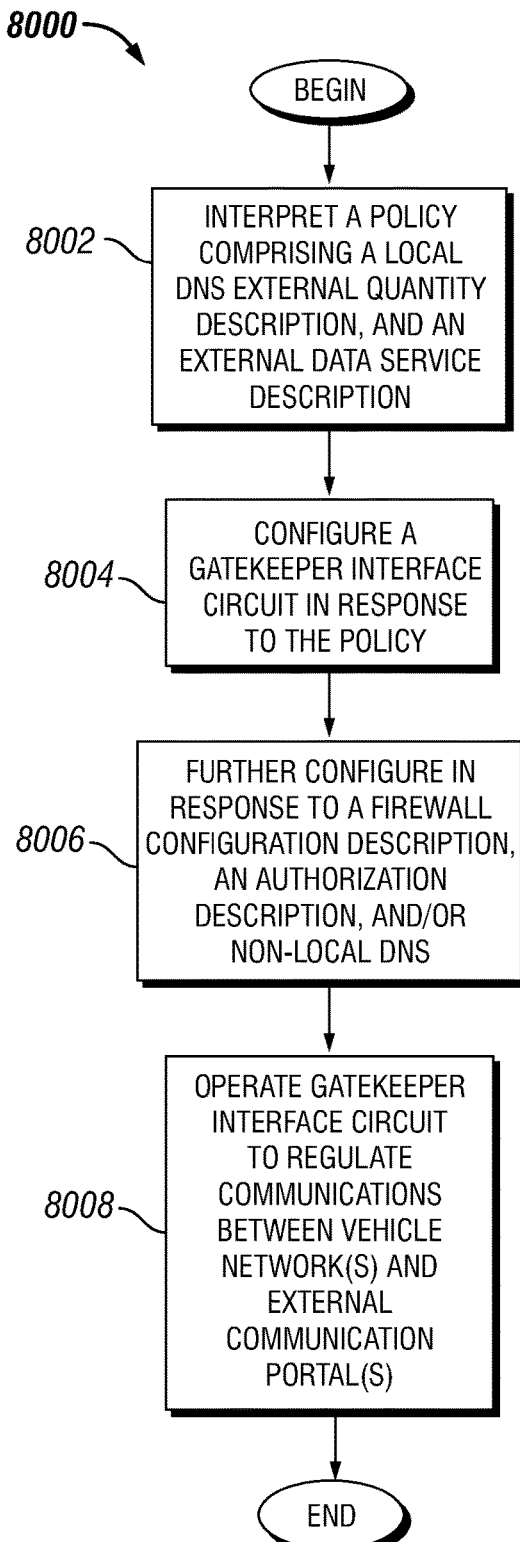
FIG. 80 is a schematic flow diagram depicting an example procedure for regulating communications of a vehicle.

Referencing FIG. 80, an example procedure 8000 for regulating external communications is schematically depicted. The example procedure 8000 includes an operation 8002 to interpret a policy including a local DNS, an external data quantity description, and an external data service description. The example procedure 8000 includes an operation 8004 to configure a gatekeeper interface circuit in response to the policy, and an operation 8008 to operate the gatekeeper interface circuit to regulate communications between networks and/or end points of a vehicle and external communication portal(s) of the vehicle, thereby regulating communications between end points of network zones of the vehicle and external devices. An example procedure 8000 optionally includes an operation 8006 to further configure the gatekeeper interface circuit in response to one or more of a firewall configuration description, an authorization description, and/or a non-local DNS (e.g., from the policy).

Figure 81:
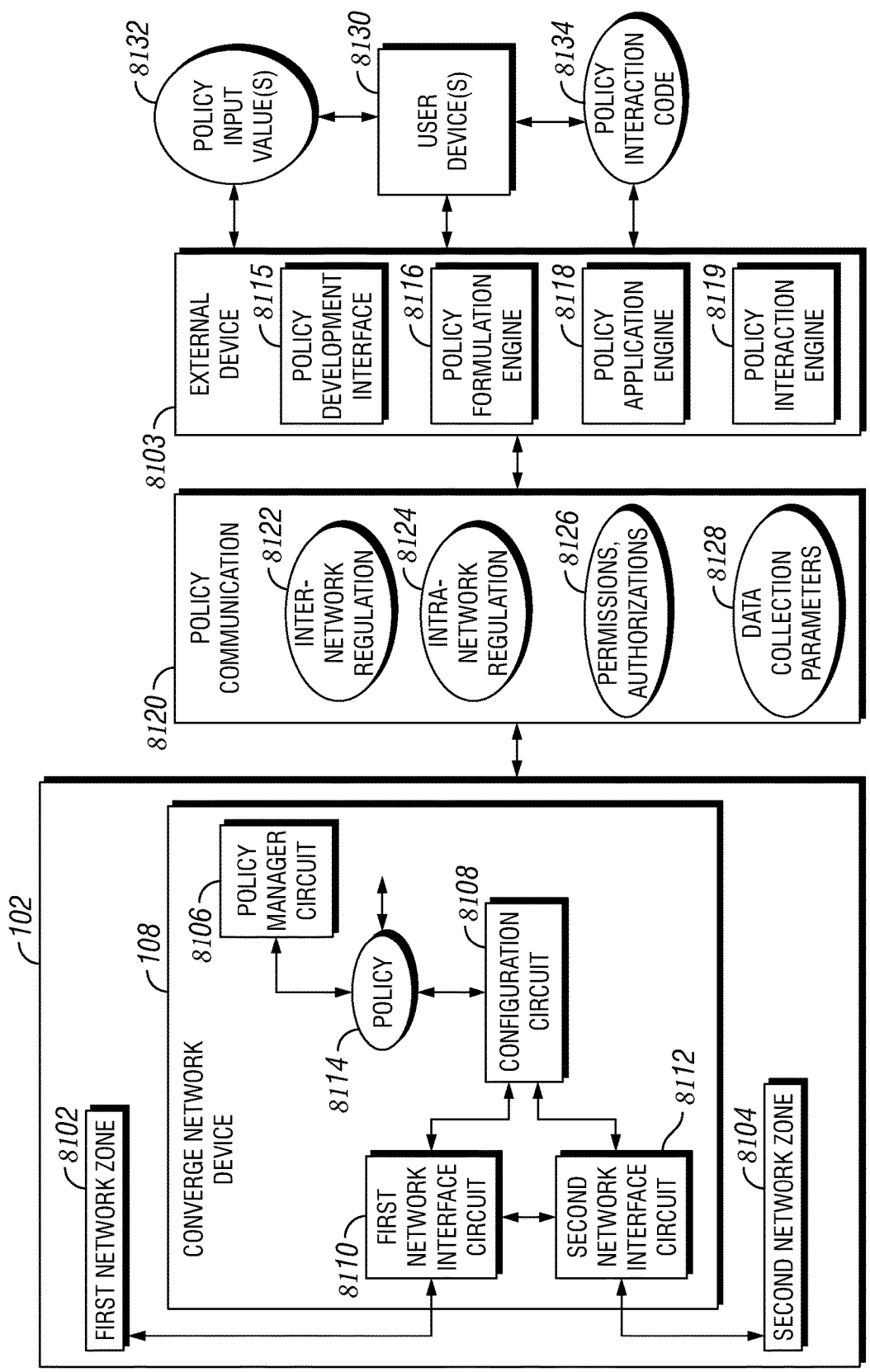
FIG. 81 is a schematic diagram of a system for regulating extra-vehicle communications according to certain embodiments of the present disclosure.

Referencing FIG. 81, an example system 8100 is depicted for regulating network communications on a vehicle, and/or for regulating extra-vehicle communications, using a CND that is externally configured. The example system 8100 includes a vehicle 102 having a first network zone 8102 and a second network zone 8104, for example network zones of a different type, such as in a vehicle having a mixed network. The example system 8100 includes a CND 108 interposed (physically and/or logically) between the network zones 8102, 8104, and further interposed (physically and/or logically) between the network zones and one or more external devices 8103. The example CND 108 includes a policy manager circuit 8106 that interprets a policy 8114, where the policy 8114 is communicated to the CND 108 from an external device 8103 (e.g., with the external device 8103 providing a policy communication 8120, where the CND 108 determines the policy 8114 in response to the policy communication 8120). The example system 8100 includes a configuration circuit 8108 that configures network interface circuit(s) (e.g., a first network interface circuit 8110 and a second network interface circuit 8112) in response to the policy 8114. In certain embodiments, the configuration circuit 8108 may configure a gatekeeper interface circuit (not shown) in response to the policy 8114. The system 8100 includes the network interface circuit(s) 8110, 8112 regulating communications between end points of the first network zone 8102 and the second network zone 8104, for example as configured by the configuration circuit 8108. In certain embodiments, the system 8100 includes a gatekeeper interface circuit that regulates communications between end points of either or both network zones 8102, 8104 and external communication portal(s) (not shown) and/or external devices 8103. The external devices 8103 for regulated communications may be the same, or distinct, external devices 8103 that provide the policy 8114. Regulating operations may be performed on inter-network communications (e.g., between network zones), intra-network communications (e.g., between devices on a given network zone), extra-vehicle communications, or other communications (e.g., communications to external devices, service tools, user devices, etc.). Any regulating operation described throughout the present disclosure are contemplated for system 8100. The example of FIG. 81 includes the policy communication 8120 having aspects such as inter-network regulation 8122 parameters, intra-network regulation 8124 parameters, extra-vehicle communication parameters (not shown), permissions and/or authorizations 8126 related to the policy, and/or data collection parameters 8128 related to the policy. The example aspects of the policy communication 8120, and the corresponding implementation of these aspects in the policy 8114 on-vehicle, are non-limiting examples provided for illustration. A given embodiment may include additional aspects of the policy, and/or may omit one or more of the depicted aspects.

An example system 8100 includes the external device 8103 being a cloud application (e.g., operating on a cloud server or other computing device, at least intermittently in communication with the vehicle), a web based tool, combinations of these, and/or having portions of the external device 8103 being one of these, with other portions provided through other implementations (e.g., a service tool, fleet tool, operator mobile device, etc.).

An example external device 8103 includes a policy development interface 8115 that accepts policy input value(s) 8132 from a number of users (e.g., via user input device(s) 8130), a policy formulation engine 8116 that compiles the policy input value(s) 8132 into a policy 8114 (and/or into one or more aspects of a policy communication 8120 utilized to provide the policy to the CND 108), and a policy application engine 8118 that communicates the policy 8114 (and/or the policy communication 8120) to the CND 108. An example policy development interface 8115 interacts with user devices 8130 to accept policy input value(s) 8132, for example operating a GUI with the user devices 8130, operating an interacting application such as a web based tool, cloud application, mobile application, etc. to receive the policy input value(s) 8132. In certain embodiments, the policy development interface 8115 accepts a configuration file (e.g., an XML file, standardized format file, etc.) from a user device 8130 as a policy input value 8132. In certain embodiments, accepting the policy input value(s) 8132 includes operations such as: determining whether a policy input value 8132 is proper (e.g., formatting, permissions associated with the user device and/or entity associated with the user device, compatibility of the policy input with available parameters, functions, sampling rates, etc. on the vehicle, and the like); parsing the policy input value 8132 into portions (e.g., data collection, network usage permission, external vehicle communication permissions, associations such as flows, applications, vehicle functions, service groups, and the like for policy portions, etc.); associating metadata with the policy input value 8132 or portions thereof (e.g., time stamps; versions of a policy, related applications, etc.; identifiers associated therewith, such as a user, user role, related entity, user device identifier, etc.); and/or prioritizing between policy input values 8132 (e.g., such as when policy input values 8132 are not compatible, and/or cannot all be included such as when an aggregate policy size limitation would be exceeded, and which may be according to any aspect of the policy input value such as data type or related vehicle function, and/or according to any association with the policy input value 8132 such as an associated entity, etc.).

An example system 8100 includes a policy interaction engine 8119 that generates policy interaction code 8134, such as header file(s), parameter definition(s), and/or an API declaration. The policy interaction engine 8119 facilitates a user-friendly development of a policy and/or portions of a policy by users, applications, and/or tools, allowing users to conveniently interact with aspects of the policy that they are authorized to develop, to select available parameters, functions, control commands, and the like, and to minimize vehicle-specific knowledge requirements for users developing the policy and/or aspects of the policy.

An example system 8100 includes a policy 8114 having a data collection definition (e.g., data parameters to be collected, and/or including information such as processing to be performed, data formats for individual data elements, data formats for storage of the data such as a file type for the stored data, communication parameters such as data rates, timeliness, treatment of aging data and/or expiration of data, etc., including any data collection parameters set forth throughout the present disclosure). An example data collection definition includes at least one local communicating device (e.g., an end point, flow, application, network zone, vehicle function, service group, etc. as described throughout the present disclosure) corresponding to at least one data collection parameter. An example system 8100 further includes a user entering an identifier, address, and/or port for a source and/or for a destination of the collected data (e.g., identifying the local communicating device(s) that is(are) the source for the collected data, and/or identifying a destination for the collected data)—e.g., by the user providing the data collection definition as a policy input value 8132 that is thereby implemented as a part of the policy 8114. An example system 8100 includes the CND 108 performing a data collection operation utilizing the data collection definition, thereby collecting data from the vehicle according to the user entered parameters for the generated data source and/or destination.

An example system 8100 includes an operation to provide all or a portion of the data collection definition, which may be performed instead of utilizing user-defined portions (e.g., where addresses or other information are intentionally hidden from the user for security purposes and/or to facilitate ease of implementation of user entry of policy input values), and/or in addition to utilizing user-defined portions (e.g., to correct a user-defined portion that may have an incorrect value, to translate a user-defined portion that may be utilizing a legacy addressing value for an end point, etc.). In certain embodiments, the CND 108 may perform operations to provide all or a portion of the data collection definition, for example utilizing translating information provided in the policy 8114 available to the CND 108, to translate addresses where an end point of the vehicle has moved (e.g., between network zones and/or to a different address), or the like. In certain embodiments, the policy formulation engine 8116 may perform operations to provide all or a portion of the data collection definition, for example to mask addresses from a user device, to allow reference to data parameters according to an industry standard, simplified description, or the like, and/or where certain responsibilities to perform operations for providing, updating, and/or correcting the data collection definition are divided between the CND 108 and the policy formulation engine 8116. For example, the CND 108 may perform certain operations to provide, update, and/or correct the data collection definition (e.g., local, vehicle-specific operations such as local address translations), and the policy formulation engine 8116 may perform other operations to provide, update, and/or correct the data collection definition (e.g., server-side operations such as data destination locations off-vehicle, providing scheduled information availability and/or capability to different users, user devices, applications, entities, and the like, etc.).

Figure 82:
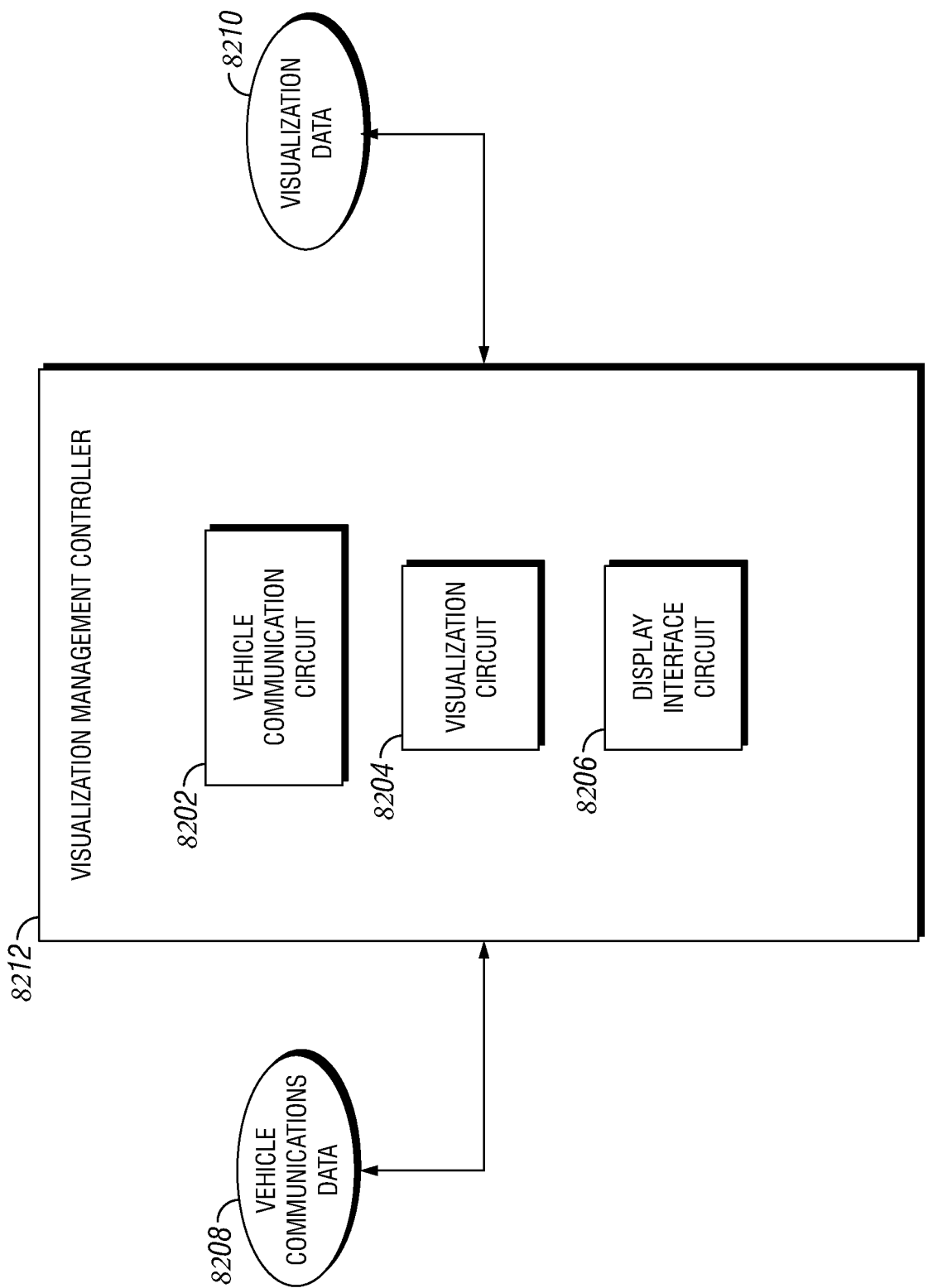
FIG. 82 is a schematic depiction of a visualization management controller.

Referencing FIG. 82, an example visualization management controller 8212 is depicted, which is configured to functionally execute operations to depict data flows on the vehicle, and/or to provide visualizations of the vehicle network and aspects of the network utilization, CND, end points, or the like. The example visualization management controller 8212 may be utilized with any system throughout the present disclosure, and/or to perform one or more aspects of operations throughout the present disclosure. The visualization management controller 8212 may be distributed across one or more vehicle controllers, the CND, and/or an external device, and/or may be provided on a single one of these. The aspects of the visualization management controller 8212 that are provided on-vehicle and/or external to the vehicle may vary depending upon the characteristics of the system, the entities (e.g., controllers, applications, flows, external devices, third-party applications, etc.) that are expected to access vehicle network data (and/or that will have capability to access vehicle network data), the communication plan (e.g., the scheme to communicate network data and/or visualization data from the vehicle and/or from a cloud storage location), and/or the processing plan (e.g., the scheme to process monitoring data into visualization data, the types of processing to be performed, and the number of distinct types of processing to be performed for various clients of the visualization data). A visualization management controller 8212 may be utilized to monitor vehicle networks (e.g., to diagnose issues on one or more networks, to monitor communications from local communicating devices, and/or to diagnose secondary issues that may be presented by unusual network utilization and/or data flow on the vehicle).

The example visualization management controller 8212 includes a vehicle communication circuit 8202 that interprets vehicle communications data 8208 (e.g., data flow on a network zone, between network zones, through the CND or other regulating components, and/or related to particular end points, flows, service groups, vehicle controllers, vehicle functions, applications, etc.). Example vehicle communications data 8208 includes one or more of the following: communications between end points of a network zone of the vehicle (e.g., on the same or on different network zones); and/or communications between local communicating device (e.g., on the same or on different network zones, and/or distributed across more than one network zone). The example visualization management controller 8212 includes a visualization circuit 8204 that generates visualization data 8210 (e.g., reference FIGS. 20-27 and the related descriptions), and a display interface circuit 8206 that transmits the visualization data 8210, for example to an external device, to a user device (e.g., a service tool, network monitoring tool, a third-party application, and/or an application utilized by a user monitoring the network(s) of the vehicle and/or other aspects of the vehicle related to the networks and/or data flows of the vehicle). An example visualization management controller 8212 includes the vehicle communication circuit 8202 positioned, in whole or part, on the vehicle (e.g., on the CND, on a vehicle controller, and/or on a network interface circuit), where the vehicle communication data 8208 is provided to a port of a network zone (e.g., a monitoring port, a mirrored port, and/or a port otherwise accessible to an external device). An example visualization management controller 8212 includes the visualization circuit positioned on an external device, where the display interface circuit 8206 provides the visualization data 8210 to a user device communicatively coupled to the external device. Without limitation to any other aspect of the present disclosure, example visualization data 8210 includes one or more of the following: a graphical representation of at least a portion of communications between local communicating devices of the vehicle; a graphical flow representation of at least a portion of communications passing through the CND; a graphical flow representation of at least a portion of communications regulated by at least one of the first network interface circuit or the second network interface circuit; and/or a graphical flow representation of at least a portion of communications passing between the first network zone and the second network zone. Example and non-limiting graphical flow representations include a data table depicting data flows, and/or any aspects of data flows as described throughout the present disclosure.

Figure 83:
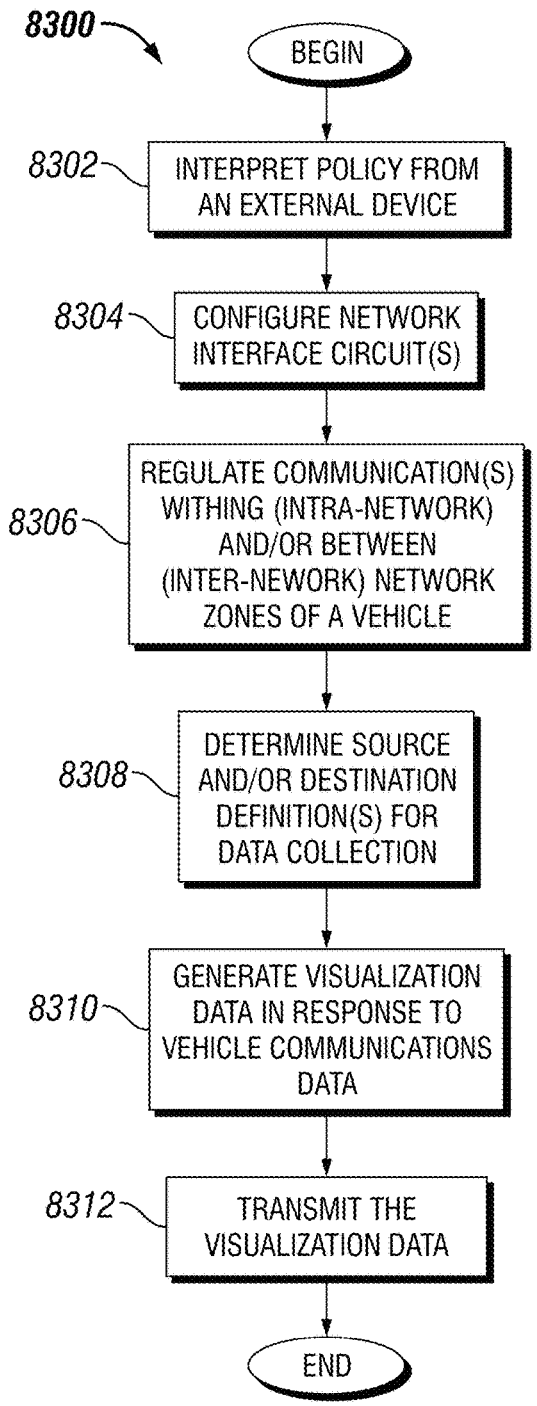
FIG. 83 is a schematic flow diagram of a procedure for providing visualization data.

Referencing FIG. 83, an example procedure 8300 to transmit visualization data to an external device and/or a user device is schematically depicted. The example procedure 8300 includes an operation 8302 to interpret a policy from an external device, and an operation 8304 to configure network interface circuit(s) and/or a gatekeeper interface circuit in response to the policy. The example procedure 8300 includes an operation 8306 to regulate communications on the vehicle (inter-network, intra-network, and/or extra-vehicle communications), and an operation 8308 to determine source and/or destination definitions for data collection. The example procedure 8300 includes an operation 8308 to determine visualization data in response to the vehicle communications data (e.g., collected in response to the policy, and the source/destination definitions for the collected data), and an operation 8312 to transmit the visualization data (e.g., to an external device, user device, data storage, application, etc.).

Figure 84:
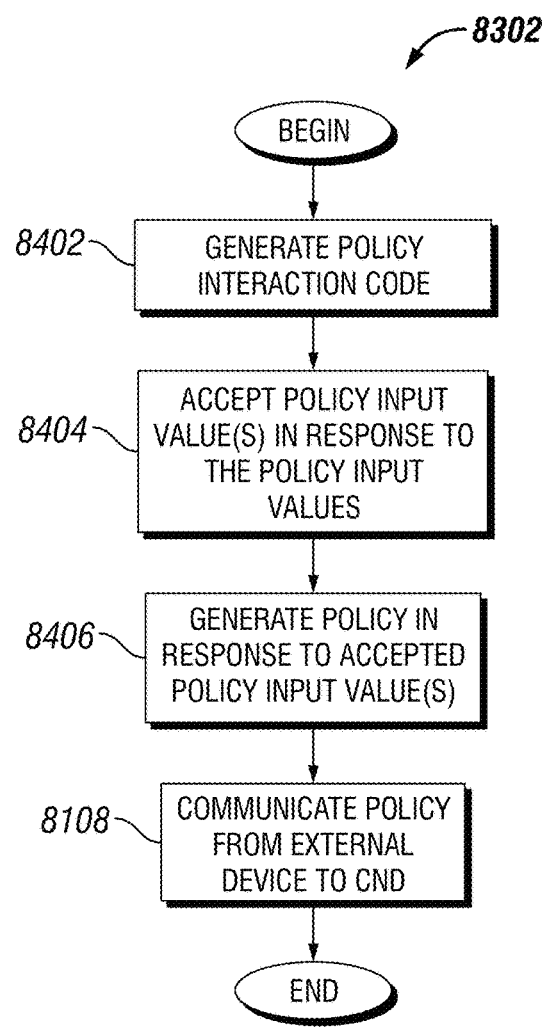
FIG. 84 is a schematic flow diagram of a procedure for updating a policy.

Referencing FIG. 84, an example procedure 8302 to interpret a policy for configuring regulation of inter-network, intra-network, and/or extra-vehicle communications is schematically depicted. The example procedure 8302 includes an operation 8402 to generate a policy interaction code, an operation 8404 to accept policy input value(s) in response to the policy interaction code, and an operation 8406 to generate a policy in response to the accepted input value(s). The example procedure 8302 further includes an operation 8408 to communicate the generated policy to a CND using an external device.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. A system, comprising:
    a mobile system having a first network zone and a second network zone of a different type than the first network zone, and wherein the second network zone utilizes an IP addressing protocol;
    a policy manager circuit structured to interpret a policy comprising an external data routing description, wherein the external data routing description comprises:
        a plurality of external address values for external network access locations, each of the plurality of external address values corresponding to an end point of a plurality of end points of the second network zone; and
        a local domain name server (DNS) comprising a plurality of local address values for end points of the plurality of end points of the second network zone, each of the local address values corresponding to at least one non-local address value for an end point of the plurality of end points of the second network zone;
    a gatekeeper interface circuit interposed between the first network zone and a transceiver selectively couplable to an external device, and further interposed between the second network zone and the transceiver; and
    a configuration circuit structured to configure the gatekeeper interface circuit in response to the external data routing description;
    wherein the gatekeeper interface circuit is structured to:
        regulate communications between end points of the first network zone and the transceiver;
        regulate communications between end points of the second network zone and the transceive; and
        access an off-mobile system external DNS in response to a request by the end point of the plurality of end points of the second network zone to communicate with an external address value, wherein the external address value is not found on the local DNS.

2. The system of claim 1, wherein the policy manager circuit is further structured to update the local DNS in response to determining a second network zone end point address change.

3. The system of claim 1, wherein a first external address value of the plurality of external address values comprises both a corresponding IPv4 external address and a corresponding IPv6 address.

4. The system of claim 1, wherein the gatekeeper interface circuit is further configured to update the local DNS in response to the accessing the off-mobile system external DNS.

5. The system of claim 1, wherein the external data routing description comprises a local DNS comprising a plurality of local address values each corresponding to one of the end points of the second network zone, each corresponding to at least one non-local address value for the end point of the plurality of end points of the second network zone.

6. The system of claim 5, wherein at least a portion of the at least one non-local address values comprise both a corresponding IPv4 non-local address and a corresponding IPv6 non-local address.

7. The system of claim 6, wherein at least a portion of the plurality of local address values comprise a corresponding non-local address value that matches the corresponding local address value.

8. The system of claim 5, wherein the first network zone does not utilize an IP addressing protocol, and wherein the local DNS further comprises at least one local address value corresponding to one of the end points of the first network zone, and a corresponding at least one non-local address value for the at least one local address value.

9. The system of claim 8, wherein the corresponding at least one non-local address value for the at least one local address value corresponding to the one of the end points of the first network zone comprises an IP addressing protocol.

10. The system of claim 9, wherein the corresponding at least one non-local address value for the at least one local address value corresponding to the one of the end points of the first network zone comprises both a corresponding IPv4 non-local address and a corresponding IPv6 non-local address.

11. A method comprising:
interpreting, via a policy manager circuit for a vehicle having a first network zone and a second network zone, a policy comprising an external data routing description, wherein the second network zone is of a different type than the first network zone, the second network zone utilizes an IP addressing protocol, and the external data routing description comprises a local domain name server (DNS) comprising a plurality of local address values for end points of the second network zone, each corresponding to at least one non-local address value for the end points of the second network zone;
responsive to the external data routing description, configuring, via a configuration circuit, a gatekeeper interface circuit;
regulating, via the gatekeeper interface circuit, communications between end points of a first network zone of a vehicle and a transceiver; and
regulating, via the gatekeeper interface circuit, communications between end points of a second network zone of the vehicle and the transceiver;
wherein the gatekeeper interface circuit is interposed between the first network zone and the transceiver, and further interposed between the second network zone and the transceiver.

12. The method of claim 11 further comprising:
determining, via the policy manager circuit, an address change of an end point of the second network zone; and
updating, via the policy manager circuit, the local DNS in response to the address change.

13. The method of claim 11, wherein the external data routing description comprises an external DNS comprising a plurality of external address values for external network access locations, each corresponding to an external resource.

14. The method of claim 11, wherein the external data routing description comprises an external DNS comprising a plurality of external address values for external network access locations, each corresponding to an end point of the second network zone.

15. The method of claim 13, wherein at least a portion of the plurality of external address values comprise both a corresponding IPv4 external address and a corresponding IPv6 address.

16. The method of claim 13 further comprising:
accessing, via the gatekeeper interface circuit, an off-vehicle external DNS in response to a request by an end point of the second network zone to communicate with an external address value, wherein the external address value is not found on the external DNS.

17. The method of claim 16, wherein the external data routing description comprises a local DNS comprising a plurality of local address values each corresponding to one of the end points of the second network zone, each corresponding to at least one non-local address value for the one of the end points of the second network zone.

18. The method of claim 17, wherein at least a portion of the at least one non-local address values comprise both a corresponding IPv4 non-local address and a corresponding IPv6 non-local address.

19. The method of claim 18, wherein at least a portion of the plurality of local address values comprise a corresponding non-local address value that matches the corresponding local address value.

20. A system, comprising:
a mobile system having a first network zone and a second network zone of a different type than the first network zone, and wherein the second network zone utilizes an IP addressing protocol;
a policy manager circuit structured to interpret a policy comprising an external data routing description, wherein the external data routing description comprises a local domain name server (DNS) comprising a plurality of local address values for end points of the second network zone, each corresponding to at least one non-local address value for the end points of the second network zone;
a gatekeeper interface circuit interposed between the first network zone and a transceiver selectively couplable to an external device, and further interposed between the second network zone and the transceiver; and
a configuration circuit structured to configure the gatekeeper interface circuit in response to the external data routing description;
wherein:
the gatekeeper interface circuit is structured to regulate communications between end points of the first network zone and the transceiver, and to regulate communications between end points of the second network zone and the transceiver; and
the external data routing description comprises a local domain name server (DNS) comprising a plurality of local address values each corresponding to one of the end points of the second network zone, each corresponding to at least one non-local address value for the one of the end points of the second network zone.

21. The system of claim 20, wherein at least a portion of the at least one non-local address values comprise both a corresponding IPv4 non-local address and a corresponding IPv6 non-local address.

22. The system of claim 21, wherein at least a portion of the plurality of local address values comprise a corresponding non-local address value that matches the corresponding local address value.

23. The system of claim 20, wherein the first network zone does not utilize an IP addressing protocol, and wherein the local DNS further comprises at least one local address value corresponding to one of the end points of the first network zone, and a corresponding at least one non-local address value for the at least one local address value.

24. The system of claim 23, wherein the corresponding at least one non-local address value for the at least one local address value corresponding to the one of the end points of the first network zone comprises an IP addressing protocol.

25. The system of claim 24, wherein the corresponding at least one non-local address value for the at least one local address value corresponding to the one of the end points of the first network zone comprises both a corresponding IPv4 non-local address and a corresponding IPv6 non-local address.

\* \* \* \* \*

UNITED STATES PATENT AND TRADEMARK OFFICE
CERTIFICATE OF CORRECTION

| | | |
|---|---|---|
| PATENT NO. | : 12,003,374 B2 | Page 1 of 1 |
| APPLICATION NO. | : 17/674309 | |
| DATED | : June 4, 2024 | |
| INVENTOR(S) | : Fang et al. | |

It is certified that error appears in the above-identified patent and that said Letters Patent is hereby corrected as shown below:

In the Drawings

On sheet 63 of 63, Fig. 84, reference numeral 8108, Line 1, delete "8108" and insert --8408-- therefor In the Specification In Column 21, Line 19, delete "308" and insert --314-- therefor In Column 21, Line 26, delete "308" and insert --314-- therefor In Column 21, Line 31, delete "308." and insert --314.-- therefor In Column 23, Line 14, delete "18" and insert --108-- therefor In Column 23, Line 27, delete "308" and insert --314-- therefor In Column 24, Line 48, delete "4040" and insert --402-- therefor In Column 27, Line 47, delete "418, 508" and insert --418, 416-- therefor In Column 27, Line 51, delete "418, 508" and insert --418, 416-- therefor In Column 33, Line 37, delete "1502" and insert --1504-- therefor In Column 51, Line 35, delete "2022" and insert --2002-- therefor In the Claims In Column 92, Line 46, in Claim 1, delete "transceive;" and insert --transceiver;-- therefor Signed and Sealed this
First Day of April, 2025

Coke Morgan Stewart
*Acting Director of the United States Patent and Trademark Office*